US010562492B2

(12) United States Patent
Joao

(10) Patent No.: US 10,562,492 B2
(45) Date of Patent: *Feb. 18, 2020

(54) CONTROL, MONITORING AND/OR SECURITY APPARATUS AND METHOD

(75) Inventor: Raymond Anthony Joao, Yonkers, NY (US)

(73) Assignee: GTJ VENTURES, LLC, Yonkers, NY (US)

( * ) Notice: Subject to any disclaimer, the term of this patent is extended or adjusted under 35 U.S.C. 154(b) by 2010 days.

This patent is subject to a terminal disclaimer.

(21) Appl. No.: 10/420,799

(22) Filed: Apr. 23, 2003

(65) Prior Publication Data

US 2003/0206102 A1 Nov. 6, 2003

Related U.S. Application Data

(60) Provisional application No. 60/441,482, filed on Jan. 22, 2003, provisional application No. 60/377,134, filed on May 1, 2002.

(51) Int. Cl.
*G08B 1/08* (2006.01)
*B60R 25/102* (2013.01)
(Continued)

(52) U.S. Cl.
CPC ............ *B60R 25/102* (2013.01); *B60R 25/33* (2013.01); *B64D 45/0031* (2019.08)

(58) Field of Classification Search
CPC ....... B60R 25/102; B60R 25/33; B60R 25/12; B60W 2250/40; B60W 2550/404;
(Continued)

(56) References Cited

U.S. PATENT DOCUMENTS 2,674,352 A    4/1954   Braun, Sr.
3,482,037 A   12/1969   Brown et al.
(Continued)

FOREIGN PATENT DOCUMENTS

CA    1277400    12/1990
DE    4423328    1/1996
(Continued)

OTHER PUBLICATIONS

CU-SeeMe Development Team, CU-SeeMe Welcome Page, Last pass: Nov. 11, 1996, http://web.archive.org/web/19970418025505/cu-seeme.cornell.edu/Welcome.html.
(Continued)

*Primary Examiner* — Van T Trieu
(74) *Attorney, Agent, or Firm* — Raymond A. Joao, Esq.

(57) ABSTRACT

An apparatus, including a receiver which receives information regarding a limitation or restriction for allowing or prohibiting a control operation or monitoring operation regarding a vehicle or premises, a memory which stores the information, and a first controller programmed to perform a control or monitoring operation regarding the vehicle or premises. The receiver receives a first signal transmitted from a second controller, containing information regarding the control operation or monitoring operation. The first controller determines, using the information, if the control operation or monitoring operation is allowed or disallowed. If allowed, the first controller transmits a second signal to a third controller. The third controller generates a third signal in response to the second signal, which activates, deactivates, enables, disables, controls an operation of, or monitors an operation of, the vehicle or premises, or a system, equipment system, equipment, component, device, or accessory, of the vehicle or premises.

37 Claims, 24 Drawing Sheets

US 10,562,492 B2

Page 2

(51) Int. Cl.
B64D 45/00 (2006.01)
B60R 25/33 (2013.01)

(58) Field of Classification Search
CPC ...... B60W 2550/406; B60W 2550/408; G08B 19/00; G01R 31/005; G01R 31/006; G01R 31/007; G01R 31/008; G07C 2205/02
USPC .............. 340/539.1, 539.11, 539.14, 539.16, 340/539.17, 539.19, 425.5, 426.13, 340/426.14, 426.16, 428, 429, 439; 307/10.2
See application file for complete search history.

(56) References Cited

U.S. PATENT DOCUMENTS

| | | |
|---|---|---|
| 3,669,288 A | 6/1972 | Young |
| 3,866,164 A | 2/1975 | Peterson |
| 3,866,165 A | 2/1975 | Peterson |
| 4,003,045 A | 1/1977 | Stockdale |
| 4,050,301 A | 9/1977 | Cushing |
| 4,064,509 A | 12/1977 | Stockdale |
| 4,074,248 A | 2/1978 | Stockdale |
| 4,100,543 A | 7/1978 | Stockdale et al. |
| 4,137,429 A | 1/1979 | Stockdale |
| 4,137,553 A | 1/1979 | Tokitsu et al. |
| 4,138,657 A | 2/1979 | Shave |
| 4,145,581 A | 3/1979 | Stockdale |
| 4,156,235 A | 5/1979 | Stockdale |
| 4,156,286 A | 5/1979 | Connors et al. |
| 4,191,948 A | 3/1980 | Stockdale |
| 4,201,908 A | 5/1980 | Johnson et al. |
| 4,206,449 A | 6/1980 | Galvin et al. |
| 4,216,375 A | 8/1980 | Ulch et al. |
| 4,236,215 A | 11/1980 | Callahan et al. |
| 4,258,421 A | 3/1981 | Juhasz et al. |
| 4,263,945 A | 4/1981 | Van Ness |
| 4,326,221 A | 4/1982 | Malls et al. |
| 4,333,093 A | 6/1982 | Raber et al. |
| 4,337,651 A | 7/1982 | Yoshino et al. |
| 4,347,590 A | 8/1982 | Heger et al. |
| 4,373,116 A | 2/1983 | Shimizu et al. |
| 4,378,574 A | 3/1983 | Stephenson |
| 4,409,670 A | 10/1983 | Herndon et al. |
| 4,420,238 A | 12/1983 | Felix |
| 4,454,583 A | 6/1984 | Schneiderhan et al. |
| 4,470,116 A | 9/1984 | Ratchford |
| 4,489,387 A | 12/1984 | Lamb et al. |
| 4,498,075 A | 2/1985 | Gaudio |
| 4,522,146 A | 6/1985 | Carlson |
| 4,524,243 A | 6/1985 | Shapiro |
| 4,554,584 A | 11/1985 | Elam et al. |
| 4,591,823 A | 5/1986 | Horvat |
| 4,596,988 A | 6/1986 | Wanka |
| 4,602,127 A | 7/1986 | Neely et al. |
| 4,604,711 A | 8/1986 | Benn et al. |
| 4,622,541 A | 11/1986 | Stockdale |
| 4,623,320 A | 11/1986 | Kakizaki et al. |
| 4,638,289 A | 1/1987 | Zottnik |
| 4,644,478 A | 2/1987 | Stephens et al. |
| 4,644,494 A | 2/1987 | Muller |
| 4,645,872 A | 2/1987 | Pressman et al. |
| 4,651,143 A | 3/1987 | Yamanaka |
| 4,656,585 A | 4/1987 | Stephenson |
| 4,660,145 A | 4/1987 | Hansen |
| 4,671,111 A | 6/1987 | Lemelson |
| 4,673,937 A | 6/1987 | Davis |
| 4,677,429 A | 6/1987 | Glotzbach |
| 4,682,292 A | 7/1987 | Bue et al. |
| 4,729,102 A | 3/1988 | Miller, Jr. et al. |
| 4,733,215 A | 3/1988 | Memmola |
| 4,768,087 A | 8/1988 | Taub et al. |
| 4,768,740 A | 9/1988 | Corrie |
| 4,772,875 A | 9/1988 | Maddox et al. |
| 4,775,028 A | 10/1988 | De Herring |
| 4,785,404 A | 11/1988 | Sims et al. |
| 4,785,472 A | 11/1988 | Shapiro |
| 4,789,904 A | 12/1988 | Peterson |
| 4,804,937 A | 2/1989 | Barbiaux et al. |
| 4,818,998 A | 4/1989 | Apsell et al. |
| 4,831,438 A | 5/1989 | Bellman, Jr. et al. |
| 4,831,539 A | 5/1989 | Hagenbuch |
| 4,833,450 A | 5/1989 | Buccola et al. |
| 4,835,546 A | 5/1989 | Keller |
| 4,837,798 A | 6/1989 | Cohen et al. |
| 4,838,275 A | 6/1989 | Lee |
| 4,841,815 A | 6/1989 | Takahashi |
| 4,853,850 A | 8/1989 | Krass, Jr. et al. |
| 4,857,912 A | 8/1989 | Everett, Jr. et al. |
| 4,860,112 A | 8/1989 | Nichols et al. |
| 4,876,597 A | 10/1989 | Roy et al. |
| 4,878,175 A | 10/1989 | Norden-Paul et al. |
| 4,882,579 A | 11/1989 | Siwiak |
| 4,882,743 A | 11/1989 | Mahmoud |
| 4,882,746 A | 11/1989 | Shimada |
| 4,891,650 A | 1/1990 | Sheffer |
| 4,893,240 A | 1/1990 | Karkouti |
| 4,896,580 A | 1/1990 | Rudnicki |
| 4,897,642 A | 1/1990 | Dilullo et al. |
| 4,908,629 A | 3/1990 | Apsell et al. |
| 4,931,793 A | 6/1990 | Fuhrmann et al. |
| 4,939,522 A | 7/1990 | Newstead et al. |
| 4,945,410 A | 7/1990 | Walling |
| 4,958,454 A | 9/1990 | Chan et al. |
| 4,959,713 A | 9/1990 | Morotomi et al. |
| 4,963,995 A | 10/1990 | Lang |
| 4,988,992 A | 1/1991 | Heitschel et al. |
| 4,989,146 A | 1/1991 | Imajo |
| 4,991,123 A | 2/1991 | Casamassima |
| 5,002,491 A | 3/1991 | Abrahamson et al. |
| 5,003,317 A | 3/1991 | Gray et al. |
| 5,005,126 A | 4/1991 | Haskin |
| 5,006,840 A | 4/1991 | Hamada et al. |
| 5,008,840 A | 4/1991 | DePierro |
| 5,014,206 A | 5/1991 | Scribner et al. |
| 5,025,253 A | 6/1991 | Dilullo et al. |
| 5,027,104 A | 6/1991 | Reid |
| 5,031,103 A | 7/1991 | Kamimura et al. |
| 5,032,845 A | 7/1991 | Velasco |
| 5,055,851 A | 10/1991 | Sheffer |
| 5,056,056 A | 10/1991 | Gustin |
| 5,056,136 A | 10/1991 | Smith |
| 5,057,932 A | 10/1991 | Lang |
| 5,058,423 A | 10/1991 | Ozaki et al. |
| 5,061,916 A | 10/1991 | French et al. |
| 5,065,321 A | 11/1991 | Bezos et al. |
| 5,068,656 A | 11/1991 | Sutherland |
| 5,070,320 A | 12/1991 | Ramono |
| 5,075,527 A | 12/1991 | Ikuma |
| 5,081,667 A | 1/1992 | Drori et al. |
| 5,083,106 A | 1/1992 | Kostusiak et al. |
| 5,084,828 A | 1/1992 | Kaufman et al. |
| 5,086,385 A | 2/1992 | Launey et al. |
| 5,097,253 A | 3/1992 | Eschbach et al. |
| 5,103,221 A | 4/1992 | Memmola |
| 5,113,427 A | 5/1992 | Ryoichi et al. |
| 5,115,678 A | 5/1992 | Ozaki et al. |
| 5,128,874 A | 7/1992 | Bhanu et al. |
| 5,132,992 A | 7/1992 | Yurt et al. |
| 5,133,079 A | 7/1992 | Ballantyne et al. |
| 5,138,649 A | 8/1992 | Krisbergh et al. |
| 5,144,661 A | 9/1992 | Shamosh et al. |
| 5,157,491 A | 10/1992 | Kassatly |
| 5,164,839 A | 11/1992 | Lang |
| 5,168,170 A | 12/1992 | Hartig |
| 5,173,932 A | 12/1992 | Johansson et al. |
| 5,189,396 A | 2/1993 | Stobbe |
| 5,192,999 A | 3/1993 | Graczyk et al. |
| 5,195,126 A | 3/1993 | Carrier et al. |
| 5,206,934 A | 4/1993 | Naef, III |
| 2,081,756 A | 5/1993 | Song |
| 5,208,756 A | 5/1993 | Song |
| 5,210,873 A | 5/1993 | Gay et al. |

(56) References Cited

U.S. PATENT DOCUMENTS

| | | |
|---|---|---|
| 5,218,367 A | 6/1993 | Sheffer et al. |
| 5,223,816 A | 6/1993 | Levinson et al. |
| 5,223,844 A | 6/1993 | Mansell et al. |
| 5,224,211 A | 6/1993 | Roe |
| 5,225,842 A | 7/1993 | Brown et al. |
| 5,239,468 A | 8/1993 | Sewersky et al. |
| 5,239,674 A | 8/1993 | Comroe et al. |
| 5,247,439 A | 9/1993 | Gurmu et al. |
| 5,247,564 A | 9/1993 | Zicker |
| 5,253,275 A | 10/1993 | Yurt et al. |
| 5,260,874 A | 11/1993 | Berner et al. |
| 5,262,875 A | 11/1993 | Mincer et al. |
| 5,263,396 A | 11/1993 | Ladan et al. |
| 5,276,728 A | 1/1994 | Pagliaroli et al. |
| 5,281,367 A | 1/1994 | Schleck et al. |
| 5,283,643 A | 2/1994 | Fujimoto |
| 5,287,398 A | 2/1994 | Briault |
| 5,295,551 A | 3/1994 | Sukonick |
| 5,299,132 A | 3/1994 | Wortham |
| 5,303,042 A | 4/1994 | Lewis et al. |
| 5,310,349 A | 5/1994 | Daniels et al. |
| 5,313,201 A | 5/1994 | Ryan |
| 5,315,711 A | 5/1994 | Barone et al. |
| 5,317,323 A | 5/1994 | Kennedy et al. |
| 5,318,450 A | 6/1994 | Carver |
| 5,321,396 A | 6/1994 | Lamming et al. |
| 5,331,577 A | 7/1994 | Grimes |
| 5,334,974 A | 8/1994 | Simms et al. |
| 5,347,306 A | 9/1994 | Nitta |
| 5,381,412 A | 1/1995 | Otani |
| 5,389,935 A | 2/1995 | Drouault et al. |
| 5,400,018 A | 3/1995 | Scholl et al. |
| 5,406,491 A | 4/1995 | Lima |
| 5,410,343 A | 4/1995 | Coddington et al. |
| 5,412,660 A | 5/1995 | Chen et al. |
| 5,412,708 A | 5/1995 | Katz |
| 5,418,537 A | 5/1995 | Bird |
| 5,428,546 A | 6/1995 | Shah et al. |
| 5,430,432 A | 7/1995 | Camhi et al. |
| 5,430,656 A | 7/1995 | Dekel et al. |
| 5,432,841 A | 7/1995 | Rimer |
| 5,436,960 A | 7/1995 | Campana, Jr. et al. |
| 5,438,517 A | 8/1995 | Sennott et al. |
| 5,440,334 A | 8/1995 | Walters et al. |
| 5,441,047 A | 8/1995 | David et al. |
| 5,442,553 A | 8/1995 | Parrillo |
| 5,445,347 A | 8/1995 | Ng |
| 5,446,659 A | 8/1995 | Yamawaki |
| 5,457,597 A | 10/1995 | Rothschild |
| 5,457,630 A | 10/1995 | Palmer |
| 5,458,494 A | 10/1995 | Krohn et al. |
| 5,461,372 A | 10/1995 | Busak et al. |
| 5,465,115 A | 11/1995 | Conrad et al. |
| 5,475,597 A | 12/1995 | Buck |
| 5,479,206 A | 12/1995 | Ueno et al. |
| 5,497,419 A | 3/1996 | Hill |
| 5,508,733 A | 4/1996 | Kassatly |
| 5,508,736 A | 4/1996 | Cooper |
| 5,509,009 A | 4/1996 | Laycock et al. |
| 5,510,828 A | 4/1996 | Lutterbach et al. |
| 5,510,832 A | 4/1996 | Garcia |
| 5,512,902 A | 4/1996 | Guthrie et al. |
| 5,513,244 A | 4/1996 | Joao et al. |
| 5,515,043 A | 5/1996 | Berard et al. |
| 5,515,285 A | 5/1996 | Garrett, Sr. et al. |
| 5,519,669 A | 5/1996 | Ross et al. |
| 5,523,950 A | 6/1996 | Peterson |
| 5,526,269 A | 6/1996 | Ishibashi et al. |
| 5,528,281 A | 6/1996 | Grady et al. |
| 5,533,589 A | 7/1996 | Critzer |
| 5,537,141 A | 7/1996 | Harper et al. |
| 5,537,143 A | 7/1996 | Steingold et al. |
| 5,541,585 A | 7/1996 | Duhame et al. |
| 5,544,649 A | 8/1996 | David et al. |
| 5,547,149 A | 8/1996 | Kalberer et al. |
| 5,548,753 A | 8/1996 | Linstead et al. |
| 5,550,738 A | 8/1996 | Bailey et al. |
| 5,550,863 A | 8/1996 | Yurt et al. |
| 5,553,609 A | 9/1996 | Chen et al. |
| 5,555,019 A | 9/1996 | Dole |
| 5,557,254 A | 9/1996 | Johnson et al. |
| 5,559,511 A | 9/1996 | Ito et al. |
| 5,563,453 A | 10/1996 | Nyfelt |
| 5,566,084 A | 10/1996 | Cmar |
| 5,568,535 A | 10/1996 | Sheffer et al. |
| 5,572,438 A | 11/1996 | Ehlers et al. |
| 5,577,689 A | 11/1996 | Haro |
| 5,587,715 A | 12/1996 | Lewis |
| 5,588,038 A | 12/1996 | Snyder |
| 5,594,425 A | 1/1997 | Ladner et al. |
| 5,594,740 A | 1/1997 | LaDue |
| 5,600,368 A | 2/1997 | Matthews, III |
| 5,602,450 A | 2/1997 | Cowan et al. |
| 5,606,361 A | 2/1997 | Davidsohn et al. |
| 5,619,193 A | 4/1997 | Ziegra et al. |
| 5,625,670 A | 4/1997 | Campana, Jr. et al. |
| 5,627,753 A | 5/1997 | Brankin et al. |
| 5,633,872 A | 5/1997 | Dinkins |
| 5,640,442 A | 6/1997 | Fitzgerald et al. |
| 5,642,199 A | 6/1997 | Ukai et al. |
| 5,660,246 A * | 8/1997 | Kaman .................. 180/287 |
| 5,668,537 A | 9/1997 | Chansky et al. |
| 5,680,123 A | 10/1997 | Lee |
| 5,682,133 A | 10/1997 | Johnson et al. |
| 5,689,442 A | 11/1997 | Swanson et al. |
| 5,694,335 A | 12/1997 | Hollenberg |
| 5,699,276 A | 12/1997 | Roos |
| 5,706,338 A | 1/1998 | Relyea et al. |
| 5,708,417 A | 1/1998 | Tallman et al. |
| 5,710,970 A | 1/1998 | Walters et al. |
| 5,712,789 A | 1/1998 | Radican |
| 5,715,905 A | 2/1998 | Kaman |
| 5,717,379 A | 2/1998 | Peters |
| 5,719,771 A | 2/1998 | Buck et al. |
| 5,721,829 A | 2/1998 | Dunn et al. |
| 5,724,092 A | 3/1998 | Davidsohn et al. |
| 5,726,984 A | 3/1998 | Kubler et al. |
| 5,727,950 A | 3/1998 | Cook et al. |
| 5,729,217 A | 3/1998 | Ito et al. |
| 5,729,452 A | 3/1998 | Smith et al. |
| 5,731,785 A | 3/1998 | Lemelson et al. |
| 5,732,074 A | 3/1998 | Spaur et al. |
| 5,734,413 A | 3/1998 | Lappington et al. |
| 5,734,963 A | 3/1998 | Fitzgerald et al. |
| 5,736,927 A | 4/1998 | Stebbins |
| 5,737,222 A | 4/1998 | Palmer |
| 5,745,161 A | 4/1998 | Ito |
| 5,751,245 A | 5/1998 | Janky et al. |
| 5,756,934 A | 5/1998 | Purdom |
| 5,757,640 A | 5/1998 | Monson |
| 5,758,300 A | 5/1998 | Abe |
| 5,758,313 A | 5/1998 | Shah et al. |
| 5,761,625 A | 6/1998 | Honcik et al. |
| 5,769,643 A | 6/1998 | Stevens, III |
| 5,772,446 A | 6/1998 | Rosen |
| 5,774,876 A | 6/1998 | Woolley et al. |
| 5,786,746 A | 7/1998 | Lombardo et al. |
| 5,788,508 A | 8/1998 | Lee et al. |
| 5,790,019 A | 8/1998 | Edwin |
| 5,791,441 A | 8/1998 | Matos et al. |
| 5,793,300 A | 8/1998 | Suman et al. |
| 5,796,365 A | 8/1998 | Lewis |
| 5,796,612 A | 8/1998 | Palmer |
| 5,798,647 A | 8/1998 | Martin et al. |
| 5,801,618 A | 9/1998 | Jenkins |
| 5,801,943 A | 9/1998 | Nasburg |
| 5,802,454 A | 9/1998 | Goshay et al. |
| 5,805,442 A | 9/1998 | Crater et al. |
| 5,808,566 A | 9/1998 | Behr et al. |
| 5,809,161 A | 9/1998 | Auty et al. |
| 5,809,415 A | 9/1998 | Rossmann |
| 5,812,931 A | 9/1998 | Yuen |
| 5,815,093 A | 9/1998 | Kikinis |
| 5,815,557 A | 9/1998 | Larson |

(56) References Cited

U.S. PATENT DOCUMENTS

| | | |
|---|---|---|
| 5,816,918 A | 10/1998 | Kelly et al. |
| 5,818,439 A | 10/1998 | Nagasaka et al. |
| 5,819,172 A | 10/1998 | Campana, Jr. et al. |
| 5,821,718 A | 10/1998 | Shaffer et al. |
| 5,821,880 A | 10/1998 | Morimoto et al. |
| 5,823,948 A | 10/1998 | Ross, Jr. et al. |
| 5,825,283 A | 10/1998 | Camhi |
| 5,826,827 A | 10/1998 | Coyaso et al. |
| 5,835,376 A | 11/1998 | Smith et al. |
| 5,835,871 A | 11/1998 | Smith et al. |
| 5,838,250 A | 11/1998 | Maekawa |
| 5,838,683 A | 11/1998 | Corley et al. |
| 5,841,638 A | 11/1998 | Purdom et al. |
| 5,842,199 A | 11/1998 | Miller et al. |
| 5,842,978 A | 12/1998 | Levy |
| 5,844,473 A | 12/1998 | Kaman |
| 5,845,203 A | 12/1998 | LaDue |
| 5,845,227 A | 12/1998 | Peterson |
| 5,845,240 A | 12/1998 | Fielder |
| 5,845,283 A | 12/1998 | Williams et al. |
| 5,850,250 A | 12/1998 | Konopka et al. |
| 5,861,799 A | 1/1999 | Szwed |
| 5,862,330 A | 1/1999 | Anupam et al. |
| 5,862,500 A | 1/1999 | Goodwin |
| 5,867,208 A | 2/1999 | McLaren |
| 5,867,821 A | 2/1999 | Ballantyne et al. |
| 5,875,430 A | 2/1999 | Koether |
| 5,877,707 A | 3/1999 | Kowalick |
| 5,878,337 A | 3/1999 | Joao et al. |
| 5,880,720 A | 3/1999 | Iwafune et al. |
| 5,884,032 A | 3/1999 | Bateman et al. |
| 5,890,079 A | 3/1999 | Levine |
| 5,892,437 A | 4/1999 | Scheibe et al. |
| 5,895,440 A | 4/1999 | Proctor et al. |
| 5,896,020 A | 4/1999 | Pyo |
| 5,897,602 A | 4/1999 | Mizuta |
| 5,897,623 A | 4/1999 | Fein et al. |
| 5,898,392 A | 4/1999 | Bambini et al. |
| 5,900,905 A | 5/1999 | Shoff et al. |
| 5,903,226 A | 5/1999 | Suman et al. |
| 5,903,816 A | 5/1999 | Broadwin et al. |
| 5,903,830 A | 5/1999 | Joao et al. |
| 5,911,582 A | 6/1999 | Redford et al. |
| 5,911,776 A | 6/1999 | Guck |
| 5,917,405 A | 6/1999 | Joao |
| 5,917,434 A | 6/1999 | Murphy |
| 5,919,244 A | 7/1999 | Danz et al. |
| 5,922,037 A | 7/1999 | Potts |
| 5,929,850 A | 7/1999 | Broadwin et al. |
| 5,931,878 A | 8/1999 | Chapin, Jr. |
| 5,938,721 A | 8/1999 | Dussell et al. |
| 5,948,026 A | 9/1999 | Beemer, II et al. |
| 5,949,345 A | 9/1999 | Beckert et al. |
| 5,959,568 A | 9/1999 | Woolley |
| 5,959,577 A | 9/1999 | Fan et al. |
| 5,963,202 A | 10/1999 | Polish |
| 5,969,714 A | 10/1999 | Butcher |
| 5,969,953 A | 10/1999 | Purdom et al. |
| 5,973,619 A | 10/1999 | Paredes |
| 5,974,349 A | 10/1999 | Levine |
| 5,974,446 A | 10/1999 | Sonnenreich et al. |
| 5,976,567 A | 11/1999 | Wheeler et al. |
| 5,976,648 A | 11/1999 | Li et al. |
| 5,978,567 A | 11/1999 | Rebane et al. |
| 5,978,648 A | 11/1999 | George et al. |
| 5,978,799 A | 11/1999 | Hirsch |
| 5,982,048 A | 11/1999 | Fendt et al. |
| 5,983,161 A | 11/1999 | Lemelson et al. |
| 5,988,645 A | 11/1999 | Downing |
| 5,995,705 A | 11/1999 | Lang |
| 5,999,808 A | 12/1999 | LaDue |
| 6,001,065 A | 12/1999 | DeVito |
| 6,001,066 A | 12/1999 | Canfield et al. |
| 6,002,326 A | 12/1999 | Turner |
| 6,002,720 A | 12/1999 | Yurt et al. |
| 6,002,972 A | 12/1999 | Palmer |
| 6,003,007 A | 12/1999 | DiRienzo |
| 6,006,159 A | 12/1999 | Schmier et al. |
| 6,007,095 A | 12/1999 | Stanley |
| 6,007,426 A | 12/1999 | Kelly et al. |
| 6,009,355 A | 12/1999 | Obradovich et al. |
| 6,009,356 A | 12/1999 | Monroe |
| 6,009,363 A | 12/1999 | Beckert et al. |
| 6,009,370 A | 12/1999 | Minowa et al. |
| 6,014,447 A | 1/2000 | Kohnen et al. |
| 6,014,569 A | 1/2000 | Bottum |
| 6,016,475 A | 1/2000 | Miller et al. |
| 6,018,710 A | 1/2000 | Wynblatt et al. |
| 6,020,825 A | 2/2000 | Chansky et al. |
| 6,020,826 A | 2/2000 | Rein |
| 6,023,708 A | 2/2000 | Mendez et al. |
| 6,028,537 A | 2/2000 | Suman et al. |
| 6,044,990 A | 4/2000 | Palmeri |
| 6,046,678 A | 4/2000 | Wilk |
| 6,047,264 A | 4/2000 | Fisher et al. |
| 6,047,270 A | 4/2000 | Joao et al. |
| 6,049,711 A | 4/2000 | Ben-Yehezkel et al. |
| 6,061,570 A | 5/2000 | Janow |
| 6,067,451 A | 5/2000 | Campana, Jr. et al. |
| 6,067,571 A | 5/2000 | Igarashi et al. |
| 6,073,106 A | 6/2000 | Rozen et al. |
| 6,075,527 A | 6/2000 | Ichihashi et al. |
| 6,076,066 A | 6/2000 | DiRienzo et al. |
| 6,078,800 A | 6/2000 | Kasser |
| 6,084,510 A | 7/2000 | Lemelson et al. |
| 6,091,956 A | 7/2000 | Hollenberg |
| 6,102,487 A | 8/2000 | .O slashed.vreb.o slashed. |
| 6,104,815 A | 8/2000 | Alcorn et al. |
| 6,108,493 A | 8/2000 | Miller et al. |
| 6,113,493 A | 9/2000 | Walker et al. |
| 6,131,060 A | 10/2000 | Obradovich et al. |
| 6,131,096 A | 10/2000 | Ng et al. |
| 6,131,116 A | 10/2000 | Riggins et al. |
| 6,137,485 A | 10/2000 | Kawai et al. |
| 6,138,241 A | 10/2000 | Eckel et al. |
| 6,141,608 A | 10/2000 | Rother |
| 6,141,620 A | 10/2000 | Zyburt et al. |
| 6,144,702 A | 11/2000 | Yurt et al. |
| 6,148,081 A | 11/2000 | Szymanski et al. |
| 6,148,291 A | 11/2000 | Radican |
| 6,151,606 A | 11/2000 | Mendez |
| 6,151,626 A | 11/2000 | Tims et al. |
| 6,161,005 A | 12/2000 | Pinzon |
| 6,167,432 A | 12/2000 | Jiang |
| 6,181,994 B1 | 1/2001 | Colson et al. |
| 6,191,825 B1 | 2/2001 | Sprogis et al. |
| 6,204,760 B1 | 3/2001 | Brunius |
| 6,208,379 B1 | 3/2001 | Oya et al. |
| 6,208,386 B1 | 3/2001 | Wilf et al. |
| 6,208,973 B1 | 3/2001 | Boyer et al. |
| 6,216,104 B1 | 4/2001 | Moshfeghi et al. |
| 6,226,389 B1 | 5/2001 | Lemelson et al. |
| 6,233,341 B1 | 5/2001 | Riggins |
| 6,233,506 B1 | 5/2001 | Obradovich et al. |
| 6,236,330 B1 | 5/2001 | Cohen |
| 6,236,365 B1 | 5/2001 | LeBlanc et al. |
| 2,525,522 A1 | 6/2001 | Hampton et al. |
| 6,243,691 B1 | 6/2001 | Fisher et al. |
| 6,244,758 B1 | 6/2001 | Solymar et al. |
| 6,249,241 B1 | 6/2001 | Jordan et al. |
| 6,252,522 B1 | 6/2001 | Hampton et al. |
| 6,263,322 B1 | 7/2001 | Kirkevold et al. |
| 6,269,392 B1 | 7/2001 | Cotichini et al. |
| 6,273,856 B1 | 8/2001 | Sun et al. |
| 6,275,231 B1 | 8/2001 | Obradovich |
| 6,278,396 B1 | 8/2001 | Tran |
| 6,281,797 B1 | 8/2001 | Forster et al. |
| 6,283,761 B1 | 9/2001 | Joao |
| 6,292,227 B1 | 9/2001 | Wilf et al. |
| 6,292,828 B1 | 9/2001 | Williams |
| 6,295,492 B1 | 9/2001 | Lang et al. |
| 6,297,853 B1 | 10/2001 | Sharir et al. |
| 6,307,948 B1 | 10/2001 | Kawasaki et al. |
| 6,317,592 B1 | 11/2001 | Campana, Jr. et al. |

(56) References Cited

U.S. PATENT DOCUMENTS

| | | |
|---|---|---|
| 6,318,536 B1 | 11/2001 | Korman et al. |
| 6,321,221 B1 | 11/2001 | Bieganski |
| 6,323,566 B1 | 11/2001 | Meier |
| 6,330,482 B1 | 12/2001 | McCain et al. |
| 6,330,499 B1 | 12/2001 | Chou et al. |
| 6,331,825 B1 | 12/2001 | Ladner et al. |
| 6,332,098 B2 | 12/2001 | Ross et al. |
| 6,334,127 B1 | 12/2001 | Bieganski et al. |
| 6,341,265 B1 | 1/2002 | Provost et al. |
| 6,341,668 B1 | 1/2002 | Fayette et al. |
| 6,347,333 B2 | 1/2002 | Fayette et al. |
| 6,356,822 B1 | 3/2002 | Diaz et al. |
| 6,362,730 B2 | 3/2002 | Razavi et al. |
| 6,366,240 B1 | 4/2002 | Timothy et al. |
| 6,374,228 B1 | 4/2002 | Litwin |
| 6,381,583 B1 | 4/2002 | Kenney |
| 6,385,732 B1 | 5/2002 | Eckel et al. |
| 6,388,399 B1 | 5/2002 | Eckel et al. |
| 6,389,337 B1 | 5/2002 | Kolls |
| 6,400,996 B1 | 6/2002 | Hoffberg et al. |
| 6,408,278 B1 | 6/2002 | Carney et al. |
| 6,412,012 B1 | 6/2002 | Bieganski et al. |
| 6,424,998 B2 | 7/2002 | Hunter |
| 6,427,063 B1 | 7/2002 | Cook et al. |
| 6,429,810 B1 | 8/2002 | De Roche |
| 6,430,531 B1 | 8/2002 | Polish |
| 6,430,603 B2 | 8/2002 | Hunter |
| 6,430,605 B2 | 8/2002 | Hunter |
| 6,431,985 B1 | 8/2002 | Kim |
| 6,437,692 B1 | 8/2002 | Petite et al. |
| 6,464,142 B1 | 10/2002 | Denenberg et al. |
| 6,474,927 B1 | 11/2002 | McAdams et al. |
| 6,493,685 B1 | 12/2002 | Ensel et al. |
| 6,522,955 B1 | 2/2003 | Colborn |
| 6,525,780 B1 | 2/2003 | Bruno et al. |
| 6,529,725 B1 | 3/2003 | Joao et al. |
| 6,542,076 B1 | 4/2003 | Joao |
| 6,542,077 B2 | 4/2003 | Joao |
| 6,549,130 B1 | 4/2003 | Joao |
| 6,567,813 B1 | 5/2003 | Zhu et al. |
| 6,587,046 B2 | 7/2003 | Joao |
| 6,589,682 B1 | 7/2003 | Fleckner et al. |
| 6,601,087 B1 | 7/2003 | Zhu et al. |
| 6,608,559 B1 | 8/2003 | Lemelson et al. |
| 6,610,954 B2 | 8/2003 | Takizawa |
| 6,615,186 B1 | 9/2003 | Kolls |
| 6,621,827 B1 | 9/2003 | Rezvani et al. |
| 6,646,655 B1 | 11/2003 | Brandt et al. |
| 6,654,032 B1 | 11/2003 | Zhu et al. |
| 6,686,838 B1 | 2/2004 | Rezvani et al. |
| 6,691,154 B1 | 2/2004 | Zhu et al. |
| 6,707,484 B1 | 3/2004 | Kawasaki et al. |
| 6,708,221 B1 | 3/2004 | Mendez et al. |
| 6,725,460 B1 | 4/2004 | Nishiyama et al. |
| 6,726,094 B1 | 4/2004 | Rantze et al. |
| 6,745,027 B2 | 6/2004 | Twitchell, Jr. |
| 6,763,501 B1 | 7/2004 | Zhu et al. |
| 6,766,454 B1 | 7/2004 | Riggins |
| 6,789,119 B1 | 9/2004 | Zhu et al. |
| RE38,609 E | 10/2004 | Chen et al. |
| 6,804,656 B1 | 10/2004 | Rosenfeld et al. |
| 6,810,488 B2 | 10/2004 | Teng |
| 6,816,616 B2 | 11/2004 | Teng |
| 6,816,817 B1 | 11/2004 | Retlich et al. |
| 6,850,497 B1 * | 2/2005 | Sigler et al. ............. 370/310 |
| 6,850,965 B2 | 2/2005 | Allen |
| 6,859,722 B2 | 2/2005 | Jones |
| 6,882,269 B2 | 4/2005 | Moreno |
| 6,889,135 B2 | 5/2005 | Curatolo et al. |
| 6,901,439 B1 | 5/2005 | Bonasia et al. |
| 6,901,448 B2 | 5/2005 | Zhu et al. |
| 6,924,727 B2 | 8/2005 | Nagaoka et al. |
| 6,925,645 B2 | 8/2005 | Zhu et al. |
| 6,927,686 B2 | 8/2005 | Nieters et al. |
| 6,930,455 B2 | 8/2005 | Chansky et al. |
| 6,943,681 B2 | 9/2005 | Rezvani et al. |
| 7,096,003 B2 | 8/2006 | Joao et al. |
| 7,164,117 B2 | 1/2007 | Breed et al. |
| 7,212,829 B1 | 5/2007 | Lau et al. |
| 7,272,179 B2 | 9/2007 | Siemens et al. |
| 7,277,010 B2 | 10/2007 | Joao |
| 7,313,476 B2 | 12/2007 | Nichols et al. |
| 7,397,363 B2 * | 7/2008 | Joao .................. B60R 25/102 |
| | | 340/539.11 |
| 9,847,029 B2 | 12/2017 | Joao |
| 9,885,782 B2 | 2/2018 | Joao |
| 9,961,249 B2 | 5/2018 | Joao et al. |
| 10,011,247 B2 * | 7/2018 | Joao .................. B60R 25/102 |
| 2001/0032099 A1 | 10/2001 | Joao |
| 2002/0016655 A1 | 2/2002 | Joao |
| 2002/0017996 A1 | 2/2002 | Niemiec |
| 2002/0032583 A1 | 3/2002 | Joao |
| 2002/0046299 A1 | 4/2002 | Lefeber et al. |
| 2002/0049622 A1 | 4/2002 | Lettich et al. |
| 2002/0049822 A1 | 4/2002 | Burkhardt et al. |
| 2002/0072808 A1 | 6/2002 | Li |
| 2002/0077077 A1 | 6/2002 | Rezvani et al. |
| 2002/0099567 A1 | 7/2002 | Joao |
| 2002/0108125 A1 | 8/2002 | Joao |
| 2002/0116318 A1 | 8/2002 | Thomas et al. |
| 2002/0121969 A1 | 9/2002 | Joao |
| 2002/0198774 A1 | 12/2002 | Weirich |
| 2003/0009361 A1 | 1/2003 | Hancock et al. |
| 2003/0014295 A1 | 1/2003 | Brookes et al. |
| 2003/0016130 A1 | 1/2003 | Joao |
| 2003/0067541 A1 | 4/2003 | Joao |
| 2003/0071899 A1 | 4/2003 | Joao |
| 2003/0193404 A1 * | 4/2003 | Joao .................. 340/426.13 |
| 2003/0084125 A1 | 5/2003 | Nagda et al. |
| 2003/0110215 A1 | 6/2003 | Joao |
| 2003/0140107 A1 | 7/2003 | Rezvani et al. |
| 2003/0206102 A1 | 11/2003 | Joao |
| 2003/0224854 A1 | 12/2003 | Joao |
| 2004/0098515 A1 | 5/2004 | Rezvani et al. |
| 2004/0160319 A1 | 8/2004 | Joao |
| 2004/0230601 A1 | 11/2004 | Joao et al. |
| 2005/0040937 A1 | 2/2005 | Cuddihy et al. |
| 2005/0248444 A1 | 11/2005 | Joao |

FOREIGN PATENT DOCUMENTS

| | | |
|---|---|---|
| EP | 0028933 | 5/1981 |
| EP | 0229869 | 7/1987 |
| EP | 0242099 | 10/1987 |
| EP | 0395596 | 10/1990 |
| EP | 0413090 | 2/1991 |
| EP | 0494030 | 7/1992 |
| EP | 0505266 | 9/1992 |
| EP | 0505627 | 9/1992 |
| EP | 0680859 | 4/1994 |
| EP | 0720412 | 11/1995 |
| EP | 0704712 | 3/1996 |
| EP | 952588 | 4/1998 |
| FR | 2674352 | 9/1992 |
| FR | 2816434 A1 | 5/2002 |
| GB | 2051442 | 1/1981 |
| GB | 2217081 | 10/1989 |
| GB | 2253534 A | 9/1992 |
| GB | 2279478 | 1/1995 |
| GB | 2263376 | 7/1999 |
| JP | 63-34612 | 2/1988 |
| SE | 9200631 | 9/1993 |
| WO | WO88/04082 | 6/1988 |
| WO | WO 89/05553 | 6/1989 |
| WO | WO 89/12835 | 12/1989 |
| WO | WO 92/22883 | 12/1992 |
| WO | WO 96/02106 | 1/1996 |

OTHER PUBLICATIONS

Cox, Brad, "Global Schoolhouse Project", Virtual School, Copyright 2004, Modification date: Jan. 22, 2004, http://www.virtualschool.edu/mon/Academia/GlobalSchoolhouseProject.html.

(56) References Cited

OTHER PUBLICATIONS

Dorcey, Tim, "CU-SeeMe Desktop VideoConferencing Software", From Connexions, vol. 9, No. 3, Mar. 1995, http://web.archive.org/web/19970418025546/cu-seeme. cornell.edu/DorceyConnexions.html.
Savetz, Kevin, et al., MBONE: Multicasting Tomorrow's Internet, Table of Contents, IDG, Apr. 1996, Copyright 1996, 1998, http://www.savetz.com/mbone/toc.html.
Savetz, Kevin, et al., MBONE: Multicasting Tomorrow's Internet, Chapter 2: Today's Technology, IDG, Apr. 1996, Copyright 1996, 1998, http://www.savetz.com/mbone/ch2.html.
Savetz, Kevin, et al., MBONE: Multicasting Tomorrow's Internet, Chapter 3: The MBONE and Multicasting, IDG, Apr. 1996, Copyright 1996, 1998, http://www.savetz.com/mbone/ch3.html.
McCartney, Layton, "Virtual MBA", Informatonweek, Nov. 1996 www.informationweek.com/604/04camba.htm.
Houstis, Elias, "Internet, Education, and the Web", Proceedings of Wet Ice 1996, pp. 27-32.
Hamalainen, Matti, "Electronic Markets for Learning: Education Brokerages on the Internet", Association for Computing Machinery. Communications of the ACM, New York, Jun. 1996.
Goldberg, Murray, "World Wide Web—Course Tool: An Environment for Building WWW-Based Courses", Fifth International World Wide Web Conference, Paris, France, May 6-10, 1996.
Dwyer, Dan, "Creating a Virtual Classroom for Interactive Education on the Web", http://www.igd.fhg.de/archive/1995_95/papers/62/ctc.virtual.class/ctc.virtual.class.html, Mar. 2001.
Secrist, Kym, "Intelligent messaging system notifies plant personnel", Control Engineering, Mid-Feb. 1997, vol. 44, Iss. 3, p. 27, 2pgs.
"Envirokare Announces Letter of Intent with Electroship(NY) Inc. for Purchase of New Patent Pending Wireless Technology to Revolutionize the $400 Billion Per Year Trucking Industry", Jul. 25, 2000, http://web.archive.org/web/20001204170600/ www.envirokare.com/news72600.html.
"Technology Executive and Former Managing Partner of Price Waterhouse Joins Envirokare as President and Director", Sep. 5, 2000, http://web.archive.org/web/2001204171700/ www.envirokare.com/news9500.html.
"Envirokare Tech Inc Announces Additions to Advisory Board", Sep. 7, 2000, http://web.archive.org/web/20001101094103/ www.envirokare.com/news9700.html.
Stafford-Fraser, Quentin, "The Trojan Room Coffee Pot-A (non-technical) biography", First published May 1995, http://www.cl.cam.ac.uk/coffee/qsf/coffee.html.
Stafford-Fraser, Quentin, "The Life and Times of the First Web Cam—When convenience was the mother of invention", Communications of the ACM, Jul. 2001/ vol. 44, No. 7, pp. 25-26, http://www.cl.cam.ac.uk/coffee/qsf/cacm200107.html.
Stafford-Fraser, Quentin, "The Story of the Trojan Room Coffee Pot—A Timeline", Feb. 2004, http://www.cl.cam.ac.uk/coffee/qsf/timeline.html.
Sattler, Michael 'Mickey', Internet TV with CU-SeeMe: Chapter 8—History, Culture, and Usage, copyrighted 1993-2003, http://www.geektimes.com/michael/CU-SeeMe/internetTVwithCuSeeMe/chapter08/culture.html.
I T2 Author Unknown, "Onstar Literature" obtained from intw. onataricoa, date unknown, OnStar Corp., 1117, httot i iwww..onetartom.
. . . Raymond D. Panko, Business Data Communications, 1997, Prentice Hall, U.S.A.
Leslie L. =Snick, et al., Creating Cool Intelligent Agents Poe the Net, 1997, Idg Books Worldwide, Inc. U.B46A,.
lem ee7/8----i . V.
datiairadallaald sothaN. ma.
mama Wwii Pere ft er* elemeal fa wall* adesalloa hat a he Ubpto.
Tana *hag Awe* ea Im Imam,* aisa Ari amara al he *ma* at ma.
. fru ram l sialitinai So complitha ft i Ibin cal 1-100P1 4199 (14047104199) and Wig, Op; 2 I. Received from (1141(42912)fitilatitEMEastun 1410144.

U.S. Appl. No. 08/681,172, Polish.
U.S. Appl. No 60/014,427, Dirienzo.
Sattler, Michael, "Internet TV With CU-SEEME," 1995, First Edition, Pages Cover, Inside Cover and Publication Information Only. Sams.net ISDN 1-57521-006-1.
Press, Larry, "Net.Speech: Desktop Audio Comes to the Net," Personal Computing, Communications of the ACM, Oct. 1995, vol. 38, No. 10.
"Color PC Video Conferencing is Here!" New Web Site—Video on Internet—comp.misc | Google Groups, May 10, 1995.
Roy, Deb Kumar, "NewsComm: A Hand-Held Device for Interactive Access to Structured Audio," Jun. 1995.
Hassen, Paul F., "Pope TV to Transmit Live Video/Audio Cybercast Across the Internet From CICI Homepage," rec.video.cable-tv | Google Groups, Oct. 5, 1995.
Unknown, "Niagara FallsCam Home Page," WaybackMachine, May 10, 1996.
Pitsilos, A.G., "rec.video.production," Making a WebCam—rec.video.production | Google Groups, Nov. 10, 1995.
Sattler, Michael, "Internet TV with CU-SeeMe" Electronic Copy, Chapters 1 through 10 and A though D. 1993.
Riesenbach, Ron, "The Ontario Telepresence Project," Conference Companion CHI '94, Apr. 24, 1994. Association for Computing Machinery, Boston, MA.
Garcia, et al., "Monitoring Data in Real Time," Dr. Dobb's Journal, Jul. 1996, p. 56.
"Beyond Pots: Teletimer, Bell Atlantic & Honeywell Joint Development", EDGE, Apr. 6, 1992. vol. 7, No. 193.
Gillespie, et al., "Remote Observing at Apache Point," Sep. 1995.
Topol, "Business and Technology: Ground Control," Apr. 22, 2002.
Topol, "Pilot Project," Apr. 22, 2002.
Perschau, Stephen, "Transporting Video Teleconferencing Traffic," National Communications System Technical Information Bulletin 93-13, Dec. 1993.
Riesenbach, Ron, et al., "Ontario Telepresence Project," Mar. 1, 1995, Information Technology Research Centre Telecommunications Research Institute of Ontario.
Paulos, Eric, et al., "Delivering Real Reality to the World Wide Web via Telerobotics," Proc. of the 1996 IEEE Intl. Conf. on Robotics and Automation, Apr. 1996.
Kim, J.H., et al., "Remote Communication for Monitoring and Control of Autonomous Underwater Vehicles," To appear in proceedings of Oceans 96, 1995.
Morlok, E.K., et al., "Vehicle Monitoring and Telecommunication Systems for Enhancement of Trucking Operations," 1989, pp. 356-360, IEEE.
Michalski, Michalski, "Community Part 1", Release 1.0, Jun. 21, 1993. 4 (http://cdn.oreilly.com/radar/r1/06-93.pdf) (teaching that one way to increase usage of a wired computer network is to make it accessible using a handheld terminal with a wireless link.), Jun. 21, 1993.
Reisenbach, et al., "The Ontario Telepresence Project," Jan. 2, 1992.
Gage, "Internet Tools for Sharing Unmanned Vehicle Information", May 1994.
Carlson, et al., "Understanding Building Automation Systems", 1991.
Bruns, "Strategies for Energy Efficient Plants and Intelligent Buildings", 1986.
Uehara, et al., "InternetCAR: Internet-Connected Automobiles", http://noc.aic.net/net98/1f/1f_2.html, Jul. 1997.
"Official Product and Show Guide." Ashrae Journal, vol. 32, No. 1, Jan. 1990.
McGowan, "Chapter 6: The System Operator Interface (SOI)." Network for Building Automation and Control Systems, 1992.
Noore, et al., "Computer-Based Multimedia Video Conferencing System." IEEE, p. 587-592, 1993.
Ballard, et al., "Automated Remote Monitoring of Structural Behavior via the Internet", SPIE vol. 2719, Apr. 1996.
Garcia, et al., (Dr. Dobbs Journal), Monitoring Data in Real Time (Remote Access to Laboratories):. Dr. Dobb's Journal, Jul. 1996.
Cordero, et al., "High Speed Network for Delivery of Education-on-Demand". SPIE vol. 2667, Mar. 25, 1996.

(56) References Cited

OTHER PUBLICATIONS

Diefenbaker, Thomas A., "Development of a Third Generation On-Board Computer System," 1989, pp. 367-369, IEEE.

Sushko, Michael S. K., "DGPS Broadcasts using the Radio Broadcast System (RBDS) for IVHS," IEE Vehicle Navigation & Information Systems Conference, 1993, pp. 312-318, IEEE.

Horgan, et al., "Electronic Watchdogs," IEEE Spectrum, 1985, pp. 43-48, IEEE.

Unknown, "Drivers get more options in 1983," Nov. 1982, p. 35.

Feinstein, et al., "Future Weaponry," IEEE Spectrum, Oct. 1982, pp. 91-99, IEEE.

Arora, R. K., et al., "Global Positioning Technology and Applications," 1994, pp. 784-787, IEEE.

Karimi, Hassan A., et al., "GPS-Based Tracking Systems for Taxi Cab Fleet Operations," IEE Vehicle Navigation & Information Systems Conference, 1993, pp. 679-682, IEEE.

Reynolds, James C., et al., "GPS-Based Vessel Position Monitoring and Display System," IEEE AES Magazine, Jul. 1990, pp. 16-22, IEEE.

U.S. Provisional Appl. No. 60/014,427 filed DiRienzo dated Mar. 28, 1995.

Perschau, National Communication System, Technical Information Bulletin 93-13, Dec. 1993.

"College Interns Use the Internet to "video commute" to Work." Business Wire, Mar. 21, 1995.

Grossman, "Communications: Picture the Scene: Wendy Grossman looks at the technology that makes possible videobroadcasting over the Internet." The Guardian 4, Jan. 26, 1995.

McGowan, "Networking for Building Automation Control Systems," 1992.

Reisenbach, et al., "Ontario Telepresence Project, Final Report," Mar. 1, 1995.

"W. Ga. Resa Chooses the Network Connection's Cheetah Video On Demand Server for Classroom of the Future," May 15, 1995, PR Newswire.

"Code-Alarm Debuts First Stolen Vehicle Recovery System to Use Both Cellular, Loran Technologies," Nov. 28, 1989. PR Newswire.

"Multitude of Car Audio Innovations at CES," Audio Week, Jan. 27, 1992, vol. 4, No. 4.

"Potential Pac Tel Subsidiary Launches Vehicle Location Service." Dec. 10, 1990, p. 9, BOC Week, vol. 7, No. 48.

Henry, Gregory W., et al., "Flexible Scheduling of Automatic Telescopes Over the Internet," Robotic Telescopes ASP Conference Series, 1995, vol. 79.

Bohus, Carisa, et al., "Running Control Engineering Experiments Over the Internet," Aug. 1995.

Bai, Weiqiang, et al., "Design, Implementation and Analysis of a Multimedia Conference System Using TCP/UDP," IEEE, 1994, pp. 1749-1753.

Bolot, et al., "A Rate Control Mechanism for Packet Video in the Internet," IEEE, 1994, pp. 1216-1223.

Fellers, et al., "Using the Internet to Provide Support for Distributed Interactions," Proc. of the 28th Annual Hawaii Int'l Conf. on Sys. Sciences, 1995, pp. 52-60.

Abdel-Wahab, "Reliable Information Service for Internet Computer Conferencing," IEEE, 1993. pp. 128•142.

Lang, Larry, "Lan Interconnection: Wide-Area Data Networks," Aug. 1991, p. 38.

Khan, Mobeen, et al., "MOBITEX and Mobile Data Standards," IEEE Communications Magazine, Mar. 1995, pp. 96-101, IEEE.

Dooling, Dave, "Navigating close to shore," IEEE Spectrum, Dec. 1994, pp. 24-25, pp. 28-30, IEEE.

Kim Kiho, et al., "Remote Manipulator and its teleoperated Guide Vehicle for Hazardous Waste Sampling Operations," 1994, pp. 2620-2625, IEEE.

Rosenberg, Paul, "Position-Location/Navigation Systems Overview for Military Land Vehicles," Technical Report No. 12496, Jun. 28, 1979.

Adam, John A., "Satellites and artificial intelligence promise improved safety and efficiency," IEEE Spectrum, Feb. 1991, pp. 27-29, IEEE.

Jurgen, Ronald K., "Smart cars and highways go global," IEEE Spectrum, May 1991, pp. 26, 28-30, IEEE.

Yang, et al., "Use of Mobitex Wireless Wide Area Networks as a Solution to Land-Based Position and Navigation", Thomas T. Yang and Kai Yan Yip, Jul. 1994.

Houh, et al., Houh, et al., "Active Pages: Intelligent Nodes on the World Wide Web." First Int'l Conf. on the World-Wide Web. 1994.

Peinl, et al., "The Design of a Platform for Mobile Data Communication", 1993.

Tao, et al., "Internet Access via Baseband and Broadband ISDN Gateways", 1994.

Fuhr, et al., "An Internet observatory: Remote Monitoring of Instrumented Civil Structures Using the Information Superhighway", 1994.

Zijderhand, et al., "The Socrates Projects: Progress Towards a Pan-European Driver Information System", 1993.

Leiner, et al., "The DARPA Internet Protocol Suite", 1985.

Clark, "The Design Philosophy of the DARPA Internet Protocols", Aug. 1988.

Lemos, "ISDN: A Solution in Search of a Problem", Oct. 1995.

Stallings, "Data and Computer Communications, 3rd Ed.", 1991.

Bruns, G. A., "Strategies for Energy Effeicient Plants and Intelligent Buildings," Proc. of the 9th World Energy Engineering Congress, Oct. 21-24, 1986, pp. v-ix, 71-74.

Carlson, Reinhold A., et al., "Understanding Building Automation Systems," 1991, pp. vii-ix, 51-65, R.S. Means Company, Inc. ISBN 0-87629-211-2.

Chang, Edmond Chin-Ping, "Internet Based Remote Camera Control System," IEEE, Jun. 22, 1996, 0-7803-3652-6.

Everett, H.R., et al., "Controlling Multiple Security Robots in a Warehouse Environment," Mar. 1994.

De Moraes, Luis F.M., et al., "The Internet Multicast from ITS: How it was Done and Implications for the Future," IEEE Communications Magazine, Jan. 1995. pp. 6-8.

Unkown, "Matracom M05—Un minitel tout terrain", Entreprendre N°38 Fevrier 1990, at p. 81 (http://fr.1001mags.com/parution/entreprendre/numero-38-fevrier-1990/page-80- 81-texte-integral).

Goldberg, Ken, et al., "Desktop Teleoperation via the World Wide Web," IEEE International Conference on Robotics and Automation, 1995, pp. 654-659, IEEE.

Kojima, Haruhiko, et al., "Visual Communication System in an Apartment House Using Fiber Optics," 1993, pp. 362-363, IEEE.

Casey, Robert F., et al., "Advanced Public Transportation Systems: The State of the Art Update '98," US Department of Transportation DOT-VNTSC-FTA-97-9, Jan. 1998.

French, Robert L., "Automobile Navigation: Where Is It Going?" IEEE AES Magazine, May 1987, pp. 6 to 12, IEEE.

Bradshaw, Jacqueline, et al., "Basic Internet Tools," 1994, 2nd edition, Open Learning Agency, Canada. ISBN 1-55162-195-9.

Perry, Tekla S., "Profile Charles R. Trimble," IEEE Spectrum, Feb. 1992, IEEE.

"Information Technology Resource Management Guideline Global Positioning System (GPS)," Commonwealth of Virginia COV ITRM Guideline 94-3, Jul. 15, 1994.

Weld, Robert B., "Communications Flow Considerations in Vehicle Navigation and Information Systems," 1989, pp. 373-375, IEEE.

Sarch, Ray, "Data communications," Technology 1993, Jan. 1993, pp. 42-45, IEEE.

Stix, Gary, "Data communications," Technology '90, Jan. 1990, pp. 35-37, IEEE.

Borsook, Paulina, "Data Communications," Technology 1994 IEEE Spectrum, Jan. 1994, pp. 26-29, IEEE.

Segev, Arie, et al., "Designing Electronic Catalogs for Business Value: Results of the CommerceNet Pilot," Oct. 1995.

Rothblatt, Martin, "The First GPS Satellite Radio Optimized for Automatic Vehicle Location," 1992, pp. 524-527, IEEE.

Getting, Ivan A., "The Global Positioning System," IEEE Spectrum, Dec. 1993, pp. 36-47, IEEE.

Ballard, Robert D., "The JASON Remotely Operated Vehicle System," Woods Hole Oceanog. Inst. Tech. Rept. WHOI-93-34, Feb. 1993.

Kaltenberger, Burke R., "Unmanned Air Vehicle/Remotely Piloted Vehicle Analysis for Lethal UAV/RPV," Sep. 1993.

(56) References Cited

OTHER PUBLICATIONS

Unkown, "Aerospace and Military," Jan. 1993.
Council on Information Mgmt, VA IT GPS Guideline, Jul. 1994.
Lin, Charles, "A New Remote-Access Tribe," PC Magazine, Feb. 6, 1996.
Vajente-Seguin, "Telemonitoring and Centralized Network Management on Optical Fibres for the RN 90 Olympic Games Highway", Jun. 1991.
Rigney, Steve, "The Norton pcAnywhere 2.0 for Windows," PC Magazine, Aug. 1, 1995.
Wygant, Leslie, "Remote access in Digital's signle package," PC Magazine, Apr. 25, 1995.
Baruch, John E. F., et al., "Remote control and robots: an Internet solution," Computing & Control Engineering Journal, Feb. 1996. pp. 39-45.
Feijoo, C. et al., "A System for Fleet Management using Differential GPS and VHF Data Transmission Mobile Networks," IEE Vehicle Navigation & Information Sys. Conf., 1993.
Lin, I-Shen, et al., "A Advanced Telerobotic Control System for a Mobile Robot with Multisensor Feedback," Proc. of Intelligent Autonomous Systems(IAS-4), Mar. 1995, 365-372.
Gault, Helen, et al., "Automatic Vehicle Location and Control at OC Transpo," IEE Vehicle Navigation & Information Systems Conference, 1993. IEEE, Ottawa.
Perlstein, Dan, "Automatic Vehicle Location Systems: A Tool for Computer Aided Despatch Systems of the Future," 1989, pp. 186-193, IEEE.
Lombardo, Thomas G., "Collision-proof airspace," IEEE Spectrum, Special Report X, Sep. 1980, pp. 85, 87, 86. IEEE.
Jurgen, Ronald K., "And if that isn't enough . . .," Automotive Application, Oct. 1983, p. 39.
Author Unkown—Urgen, IEEE Spectrum, Oct. 1985, pp. 82-83.
Saldin, Neil P., et al., "Magnavox Automatic Vehicle Location Pilot System for the Toronto Department of Ambulance Services," 1989, pp. 194-201, IEEE.
"Best bits: applications of microprocessors," Mar. 1982, p. 24.
Hurst, G.C., "Quiktrak: A Unique New AVL System," 1989, pp. A-60 to A-62 and p. 126, IEEE.
Halayko, David W., "The Canadian MSAT Field Trials Program," 1992, pp. 376-378, IEEE.
Fong, Terrence, et al., "Operator Interfaces and Network-Based Participation for Dante II," SAE Tech Paper 951518, 25th Int'l. Conf. on Environmental Sys. Jul. 10, 1995.
Davis, et al., "Combined Remote Key Control and Immobilization System for Vehicle Security," 1996, IEEE.
Gormley, Thomas J., et al., "Real Time Diagnostics for Space Shuttle Auxiliary Power System", SAE Tech Paper 951399, Sep. 7, 1995.
Jacobs, et al., "The Application of a Novel Two-Way Mobile Satellite Communications and Vehicle Tracking System to the Transportation Industry," Feb. 1991, IEEE.
Taylor, "IMDNs Revolutionize Mobile Data Communications and Vehicle Location", IEE Vehicle Nav. & Info. Sys. Conf. 1993. IEEE.
Salmasi, "An Overview of the Omnitracs—The First Operational Mobile KU-Band Satellite Communications," May 1, 1988.
Scapinakis, et al., "Communications and Positioning Systems in the Motor Carrier Industry," Jan. 1, 1992.
Scapinakis, et al., "Studies of the Adoption and Use of Location and Communication Techs," Jan. 1, 1991.
McGowan, John J., "Networking for Building Automation and Control Systems," 1992, The Fairmont Press, Inc.
Muller, Nathan J., "Computerized Document Imaging Systems: Technology and Applications," 1993, Artech House, Boston.
Hodges, et al., "Multimedia Computing: Case Studies from MIT Project Athena", 1993.
Schmandt, Chris, et al., "Audio and Telephone Server for Multi-Media Workstations," Proceedings, Second IEEE Conference on Computer Workstations, 1988, IEEE, Santa Clara, CA.
Yang, C. "INETPhone: Telephone Services and Servers on Internet," Apr. 1995, University of North Texas.
Macedonia, Michael R., et al., "MBone Provides Audio and Video Across the Internet," Computer, Apr. 1994, pp. 30-36.
Unknown, Data Communications, Jan. 1992.
Morlok, Edward K., et al., "Advanced Vehicle Monitoring and Communications Systems for Bus Transit," Final Report DOT-T-94-03, Sep. 1991.
Young, G.G., "An Equipment Health Monitoring and Fleet Dispatching System for Logging Trucks." ,1999.
Jennings, Nicholas R., et al., "Applying Agent Technology," Applied Artificial Intelligence: An International Journal, 1995, pp. 1-22, vol. 9 Issue 4.
Unkown, IEEE—Spectrum, Oct. 1993.
Unkown, IEEE—Spectrum, May 1995.
Goldberg, Ken, et al., "Desktop Teleoperation via the World Wide Web," IEEE International Conference on Robotics and Automation, 1995. IEEE.
Gerland, Hurst E., "Intelligence on Board Modern Approach to Transit Fleet Management," Vehicle Navigation & Information Systems Cont. Proc., 1994, pp. 557-562, IEEE.
Moezzi, et al., "An Emerging Medium: Interactive Three-Dimensional Digital Video" Proceedings of Multimedia '96, 1996, pp. 358-361.
Soman, et al., "An Experimental Study of Video Conferencing over the Internet" 1994, pp. 720-724, IEEE.
Turletii, et al., "Videoconferencing on the Internet," IEEE/ACM Transactions on Networking, Jun. 1996, pp. 340-351, vol. 4, No. 3.
Vetter, "Computer-controlled Devices Reach the Internet," Computer, Dec. 1995.
Vetter, "Videoconferencing on the Internet," Computer, Jan. 1995.
Graves, et al., "A Modular Software System for Distributed Telerobotics," Aug. 25, 1994.
Gleck, "Fast Forward; Really Remote Control," The New York Times, Dec. 3, 1995.
Fuhr, et al., "An Internet Observatory: Remote Monitoring of Instrumented Civil Structures Using the Information Superhighway," Smart Mater. Struct. 4, 1995, pp. 14-19.
Mattheij, Jacques A. "Welcome to MCS," WaybackMachine, Dec. 29, 1996. http://web.archive.org/web/19961229205008/http:/mattheij.nl/.
Mattheij, Jacques A. "MCS—Interface," WaybackMachine, Jun. 24, 1998. http://web.archive.org/web/19980624042050fw/http://www.mattheij.com/interface.html.
"CU-SeeMe Welcome Page," WaybackMachine, May 2, 1998. http://web.archive.org/web/19980502173008/http://cu-seeme.cornell.edu/Welcome.html.
Melikan, Rose, "Bob Metcalfe's article about the trojan Room Coffee Pot," May 15, 2013. qandr.org/quentin/coffeepot/metcalfe.
Ellwood, Stephen J. "rec.video," May 15, 2013. https://groups.google.com/group/rec.video/browse_thread/thread/c68de5ea65664440/b1e46951ddf20a93.
Caglayan, et al., "Agent Source Book—A Complete Guide to Desktop, Internet, and Intranet Agents", 1997.
Mattheij, Jacques. "My Brush With a Patent Troll," Sep. 21, 2012. http://jacquesmattheij.com/my-brush-with-a-patent-troll.
Bilton, Nick, "As the Web Turns 25, Its Creator Talks About Its Future," The New York Times (Internet), Mar. 11, 2014.
Stafford-Fraser, Quentin, "The Trojan Room Coffee Pot A (non-technical) biography," May 1995.
Watanabe, Kenzi et al., "Classroom Lessons of Astronomy Using the Internet and It's Multimedia Applications," IEEE, 1996. pp. 389-394.
Bess, Philip K "Spread Spectrum Applications in Unmanned Aerial Vehicles," Jun. 1994.
Gomes, Lamberto, et al., "Taxi Emergency and Location System for Metropolitan Toronto," pp. 123-127.
Vieveen, Jan W., et al., "Telematics and Dangerous Goods in the Netherlands," IEE Vehicle Nay. & Info. Sys. Conf., 1993, pp. 653-656, IEEE.
Leighty, Robert D., "Terrain navigation concepts for autonomous vehicles," SPIE Applications of Artificial Intelligence, 1984, pp. 120-125, vol. 485.
Perilstein, Fred M., "The Future Impact of the Microprocessor on Total Transport System Control Functions," 1994, pp. 25-30, IEEE.

(56) References Cited

OTHER PUBLICATIONS

Dettmer, Roger, "The Net effect," IEE Review, Mar. 1995, pp. 67-71, IEEE.
Caskey, David L., "The Potential of Intelligent Vehicle Highway Systems for Enhanced Traveler Security," 1993, pp. 117-119, IEEE.
Kaplan, Gadi, "Transportation," Technology '86, Jan. 1986, pp. 73-75, IEEE.
Kaplan, Gadi, "Transportation," Technology '85, Jan. 1985, pp. 81-84, IEEE.
Kaplan, Gadi, et al., "Transportation," Technology '88, Jan. 1988, pp. 59-64, IEEE.
Ballard, Robert D., "The JASON Remotely Operated Vehicle System," Feb. 1993.
Goldberg, Ken, et al., "Beyond the Web: manipulating the real world," Computer Networks and ISDN Systems 28, 1995, pp. 209-219, Elsevier Science B.V.
Kojima, Haruhiko, et al., "Visual Communication System in an Appartment House Using Fiber Optics," Jun. 11, 1993, IEEE.
Laird, R.T. et al., "MDARS Multiple Robot Host Architecture," Association of Unmanned Vehicle Systems, Oct. 1995.
Gerland, "Intelligence on Board—Modern Approach to Transit Fleet Management," Vehicle Navigation Information Systems Conference Proceedings, 1994.
Wygant, Leslie, "Remote access in Digital's signle package", Apr. 25, 1995.
Rembold, U., et al., "intelligent autonomous systems," 1995, IOS Press, Netherlands.
Harris, C. J., et al., "Intelligent autonomous vehicles: recent progress and central research issues," Computing & Control Engineering Journal, Jul. 1992, pp. 164-171.
Unknown, Ivan Getting Profile, Apr. 1991.
Frankel, David, "ISDN Reaches the Market," IEEE Spectrum, Jun. 1995, pp. 20-25, IEEE.
Aviles, W. A., et al., "Issues in Mobile Robotics: The Unmanned Ground Vehicle Program TeleOperated Vehicle (TOV)," SPIE Mobile Robots V, 1990, pp. 587-597, vol. 1388.
Duchamp, Dan, "Issues in Wireless Mobile Computing," 1992, pp. 2-10, IEEE.
Gerland, Horst E., "ITS Intelligent Transportation System" IEE Vehicle Nay. & Info. Sys. Conf., 1993, pp. 606-611, IEEE.
Perry, Tekla S., "Careers/People," 1991, p. 74, IEEE.
Allen, Mike, "Beyond the Car Phone," Popular Mechanics, Aug. 1996.
"General Motors Announces OnStar," Feb. 9, 1996.
Yamamoto, Kazuyuki, et al., "A Home Terminal System Using the Home Area Information Network," IEEE Transactions on Consumer Electronics, Nov. 1984, vol. CE-30, No. 4.
Lin, et al., "Migration of Home Information System Toward ISDN," IEEE Transactions on Consumer Electronics, May 1990, pp. 103-109, vol. 36, No. 2.
Inoue, et al., "A Home Automation System," IEEE Transactions on Consumer Electronics, Aug. 1985, pp. 516-527, vol. CE-31, No. 3.
Dorcey, "CU-SeeME Desktop Videoconferencing," Connexions, Mar. 1995.
Ellis, Leslie, "Sun, Starlight Nets Team Up on Business Video Servers," Oct. 10, 1994.
Johannesen, "Fleet Management Using INMARSAT-C and GPS—A Norwegian Pilot Project", Vehicle Navigation & Information Systems, 1992, pp. 305-310, IEEE.
"Daily Giz Wiz 580: Connectix QuickCam," May 30, 2008.
Stauffer, "Smart Enabling System for Home Automation" IEEE Transactions on Consumer Electronics, May 1991, pp. xxix-xxxv, vol. 37, No. 2.
Tynan, "The 50 Greatest Gadgets of the Past 50 Years," PC World, Dec. 24, 2005.
Anbinder, "Connectix is Watching," Jul. 18, 1994.
Wheatley, "Tracker—Stolen Vehicle Recovery System," 1993, The Institution of Electrical Engineers, London, UK.
Scorer, Tony, Trakbak Vehicle Location and Recovery, 1993, IEE, London, UK.
Middleton, et al., "Vehicle Anti-Theft System Uses Radio Frequency Identification," 1993, IEE, London, UK.
Unkown, IEEE—How to Frustrate Car Thieves, Oct. 1985.
Tsuzawa, M., et al., "Advanced Mobile Traffic Information and Communication System—AMTICS," 1989, pp. 475-483, IEEE.
Langrock, Donald G., et al., "Advanced Telerobotic Controller," 1994, pp. 11-157 to 11-162, IEEE.
Adam, A. "Aerospace and Military," Technology '85, Jan. 1985, pp. 85-88, IEEE.
Dooling, Dave, "Aerospace and military," IEEE Spectrum Technology 1993, Jan. 1993, pp. 72-75, IEEE.
Schooley, Larry C., et al., "An Advanced Architecture for Telesystems Applications," 1994 IEEE National Telesystems Conference, 1994, pp. 119-122, IEEE.
Harris, James C., "An Infogeometric Approach to Telerobotics," 1994 IEEE National Telesystems Conference, 1994, pp. 153-156, IEEE.
Illman, J., et al., "An Integrated System for Navigation and Positioning of an ROV for Scientific Exploration," 1993, pp. 11-449 to 11-503, IEEE.
Unkown, IEEE Spectrum—Finding Your Way Electronically, Nov. 1982.
Cogger, Dick, "CU-SeeMe ReadME File" Jan. 16, 1995, pp. 1-14.
Cameron, et al., "Intelligent Transportation System Mayday Becomes a Reality," 1995, pp. 340-347, IEEE.
Schilling, "Wireless Communications Going Into the 21st Century," IEEE Transactions on Vehicular Technology, Aug. 1994, pp. 645-652, vol. 43 No. 3 IEEE.
Fellers, Jack W., et al., "Using the Internet to Provide Support for Distributed Interactions," Proc. of the 28th An. Hawaii Intl. Conf. On Sys. Sciences, 1995, pp. 52-60.
Zhang, Wei-Bin, "Vehicle Health Monitoring for AVCS Malfunction Management," IEE Vehicle Nav. & Info. Sys. Conf., 1993, pp. 501-504, IEEE.
Gates, Harvey M., et al., "Vehicular Positioning System," IEEE AES Magazine, Mar. 1986, pp. 17-19, IEEE.
Chang, Yee-Hsiang, "Wide Area Information Accesses and the Information Gateways," 1994, pp. 21-27, IEEE.
Corr, Frank, et al., "Worldwide Communications and Information Systems," IEEE Communications Magazine, Oct. 1992, pp. 58-63, IEEE.
Kehoe, Brendan P., "Zen and the Art of the Internet," Jan. 1992, First Edition.
Garcia, et al., "Monitoring Data in Real Time," Dr. Dobb's Journal, Jul. 1996, pp. 56, 58, 60 and 64.
Fuhr, P. L., et al., "An Internet observatory: remote monitoring of instrumented civil structures using the information superhighway," Smart Mater. Struct. 4, 1995, pp. 14-19.
Cordero, et al., "High speed network for delivery of education-on-demand," SPIE, Mar. 25, 1996, pp. 161-172, vol. 2667.
Sellers, et al., "An update on the OmniTRACS Two-way Satellite Mobile Communications System and its Application to the Schneider National Truckload Fleet," 1992 Proceedings of the International Congress on Transportation Electronics, Oct. 1992.
Zuech, "The EDC-1000 Electronic Imaging System," published by NASA Astrophysics Data System in I.A.P.P.P. Communications, 39 (Mar. 1990) at 1-2.
Fuhr, et al., "Remote Monitoring of Instrumented Structures Using the Internet Information Superhighway", Paper presented at the Second European Conf. on Smart Structures and Materials, Glasgow 1994, Session 3.
Sheng, et al., "A Portable Multimedia Terminal", IEEE Communications Magazine, Dec. 1992.
Jones, et al., "Fully Integrated Truck Information and Control Systems (TIACS)," Society of Automotive Engineers, 1983.
Kay, "Computer Software", Scientific American, 53-50, vol. 251, No. 3, Sep. 1984.
Hagenbuch, "Truck/Mobile Equipment Performance Monitoring Management Information Systems (MIS)", SAE Technical Paper Series 861249 (1986).
Gillan, "Prometheus and Drive: Their Implications for Traffic Managers," Transportation Road Research Lab UK 1989.

(56) References Cited

OTHER PUBLICATIONS

U.S. Appl. No. 08/681,172 filed by Nathan Polish dated Jul. 22, 1996, now abandonded.
U.S. Appl. No. 60/014,427 filed DiRienzo dated Mar. 28, 1995.
Paulos, Eric, et al., "A World Wide Telerobotic Remote Environment Browser," published by O'Reilly & Associates, Inc. in World Wide Web Journal, Issue One: Conference Proceedings, Fourth International World Wide Web Conference, (1995) at 677-690.
Paulos, Eric, et al., "A World Wide Telerobotic Remote Environment Browser," Fourth International World Wide Web Conference, (1995) available at http://www.w3.org/Conferences/WWW4/Papers/326.
Katz, Randy, "Adaptation and Mobility in Wireless Information Systems," published by IEEE, Personal Communications (vol. 1, Issue 1), (Aug. 18, 1995).

* cited by examiner

CONTROL, MONITORING AND/OR SECURITY APPARATUS AND METHOD

RELATED APPLICATIONS

This application claims the benefit of the priority of U.S. Provisional Patent Application Ser. No. 60/377,134, filed on May 1, 2002, and entitled "CONTROL, MONITORING AND/OR SECURITY APPARATUS AND METHOD", and U.S. Provisional Patent Application Ser. No. 60/441,482, filed on Jan. 22, 2003, and entitled "CONTROL, MONITORING AND/OR SECURITY APPARATUS AND METHOD", the subject matter and teachings of which are hereby incorporated by reference herein in their entirety.

FIELD OF THE INVENTION

The present invention pertains to a control, monitoring and/or security apparatus and method and, in particular, to a control, monitoring, and/or security, apparatus and method for exercising and/or providing control, monitoring and/or security, vehicles, motor vehicles, marine vessels and vehicles, aircraft, recreational vehicles, residential premises, commercial premises, structures and/or equipment, in a network environment.

BACKGROUND OF THE INVENTION

Anti-theft devices for vehicles and premises are known in the prior art for preventing and/or thwarting the theft of a vehicle and/or of a premises. Vehicle recovery devices or systems are also known for recovering a motor vehicle. These known anti-theft and/or vehicle recovery devices may be of the active or passive variety and are typically available in many forms (i.e. steering wheel locks, hood locks, ignition system cut-off devices, alarms, vehicle homing devices with associated receiving devices, etc.). In some cases, these devices may be of a very simple design, while in other cases, they may be of a more sophisticated design. However, as is well known, these known anti-theft and/or vehicle recovery devices or systems may be easily defeated by thieves, and especially, by professional thieves and/or have other disadvantages associated with their use. Experience has shown that even the most sophisticated of anti-theft devices may be defeated by an experienced, and determined, thief, and that vehicle recovery systems also have drawbacks associated with their use.

In the case of some vehicle recovery devices, their use may be limited by the availability, or lack thereof, of the corresponding tracker or receiver device(s) in the particular locality, or the lack of same by the law enforcement department in a particular area.

An even more disturbing criminal practice, involving the theft of motor vehicles, has rendered most anti-theft devices virtually useless. This criminal practice, known as car-jacking, has gained widespread attention. Car-jacking usually occurs when a thief or thieves confront a motorist or motor vehicle operator, when the motor vehicle engine is running, or when the car thief obtains easy access to the motor vehicle ignition keys and to the motor vehicle, either by force or by the threat of force, thereby bypassing, and rendering useless, any of the widely known anti-theft and/or theft-deterrent devices, thereby gaining control and/or possession of the motor vehicle. In these instances, the motorist or motor vehicle operator is well advised to surrender the motor vehicle. However, once surrendered, the motor vehicle is virtually lost to the car thief.

Anti-theft and/or theft-deterrent devices which attempt to defeat the ultimate vehicle theft, such as caused by car-jacking, by disabling the motor vehicle during the "get-away", such as by shutting off power to the motor vehicle engine, have major disadvantages and drawbacks in that they could shut-off the vehicle engine at an inopportune instant in time, thereby causing a dangerous condition to exist which could lead to an accident and resulting injuries to individuals as well as damage to property. These accidents may arise when the motor vehicle power is suddenly shut-off while the vehicle is in motion, which condition could cause the vehicle to suddenly, or even gradually, lose power on a roadway or highway, while traveling at a moderate or at a high rate of speed and/or when a power steering and/or a power braking system, which derives its power from the vehicle engine, suddenly loses power upon the loss of the engine power. As noted above, accidents such as these may result in injuries to people, both inside and outside the vehicle, as well as property damage caused by, and to, the vehicle.

The above described disadvantages and drawbacks of the prior art devices may also pose accident liability concerns to those manufacturers and/or sellers of these devices, as well as to the owner or operator of the motor vehicle, as these entities and/or individuals may be held liable for the injuries and/or the damages sustained as a result of the above described accidents.

Vehicle recovery systems are known which include a vehicle homing device, which is activated and which emits homing signals which are used to home in on, or to locate, the vehicle. These vehicle recovery systems usually require that the law enforcement agency have corresponding homing signal receivers and/or equipment and that they be kept in operating condition, in order to effectively home in on, or locate, the vehicle. Unless the local police or law enforcement authorities have such equipment, the homing signal recovery device serves little purpose in recovering the vehicle in that locale.

Other vehicle recovery systems require that a police report be made prior to an activation of the homing and/or recovery equipment, which practice could result in the loss of valuable time in the vehicle recovery process. The above problems concerning vehicle security are equally applicable to and present an equal or even greater problem in providing security for marine vessels and vehicles, aircraft and/or recreational vehicles.

Providing security for residential premises, commercial premises, structures, and/or equipment, is also of great concern, especially when such premises, structures and/or equipment are left vacant for hours and/or days at a time. These concerns may arise while residential premises are left unoccupied during the working day, when second homes and/or vacation homes are left unoccupied for days, weeks and months at a time, and in commercial premises which may also be left unoccupied for long periods of time such as after working hours or during weekends or other prolonged periods of time when these premises may be closed and/or unoccupied.

While anti-theft and/or security systems exist for residential and/or commercial premises, such systems fail to enable the owner or occupant and/or other authorized individual to conveniently and effectively exercise and/or perform control, monitoring and/or security functions with regards to these premises. The same holds true for other types or structures and/or equipment. The ability to conveniently and effectively enable one to exercise and/or to perform control, monitoring and/or security functions would prove to be invaluable in allowing owners, occupants and/or other authorized individuals to exercise and/or to provide control, monitoring and/or security functions over these premises, from a remote location and at any time.

SUMMARY OF THE INVENTION

The present invention provides an apparatus and a method for overcoming the disadvantages and drawbacks which are associated with the known prior art control, monitoring and/or security systems and provides a control, monitoring and/or security apparatus and method and, in particular, to a control, monitoring, and/or security, apparatus and method for exercising and/or providing control, monitoring and/or security, vehicles, motor vehicles, marine vessels and vehicles, aircraft, recreational vehicles, residential premises, commercial premises, structures and/or equipment, in a network environment.

The present invention also provides an apparatus and a method which also overcomes the shortcomings of prior art anti-theft and/or theft deterrent systems and, in particular, anti-theft and/or theft-deterrent systems for vehicles, marine vessels and vehicles, aircraft and recreational vehicles as well as for residential premises and/or for commercial premises.

The apparatus of the present invention includes a transmitter system for transmitting an electrical, an electronic, an electromagnetic or other suitable signal, transmittable over a communication system and/or medium, upon an activation by the owner or authorized user or operator of the vehicle, motor vehicle, marine vessel, aircraft, recreational vehicle, and/or the owner, occupant and/or authorized individual of and for the residential premises and/or the commercial premises.

The transmitter should also consist of a user interface device and a transmitting device. The transmitter should also have a receiver associated therewith for receiving signals. In this regard, the transmitter/receiver combination can be replaced and/or implemented with and/or by a transceiver. The transmitter transmits a signal, in response to an authorized user or operator accessing and/or activating the apparatus.

The transmitter system is a remote system, which may or may not be physically connected to the remainder of the apparatus. Further, the transmitter system is not located in the vehicle, motor vehicle, marine vessel or vehicle, aircraft, recreational vehicle, residential premises and/or commercial premises, but rather, is located external from, and/or separate and apart from, the vehicle.

The apparatus also includes a receiver for receiving the signals which are transmitted by the transmitter or transceiver system. The receiver receives the signal(s) which is transmitted by the transmitter or transceiver and provides an indication, in the form of a signal transmission, back to the transmitter or transceiver and, in particular, the transmitter receiver, which signifies that a signal has been received by the apparatus. The receiver also generates data which is indicative of the signal, or a portion thereof, which has been received. The receiver should also be provided with its own transmitter. In this regard, this receiver/transmitter combination can also be replaced and/or implemented with and/or by a transceiver.

The transmitter/receiver combination should provide for the transmission and for the reception of a multitude of remote electrical, electronic, electromagnetic, and/or other suitable signals, over long distances and/or in a mobile and/or a wireless communications environment. Telephone signals and telephone communication devices can be utilized in the present invention as well as personal computers which can be utilized with telecommunications and/or other suitable communication systems and/or mediums.

Upon receiving the signal, the receiver generates a distinct signal which is indicative of the signal transmitted from the transmitter. At least a portion of the transmitted signal can include a valid access code, which accesses the receiver and the apparatus. The access code serves to provide for security measures which can be taken in conjunction with the use of the apparatus.

The apparatus also includes a controller or a CPU 4 (CPU), which is electrically connected with the receiver and which receives, or reads, whichever the case may be, the signal or signals, or portions thereof, which are generated by the receiver. The CPU also has associated therewith a read only memory device(s) and random access memory device(s). The data which is received by the receiver is processed by the apparatus.

The CPU can also have a transmitter associated therewith for transmitting signals to the transmitter receiver or transceiver. In this manner, the CPU of the apparatus can respond to a user data transmission, command, or inquiry with a transmitted signal.

In the case of vehicles, motor vehicles, marine vessels and vehicles, aircraft and recreational vehicles (hereinafter referred to collectively as "vehicles"), the CPU is electrically connected and/or linked to the vehicle ignition system, which is located externally from the apparatus. The CPU may or may not be connected with and/or linked to the vehicle ignition system through an ignition system interface. The CPU can transmit signals to, as well as receive signals from, the vehicle ignition system. In this manner, the CPU and the vehicle ignition system can exchange information between each other.

The CPU, upon receiving an appropriate signal from the receiver, and upon the completion of a data processing routine, can issue a suitable signal, to the vehicle ignition system. This signal can be one which will disable, re-enable and/or reset the vehicle ignition system. The CPU can also interrogate the ignition system and/or receive data from the ignition system which is indicative of ignition system status.

The CPU can also be electrically connected and/or linked to the vehicle fuel system which is also located externally from the apparatus. The CPU may or may not be connected with and/or linked to the vehicle fuel system through a fuel system interface. The CPU is capable of issuing a signal, to disable, re-enable and/or reset the vehicle fuel system. The CPU can also interrogate and/or receive data from the fuel system which is indicative of fuel system status. The CPU can also provide control over the vehicle exhaust system in a similar fashion or in an analogous manner.

The CPU can also be electrically connected and/or linked to at least one or more of a variety of vehicle equipment systems. The vehicle equipment system or systems are located externally from the apparatus and may or may not be connected and/or linked to the CPU via a respective and/or associated vehicle equipment system or systems interface. The vehicle equipment system or systems, which varies for each type of vehicle (i.e., vehicle, motor vehicle, marine vessel or vehicle, aircraft and/or recreation vehicle) can include, but is not limited to, an exterior and/or an interior siren or alarm, a horn, a vehicle exterior light system(s), a power door lock or other locking system or device, a hood locking system, a video recording device and/or a camera, and/or an audio recording device, for providing surveillance of the vehicle interior and/or exterior, an intercom system, for providing communications between vehicle users and/or occupants and the owner, operator and/or authorized individual, cellular or mobile phones and/or any one or more of the widely known vehicle anti-theft systems, alarm systems and/or stolen vehicle and/or other type of vehicle recovery systems and/or devices.

Each of the vehicle equipment systems, if utilized in conjunction with the apparatus, can be activated, de-activated, reset or in some other way controlled and/or monitored by the apparatus of the present invention. The use of any one or more of the vehicle equipment system or systems is optional.

The vehicle equipment system or systems receives signals from the CPU, which signals serve to activate, de-activate, or vice versa, whichever the case may be, the respective vehicle equipment system(s).

The apparatus can also comprise a vehicle position and locating device which can be utilized in order to determine the position and/or the location of the vehicle. The vehicle position and locating device can be utilized so as to determine the position of the vehicle anywhere in the world and provide for the transmission of vehicle position and/or location data, via an associated transmitter, to an appropriate system receiver so that vehicle position would be available to the owner, user and/or authorized individual and/or so that the vehicle can be located and/or tracked and recovered.

The apparatus can also comprise a vehicle position and locating system receiver, which is employed for receiving and/or processing the data which is transmitted from the vehicle position and locating device.

The vehicle position and locating device can comprise a positioning system computer and a global positioning device with associated global positioning system receiver. The vehicle position and locating device can also comprise a position data transmitter for transmitting the vehicle position and/or location data to the vehicle position system receiver. The vehicle position and locating device can also comprise a data base which contains digital and/or digitized map data, which can be utilized in order to determine the geographical position of the vehicle from the calculated "raw" position data obtained from the global positioning device. In this manner, vehicle position and/or location on a map can be obtained.

Vehicle position and/or location data can be transmitted to the vehicle position system receiver which can be located at, or accessible to, the authorized user or operator and/or authorized individual at any location and/or at the location of an authorized office or agency, such as at a central security office or agency or local or regional law enforcement office or agency, which is duly authorized to receive the vehicle position and/or location data for the vehicle.

The vehicle position and locating device can also perform updated global positioning calculations so as to provide for a tracking of a vehicle movement. The apparatus can also ascertain vehicle movement by monitoring and/or tracking vehicle position data as it is updated.

The vehicle position system receiver can be equipped with an appropriate computer system and a receiver for receiving the data transmitted by the transmitter of the vehicle position and locating device.

The vehicle position system receiver can comprise a CPU for controlling the operation of the system receiver which CPU is connected and/or linked to the receiver for receiving and/or for reading the vehicle position and/or location data. The system receiver can also comprise a user interface device, a display device, an output device and a database containing digital map data for use in determining geographical position of a vehicle. The system receiver can also comprise a transmitter for sending data and/or signals to the vehicle position and locating device and/or for transmitting signals to the CPU and/or to the transmitter receiver.

The system receiver can also be utilized in conjunction with a home and/or a personal computer and/or other personal communications device and/or apparatus which can be utilized with an associated receiver or equivalent peripheral device(s).

A home and/or personal computer, and/or other personal communications device and/or apparatus can also be utilized for performing the functions of the transmitter and the vehicle position and locating system receiver. The apparatus can also be utilized in conjunction with a computer network such as an on-line service and/or on, or over, the Internet and/or the World Wide Web, by employing an appropriate server computer and/or an associated Web Site and/or Web Site technology in conjunction with an appropriate communication medium.

Upon the occurrence, or the discovery thereof, of the theft of a vehicle, or simply in order to monitor vehicle status or location, the authorized user or operator can activate the apparatus by entering an access code into the transmitter or transceiver interface. Entry of a valid access code will activate a signal transmission from the transmitter or transceiver to access the apparatus.

The authorized user or operator can then transmit a command code from the transmitter or transceiver to the receiver of the apparatus. In a case when the vehicle has been stolen, the command code can be a vehicle disable command code. It should also be noted that a vehicle re-enable or reset command code, or any other suitable command code, monitoring code, etc., which would represent a function or operation to be performed by the apparatus, can also be entered. The command code is then transmitted to, and received by, the receiver.

The command code data is then transmitted to, or read by, the CPU for command code identification and for further processing, if necessary. In this manner, an authorized user or operator, upon learning of the theft of the vehicle, or simply attempting to ascertain the status and/or location of the vehicle, can easily access and/or activate the apparatus by simply "calling up" or transmitting a signal to the apparatus.

In the case where the motor vehicle has been stolen, and the authorized user or operator wants to prevent and/or thwart the theft of the vehicle and recover the vehicle, the command code which can be entered can be a vehicle disable command code (disable code) which will disable the vehicle and activate the vehicle position and/or locating device. If the authorized user or operator desires to re-enable the vehicle, such as when the motor vehicle has been found or recovered, so as to render the vehicle re-enabled or operational, the command code to be entered can be a vehicle re-enable or reset command code.

If a valid disable code is transmitted to the apparatus, the vehicle position and locating device is activated and various vehicle systems, including the vehicle ignition system, fuel or fuel pump system and/or exhaust system, and/or at least one or more of a variety of utilized vehicle equipment system(s), can either be activated, de-activated, or reset depending upon the circumstances.

The operation of the vehicle position and locating device can proceed and continue simultaneously and/or concurrently with the operation of the apparatus and the CPU. Any one or more of a vehicle equipment systems, including a vehicle alarm and/or homing device can also be activated.

Upon the vehicle being found or recovered, such as in a manner resulting from utilizing the vehicle position and locating device, the authorized user or operator can once again access the apparatus by entering a valid access code and by then entering a valid re-enable or reset command code.

The CPU can then issue a control signal to re-enable or reset the vehicle ignition system, vehicle fuel or fuel pump system and/or exhaust system and/or de-activate or re-activate, any one or more of the various vehicle equipment systems which are utilized. The vehicle position and/or locating device can also be de-activated.

Safeguards can be employed in order to prevent a wrong or a mis-dialed number or unauthorized transmission(s) from accidentally accessing and activating the apparatus, and further, can serve to prevent an unauthorized or an unwanted disabling or re-enabling or setting or resetting of the vehicle ignition system, the vehicle fuel or fuel pump system and/or the vehicle exhaust system and/or the activation, de-activation, or resetting of any one or more of the various vehicle equipment systems which can be utilized.

As noted above, a disable command code can cause the apparatus to activate a vehicle position and locating device which can operate simultaneously and/or concurrently with, and independently of, the operation of the apparatus and the CPU. Once activated, the vehicle position and locating device can activate the global positioning device which calculates vehicle position data by using well known global positioning calculation methods and/or techniques.

Once the vehicle position data has been calculated, the position data can then be transmitted to the vehicle position system receiver which is located at the location of the authorized user or operator, or at the authorized office, agency or other entity. Geographic position and/or location data (i.e. street location, location on a map, etc.) for the vehicle can also be obtained by processing the position and/or location data in conjunction with digital map and/or other suitable data. The transmission of position data can be repeated for a predetermined time interval, after which the global positioning device can calculate updated position data.

The vehicle position data which is received by the vehicle position system receiver can then be employed to find and/or to recover the vehicle. Vehicle position data can be updated, continuously and/or in some other suitable manner, by repeating the global positioning calculations.

Vehicle position data, along with updated vehicle position data, can also be utilized in order to track and/or to monitor vehicle movement. Vehicle position data can also be displayed and/or output for use in finding and/or recovering the vehicle.

The authorized user or operator can discontinue operation of and/or de-activate the global positioning device and/or the vehicle position system receiver, such as when the vehicle has been found or recovered and/or at any other time.

The global positioning device can be utilized to locate and/or to track vehicle movement anywhere in the world. In this manner, the apparatus of the present invention can be utilized to disable or de-activate vital vehicle systems and/or to find and/or recover a stolen vehicle and/or to monitor vehicle operation and/or vehicle location and/or movement.

Further, the present invention provides for an apparatus and a method for disabling and/or re-enabling various systems of the vehicle, when the vehicle is not in use, simply by "calling up" the apparatus so as to disable the vehicle and, thereby, provide added security against vehicle theft and/or to prevent damage to the vehicle and/or to any components thereof. In this manner, an authorized user or operator can disable the vehicle ignition system, fuel or fuel pump system, exhaust system and/or any one or more of a variety of the vehicle equipment systems, of a vehicle which can be parked and/or in use, from any location and/or at any time.

An authorized user or operator can also access the apparatus at any time and, with the use of an appropriate command code, can determine the operating status of the vehicle, the apparatus, and/or any one or more of the various vehicle systems so as to determine if, for example, the ignition system or fuel or fuel pump system is activated or on, thereby alerting the authorized user or operator that someone is operating the vehicle. An authorized user or operator can also access the apparatus so as to determine vehicle position and/or location data or information and/or the geographic location of the vehicle. In this manner, the authorized user or operator can determine the status and/or the location of his or her vehicle at any time and for any reason. In this regard, a safe and an effective anti-theft and/or vehicle recovery apparatus and method is provided by the present invention.

The apparatus of the present invention can be utilized in conjunction with a multitude and/or a variety of valid command codes, wherein each different command code can selectively disable or re-enable or reset any one or any combination of the vehicle systems, such as the vehicle ignition system, the vehicle fuel or fuel pump system, the vehicle exhaust system and/or any one or more of the various vehicle equipment systems which can be utilized. In this manner, the authorized user or operator can utilize the present invention to selectively disable, re-enable, de-activate or re-activate any one or more of the vehicle systems, or a combination thereof, at his or her discretion, at any time, and from any location.

As noted above, an authorized user or operator can also utilize command codes for determining status of the apparatus or of the vehicle, or of any one or more of the vehicle systems. A command code can also be employed to simply determine vehicle position.

The apparatus can also be programmable by the user or operator via the transmitter or transceiver, or at the vehicle, so that certain parameters, such as the timing, and/or the degree of disabling or re-enabling, of the various vehicle systems can be programmed.

By utilizing a multitude of command codes, including disable codes and/or re-enable or reset codes, which codes affect different vehicle systems, or combinations thereof, it is also possible to selectively control the vehicle systems from a remote location. The apparatus can also be programmed for automatic activation and/or self-activation and/or automatic and/or programmed operation via a command code(s), so that the apparatus can become activated upon a certain occurrence, or lack thereof, and thereafter, provide for the disabling and/or the re-enabling of any one or more of the vehicle systems along with activating the vehicle position and/or locating device. The apparatus can also provide information pertaining to vehicle theft, status and/or position.

The apparatus can also be designed and/or programmed to detect its unauthorized use and/or its use by an unauthorized individual. In this regard, the vehicle is capable of reporting itself as being stolen.

In another preferred embodiment of the present invention, an arming device and an activation device can be utilized in conjunction with the apparatus in place of the transmitter/receiver combination so as to provide for an automatic monitoring and/or activation of the apparatus. In such an embodiment, the command code(s) can be a default code and/or be user selected and/or programmable. Automatic activation can also be programmed by the user or operator via a command code(s) with apparatus operation activated upon the occurrence, or lack thereof, of a specified event.

In this manner, the arming device/activation device combination can be utilized so as to activate the apparatus and/or any one or more of the vehicle systems, including the ignition system, the fuel or fuel pump system, the exhaust system and/or any one or more of the various vehicle equipment systems which are utilized in conjunction with the apparatus. The vehicle position and locating device can also be activated via the automatic activation of the apparatus.

In yet another preferred embodiment of the present invention, the vehicle position and locating device can comprise a plurality of global positioning devices which can be strategically located at various points and/or locations in or on the vehicle. Each of the global positioning devices can be placed at different points and/or locations in, or on, the vehicle, with the distances between each of the respective devices being recorded and stored. Upon the activation of the global positioning devices and the calculation of each position or location of each device, any change in distance between any two or more of the respective devices could be utilized in order to determine if the vehicle, or any portion thereof, has been dismantled or structurally altered, at least in part, or possibly to a greater extent.

The apparatus and the method of the present invention can also be utilized in conjunction with a central security office or agency, such as a private security service and/or by a local or regional law enforcement office or agency, in order to provide a prompt means by which to report a vehicle theft, provide for a manner in which to disable and/or re-enable a vehicle or vehicle system, and to determine vehicle position and/or location so as to facilitate the locating and the recovery of the vehicle. In this regard, the present invention can be utilized so as to allow control, monitoring and/or security functions to be exercised and/or performed by an authorized third party. The present invention can also be utilized so as to provide for a prompt law enforcement theft reporting, law enforcement response to the theft report and recovery of the vehicle.

An authorized user or operator can register their vehicle and apparatus with a central security office or agency such as by registering vehicle identification information along with vehicle access and command code data and any other pertinent information. Upon the occurrence of a vehicle theft, or the discovery thereof, the authorized user or operator can access the apparatus so as to exercise and/or to perform control, monitoring and/or security functions over same while, at the same time, allowing for a control, monitoring and/or a security function to be exercised and/or performed by the central security office or other entity.

The apparatus, which is utilized at the central security office and/or other entity, can have the same control capabilities over the vehicle as that of the apparatus utilized in the vehicle. In this regard, status of the apparatus, the vehicle, any one or more of the various vehicle systems, and/or the vehicle position and/or location data can be obtained by the apparatus located at the central security office and/or other entity.

The apparatus which is utilized at the central security office can also be utilized in connection with an on-line service and/or on, or over, the Internet and/or the World Wide Web so as to provide for a means by which the authorized user or operator can utilize the apparatus in conjunction with a home and/or a personal computer and/or a commercial or industrial computer system (i.e., an internet server computer) and/or any other appropriate device.

The present invention can also be utilized in conjunction with a server, a server computer, or other computer or computer system, in or to perform any of the herein-described control, monitoring and/or security operations or functions for any of the herein-described vehicles an/or premises.

In another embodiment, an access code can be only transmitted to, and received by, the central security office apparatus and the vehicle can be accessed and controlled via an access and command code(s) which are transmitted by and from the central security office apparatus. Transmitter devices can also be located in the vehicle so as or to allow a vehicle occupant(s) to transmit signals directly to the central security office and/or agency and/or central equipment, (i.e., satellite, cellular communications site etc.) such as in instances where help can be required and/or in emergency situations.

In yet another embodiment, the access code can only be transmitted to, and received at, the vehicle. In this embodiment, the apparatus which is located in the vehicle can then transmit data to the apparatus located at the central security office thereby alerting the central security office or agency of the vehicle theft or status inquiry. The apparatus at the central security office can thereafter exercise and/or provide control over and/or monitor the functions of, the vehicle apparatus for a plurality of vehicles. Further, the central security office apparatus can also provide the means by which to allow a central security office or local or regional law enforcement office or agency to provide security monitoring over the vehicle(s) which are registered therewith.

In the case where the apparatus can be automatically activated, the vehicle apparatus can transmit a signal, indicative of vehicle theft and/or an unauthorized use or operation of the vehicle, to the central security office apparatus thereby reporting the unauthorized use or operation, or theft, of the vehicle before the authorized user or operator is able to discover same.

The central security office apparatus can also be utilized so as to verify and/or monitor apparatus accessing and/or activation by the authorized user or operator. The authorized user or operator can also "call" the central security office from any location, via any communication means and/or device in order to determine the status and/or the whereabouts or location of his or her vehicle. Both the vehicle apparatus and the central security office apparatus can exercise and/or perform the same control, monitoring and/or security functions over the vehicle.

The present invention can also be utilized, in a similar and/or analogous manner, to provide control, monitoring and/or security for boats, marine vessels, airplanes and aircraft, and/or recreational vehicles of any kind or type. The present invention can also be utilized in order to control, monitor, and/or secure, any of the various vehicle systems, vehicle equipment systems, vehicle equipment, vehicle components, vehicle devices, and/or vehicle accessories, for any of the vehicles described herein.

The present invention can be utilized in order to allow a user to remotely control the operation, movement, direction of movement or travel, propulsion, and/or travel, of any of the herein-described vehicles via a computer or communication device and any one or more of a server computer and/or any other server computer or computer described herein. In this manner, the apparatus and method of the present invention can be utilized in order to remotely control the operation, movement, direction of movement or travel, propulsion, and/or travel, of the vehicle in a network environment and/or to drive or maneuver the vehicle from a remote location.

The user can also disable any and/or all of the vehicle operating and/or operational control systems in order to facilitate and/or to enable the user to take and have control over the vehicle in order to allow the user to remotely control, drive, or maneuver, the vehicle. The user can also disable any and/or all of the vehicle operating and/or operational control systems in order to facilitate and/or to enable the user to take and have control over the vehicle in order to allow the user to remotely control, drive, or maneuver, the vehicle via the home or personal computer or communication device and any one or more of a server computer, and/or any other server computer and/or computer described herein.

The present invention can be utilized in order to allow a user to remotely control the operation, movement, direction of movement or travel, propulsion, and/or travel, of the boat via a computer or communication device and any one or more of the server, server computer, or computer. In this manner, the apparatus and method of the present invention can be utilized in order to remotely control the operation, movement, direction of movement or travel, propulsion, and/or travel, of the boat, in a network environment and/or to control, maneuver, drive, or operate, the boat from a remote location in a network environment. The user can also disable any and/or all of the boat operating and/or operational control systems in order to facilitate and/or to enable the user to take and have control over the boat in order to allow the user to remotely control, drive, or maneuver, the boat via the home or personal computer or communication device and any one or more of the server, server computer, or computer.

The present invention can be utilized in order to allow a user to remotely control the operation, movement, direction of movement or travel, propulsion, and/or travel, of the airplane via the computer or communication device and any one or more of the server, server computer, or computer. In this manner, the apparatus and method of the present invention can be utilized in order to remotely control the operation, movement, direction of movement or travel, propulsion, and/or travel, of the airplane in a network environment and/or to operate, fly, or maneuver, the airplane from a remote location in a network environment.

The user can also disable any and/or all of the airplane operating and/or operational control systems, such as, but not limited to, the cockpit control systems and/or the flight deck control systems, in order to facilitate and/or to enable the user to have control over the airplane in order to allow the user to remotely control, fly, maneuver, or operate, the airplane via the computer or communication device via the home or personal computer or communication device and any one or more of the server, server computer, or computer.

The user can also remotely fly and land the airplane via the home or personal computer or communication device and any one or more of the server, server computer, or computer. Any and all flight control functions can be controlled via the home or personal computer or communication device and any one or more of the server, server computer, or computer.

The airplane can also be landed remotely by controlling and/or uploading information to the automatic pilot aboard the airplane. The user can also dump fuel, deploy parachutes, and/or activate and/or deploy emergency landing escape chutes, fire extinguishment equipment, and/or any other system(s), equipment system(s), device(s), component(s), accessory, and/or accessories, via the home or personal computer or communication device and any one or more of the server, server computer, or computer.

The automatic pilot can also be instructed or controlled, via the home or personal computer or communication device and any one or more of the server, server computer, or computer, to activate black box transmissions, and/or audio and/or video recording transmissions, to a location remote from the airplane, to dump fuel, to deploy parachutes, and/or to activate and/or deploy emergency landing escape chutes, fire extinguishment equipment, any other system(s), equipment system(s), device(s), component(s), accessory, and/or accessories.

The present invention can be utilized in order to allow a user to remotely control the operation, movement, direction of movement or travel, propulsion, and/or travel, of the snowmobile via the computer or communication device and any one or more of the server, server computer, or computer. In this manner, the apparatus and method of the present invention can be utilized in order to remotely control the operation, movement, direction of movement or travel, propulsion, and/or travel, of the snowmobile in a network environment and/or to control, maneuver, drive, or operate, the snowmobile from a remote location, in a network environment.

The user can also disable any and/or all of the snowmobile operating and/or operational control systems in order to facilitate and/or to enable the user to take and have control over the snowmobile in order to allow the user to remotely control, drive, or maneuver, the snowmobile via the home or personal computer or communication device and any one or more of the server, server computer, or computer.

In still another embodiment, the present invention can be utilized in conjunction with a residential premises, residential building and/or a home and/or a household control, monitoring and/or security system. The present invention can also be utilized in order to control, monitor, and/or secure, any of the various premises systems, premises equipment systems, premises equipment, premises components, premises devices, and/or premises accessories, for any of the premises described herein.

In the case where the present invention is utilized in conjunction with a residential premises, residential building and/or a home and/or a household control, monitoring and security system, the CPU can be electrically connected and/or linked to the home and/or household electrical system, which is located externally from the apparatus. The CPU may or may not be connected with and/or linked to the home electrical system through an electrical system interface. The CPU can transmit signals to, as well as receive signals from, the home electrical system. In this manner, the CPU and the home electrical system, can exchange information between each other.

The CPU, upon receiving an appropriate signal from the receiver, and upon the completion of the requisite data processing routine can issue an electrical, an electronic, and/or any other suitable signal, including a digital command signal, to the home electrical system. This electrical, electronic and/or other suitable signal or digital command signal may be one which will disable, re-enable or reset the home electrical system. The CPU can also interrogate the electrical system and/or receive data from the electrical system which is indicative of electrical system status (i.e., whether the electrical system is on or off and/or to what extent certain portions thereof may be on or off).

The CPU can also be electrically connected and/or linked to the home heating system which is also located externally from the apparatus. The CPU may or may not be connected with and/or linked to the home heating system through a heating system interface. The CPU is capable of issuing an electrical, electronic and/or other suitable signal, including a digital signal, to disable or to re-enable the home heating system. The CPU can also interrogate and/or receive data from the home heating system which is indicative of home heating system status (i.e., whether the heating system is on or off and/or to what extent certain portions thereof may be on or off).

The CPU can also be electrically connected and/or linked to the home air conditioning system which is also located externally from the apparatus. The CPU may or may not be connected with and/or linked to the home air conditioning system through an air conditioning system interface. The CPU is capable of issuing an electrical, electronic and/or other suitable signal, including a digital signal, to disable or to re-enable the home air conditioning system. The CPU can also interrogate and/or receive data from the home air conditioning system which is indicative of home air conditioning system status (i.e., whether the air conditioning system is on or off and/or to what extent certain portions thereof may be on or off).

The CPU can also be electrically connected and/or linked to the home water system which is also located externally from the apparatus. The CPU may or may not be connected and/or linked to the home water system through a home water system interface (i.e., electrical shut-off valve). The CPU is capable of issuing an electrical, electronic and/or other suitable signal, including a digital signal, to disable or to re-enable the home water system. The CPU can also interrogate and/or receive data from the home water system which is indicative of the water system status (i.e., whether the home water system or any portion thereof is on or off).

The CPU can also be electrically connected and/or linked to the home thermostat or environmental control system so as to control and monitor interior temperature. In this manner, the home thermostat system can then be adjusted and/or controlled by the user or operator via the apparatus. The home thermostat system can be connected to the home heating system and/or to the home air conditioning system so as to activate, set and/or control the operation of these systems so as to achieve the desired temperature and/or environmental conditions in the home.

The CPU can also be electrically connected and/or linked, via interfaces if needed, to any one or more of a variety of home equipment systems which can include a home anti-theft and/or burglary alarm system, an interior and/or exterior siren or alarm, interior and/or exterior lighting systems, electrical and/or electronically controlled locking devices for doors and/or windows, including electrical and/or electronic dead bolt locks and/or other types of locking devices, electrical systems and devices for controlling electrical circuits or systems room-by-room, device-by-device, and/or appliance-by-appliance.

The home equipment system can also include devices for controlling any one or more of the electrical circuitry, such as circuits controlled by fuses, circuit breakers or equivalent devices, devices for controlling and/or monitoring hot water heater(s), garage door opener(s), lawn sprinkler system(s), electric fences and/or fencing, in-ground or above-ground pool equipment, filters and/or heaters, home water valves, individual room water valves, home fire detector equipment and home fire extinguishment equipment, jacuzzis, hot tubs, pet feeders and/or any other electrical and/or electronic devices and/or appliances and/or those devices and/or appliances which can be electrically and/or electronically controllable. Home equipment systems can also include door and window closing, opening and locking devices.

The home equipment systems can also include any and all home appliances such as televisions, telephones, telephone answering machines, VCRs, stoves, ovens, microwave ovens, door bells, individual lights or lamps, blenders, toasters, irons, computers, word processors, stereos, radios, and any other home appliance and/or devices which can be electrically and/or electronically activated and/or controllable.

The home equipment systems can also include video recording equipment, which can include video recording device(s) and/or a camera(s), such as those utilized in conjunction with personal computers, televisions, digital televisions, interactive televisions, surveillance systems, display telephones and/or other communication devices, including personal communication devices.

The video recording device(s) and/or camera(s) can be digital recording devices or cameras or other suitable video recording and/or photography equipment. The video recording device(s) and/or camera(s) can be located at any location on and in the interior and/or at the exterior of the home or premises and can have associated therewith transmitting devices for transmitting the recorded video or photograph(s) to the owner or occupant and/or other authorized individual so as to provide surveillance and/or monitoring capabilities for the home and/or premises.

The home equipment system can also include audio recording equipment, which can include microphones and/or tape recorders, such as those utilized in conjunction with personal computers, televisions, digital televisions, interactive televisions, display telephones and/or other communication devices, including personal communication devices.

The audio recording device(s) can have a transceiver or transmitter/receiver system associated therewith for transmitting audio information to the owner or occupant and/or authorized individual so as to provide for the monitoring and/or the surveillance of the interior and/or the exterior of the home.

The home equipment systems can also include an intercom system or device or telephone, cellular, digital or otherwise, for providing a means by which to allow the user or operator, or other authorized individual, to communicate with the persons present in, or occupants of, the home or the premises. The home equipment systems can also include monitoring device(s) for reading and/or monitoring the home fuel supply, gas meter and/or gas usage, water supply, water meter and/or water usage, electrical generator and/or alternator operation, electricity meter and/or electricity usage, heat and/or air conditioning usage, gas and/or oil or other fuel supply and/or usage, telephone usage, appliance usage, etc., a home control system and/or any other home operation and/or system function.

The monitoring device(s) can have associated therewith a transceiver or transmitter/receiver system for transmitting data and/or information recorded and/or read by the monitoring device(s) to the user or operator and for receiving signals such as, for example, control signals, by which the user or operator can exercise control over the monitoring device(s). The monitoring devices and the corresponding devices which they monitor can be linked via wireless devices and/or over a wireless medium.

When used in conjunction with a residential premises, residential building and/or home or household system, the apparatus and method of the present invention can be utilized and/or operates in the same or in a similar and/or analogous manner as it is utilized and/or operates in conjunction with vehicles so as to provide control, monitoring and/or security functions for and over a home and/or residential premises. In this manner, a homeowner or occupant can access a home system at any time, and from any location, and thereby exercise and/or provide control, monitoring and/or security functions over any home system, equipment, device and/or appliance. The owner or occupant can also monitor the status, state, or operation of any home system, equipment, device and/or appliance. Lastly, the owner or occupant can exercise and/or perform security related functions or operations on, and over, the home system, equipment, device and/or appliance.

In still another embodiment, the apparatus and method of the present invention can be utilized in conjunction with a commercial building, commercial office and/or commercial premises control, monitoring and/or security system. In the case where the present invention is utilized in conjunction with a commercial building, commercial office and/or commercial premises control, monitoring and/or security system, the CPU can be electrically connected and/or linked to the commercial office and/or premises electrical system, heating system, air-conditioning system, water system, thermostat system, and/or to at least any one or more of a variety of commercial office and/or premises equipment systems, which can include an anti-theft and/or burglary alarm system, an interior and/or exterior siren or alarm, interior and/or exterior lighting and/or lighting system(s), electrical and/or electronically controlled locking devices for doors and/or windows, including electrical and/or electronic dead-bolt locks and/or locking devices.

The CPU can also be connected and/or linked to commercial office and/or premises equipment systems which include electrical systems for controlling electrical circuits or systems room-by-room, device-by-device, and/or appliance-by-appliance, devices for controlling any one or more of the electrical circuitry, such as circuits controlled by fuses, circuit breakers or equivalent devices, devices for controlling and/or monitoring hot water heaters, garage door openers, lawn sprinkler systems, electric fences and/or fencing, in-ground or above-ground pool and/or fountain equipment, filters and/or heaters, fire detector equipment, fire extinguishment equipment, and office equipment, power door and/or window closing, opening and locking equipment and any other electrical and/or electronic device or item or any device and/or item which is electrically or electronically controllable.

The commercial office and/or premises equipment systems can also include any and all commercial office and/or premises appliances such as televisions, telephones, telephone answering machines, alarm systems, VCRs, stoves, ovens, microwave ovens, door bells, individual lights or lamps, office equipment and appliances, computer and associated peripherals, word processors, stereos, radios, manufacturing equipment and any other commercial office and/or premises equipment.

The commercial office and/or premises equipment system can also include a video recording equipment, which can include video recording device(s) and/or a camera(s), such as those utilized in conjunction with personal computers, televisions, digital televisions, interactive televisions, display telephones and/or other communication devices, including personal communication devices, and/or a still picture camera(s). The video recording device(s) or camera(s) can be digital recording devices or cameras or other suitable devices or cameras, including typical video recording devices or cameras for providing video recording and/or surveillance.

The video recording device(s) or camera(s) can have a transceiver or transmitter/receiver system associated therewith for transmitting video images and/or photographs, recorded by the video recording device(s) or camera(s), to the owner or occupant and/or authorized individual so as to provide for the monitoring and/or the surveillance of the interior and/or the exterior of the commercial office and/or premises.

The commercial office and/or premises equipment system can also include audio recording equipment, which can include microphones and/or tape recorders, such as those utilized in conjunction with personal computers, televisions, digital televisions, interactive televisions, display telephones and/or other communication devices, including personal communication devices.

The audio recording device(s) can have a transceiver or transmitter/receiver system associated therewith for transmitting audio information to the owner or occupant and/or authorized individual so as to provide for the monitoring and/or the surveillance of the interior and/or the exterior of the commercial office and/or premises.

The commercial office and/or premises equipment system can also include an intercom system or device or telephone, cellular, digital or otherwise, for providing a means by which to allow the owner or occupant, or other authorized individual, to communicate with the persons present in, or occupants of, the commercial office and/or premises. The commercial office and/or premises equipment system can also include monitoring device(s) for reading and/or monitoring the commercial office and/or premises fuel supply, fuel usage, water supply, water usage, electricity meter, electricity usage, electrical generator and/or alternator operation, heat and/or air conditioning usage, gas and/or oil or other fuel usage, telephone usage, commercial office and/or premises equipment and/or appliance usage, etc., and/or commercial office and/or premises control system and/or any other commercial office and/or premises operation and/or system function.

The monitoring device(s) can have associated therewith a transceiver or transmitter/receiver system for transmitting data and/or information recorded and/or read by the monitoring device(s) to the user or operator and for receiving signals such as, for example, control signals, by which the user or operator can exercise control over the monitoring device(s). The monitoring devices and the corresponding equipment and/or devices to be monitored can be linked via wireless devices and/or over wireless communication systems.

The commercial office and/or premises equipment system or systems receives signals from the CPU, which signals serve to activate or de-activate, or vice versa, whichever the case can be, the respective commercial office and/or premises equipment system(s) which are utilized in conjunction with the apparatus.

When utilized in conjunction with a commercial office and/or premises, the apparatus and method of the present invention is utilized and/or operates in the same, or in a similar and/or analogous, manner as it is utilized and/or operates in conjunction with vehicles and/or with residential premises, etc., so as to allow control, monitoring and/or security functions to be exercised and/or performed on, and over, a commercial office and/or premises.

In this manner, an owner, occupant and/or authorized individual can access a commercial office and/or premises system at any time and from any location and thereby exercise and/or perform control, monitoring and/or security functions over any commercial office and/or premises system, equipment, device and/or appliance. The owner, occupant or authorized individual can also monitor the status, state or operation of any commercial office and/or premises system, equipment, device and/or appliance.

In any of the above described embodiments, the present invention can be utilized in conjunction with any suitable communication device(s) and/or communication system(s). In this manner, the present invention can be utilized in conjunction with a telephone, a touch tone telephone, a cordless telephone and/or a cellular or mobile telephone, a home and/or a personal computer having associated telecommunication devices or other suitable peripheral device(s) such as a modem and/or a fax/modem, personal communication devices which can operate over an appropriate telecommunications system, and/or other suitable communications systems and/or mediums, including radio signal, optical, satellite and/or other communications systems and/or mediums. Any suitable communication system and/or medium can be utilized.

Personal communication service (PCS) systems and devices, including stationary, portable and/or hand-held devices, can also be utilized. Digital signal communications devices and systems can also be utilized. Interactive and/or digital televisions, personal communication devices, personal communication services (PCS) devices, personal digital assistants, cellular telephones, display telephones, display cellular telephones and electronically equipped watches and/or other devices and/or effects can also be utilized for performing user interactive control, monitoring and/or security functions in conjunction with the present invention.

The interface devices utilized in any of the various embodiment of the present invention can be wireless devices or modules which need not be directly connected to the CPU or to its respective equipment system in a hard-wired manner. In this regard, hard-wired electrical connections may be unnecessary. In the case of wireless interface devices or modules, corresponding wireless technology and/or systems should be utilized in order to provide for the wireless control and/or operation of the respective equipment(s).

The present invention can be utilized to access, monitor, and/or record or store, operation data and/or information for any of the herein-described vehicles, motor vehicles, boats, marine vessels, airplanes, aircraft, and/or recreational vehicles, at a location remote from the respective vehicles, motor vehicles, boats, marine vessels, airplanes, aircraft, and/or recreational vehicles. The present invention can be utilized to access, monitor, and/or record or store, operation data and/or information for any of the herein-described residential premises and/or commercial premises. Any of the respective operation data and/or information can be obtained at, and/or stored at, any of the transmitters, home and/or personal computers, computers, and/or server computers, described herein.

In any and/or all of the embodiments described herein, any of the server, server computer, or computer, and/or any of the home and/or personal computers or communication devices described herein and/or utilized in conjunction with the apparatus and method of the present invention can comprise any number of computers or computer systems. In this regard, any of the server, server computer, or computer, and/or any of the home and/or personal computers or communication devices can be a single computer or computer system or can be comprised of, or can include, a plurality (two or more) computers or computer systems.

In any and/or all of the embodiments described herein, any of the receivers or transmitters associated with and/or utilized in conjunction with a server, server computer, or computer, and/or any of the home and/or personal computers or communication devices, described herein, can be or can include any number of receivers or transmitters, respectively.

In another preferred embodiment of the present invention, a respective vehicle owner, vehicle user, or other authorized individual or entity, can program any one or more of respective server, server computer, or computer, so as to provide a limitation, limitations, a restriction, and/or restrictions, regarding any control operations or functions, any monitoring operations or functions, and/or any security operations or functions, which can be authorized, allowed, and/or disallowed. In this regard, the present invention can be utilized so as to allow an owner, user, or authorized individual or entity, to pre-specify limitations or restrictions regarding the use of the apparatus and method of the present invention in conjunction with any of the herein described vehicles.

The limitation(s) or restriction(s) on the ability to access the present invention and/or the vehicle and/or to perform any of the herein-described control, monitoring, and/or security, operations or functions on or regarding the respective vehicle can include, but is not limited to authorized individuals who may utilize the present invention to perform a control monitoring, and/or security operation or function, on or regarding any of the herein-described vehicles and/or any of the herein-described vehicle systems, vehicle equipment systems, vehicle equipment, vehicle components, vehicle devices, and/or vehicle accessories, authorized time or times for performing any of the herein-described control, monitoring, and/or security, operations or functions on or regarding any of the herein-described vehicles and/or any of the herein-described vehicle systems, vehicle equipment systems, vehicle equipment, vehicle components, vehicle devices, and/or vehicle accessories, the name or identity of an authorized individual, entity, individuals, and/or entities, which or which can perform any of the herein-described control, monitoring, and/or security, operations or functions on or regarding any of the herein-described vehicles and/or any of the herein-described vehicle systems, vehicle equipment systems, vehicle equipment, vehicle components, vehicle devices, and/or vehicle accessories, the types of, the kinds of, and/or the degree of, control, monitoring, and/or security, operations or functions which can be performed on or regarding any of the herein-described vehicles and/or any of the herein-described vehicle systems, vehicle equipment systems, vehicle equipment, vehicle components, vehicle devices, and/or vehicle accessories, the vehicles and/or any of the herein-described vehicle systems, vehicle equipment systems, vehicle equipment, vehicle components, vehicle devices, and/or vehicle accessories, which can be controlled, monitored, and/or secured, via the present invention, the time or times for which certain control, monitoring, and/or security, operations or functions can be performed on certain vehicles and/or any of the herein-described vehicle systems, vehicle equipment systems, vehicle equipment, vehicle components, vehicle devices, and/or vehicle accessories, the name or identity of an owner, user, or authorized individual(s), entity, or entities, who or which are authorized to perform any of the control, monitoring, and/or security, operations or functions on certain vehicles and/or certain of any of the herein-described vehicle systems, vehicle equipment systems, vehicle equipment, vehicle components, vehicle devices, and/or vehicle accessories, and/or the types of or identity of the vehicle systems, vehicle equipment systems, vehicle equipment, vehicle components, vehicle devices, and/or vehicle accessories, which can be controlled, monitored, and/or secured, via the present invention and/or which can be controlled by the respective owner, user, or authorized individual or entity, and/or the degree and/or manner to which they can be controlled, monitored, and/or secured.

The present invention can be utilized in order to limit and/or restrict access to any one or more of the herein-described vehicles as well as to limit or restrict the control, monitoring, and/or security, operations or functions, which can be performed on or regarding any one or more of the herein-described vehicles and/or any of the herein-described vehicle systems, vehicle equipment systems, vehicle equipment, vehicle components, vehicle devices, and/or vehicle accessories, associated with a vehicle or vehicles. In this manner, the present invention can be utilized in order to limit or restrict use of the present invention as it may pertain to a respective vehicle or vehicles.

A limitation or restriction on access to a vehicle and/or to any of the herein-described vehicle systems, vehicle equipment systems, vehicle equipment, vehicle components, vehicle devices, and/or vehicle accessories, and/or the types and kinds of control, monitoring, and/or security, operations and/or functions, which can be performed on or regarding a vehicle and/or any of the herein-described vehicle systems, vehicle equipment systems, vehicle equipment, vehicle components, vehicle devices, and/or vehicle accessories, can be transmitted to a respective server, server computer, or computer, from a communication device or a computer associated with the owner, user, or authorized individual.

The communication device or computer can, but need not be, the home or personal computer or communication device, but rather can be a communication device, telephone, wireless telephone, cellular telephone, videophone, display telephone, two-way radio, walkie-talkie, television, digital television, cable television, interactive television, pager, beeper, personal digital assistant, pocket personal computer, computer, desktop computer, laptop or notebook computer, mobile computer, handheld computer, a network computer for receiving and/or providing electronic mail messages, and/or watch, and/or any other communication device.

The owner, user, or authorized individual, can, at any time, access the respective server, server computer, or computer, and transmit the limitation(s) or restriction(s) to the respective server, server computer, or computer. The limitation or restriction can be automatically received by the respective server, server computer, or computer, and can be automatically stored by the respective server, server computer, or computer.

Thereafter, upon an individual or entity attempting to access the vehicle via the respective server, server computer, or computer, in order to attempt to perform a control, a monitoring, and/or a security, operation or function, on or regarding a vehicle and/or a vehicle system, a vehicle equipment system, vehicle equipment, a vehicle component, a vehicle device, and/or a vehicle accessory, the respective server, server computer, or computer, can utilize the stored limitation(s) or restriction(s) in processing the control, monitoring, and/or security, operation or function, which is being attempted. The respective server, server computer, or computer, can determine whether the attempted control, monitoring, and/or security, operation or function, is at last one of authorized, allowed, unauthorized, or disallowed. Depending upon the outcome of the processing routine, the respective server, server computer, or computer, will determine if the attempted control, monitoring, and/or security, operation or function, is at least one of authorized, allowed, unauthorized, or disallowed.

If the respective server, server computer, or computer, determines that the attempted control, monitoring, and/or security, operation or function, is authorized or allowed, the respective server, server computer, or computer, will effectuate the control, monitoring, and/or security, operation or function on or regarding the vehicle and/or any vehicle system(s), vehicle equipment system(s), vehicle equipment, vehicle component(s), vehicle device(s), vehicle accessory, and/or vehicle accessories. If the respective server, server computer, or computer, determines that the attempted control, monitoring, and/or security, operation or function, is unauthorized or not allowed, then the respective server, server computer, or computer, will disallow the attempted control, monitoring, and/or security, operation or function.

The respective server, server computer, or computer, can thereafter, generate and transmit an notification message to any of the herein-described communication devices identified as being associated with the owner, user, and/or authorized individual or entity, so as to provide information regarding the access of the vehicle and/or the control, monitoring, and/or security, operation(s) and/or function(s) performed. In the case of an unauthorized access and/or attempt, the notification message can provide information regarding the attempted access and/or the control, monitoring, and/or security, operation or function, which was attempted. The notification message can also include the time of access, telephone number or traced location from which the access communication originated and/or was transmitted, and/or any other information regarding the time or access and the individual or entity accessing the vehicle or attempting top access the vehicle.

In another preferred embodiment of the present invention, a respective premises owner, premises user, or other authorized individual or entity, can program any one or more of respective server, server computer, or computer, so as to provide a limitation, limitations, a restriction, and/or restrictions, regarding any control operations or functions, any monitoring operations or functions, and/or any security operations or functions, which can be authorized, allowed, and/or disallowed. In this regard, the present invention can be utilized so as to allow an owner, user, or authorized individual or entity, to pre-specify limitations or restrictions regarding the use of the apparatus and method of the present invention in conjunction with any of the herein described premises.

The limitation(s) or restriction(s) on the ability to access the present invention and/or the premises and/or to perform any of the herein-described control, monitoring, and/or security, operations or functions on or regarding the respective premises can include, but is not limited to authorized individuals who may utilize the present invention to perform a control monitoring, and/or security operation or function, on or regarding any of the herein-described premises and/or any of the herein-described premises systems, premises equipment systems, premises equipment, premises components, premises devices, and/or premises accessories, authorized time or times for performing any of the herein-described control, monitoring, and/or security, operations or functions on or regarding any of the herein-described premises and/or any of the herein-described premises systems, premises equipment systems, premises equipment, premises components, premises devices, and/or premises accessories, the name or identity of an authorized individual, entity, individuals, and/or entities, which or which can perform any of the herein-described control, monitoring, and/or security, operations or functions on or regarding any of the herein-described premises and/or any of the herein-described premises systems, premises equipment systems, premises equipment, premises components, premises devices, and/or premises accessories, the types of, the kinds of, and/or the degree of, control, monitoring, and/or security, operations or functions which can be performed on or regarding any of the herein-described premises and/or any of the herein-described premises systems, premises equipment systems, premises equipment, premises components, premises devices, and/or premises accessories, the premises and/or any of the herein-described premises systems, premises equipment systems, premises equipment, premises components, premises devices, and/or premises accessories, which can be controlled, monitored, and/or secured, via the present invention, the time or times for which certain control, monitoring, and/or security, operations or functions can be performed on certain premises and/or any of the herein-described premises systems, premises equipment systems, premises equipment, premises components, premises devices, and/or premises accessories, the name or identity of an owner, user, or authorized individual(s), entity, or entities, who or which are authorized to perform any of the control, monitoring, and/or security, operations or functions on certain premises and/or certain of any of the herein-described premises systems, premises equipment systems, premises equipment, premises components, premises devices, and/or premises accessories, and/or the types of or identity of the premises systems, premises equipment systems, premises equipment, premises components, premises devices, and/or premises accessories, which can be controlled, monitored, and/or secured, via the present invention and/or which can be controlled by the respective owner, user, or authorized individual or entity, and/or the degree and/or manner to which they can be controlled, monitored, and/or secured.

The present invention can be utilized in order to limit and/or restrict access to any one or more of the herein-described premises as well as to limit or restrict the control, monitoring, and/or security, operations or functions, which can be performed on or regarding any one or more of the herein-described premises and/or any of the herein-described premises systems, premises equipment systems, premises equipment, premises components, premises devices, and/or premises accessories, associated with a premises or premises. In this manner, the present invention can be utilized in order to limit or restrict use of the present invention as it may pertain to a respective premises or premises.

A limitation or restriction on access to a premises and/or to any of the herein-described premises systems, premises equipment systems, premises equipment, premises components, premises devices, and/or premises accessories, and/or the types and kinds of control, monitoring, and/or security, operations and/or functions, which can be performed on or regarding a premises and/or any of the herein-described premises systems, premises equipment systems, premises equipment, premises components, premises devices, and/or premises accessories, can be transmitted to a respective server, server computer, or computer, from a communication device or a computer associated with the owner, user, or authorized individual.

The communication device or computer can, but need not be, the home or personal computer or communication device, but rather can be a communication device, telephone, wireless telephone, cellular telephone, videophone, display telephone, two-way radio, walkie-talkie, television, digital television, cable television, interactive television, pager, beeper, personal digital assistant, pocket personal computer, computer, desktop computer, laptop or notebook computer, mobile computer, handheld computer, a network computer for receiving and/or providing electronic mail messages, and/or watch, and/or any other communication device.

The owner, user, or authorized individual, can, at any time, access the respective server, server computer, or computer, and transmit the limitation(s) or restriction(s) to the respective server, server computer, or computer. The limitation or restriction can be automatically received by the respective server, server computer, or computer, and can be automatically stored by the respective server, server computer, or computer.

Thereafter, upon an individual or entity attempting to access the premises via the respective server, server computer, or computer, in order to attempt to perform a control, a monitoring, and/or a security, operation or function, on or regarding a premises and/or a premises system, a premises equipment system, premises equipment, a premises component, a premises device, and/or a premises accessory, the respective server, server computer, or computer, can utilize the stored limitation(s) or restriction(s) in processing the control, monitoring, and/or security, operation or function, which is being attempted. The respective server, server computer, or computer, can determine whether the attempted control, monitoring, and/or security, operation or function, is at last one of authorized, allowed, unauthorized, or disallowed. Depending upon the outcome of the processing routine, the respective server, server computer, or computer, will determine if the attempted control, monitoring, and/or security, operation or function, is at least one of authorized, allowed, unauthorized, or disallowed.

If the respective server, server computer, or computer, determines that the attempted control, monitoring, and/or security, operation or function, is authorized or allowed, the respective server, server computer, or computer, will effectuate the control, monitoring, and/or security, operation or function on or regarding the premises and/or any premises system(s), premises equipment system(s), premises equipment, premises component(s), premises device(s), premises accessory, and/or premises accessories. If the respective server, server computer, or computer, determines that the attempted control, monitoring, and/or security, operation or function, is unauthorized or not allowed, then the respective server, server computer, or computer, will disallow the attempted control, monitoring, and/or security, operation or function.

The respective server, server computer, or computer, can thereafter, generate and transmit an notification message to any of the herein-described communication devices identified as being associated with the owner, user, and/or authorized individual or entity, so as to provide information regarding the access of the premises and/or the control, monitoring, and/or security, operation(s) and/or function(s) performed.

In the case of an unauthorized access and/or attempt, the notification message can provide information regarding the attempted access and/or the control, monitoring, and/or security, operation or function, which was attempted. The notification message can also include the time of access, telephone number or traced location from which the access communication originated and/or was transmitted, and/or any other information regarding the time or access and the individual or entity accessing the premises or attempting top access the premises.

In another preferred embodiment, the present invention can provide a real-time and/or a deferred notification to a vehicle owner, user, and/or an authorized individual that the vehicle has been accessed and/or that a control, a monitoring, and/or a security, operation(s) or function(s) has been, or is about to be, performed on or regarding any of the herein-described vehicles and/or any of the herein-described vehicle systems, vehicle equipment systems, vehicle equipment, vehicle components, vehicle devices, and/or vehicle accessories.

The notification can be performed by transmitting a notification message containing information regarding the vehicle accessing event, and/or the control, monitoring, and/or security, operation(s) and/or function(s) which has been, or which is about to be, performed, from a respective server, server computer, or computer.

In another preferred embodiment, the respective vehicle owner, user, or other authorized individual can transmit a reply message, to the respective server, server computer, or computer, containing information for any one or more of allowing or disallowing the vehicle accessing, and/or undoing or canceling any performed control, monitoring, and/or security, operation(s) or function(s) or allowing or disallowing any control, monitoring, and/or security, operation(s) or function(s) which are about to be performed.

The respective server, server computer, or computer, can receive and process the reply signal and, thereafter, either undo or cancel any performed control, monitoring, and/or security, operation(s) or function(s), and/or allow of disallow the vehicle accessing, and/or any control, monitoring, and/or security, operation(s) or function(s), which are about to be performed.

The respective server, server computer, or computer, can, thereafter, generates an activity or confirmation message containing information regarding the action taken by the server, server computer, or computer, in response to the reply signal.

In another preferred embodiment, the apparatus and method of the present invention can provide a real-time and/or a deferred notification to a premises owner, user, and/or an authorized individual that the premises has been accessed and/or that a control, a monitoring, and/or a security, operation(s) or function(s) has been, or is about to be, performed on or regarding any of the herein-described premises and/or any of the herein-described premises systems, premises equipment systems, premises equipment, premises components, premises devices, and/or premises accessories.

The notification can be performed by transmitting a notification message containing information regarding the premises accessing event, and/or the control, monitoring, and/or security, operation(s) and/or function(s) which has been, or which is about to be, performed, from a respective server, server computer, or computer.

In another preferred embodiment, the respective premises owner, user, or other authorized individual can transmit a reply message, to the respective server, server computer, or computer, containing information for any one or more of allowing or disallowing the premises accessing, and/or undoing or canceling any performed control, monitoring, and/or security, operation(s) or function(s) or allowing or disallowing any control, monitoring, and/or security, operation(s) or function(s) which are about to be performed.

The respective server, server computer, or computer, can receive and process the reply signal and, thereafter, either undo or cancel any performed control, monitoring, and/or security, operation(s) or function(s), and/or allow of disallow the premises accessing, and/or any control, monitoring, and/or security, operation(s) or function(s), which are about to be performed.

The server, server computer, or computer, can generate an activity or confirmation message containing information regarding the action taken by the respective server, server computer, or computer, in response to the reply signal.

The present invention can be utilized to perform any/or all of the herein-described functionality for any of the herein-described vehicles and/or for any of the herein-described vehicle systems, vehicle equipment systems, vehicle equipment, vehicle components, vehicle devices, and/or vehicle accessories. The present invention can be utilized to control, monitor, and/or secure, any of the herein-described vehicles and/or any of the herein-described vehicle systems, vehicle equipment systems, vehicle equipment, vehicle components, vehicle devices, and/or vehicle accessories.

The present invention can be utilized in order to disable any controls of any of the herein-described vehicles and/or any vehicle system(s), vehicle equipment system(s), vehicle equipment, vehicle component(s), vehicle device(s), and/or vehicle accessory, described herein and/or otherwise utilized in conjunction with the vehicle and provide for the remote-controlled operation of the vehicle and any vehicle system(s), vehicle equipment system(s), vehicle equipment, vehicle component(s), vehicle device(s), and/or vehicle accessory, described herein and/or otherwise utilized in conjunction with the vehicle.

The present invention can be utilized to perform any/or all of the herein-described functionality for any of the herein-described vehicles and/or for any of the herein-described vehicle systems, vehicle equipment systems, vehicle equipment, vehicle components, vehicle devices, and/or vehicle accessories. The present invention can be utilized to control, monitor, and/or secure, any of the herein-described vehicles and/or any of the herein-described vehicle systems, vehicle equipment systems, vehicle equipment, vehicle components, vehicle devices, and/or vehicle accessories.

The present invention can be utilized in order to disable any controls of any of the herein-described vehicles and/or any vehicle system(s), vehicle equipment system(s), vehicle equipment, vehicle component(s), vehicle device(s), and/or vehicle accessory, described herein and/or otherwise utilized in conjunction with the vehicle and provide for the remote-controlled operation of the vehicle and any vehicle system(s), vehicle equipment system(s), vehicle equipment, vehicle component(s), vehicle device(s), and/or vehicle accessory, described herein and/or otherwise utilized in conjunction with the vehicle.

The present invention can be utilized to perform any/or all of the herein-described functionality for any of the herein-described vehicles and/or for any of the herein-described vehicle systems, vehicle equipment systems, vehicle equipment, vehicle components, vehicle devices, and/or vehicle accessories. The present invention can be utilized to control, monitor, and/or secure, any of the herein-described vehicles and/or any of the herein-described vehicle systems, vehicle equipment systems, vehicle equipment, vehicle components, vehicle devices, and/or vehicle accessories.

The present invention can be utilized in order to disable any controls of any of the herein-described vehicles and/or any vehicle system(s), vehicle equipment system(s), vehicle equipment, vehicle component(s), vehicle device(s), and/or vehicle accessory, described herein and/or otherwise utilized in conjunction with the vehicle and provide for the remote-controlled operation of the vehicle and any vehicle system(s), vehicle equipment system(s), vehicle equipment, vehicle component(s), vehicle device(s), and/or vehicle accessory, described herein and/or otherwise utilized in conjunction with the vehicle.

The present invention can also be utilized in order to allow a vehicle owner, user, or authorized individual, to limit or restrict access to, and/or control, monitoring, and/or security, operations or functions which relate to, a vehicle or vehicles. The present invention can also be utilized to provide real-time and/or deferred notification to a vehicle owner, user, or authorized individual, a vehicle is being accesses via the present invention and/or that a control, monitoring, and/or security, operation(s) and/or function(s) has been performed and/or is being attempted.

The present invention can be utilized to perform any/or all of the herein-described functionality for any of the herein-described premises and/or for any of the herein-described premises systems, premises equipment systems, premises equipment, premises components, premises devices, and/or premises accessories. The present invention can be utilized to control, monitor, and/or secure, any of the herein-described premises and/or any of the herein-described premises systems, premises equipment systems, premises equipment, premises components, premises devices, and/or premises accessories.

The present invention can be utilized in order to disable any controls of any of the herein-described premises and/or any premises system(s), premises equipment system(s), premises equipment, premises component(s), premises device(s), and/or premises accessory, described herein and/or otherwise utilized in conjunction with the premises and provide for the remote-controlled operation of the premises and any premises system(s), premises equipment system(s), premises equipment, premises component(s), premises device(s), and/or premises accessory, described herein and/or otherwise utilized in conjunction with the premises.

The present invention can be utilized to perform any/or all of the herein-described functionality for any of the herein-described premises and/or for any of the herein-described premises systems, premises equipment systems, premises equipment, premises components, premises devices, and/or premises accessories. The present invention can be utilized to control, monitor, and/or secure, any of the herein-described premises and/or any of the herein-described premises systems, premises equipment systems, premises equipment, premises components, premises devices, and/or premises accessories.

The present invention can be utilized in order to disable any controls of any of the herein-described premises and/or any premises system(s), premises equipment system(s), premises equipment, premises component(s), premises device(s), and/or premises accessory, described herein and/or otherwise utilized in conjunction with the premises and provide for the remote-controlled operation of the premises and any premises system(s), premises equipment system(s), premises equipment, premises component(s), premises device(s), and/or premises accessory, described herein and/or otherwise utilized in conjunction with the premises.

The present invention can be utilized to perform any/or all of the herein-described functionality for any of the herein-described premises and/or for any of the herein-described premises systems, premises equipment systems, premises equipment, premises components, premises devices, and/or premises accessories. The present invention can be utilized to control, monitor, and/or secure, any of the herein-described premises and/or any of the herein-described premises systems, premises equipment systems, premises equipment, premises components, premises devices, and/or premises accessories.

The present invention can be utilized in order to disable any controls of any of the herein-described premises and/or any premises system(s), premises equipment system(s), premises equipment, premises component(s), premises device(s), and/or premises accessory, described herein and/or otherwise utilized in conjunction with the premises and provide for the remote-controlled operation of the premises and any premises system(s), premises equipment system(s), premises equipment, premises component(s), premises device(s), and/or premises accessory, described herein and/or otherwise utilized in conjunction with the premises.

The present invention can also be utilized in order to allow a premises owner, user, or authorized individual, to limit or restrict access to, and/or control, monitoring, and/or security, operations or functions which relate to, a premises or premises. The present invention can also be utilized to provide real-time and/or deferred notification to a premises owner, user, or authorized individual, a premises is being accesses via the present invention and/or that a control, monitoring, and/or security, operation(s) and/or function(s) has been performed and/or is being attempted.

In any of the embodiments described herein which provide centralized processing functionality, any of the respective server computers and/or computers can be any computers and/or computer systems, central processing computers, sever computers, network computers, and/or any other computers and/or communication devices, depending upon the specific application and/or the communication networks which are utilized in conjunction therewith. Any of the respective server computers and/or computers can also be implemented by any number any/or type of computers and/or computer systems.

In any and/or all of the embodiments described herein, any of the respective transmitters, central processing units, home and/or personal computers, server computers and/or computers, can transmit signals, data and/or information, to, as well as receive signals, data and/or information, from, any one or more of the respective transmitters, central processing units, home and/or personal computers, server computers and/or computers. Any of the respective transmitters, central processing units, home and/or personal computers, server computers and/or computers, can communicate with each other in a bi-directional manner and/or fashion.

In any and/or all of the embodiments described herein, any of the transmitters, central processing units, home and/or personal computers, server computers and/or computers, can generate and transmit an appropriate message and/or signal, which can contain any appropriate data and/or information, and transmit the signal to a respective transmitter, central processing unit, home and/or personal computer, server computer and/or computer, depending upon the embodiment utilized. In turn, any of the server computers and/or computers can process and/or transmit either the signal and/or a signal generated in response to the signal to the transmitter, central processing unit, home and/or personal computer, server computer and/or computer, and/or any other communication device associated with the respective individual, owner, user, and/or occupant, to be provided with such notification.

In any and/or all of the embodiments described herein, any of the server computers and/or computers, and/or any of the home and/or personal computers or communication devices described herein and/or utilized in conjunction with the apparatus and method of the present invention can comprise and/or can be implemented with any number of computers or computer systems. In this regard, any of the server computers and/or computers, and/or any of the home and/or personal computers or communication devices can be a single computer or computer system or can be comprised of, or can include, a plurality (i.e. two or more) computers or computer systems. In this manner, any of the server computers and/or computers, and/or any of the home and/or personal computers or communication devices can be comprised of, and/or can be implemented, by utilizing any number of computers and/or computer systems.

The respective server computer and/or computer, and/or any of the home and/or personal computer or communication devices can also be comprised of, or can include, any number of computers and/or computer systems and can also include any number of transmitters, receivers, and/or other hardware devices and/or peripheral devices.

In any and/or all of the embodiments described herein, any of the receivers or transmitters associated with and/or utilized in conjunction with any of the server computers and/or computers, and/or any of the home and/or personal computers or communication devices, described herein, can be or can include any number of receivers or transmitters, respectively.

In this manner, any event occurring at and/or involving, any condition of, any occurrence of, and/or other operating conditions and/or states regarding, any of the respective systems, equipment systems, subsystems, devices, components, and/or appliances, of any of the respective vehicles, motor vehicles, boats, marine vessels, airplane, aircraft, recreational vehicles, residential premises, and/or commercial premises, described herein, can be reported to a respective server computer, central processing computer, and/or central monitoring service, and/or can be reported to any of the respective individuals, users, owners, and/or occupants. For example, a malfunctioning of a respective system(s), equipment system(s), subsystem(s) device(s), component(s), equipment, and/or appliance(s), of any of the herein-described vehicles, motor vehicles, boats, marine vessels, airplanes, aircraft, recreational vehicles, residential premises, and/or commercial premises, can be reported to a respective server computer, central processing computer, and/or central monitoring service, and/or can be reported to any of the respective individuals, users, owners, and/or occupants.

Similarly, any activation, de-activation, enabling, disabling, and/or any change and/or occurrence in, and/or involving the status and/or the operational state, of any of the respective system(s), equipment system(s), subsystem(s), device(s), component(s), equipment, and/or appliance(s), described herein, can be reported to a respective server computer, central processing computer, and/or central monitoring service, and/or can be reported to any of the respective individuals, users, owners, and/or occupants.

In any and/or all of the embodiments described herein the apparatus and method of the present invention can be utilized to monitor and/or control any of the vehicles and/or premises described herein. In another preferred embodiment, a user can access the vehicle or premises via the computer system or server, obtain video information and/or audio information at the vehicle or premises, and if needed or desired, transmit a signal including the video information and/or audio information obtained, to the computer associated with the central security office. In this manner, for example, an owner or other authorized individual who has just ascertained that a vehicle or a premises may have been, or is being, broken into, vandalized, stolen, used or entered without authorization, can transmit video or audio information, including any video or audio evidence of the occurrence, to the central office computer for viewing by authorized individuals and/or for storage for later use as evidence. In this manner, the apparatus and method of the present invention can be utilized to report any of the herein-described occurrences regarding any of the herein-described vehicles while on-line with the computer system or server.

For example, an individual can access his or her vehicle, ascertain that it has been or is being used by or operated by an unauthorized person, has been or is being vandalized or damaged, has been or is being burglarized, or is in a damaged state or a state of disrepair, and transmit a signal to the central office computer which can include information regarding the occurrence (i.e., that the vehicle has been or is being used by or operated by an unauthorized person, has been or is being vandalized or damaged, has been or is being burglarized, or is in a damaged state or a state of disrepair, etc.) as well as any one or more of video information or a picture, audio information, recorded video information, recorded audio information, which can be used in order to provide information regarding the occurrence to the appropriate individuals and/or authorities and/or used as evidence by any appropriate security or law enforcement service or entity.

In a similar or analogous manner, an individual can access his or her premises, ascertain that it has been or is being used by or operated by an unauthorized person, has been or is being entered upon, has been or is being trespassed upon or broken into, has been or is being vandalized or damaged, has been or is being burglarized, or is in a damaged state or a state of disrepair, and transmit a signal to the central office computer which can include information regarding the occurrence (i.e., that the premises has been or is being used by or operated by an unauthorized person, has been or is being entered upon, has been or is being trespassed upon or broken into, has been or is being vandalized or damaged, has been or is being burglarized, or is in a damaged state or a state of disrepair, etc.) as well as any one or more of video information or a picture, audio information, recorded video information, recorded audio information, which can be used in order to provide information regarding the occurrence to the appropriate individuals and/or authorities and/or used as evidence by any appropriate security or law enforcement service or entity. In this manner, the apparatus and method of the present invention can be utilized to report any of the herein-described occurrences regarding any of the herein-described premises while on-line with the computer system or server.

In another preferred embodiment, the apparatus of the present invention can be programmed so that any appropriate and/or respective system, equipment system, equipment, component, device, and/or accessory, of any of the herein-described vehicles and/or premises can automatically detect an occurrence of at least one of an unauthorized use of, an act of vandalism perpetrated on, to, or in, a break-in of, a burglary of, damage to, and/or a state of disrepair of, any of the herein-described vehicles and/or premises, and/or any system, equipment system, equipment, component, device, and/or accessory, of a vehicle and/or a premises. The apparatus, and/or any respective components, can automatically generate and transmit a signal to the central office computer which can include information regarding the occurrence as well as any one or more of video information or a picture, audio information, recorded video information, recorded audio information, which can be used in order to provide information regarding the occurrence to the appropriate individuals and/or authorities and/or used as evidence by any appropriate security or law enforcement service or entity.

In any and/or all of the embodiments described herein, any of the receivers or transmitters associated with and/or utilized in conjunction with a server, server computer, or computer, and/or any of the home and/or personal computers or communication devices, described herein, can be or can include any number of receivers or transmitters, respectively.

In any and/or all of the embodiments described herein, the apparatus can be utilized in order to provide any one or more of, video information, audio information, and/or video conferencing information, on or via any number of communication channels. The apparatus and method of the present invention can be utilized to provide any one or more of video information, audio information, and/or video conferencing information, on or via any number of communication channels in a communication network.

The apparatus and method of the present invention can be utilized to provide video information from any one of any number of video recording devices. The apparatus and method of the present invention can also be utilized to provide audio information from any one of any number of audio recording devices. The apparatus and method of the present invention can also be utilized to provide video conferencing from any one of any number of video conferencing devices.

For example, a user can select a particular video camera, from any number of video cameras utilized in conjunction with the apparatus and method of the present invention, from which to obtain video. In a similar manner, a user can select a particular audio microphone, from any number of audio microphones utilized in conjunction with the apparatus and method of the present invention, from which to obtain audio. A user can also select a particular video conferencing device, from any number of video conferencing devices utilized in conjunction with the apparatus and method of the present invention, from which to engage in a video conference(s).

The apparatus and method of the present invention can be utilized in order to provide video information and/or video images from two or more video recording devices or cameras to a user computer or user communication device simultaneously in a split-screen format or multiple screen format.

Accordingly, it is an object of the present invention to provide a control, monitoring and/or security, apparatus and method.

It is another object of the present invention to provide a control, monitoring and/or security, apparatus and method for any one or more of a vehicle, a motor vehicle, a marine vessel or vehicle, an aircraft, a recreational vehicles, a residential premises and/or a commercial premises.

It is still another object of the present invention to provide a control, monitoring and/or security, apparatus and method for any one or more of a vehicle, a motor vehicle, a marine vessel or vehicle, an aircraft, a recreational vehicles, a residential premises and/or a commercial premises, which can perform any of the functions described herein as being capable of being performed by the apparatus and method of the present invention.

It is still another object of the present invention to provide a control, monitoring and/or security, apparatus and method for any one or more of a vehicle, a motor vehicle, a marine vessel or vehicle, an aircraft, a recreational vehicles, a residential premises and/or a commercial premises, which can perform any of the functions described herein as being capable of being performed by the apparatus and method of the present invention and which can be performed over any one or more of the communication networks or systems described herein.

It is another object of the present invention to provide a control, monitoring and/or security, apparatus and method for any one or more of vehicles, motor vehicles, marine vessels and vehicles, aircraft, recreational vehicles, residential premises and/or commercial premises.

It is still another object of the present invention to provide a control, monitoring and/or security, apparatus and method for any one or more of vehicles, motor vehicles, marine vessels and vehicles, aircraft, recreational vehicles, residential premises and/or commercial premises, which can provide for the remote control, monitoring and/or accessing, of the respective vehicles, motor vehicles, marine vessels and vehicles, aircraft, recreational vehicles, residential premises and/or commercial premises.

It is yet another object of the present invention to provide a control, monitoring and/or security apparatus and method which provides for the selective control, activation and/or de-activation and/or for the programmed control of any one or more of an ignition system, a fuel system, an exhaust system and/or any one or more of various equipment systems of, and for, vehicles, motor vehicles, marine vessels and vehicles, aircraft and/or recreational vehicles.

It is another object of the present invention to provide a control, monitoring and/or security apparatus and method which provides for the selective control, activation and/or deactivation and/or for the programmed control of any one or more of an electrical system, heating system, water system, air conditioning system, thermostat system and/or any one or more of the various systems, equipment systems, devices and/or appliances, etc., of, and for, residential premises and/or commercial premises.

It is another object of the present invention to provide a control, monitoring and/or security apparatus and method which is utilized in conjunction with a global positioning system or other positioning system and which provides for a determination of the position and/or location of, and for, vehicles, motor vehicles, marine vessels and vehicles, aircraft, recreational vehicles, residential premises and/or commercial premises.

It is another object of the present invention to provide a control, monitoring and/or security apparatus and method which provides programming, information gathering, and monitoring capabilities for, and regarding, the status of and/or the operating state(s) of various systems of, and for, vehicles, motor vehicles, marine vessels and vehicles, aircraft, recreational vehicles, residential premises and/or commercial premises.

It is still another object of the present invention to provide a control, monitoring and/or security apparatus and method for vehicles, motor vehicles, marine vessels and vehicles, aircraft, recreational vehicles, residential premises and/or commercial premises which is utilized in conjunction with a home and/or a personal computer, a telephone, a display telephone, a cellular telephone, a television, an interactive television, a digital television, a personal digital assistant and/or a personal communications services device and/or other personal communications devices.

It is yet another object of the present invention to provide a control, monitoring and/or security apparatus and method for vehicles, motor vehicles, marine vessels and vehicles, aircraft, recreational vehicles, residential premises and/or commercial premises which can be utilized, operated and/or controlled via, over, or with, an on-line service, and/or on, or over, the Internet and/or the World Wide Web.

It is still another object of the present invention to provide a control, monitoring and/or security apparatus and method for vehicles, motor vehicles, marine vessels and vehicles, aircraft, recreational vehicles, residential premises and/or commercial premises which provides for an automatic activation, self-activation and/or programmed activation of the apparatus.

It is yet another object of the present invention to provide a control, monitoring and/or security apparatus and method for vehicles, motor vehicles, marine vessels and vehicles, aircraft, recreational vehicles, residential premises and/or commercial premises which is utilized in conjunction with wireless devices and/or systems and/or with wireless communication technology.

It is still another object of the present invention to provide a control, monitoring and/or security apparatus and method for vehicles, motor vehicles, marine vessels and vehicles, aircraft, recreational vehicles, residential premises and/or commercial premises which is utilized in conjunction with a central security office and/or agency.

It is yet another object of the present invention to provide a control, monitoring and/or security apparatus and method for vehicles, motor vehicles, marine vessels and vehicles, aircraft, recreational vehicles, residential premises and/or commercial premises which is utilized in conjunction with a central security office and/or agency and/or with, or over, an on-line service and/or on, or over, the Internet and/or the World Wide Web and/or other information structure, infrastructure, system and/or communication system or medium.

It is yet another object of the present invention to provide a control, monitoring and/or security apparatus and method which is programmable and which can be programmed for self-activation and/or programmed operation.

It is another object of the present invention to provide a control, monitoring and/or security apparatus and method which provides video conferencing with individuals and/or occupants of any of the vehicles, boats, marine vessels, airplanes, residential premises, and/or commercial premises described herein.

It is still another object of the present invention to provide a control, monitoring and/or security apparatus and method which can control and/or monitor fuel cells, fuel cell operation, fuels cell electrical power output, fuel cell fuel supply level, or fuel cell by-product output.

It is yet another object of the present invention to provide a control, monitoring and/or security apparatus and method which can facilitate the monitoring of the status, operating status, and/or condition, of any of the vehicles and/or premises described herein and/or any of the systems, components, and/or devices of any of the respective vehicles and/or premises described herein.

It is another object of the present invention to provide a control, monitoring and/or security apparatus and method which facilitates the transmitting of data and/or information recorded and/or read by the monitoring device(s) to the user or operator of the respective vehicle and/or premises.

It is still another object of the present invention to provide a control, monitoring and/or security apparatus and method which facilitates the receiving of signals and/or control signals by which the user or operator can exercise control over the respective vehicle, premises, and/or monitoring device(s) associated therewith.

It is still another object of the present invention to provide a control, monitoring and/or security apparatus and method which facilitates the detection of failures in any of the vehicles and/or premises, and/or any of the respective equipment systems described herein.

It is another object of the present invention to provide a control, monitoring and/or security apparatus and method which facilitates the reporting of a failure(s) of any of the systems, equipment systems, devices, components, and/or appliances utilized in conjunction with the vehicles and/or premises described herein, to an individual, a central processing computer, and/or a centralized office.

It is another object of the present invention to provide a control, monitoring and/or security apparatus and method which facilitates the utilization of a command computer in conjunction with controlling, monitoring, and/or providing diagnostics for, any of the systems, equipment systems, devices, components, and/or appliances utilized in conjunction with the vehicles and/or premises described herein.

It is another object of the present invention to provide a control, monitoring and/or security apparatus and method which facilitates the use of a command computer for controlling and/or monitoring the operating status and/or condition of a respective system, equipment system, subsystem, component, device, and/or appliance, of any of the vehicles and/or premises described herein.

It is another object of the present invention to provide a control, monitoring and/or security apparatus and method which provides diagnostic information for any of the systems, components, and/or devices, of and/or associated with any of the vehicles and/or premises described herein.

It is another object of the present invention to provide a control, monitoring and/or security apparatus and method which facilitates the monitoring of wear and/or usage of any of the herein-described electronic, electrical, mechanical, and/or electromechanical, systems, devices, and/or components of and/or associated with any of the vehicles and/or premises described herein.

It is another object of the present invention to provide a control, monitoring and/or security apparatus and method which facilitates the controlling and/or the monitoring vehicle systems and/or premises systems and/or any systems, devices, and/or components of and/or associated with the respective vehicles and/or premises.

It is another object of the present invention to provide a control, monitoring and/or security apparatus and method which facilitates the control of the movement, the motion or the operation of any of the vehicles and/or premises and/or any of the systems, devices and/or components of and/or associated with the respective vehicles and/or premises.

It is another object of the present invention to provide a control, monitoring, and/or security, apparatus and method which provides for the remote accessing of operation data for any one or more of the herein-described vehicles, motor vehicles, boats, marine vessels, airplanes, aircraft, and/or recreational vehicles.

It is still another object of the present invention to provide a control, monitoring, and/or security, apparatus and method which provides for the remote accessing, obtaining, or storage, of operation data for any one or more of the herein-described vehicles, motor vehicles, boats, marine vessels, airplanes, aircraft, and/or recreational vehicles.

It is yet another object of the present invention to provide a control, monitoring, and/or security, apparatus and method which provides for the remote accessing of operation data for any one or more of the herein-described vehicles, motor vehicles, boats, marine vessels, airplanes, aircraft, and/or recreational vehicles, by any appropriate computer and/or communication device, in a network environment.

It is another object of the present invention to provide a control, monitoring, and/or security, apparatus and method which provides for the remote accessing, obtaining, or storage, of operation data for any one or more of the herein-described vehicles, motor vehicles, boats, marine vessels, airplanes, aircraft, and/or recreational vehicles, by any appropriate computer and/or communication device, in a network environment.

It is another object of the present invention to provide a control, monitoring, and/or security, apparatus and method which provides for the remote accessing, obtaining, or storage, of operation data for any one or more of the herein-described residential premises and/or commercial premises.

It is still another object of the present invention to control, monitor, and/or secure, any of the various vehicle systems, vehicle equipment systems, vehicle equipment, vehicle components, vehicle devices, and/or vehicle accessories, for any of the vehicles described herein.

It is yet another object of the present invention to allow a user to remotely control the operation, movement, direction of movement or travel, propulsion, and/or travel, of any of the herein-described vehicles via a computer or communication device and any one or more of a server computer and/or any other server computer or computer described herein.

It is another object of the present invention to allow a user to remotely control the operation, movement, direction of movement or travel, propulsion, and/or travel, of a vehicle in a network environment and/or to drive or maneuver the vehicle from a remote location.

It is still another object of the present invention to allow a user to disable any and/or all of a vehicle's operating and/or operational control systems in order to facilitate and/or to enable the user to take and have control over a vehicle in order to allow the user to remotely control, drive, or maneuver, the vehicle.

It is yet another object of the present invention to allow a user to disable any and/or all of a vehicle's operating and/or operational control systems in order to facilitate and/or to enable the user to take and have control over a vehicle in order to allow the user to remotely control, drive, or maneuver, the vehicle via a computer or communication device and any one or more of a server, a server computer, and/or any computer and/or computer system described herein.

It is another object of the present invention to allow a user to remotely control the operation, movement, direction of movement or travel, propulsion, and/or travel, of a boat via a computer or communication device and any one or more of the server, server computer, or computer.

It is still another object of the present invention to allow a user to remotely control the operation, movement, direction of movement or travel, propulsion, and/or travel, of a boat, in a network environment and/or to control, maneuver, drive, or operate, the boat from a remote location in a network environment.

It is yet another object of the present invention to allow a user to remotely disable any and/or all of a boat's operating and/or operational control systems in order to facilitate and/or to enable the user to take and have control over a boat in order to allow the user to remotely control, drive, or maneuver, the boat via a computer or communication device and any one or more of the server, server computer, or computer.

It is another object of the present invention to allow a user to remotely control the operation, movement, direction of movement or travel, propulsion, and/or travel, of an airplane via the computer or communication device and any one or more of the server, server computer, or computer.

It is still another object of the present invention to allow a user to remotely control the operation, movement, direction of movement or travel, propulsion, and/or travel, of an airplane in a network environment and/or to operate, fly, or maneuver, the airplane from a remote location in a network environment.

It is yet another object of the present invention to allow a user to remotely disable any and/or all of an airplane's operating and/or operational control systems, such as, but not limited to, the cockpit control systems and/or the flight deck control systems, in order to facilitate and/or to enable the user to have control over the airplane in order to allow the user to remotely control, fly, maneuver, or operate, the airplane via the computer or communication device via a computer or communication device and any one or more of the server, server computer, or computer.

It is another object of the present invention to allow a user to remotely fly and land an airplane via a home or personal computer or communication device and any one or more of the server, server computer, or computer. Any and all flight control functions can be controlled via the home or personal computer or communication device and any one or more of the server, server computer, or computer.

It is still another object of the present invention to provide an apparatus which can be utilized to land an airplane remotely.

It is yet another object of the present invention to provide an apparatus which can be utilized to control and/or to upload information to an automatic pilot aboard any of the vehicles described herein.

It is another object of the present invention to provide an apparatus which can be utilized to control and/or to upload information to an automatic pilot aboard an airplane.

It is still another object of the present invention to provide an apparatus which can be utilized to any one or more of dump fuel, deploy parachutes, and/or activate and/or deploy emergency landing escape chutes, fire extinguishment equipment, and/or any other system(s), equipment system(s), device(s), component(s), accessory, and/or accessories, via a computer or communication device and any one or more of the server, server computer, or computer.

It is yet another object of the present invention to allow a user to remotely control the operation, movement, direction of movement or travel, propulsion, and/or travel, of a snowmobile via a computer or communication device and any one or more of the server, server computer, or computer.

It is another object of the present invention to allow a user to remotely control the operation, movement, direction of movement or travel, propulsion, and/or travel, of a snowmobile in a network environment and/or to control, maneuver, drive, or operate, the snowmobile from a remote location, in a network environment.

It is still another object of the present invention to allow a user to disable any and/or all of a snowmobile's operating and/or operational control systems in order to facilitate and/or to enable the user to take and have control over the snowmobile in order to allow the user to remotely control, drive, or maneuver, the snowmobile via a computer or communication device and any one or more of the server, server computer, or computer.

It is another object of the present invention to allow a user to program any one or more of a server, server computer, or computer, so as to provide a limitation, limitations, a restriction, and/or restrictions, regarding any control operations or functions, any monitoring operations or functions, and/or any security operations or functions, which can be authorized, allowed, and/or disallowed, regarding any of the herein-described vehicles.

It is still another object of the present invention to allow a user to limit or restrict use of the present invention as it may pertain to a respective vehicle or vehicles.

It is another object of the present invention to allow a user to program any one or more of a server, server computer, or computer, so as to provide a limitation, limitations, a restriction, and/or restrictions, regarding any control operations or functions, any monitoring operations or functions, and/or any security operations or functions, which can be authorized, allowed, and/or disallowed, regarding any of the herein-described premises.

It is still another object of the present invention to allow a user to limit or restrict use of the present invention as it may pertain to a respective premises.

It is yet another object of the present invention to provide a real-time and/or a deferred notification to a vehicle owner, user, and/or an authorized individual that the vehicle has been accessed, or that access has been or is being attempted, and/or that a control, a monitoring, and/or a security, operation(s) or function(s) has been, or is about to be, performed on or regarding any of the herein-described vehicles and/or any of the herein-described vehicle systems, vehicle equipment systems, vehicle equipment, vehicle components, vehicle devices, and/or vehicle accessories.

It is another object of the present invention to provide a user with the ability to transmit a reply message, to the respective server, server computer, or computer, containing information for any one or more of allowing or disallowing a vehicle accessing, and/or undoing or canceling any performed control, monitoring, and/or security, operation(s) or function(s), or allowing or disallowing any control, monitoring, and/or security, operation(s) or function(s) which are about to be performed.

It is yet another object of the present invention to provide a real-time and/or a deferred notification to a premises owner, user, and/or an authorized individual that the premises has been accessed, or that access has been or is being attempted, and/or that a control, a monitoring, and/or a security, operation(s) or function(s) has been, or is about to be, performed on or regarding any of the herein-described premises and/or any of the herein-described premises systems, premises equipment systems, premises equipment, premises components, premises devices, and/or premises accessories.

It is another object of the present invention to provide a user with the ability to transmit a reply message, to the respective server, server computer, or computer, containing information for any one or more of allowing or disallowing a premises accessing, and/or undoing or canceling any performed control, monitoring, and/or security, operation(s) or function(s), or allowing or disallowing any control, monitoring, and/or security, operation(s) or function(s) which are about to be performed.

It is still another object of the present invention to provide an apparatus and method for controlling and/or monitoring a vehicle and/or a premises which can be utilized to obtain video information and/or audio information from or at the respective vehicle or premises.

It is yet another object of the present invention to provide an apparatus and method for controlling and/or monitoring a vehicle and/or a premises which can be utilized to transmit video information and/or audio information obtained from or at the respective vehicle or premises and to a computer associated with a security office or law enforcement agency.

It is another object of the present invention to provide an apparatus and method for controlling and/or monitoring a vehicle and/or a premises which can be utilized to report an occurrence regarding any of the herein-described vehicles and/or premises while on-line to a computer system or server associated with a security service or law enforcement agency.

It is still another object of the present invention to provide an apparatus and method for controlling and/or monitoring a vehicle and/or a premises which can be programmed to automatically detect an occurrence of at least one of an unauthorized use of, an act of vandalism perpetrated on, to, or in, a break-in of, a burglary of, damage to, and/or a state of disrepair of, any of the herein-described vehicles and/or premises, and/or any system, equipment system, equipment, component, device, and/or accessory, of a vehicle and/or a premises.

It is yet another object of the present invention to provide an apparatus and method for controlling and/or monitoring a vehicle and/or a premises which can be programmed to automatically detect an occurrence of at least one of an unauthorized use of, an act of vandalism perpetrated on, to, or in, a break-in of, a burglary of, damage to, and/or a state of disrepair of, any of the herein-described vehicles and/or premises, and/or any system, equipment system, equipment, component, device, and/or accessory, of a vehicle and/or a premises, and which can automatically generate and transmit a signal regarding the occurrence to a computer associated with a security service or law enforcement agency.

It is yet another object of the present invention to provide an apparatus and method for controlling and/or monitoring a vehicle and/or a premises which can be programmed to automatically detect an occurrence of at least one of an unauthorized use of, an act of vandalism perpetrated on, to, or in, a break-in of, a burglary of, damage to, and/or a state of disrepair of, any of the herein-described vehicles and/or premises, and/or any system, equipment system, equipment, component, device, and/or accessory, of a vehicle and/or a premises, and which can automatically generate and transmit a signal containing any one or more of video information or a picture, audio information, recorded video information, recorded audio information, which can be used in order to provide information regarding the occurrence to a computer associated with a security service or law enforcement agency.

It is another object of the present invention to provide an apparatus and method for controlling and/or monitoring a vehicle and/or a premises which can be programmed to automatically detect an occurrence of at least one of an unauthorized use of, an act of vandalism perpetrated on, to, or in, a break-in of, a burglary of, damage to, and/or a state of disrepair of, any of the herein-described vehicles and/or premises, and/or any system, equipment system, equipment, component, device, and/or accessory, of a vehicle and/or a premises, and which can automatically generate and transmit a signal containing information which can be used as evidence of the occurrence.

It is still another object of the present invention to provide an apparatus and/or method for facilitating any one or more of a control of, a monitoring of, and/or security for, any one or more of the a vehicle, a motor vehicle, a marine vessel or vehicle, an aircraft, a recreation vehicle, a residential premises, and/or a commercial premises.

It is yet another object of the present invention to provide an apparatus and/or method for facilitating any one or more of a control of, a monitoring of, and/or security for, any one or more of the a vehicle, a motor vehicle, a marine vessel or vehicle, an aircraft, a recreation vehicle, a residential premises, and/or a commercial premises, by utilizing any one or more of the numerous embodiments described herein.

Other objects and advantages of the present invention will be apparent to those individuals skilled in the art upon a review of the Description Of The Preferred Embodiment taken in conjunction with the Drawings which follow.

DESCRIPTION OF THE PREFERRED EMBODIMENTS

The present invention pertains to a control, monitoring, and/or security, apparatus and method and, in particular, to a control, monitoring and/or security apparatus and method for exercising and/or providing control, monitoring and/or security, vehicles, motor vehicles, marine vessels and vehicles, aircraft, recreational vehicles, residential premises, commercial premises, structures and/or equipment, in a network environment.

The terms "individual", "owner", "user", "operator", "occupant", and/or the plural of same, refer to any individual, individuals, owner, owners, user, users, operator, operators, occupant, and/or occupants, of any of the herein-described vehicle, boats, marine vessels, airplanes, aircraft, residential premises, commercial premises, and/or any of the systems, subsystems, devices, components thereof, as well as refer to any of the individuals, entities, parties, and/or users, of the apparatus and/or method of the present invention and/or any of the computers, processing devices, and/or communication devices, described herein as being utilized in conjunction with the preset invention and/or which form a component of the present invention. Further, any of the terms "individual", "owner", "user", "operator", "occupant", and/or the plural of same, can be used interchangeably.

Applicant hereby incorporates by reference herein the subject matter and teachings of U.S. patent application Ser. No. 10/283,644, filed Oct. 30, 2002.

Applicant hereby incorporates by reference herein the subject matter and teachings of U.S. Provisional Patent Application Ser. No. 60/377,134, filed on May 1, 2002, and U.S. Provisional Patent Application Ser. No. 60/441,482, filed on Jan. 22, 2003.

Applicant hereby incorporates by reference herein the subject matter and teachings of U.S. Provisional Patent Application Ser. No. 60/187,735. Applicant also hereby incorporates by reference herein the subject matter and teachings of U.S. Provisional Patent Application Ser. No. 60/190,379.

Applicant hereby incorporates by references herein the subject matter and teachings of U.S. patent application Ser. No. 10/283,644, filed Oct. 30, 2002. Applicant hereby incorporates by reference herein the subject matter and teachings of U.S. Pat. No. 6,542,076. Applicant hereby incorporates by reference herein the subject matter and teachings of U.S. Pat. No. 6,542,077. Applicant hereby incorporates by reference herein the subject matter and teachings of U.S. Pat. No. 6,549,130. Applicant hereby incorporates by reference herein the subject matter and teachings of U.S. Pat. No. 5,917,405. Applicant also incorporates by reference herein the subject matter and teachings of U.S. Pat. No. 5,513,244.

Figure 1:
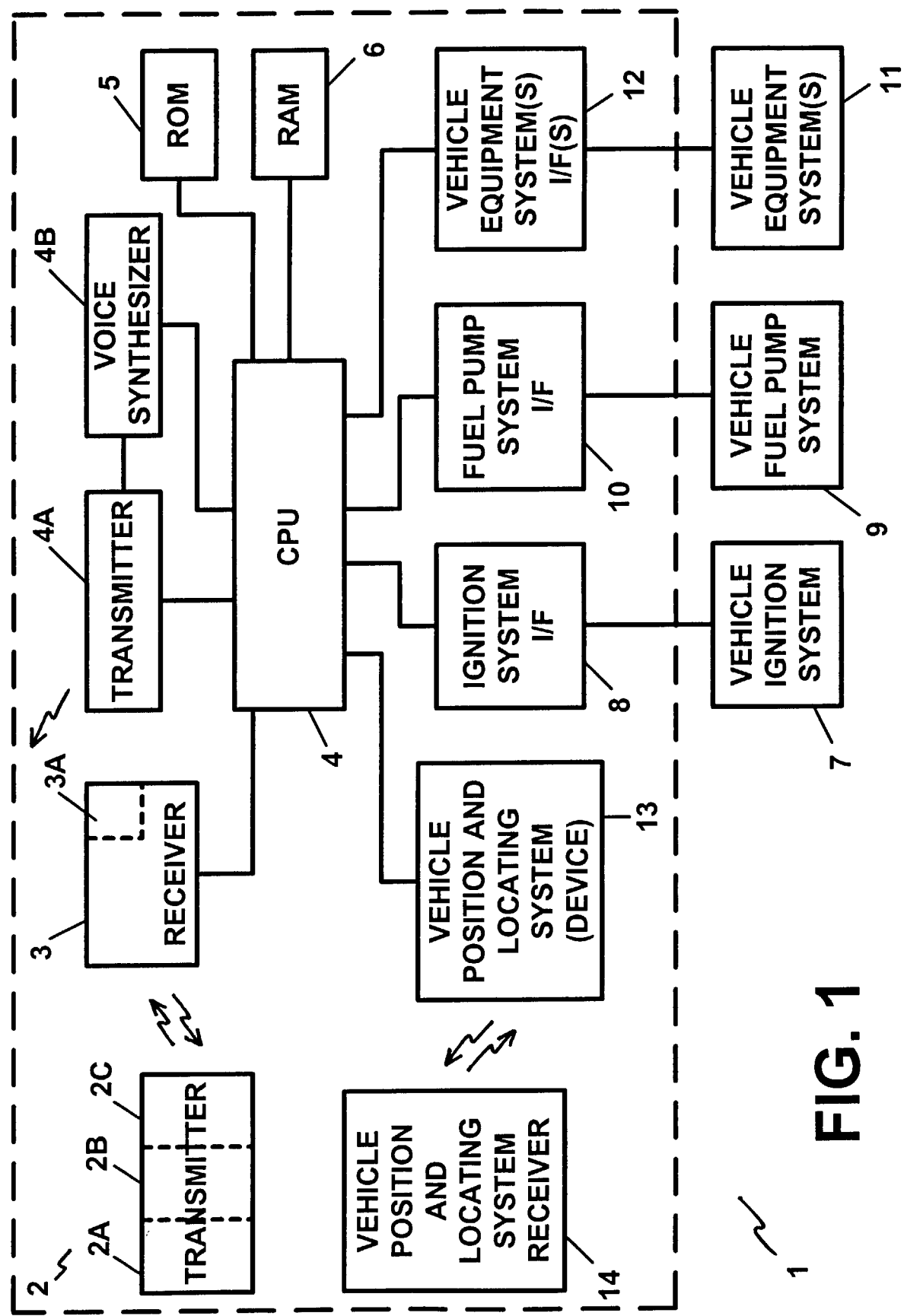
FIG. 1 illustrates a block diagram of the apparatus which is the subject of the present invention.

FIG. 1 illustrates a block diagram of the apparatus which is the subject of the present invention and which is denoted generally by the reference numeral 1. As illustrated in FIG. 1, the apparatus 1 includes a transmitter system 2, for transmitting an electrical, an electronic, an electromagnetic or other suitable signal, upon an activation by a motor vehicle owner or authorized user or operator, hereinafter referred to collectively as the "authorized user or operator".

While the foregoing description of the preferred embodiment is directed to a motor vehicle and, in particular, to an automobile, the term "motor vehicle" includes, but is not limited to, automobiles, trucks, buses, school buses, trains, subway trains, mass transportation vehicles, tractor trailers, construction equipment, equipment, mobile structures, mobile and/or moveable industrial and/or commercial and/or equipment, structures and/or work platforms, mining equipment, drilling equipment, drilling platforms, farm equipment, commercial vehicles, recreational vehicles, motorcycles, recreational vehicles, motor and/or mobile homes, etc. Any of the above noted vehicles may be manned and/or unmanned and may also include law enforcement and/or military vehicles and/or equipment. The present invention can also be utilized in marine vehicles and/or vessels, boats, ships, aircraft, airplanes, jets, submersible and/or underwater vehicles and/or vessels, space vehicles and/or vessels and satellites, all of which can be manned and/or unmanned. The present invention can also be employed in conjunction with gasoline, diesel, alternate fuel and/or electrically powered and/or propelled vehicles.

In the preferred embodiment, the transmitter system 2 consists of a user interface device 2A and a transmitting device or transmitter 2B. The transmitter 2 also has a receiver 2C for receiving signals as will be described below. In this regard, the transmitter/receiver combination can also be implemented by utilizing a transceiver. The user interface device 2A provides the means by which the authorized user or operator can access or activate the apparatus 1, as well as the means by which the authorized user or operator can enter access and/or command codes into the transmitter system 2. The transmitter 2B transmits a signal, in response to the authorized user or operator accessing or activating the apparatus 1. The user interface device 2A also includes a device (not shown) for providing an audio and/or a video indication of system operation and/or status as well as providing information indicative of data received by the receiver 2C.

The transmitter system 2 is a remote system, which is not physically connected to the remainder of the apparatus 1. Further, the transmitter system 2, in the preferred embodiment, is not located in the motor vehicle, but rather, is located external from, and separate and apart from, the motor vehicle. In the preferred embodiment, the transmitter system 2 or transceiver, is designed to be capable of transmitting signals over long distances, i.e. tens, hundreds, and/or thousands of miles or farther. The transmitter system 2 or transceiver, in the preferred embodiment, is also capable of transmitting a multitude of signals. As will be described below, this capability to transmit a multitude of signals allows for the transmission of a variety of command codes, and of multiple command codes, to the apparatus 1, which in turn, provides for an apparatus which can provide for a multitude of responses in the control and operation thereof.

In the preferred embodiment, the transmitter system 2 or transceiver is a touch tone telephone which can be a line-connected telephone, a cordless telephone and/or a cellular or mobile telephone. As described hereinafter, the transmitter system 2 can also be a home and/or a personal computer, having associated telecommunication devices or other suitable peripheral device(s) such as a modem and/or a fax/modem, or other personal communication device, which can operate over an appropriate telecommunications system, and/or other suitable communications systems, including radio signal, optical, satellite and/or other communications systems. The communications system utilized can operate anywhere in the electromagnetic and/or radio spectrum. In this regard, personal communication service (PCS) systems and devices, including stationary, portable and/or hand-held devices, can also be utilized. Digital signal communications devices and systems can also be utilized. Interactive and/or digital televisions, personal communication devices, personal communication services (PCS) devices, personal digital assistants, cellular telephones, display telephones, video telephones, display cellular telephones and electronically equipped watches and/or other devices and/or effects or accessories can also be utilized for user interactive and/or display or output applications and/or functions.

Applicant hereby incorporates by reference herein the subject matter of U.S. Pat. No. 5,081,667 which teaches a system for integrating a cellular telephone with a vehicle security system. Applicant also hereby incorporates by reference herein the subject matter of U.S. Pat. No. 5,276,728 which teaches a remotely activated automobile disabling system. Applicant further hereby incorporates by reference herein the subject matter of U.S. Pat. No. 5,113,427 which teaches a radio signal responsive vehicle device control system, and further, use of a personal paging unit in a paging system for receiving a radio signal. Applicant also hereby incorporates by reference herein the subject matter of U.S. Pat. No. 4,882,746, which teaches a cordless telephone system. Applicant further hereby incorporates by reference herein the subject matter of U.S. Pat. No. 5,138,649 which teaches a portable telephone handset with remote control. Applicant further hereby incorporates by reference herein the subject matter of U.S. Pat. No. 5,195,126 which teaches an emergency alert and security apparatus and method.

Referring once again to FIG. 1, the apparatus 1 also includes a receiver 3, for receiving the signals which are transmitted by the transmitter system 2. The receiver 3 can be any receiver which is capable of receiving the remote electrical, electronic, electromagnetic, and/or other signals, which can be transmitted by the transmitter system 2. In the preferred embodiment, the receiver 3 is also capable of receiving any of a wide variety of signals, and/or multitude of signals, which can be transmitted by the transmitter system 2.

The transmitter system 2/receiver 3 combination, of the apparatus 1 can be implemented, in the preferred embodiment, by utilizing any appropriate transmitter or transmitter system or device and any receiver or receiver system or device and related devices or techniques which are well known in the telecommunications art. In such a transmitter/receiver system, the transmitter 2 can be any of the devices described herein, which can provide a user interface for entering a command, code, data code, or sequence, and which can provide a means by which to transmit a signal, in response to the entered data, to an appropriate receiver or receiver device.

The receiver 3, or the communication system which services same, in turn, can provide an indication, in the form of a signal transmission, back to the transmitter 2 and, in particular, to the transmitter receiver 2C, which signifies that a signal has been received by the apparatus 1. The receiver 3 also generates data which is indicative of the signal, or a portion thereof, which has been received. In this regard, in the preferred embodiment, the receiver 3 is provided with its own transmitter 3A, or the communication system or service which services the receiver 3 can provide a transmitter (not shown) as may be the case with certain pager systems, such as and including two-way pager systems, for transmitting signals back to the transmitter system 2. The receiver 3/transmitter 3A combination, in appropriate cases, can be replaced with and/or implemented by a transceiver. The receiver 3 and/or receiver 3/transmitter 3A combination or transceiver can also be a cellular and/or mobile telephone which can receive and transmit signals at and from a mobile location.

It should be noted that the transmitter/receiver system, which can also include two-way pager systems, can be replaced with any other type of transmitter/receiver combination, electronic or otherwise, which provides for the transmission and reception of a multitude of remote electrical, electronic, electromagnetic, and/or other suitable signals, over long distances and/or in a mobile and/or a wireless communications environment. As noted above, a personal computer system which can be adapted to such operation, or a personal communication device(s) or personal communication services (PCS) device(s) can also be utilized for, or in, any of the transmitter/receiver system combinations described herein.

In the preferred embodiment, upon receiving the signal, the receiver 3, generates a distinct signal which can be a digital, an electrical, an electronic and/or an electromagnetic or other suitable signal, which signal is indicative of the signal transmitted from the transmitter 2B of the transmitter system 2 and received by the receiver 3.

At least a portion of the signal transmitted from the transmitter system 2 to the receiver 3 can include a valid access code, which accesses the receiver 3, and the apparatus 1, which access code serves to provide for security measures which can be taken in conjunction with the use of the apparatus 1.

The apparatus 1 also includes a controller or a CPU 4 (CPU) 4, which is electrically connected with the receiver 3 and transmitter 3A and which receives, or reads, whichever the case may be, the digital signal or signals, or portions thereof, which are received by the receiver 3 and/or generated by the receiver 3 in response to the received signal. The CPU 4 can be any type of digital processing device. In the preferred embodiment, the CPU 4 is implemented by a microprocessor. The CPU 4 also has associated therewith a read only memory device (ROM) 5 and a random access memory device (RAM) 6 for storing data which is utilized by the apparatus 1. The data which is received by the receiver 3 is processed by the apparatus 1 in the manner described below.

The use of a microprocessor as the CPU 4 provides for versatility in apparatus programmability, as well as facilitates an apparatus which can be made as small in size as possible. The CPU 4 can also be implemented by a microcomputer, a mini-computer, or any other digital computer device or system, along with the requisite associated memory devices and other necessary and/or selected peripheral devices. The functions of the CPU 4 can also be performed by appropriately integrating the apparatus 1 with the electronic command computer of the vehicle.

It should be noted that the provision of an apparatus 1, which is as small in size as possible, allows for an apparatus which can be more easily installed and concealed in the vehicle, so as to prevent its being located and defeated by a car thief. It is also envisioned that the apparatus 1 can be installed in the motor vehicle during the vehicle's manufacture and/or assembly process so as to insure that it will not be easily detectable or accessible by a car thief. The more cancelable the apparatus, the less likelihood that it could be located and defeated. It is envisioned that the apparatus 1 and any associated circuitry and/or wiring, can be designed into the motor vehicle so as to be inaccessible to a thief.

The CPU 4 also has a transmitter 4A associated therewith for transmitting signals to the transmitter system 2 or transceiver. In this manner, the CPU 4 of the apparatus 1 can respond to a user data transmission, command, or inquiry with a transmitted signal which can include digital as well as other data and can also include electronically synthesized voice data which is generated by a voice synthesizer 4B which is connected to the CPU 4 and the transmitter 4A as shown in FIG. 1. The transmitter 4A and optional voice synthesizer 4B can be utilized so as to provide information to an authorized user or operator which can include, but not be limited to, apparatus status, vehicle operation status, and the status of each vehicle system, equipment and/or device which is utilized in conjunction with the apparatus as well as vehicle position data.

The CPU 4 is electrically connected and/or linked to the motor vehicle ignition system 7, which is located externally from the apparatus 1. The CPU 4 may or may not be connected and/or linked with the vehicle ignition system 7 through an ignition system interface 8 which is also shown in FIG. 1. The CPU 4 can transmit signals to, as well as receive signals from, the vehicle ignition system 7. In this manner, the CPU 4 and the vehicle ignition system 7, can exchange information between each other. In this manner, the CPU 4, upon receiving an appropriate signal from the receiver 3, and upon the completion of the requisite data processing routine, which will be described below, can issue an electrical, an electronic, and/or any other suitable signal, including a digital command signal, to the vehicle ignition system 7. This electrical, electronic and/or other suitable signal or digital command signal can be one which will disable the vehicle ignition system 7 or one which will re-enable or reset the vehicle ignition system 7. The CPU 4 can also interrogate the ignition system 7 and/or receive data from the ignition system 7 which is indicative of ignition system status (i.e., whether the ignition system 7 is on or off).

In the preferred embodiment, the CPU 4 is also electrically connected and/or linked to the motor vehicle fuel pump system 9 which is also located externally from the apparatus 1. The CPU 4 may or may not be connected with the vehicle fuel pump system 9 through a fuel pump system interface 10 which is also shown in FIG. 1. In the case of an electrical or an electronic fuel pump system, the CPU 4 can provide an electrical, an electronic, and/or other suitable signal, including a digital signal, which will disable, re-enable, or reset the vehicle fuel pump system 9.

In the case of a mechanical fuel pump system, the CPU 4 can provide an electrical, electronic, and/or other suitable signal, including a digital signal, which will disable or re-enable an electrical valve system, which can be used to control the operation of the mechanical fuel pump system. Whichever the case may be, the CPU 4 will be capable of issuing an electrical, electronic and/or other suitable signal, including a digital signal, to disable, to re-enable, or to reset the vehicle fuel pump system 9. The CPU 4 can also interrogate and/or receive data from the fuel pump system 9 which is indicative of fuel pump system status (i.e., whether the fuel pump system 9 is on or off). The CPU 4 can also be electrically connected and/or linked to an appropriate device (not shown) for controlling the operation of a vehicle exhaust system device. The vehicle exhaust system device can be a device for blocking the flow of exhaust gases through the exhaust system.

The CPU 4, in the preferred embodiment, is also electrically connected and/or linked to at least one or more of a vehicle equipment system or systems 11. The vehicle equipment system or systems 11 are located externally from the apparatus 1 and may or may not be connected and/or linked to the CPU 4, via a vehicle equipment system or systems interface 12 which may or may not be required for each one of the variety or multitude of the vehicle equipment systems which can be utilized in conjunction with the apparatus.

The vehicle equipment system or systems 11 can include a loud siren or alarm, which may be located in the passenger compartment of the motor vehicle and, which can produce a loud piercing sound so as to make it unbearable for an intruder to remain inside the motor vehicle passenger compartment. The vehicle equipment system 11 can also include an external siren or alarm, which can produce a loud piercing sound, which may be utilized to draw attention to the motor vehicle. The vehicle equipment system 11 can also include a horn, which may blare continuously or intermittently, so as to also draw attention to the motor vehicle. The vehicle equipment system(s) 11 can also include the vehicle external light systems(s), which can include the vehicle head lights, tail lights or flashers, which can be constantly illuminated or which can blink on and off repeatedly so as to draw attention to the motor vehicle.

The vehicle equipment system(s) 11 can also include a power door lock system, for securing the vehicle passenger compartment so as to prevent an entry thereunto or an exit therefrom. In addition, the vehicle equipment system(s) 11 can include a hood locking system, such as a mechanical hood locking system, for locking the vehicle hood so as to prevent an unauthorized access into the vehicle engine compartment so as to prevent any tampering with the apparatus 1 or with other systems and/or components of the motor vehicle. The vehicle equipment system(s) 11 can also include "smart" windows which turn opaque and/or darker depending upon interior lighting.

The vehicle equipment system(s) 11 can also include any one or more of the widely known vehicle anti-theft systems and can also include a vehicle recovery system or device, including a homing and/or a tracking device or system, each of which system(s) can be activated and/or controlled by the apparatus 1 of the present invention.

The vehicle equipment system(s) 11 can also include video recording and/or photographing equipment, which can include video recording device(s) and/or a camera(s), such as those utilized in conjunction with personal computers, televisions, digital televisions, interactive televisions, display telephones, video telephones, and/or other communication devices, including personal communication devices, or a still picture camera(s). The video recording device(s) or camera(s) can be digital recording devices or cameras or other suitable devices or cameras, including typical video recording devices or cameras. The video recording device(s) or camera(s), in a preferred embodiment, has associated therewith a transceiver or transmitter/receiver system for transmitting video images recorded by the video recording device(s) or camera(s) to the user or operator and for receiving signals such as, for example, control signals, by which the user or operator can exercise control over the video recording device(s) or camera(s).

The video recording device(s) or camera(s) can be located at any location on the interior of the vehicle such as, for example, in the dashboard of the vehicle so that the user or operator, or any other authorized individual, can observe and/or photograph the driver of the vehicle, or the occupants and/or cargo of the vehicle. The video recording(s) or camera(s) can also be located on the vehicle exterior. The video recording device(s) or camera(s) can have wide angles for maximum angular viewing and can also be pivotable and/or movable. The video device(s) or camera(s) can be moveable along a track or other guiding device or element so that the respective video recording device or camera can be moved along the vehicle interior or exterior. The video recording device(s) or camera(s) can record and/or transmit the recorded video and/or the picture(s) in real time and/or live. The video recording device(s) or camera(s) can also be equipped with a storage medium, for storing the recorded video and/or picture(s), and a transmitter or transceiver for transmitting the stored video and/or picture(s) to the user or operator at a later time. In this manner, real-time, as well as deferred, video and/or picture(s) transmissions can be provided.

The vehicle equipment system(s) 11 can also include audio recording equipment, which can include audio recording device(s) such as microphones and/or tape recorders, such as those utilized in conjunction with personal computers, televisions, digital televisions, interactive televisions, telephones, cellular telephones, display telephones, video telephones, and/or other communication devices, including personal communication devices. The audio recording device(s) can be digital audio recording devices or other suitable audio devices including typical audio recording devices. The audio recording device(s), in a preferred embodiment, has associated therewith a transceiver or transmitter/receiver system for transmitting the recorded audio to the user or operator and for receiving signals such as, for example, control signals, by which the user or operator can exercise control over the audio recording device(s).

The audio recording device(s) can be located at any location on the interior and/or exterior of the vehicle so that the user or operator, or any other authorized individual, may hear what is transpiring, and/or what has transpired, inside and/or outside the vehicle. The audio recording device(s) can also be pivotable and/or movable. The audio recording device(s) microphone(s) can be moveable along a track or other guiding device or element so that the respective audio recording device or microphone can be moved along the vehicle interior or exterior. The audio recording device(s) can record and/or transmit the recorded audio in real time and/or live. The audio recording device(s) can also be equipped with a storage medium, for storing the recorded audio, and a transmitter or transceiver for transmitting the stored audio at a later time. In this manner, real-time as well as deferred audio transmissions can be provided.

The vehicle equipment system(s) 11 can also include an intercom system or device or telephone, cellular, digital or otherwise, for providing a means by which to allow the user or operator, or other authorized operator, to communicate with the operator and/or occupants of the vehicle over a designated communication line. The vehicle equipment system 11 can also include video conferencing devices and/or equipment for enabling the vehicle occupants and/or individuals inside the vehicle, outside the vehicle, and/or in the vicinity of the vehicle, to engage in and/or partake in video conferences and/or video conferencing with others via a communication network.

The vehicle equipment system(s) 11 can also include the vehicle battery or batteries, vehicle fuel cell or fuel cells, battery monitoring equipment, battery charge level, fuel cell output, fuel cell fuel supply, fuel cell temperature measuring device, fuel cell by-product (i.e. water or other by-product, heat, etc.) measuring device, fuel cell output measuring device (i.e. voltmeter, ammeter, current measure, power meter, etc.), an air bag deployment device, an air bag deployment detection device, a vehicle dashboard display device, a gyroscope for measuring vehicle pitch, roll, yaw, or attitude, a gyrocompass for measuring direction of travel, a vehicle data recorder and/or a vehicle operation data recorder, a navigation system, a navigation control and/or monitoring system, an automatic pilot, a radar system, a vehicle voice recorder, a vehicle voice recorder control and/or monitoring device, an emergency oxygen control and/or monitoring device, an emergency oxygen deployment detection device, an air bag deployment device, an air bag deployment detection device, and/or a vehicle control console display device.

The vehicle equipment system(s) 11 can also include monitoring device(s) for reading and/or monitoring the status and/or condition of any of the vehicle fuel supply, water and/or coolant supply, electrical generator and/or alternator operation, battery charge level, fuel cell electrical power output, fuel cell fuel supply level, fuel cell operating temperature, fuel cell by-product output level, and/or engine temperature level and/or any other vehicle operation and/or system function and/or vehicle equipment system(s) operating status and/or condition. The monitoring device(s), in a preferred embodiment, has associated therewith a transceiver or transmitter/receiver system for transmitting data and/or information recorded and/or read by the monitoring device(s) to the user or operator and for receiving signals such as, for example, control signals, by which the user or operator can exercise control over the monitoring device(s).

The vehicle equipment system(s) 11 can also include communication devices, such as two-way radios, radios, televisions, navigational devices and/or equipment, fire extinguishing equipment, radar devices and equipment, emergency and/or distress signal equipment, and any electrical, electronic and/or otherwise activated appliances and/or equipment which can be utilized in a vehicle. Appliances can include household appliances such as refrigerators, stoves, air conditioners, ovens, microwave ovens, lighting systems, etc. The vehicle equipment system(s) 11 can also include electrical and/or electronically controlled dead bolt locking devices for use on doors, windows, hood, trunk and/or in conjunction with any other opening components and/or components for gaining access to various locations on and/or in, and/or any systems, devices, and/or components of, the vehicle.

The vehicle equipment system(s) 11 can also include a wheel and/or brake locking device or mechanism. The vehicle equipment systems can also include hydraulic and/or pneumatic equipment and/or other equipment, including winches, etc, which can be remotely activated as described herein. The vehicle equipment system(s) 11 can also include vehicle communication devices including, but not limited to radios, televisions and entertainment devices, two-way radios, cellular telephones and equipment, etc.

The vehicle equipment system(s) 11 can also include an automatic pilot device which can be utilized to drive the vehicle automatically and/or to control any one or more of the vehicle's direction of travel or movement, speed of travel or movement, forward movement, reverse movement, vehicle turning or steering, engine operation, directional light signals, side movement, and/or stopping or parking. The automatic pilot can also control or monitor any and/or all of the electrical systems, electronic systems, mechanical systems, hydraulic systems, braking systems, etc., of the vehicle. In any and/or all of the embodiments described herein the automatic pilot can be programmed to operate and/or to control the operation of the vehicle. The automatic pilot can utilize a pre-stored travel program to control the travel of the vehicle. A user can also upload a travel program to the automatic pilot during the operation or use of the present invention.

The automatic pilot can be utilized in conjunction with a global positioning device, the position and locating device (system) 13, and a navigation system with or without a map database, in order to automatically control, fly, and/or maneuver, the airplane from a location to a destination. In the case of a hijacking, an incapacitation of the flight crew and/or any other emergency situation, a cockpit flight controls can be disabled so as to prevent the flying of the airplane by an unauthorized individual. Thereafter, a revised or emergency flight plan can be transmitted to the automatic pilot in order to direct or fly the airplane to an emergency landing location. The revised or emergency flight plan can also include data and/or information regarding the airport or airfield selected for landing as well as a runway code or codes corresponding to the runway selected for landing. The automatic pilot can also automatically transmit a runway code to the tower or other entity associated with the airport or airfield selected for landing.

The vehicle equipment system(s) 11 can also include a fuel draining system or dumping system, a noise cancellation device or noise cancellation system, a parachute, a parachute deployment system and/or a vehicle navigation system.

The vehicle equipment system(s) 11 can also include a color video camera, an acoustic sensor or acoustic sensing device, a door sensing device which can be utilized to sense an open state or a closed state of a door or doors, and/or a window sensing device which can be utilized to sense an open state or a closed state of a window or windows.

The vehicle equipment(s) systems 11 can also include a power "on" sensor or power "on" sensing device for sensing a power "on" condition for any of the vehicle equipment system(s) 11, vehicle systems, vehicle equipment, vehicle devices, vehicle components, and/or other vehicle systems, described herein. The vehicle equipment(s) systems 11 can also include a power "off" sensor or power "off" sensing device for sensing a power "off" condition for any of the vehicle equipment system(s) 11, vehicle systems, vehicle equipment, vehicle devices, vehicle components, and/or other vehicle systems, described herein.

The vehicle equipment system(s) 11 can also include a temperature sensor or temperature sensing device and/or a water sensor or a water sensing device. The vehicle equipment system(s) 11 can also include a water pump or water pumping device for pumping water out of the vehicle.

The vehicle equipment system(s) 11 can also include a motion sensor for detection the motion or movement of individuals or objects inside the vehicle, outside the vehicle, and/or in the vicinity of the vehicle.

The vehicle equipment system(s) 11 can also include systems for detecting failures in any of the above, or any other, equipment systems and report such failure(s) to the user or operator whether he or she is operating the vehicle or is not in the vehicle and/or for reporting such failures to a central office.

The vehicle equipment system(s) 11 can also include the vehicle command computer which is utilized to control and/or to the various electronic, electrical, mechanical, and/or electromechanical systems, components, devices, of the vehicle. The command computer can control and monitor any of the systems, components, and/or devices, of the vehicle, including, but not limited to, the ignition system, the fuel system, fuel injection system, electrical systems for ignition, lights, horn, door locks, exhaust system, windows, fuel pump, oil pump, engine timing device, battery, fuel cells, fuel supply device, video recording equipment, audio recording equipment, vehicle integrated positioning device, tire pressure indicator, and/or any other system, device, or component which can be controlled and/or monitored by the command computer.

The command computer can transmit control signals and/or status request signals to any of the herein-described vehicle systems, components and/or devices so as t respectively control and/or monitor the operating status and/or condition of the respective system, component and/or device. The command computer can also receive signals from the respective systems, devices and/or components, with said signals containing data and/or information concerning the operating status, operating state, and/or condition, of the respective systems, devices and/or components. The command computer can be utilized so as to control, monitor, and/or provide diagnostic information for any of the vehicle systems, components, and/or devices, which are controlled and/or monitored with the command computer.

The vehicle equipment system(s) 11 can also include wear and/or usage indicators and/or detection devices which can be connected with either the command computer and/or the central processing computer and which can be utilized so as to monitor the wear and/or usage of any of the herein-described electronic, electrical, mechanical, and/or electromechanical, systems, devices, and/or components.

The vehicle equipment system(s) 11 can also include automatic control devices for controlling and/or monitoring vehicle systems and/or devices for vehicle movement and/or motion, such as, but not limited to, vehicle transmission system for controlling vehicle forward and/or reverse direction of movement, vehicle acceleration system for controlling speed of movement, vehicle braking system for controlling vehicle braking, vehicle steering system for steering the vehicle, and/or any other system and/or component for controlling and/or for effecting remote-control over the movement and/or the motion of the vehicle.

The vehicle equipment system(s) 11 can also include a guidance system. The vehicle equipment system(s) 11 can also include a monitoring device or monitoring system for measuring and/or monitoring any one or more of vehicle attitude, pitch, roll, yaw, speed, erratic movement, sudden movement in any direction, sudden movement or jolts in any direction inconsistent with normal or expected movement or operation. The monitoring device or monitoring system can detect sudden changes in normal vehicle operation, abnormal vehicle behavior, abnormal or erratic vehicle behavior (i.e. intentional crashing of the vehicle, loss of control, deviation from an expected course of travel, etc.), and/or a loss of control condition. The monitoring device or monitoring system can detect sudden change(s) in vehicle movement, erratic behavior, and/or abnormal behavior, and generate and transmit a signal to any one or more of the server computer 510, the server computer 952, the computer 970, and/or the home or personal computer or communication device 150, to alert an authorized user of the sudden change(s) in vehicle movement, erratic behavior, and/or abnormal behavior. Thereafter, a user or operator can take control of the vehicle from a remote location via any one or more of the home or personal computer or communication device 150, the server computer 510, the server computer 952, and/or the computer 970.

In the case of commercial, industrial, and/or farm and/or construction equipment, drilling equipment, mining equipment, excavating equipment, and/or other commercial equipment, the vehicle equipment system(s) 11 can also include loading and/or unloading mechanisms, cutting mechanisms, bailing mechanisms, winches and any and all of the various systems and devices utilized in conjunction with these vehicles and/or equipment.

In any and/or all of the embodiments described herein, the systems, equipment systems, subsystems, devices, components, and/or appliances, of and/or utilized in any of the respective vehicles, motor vehicles, boats, marine vessels, airplanes, aircraft, and/or recreational vehicles, can include and/or can utilize the teachings and/or the subject matter of the following U.S. Patents, the subject matter and teachings of which are hereby incorporated by reference herein and form a part of the disclosure of this patent application: U.S. Pat. No. 6,009,356 which teaches and discloses a wireless transducer data capture and retrieval system for aircraft; U.S. Pat. No. 6,002,972 which teaches and discloses a method and apparatus for measuring forces based upon differential pressure between surfaces of an aircraft; U.S. Pat. No. 5,974,349 which teaches and discloses remote, aircraft, global, paperless maintenance; U.S. Pat. No. 5,969,953 which teaches and discloses a stacked memory for flight recorders; U.S. Pat. No. 5,890,079 which teaches and discloses a remote aircraft flight recorder and advisory system; U.S. Pat. No. 5,845,240 which teaches and discloses selective recall and preservation of continuously recorder data; U.S. Pat. No. 5,841,638 which teaches and discloses a stacked memory for flight recorders; U.S. Pat. No. 5,826,827 which teaches and discloses and air-chute safety system; U.S. Pat. No. 5,796,612, which teaches and discloses a method for flight parameter monitoring and control; U.S. Pat. No. 5,761,625 which teaches and discloses reconfigurable algorithmic networks for aircraft data management; U.S. Pat. No. 5,756,934 which teaches and discloses 5,737,222 which teaches and discloses an apparatus for measuring lift forces based upon differential pressure between surfaces of an aircraft; U.S. Pat. No. 5,627,753 which teaches and disclose a method and apparatus for recording data on cockpit voice recorder, U.S. Pat. No. 5,457,630 which teaches and disclose a system for onboard lift analysis and apparatus therefor; U.S. Pat. No. 5,331,577 which teaches and discloses an aircraft wing position indicator; U.S. Pat. No. 5,283,643 which teaches and discloses a flight information recording method and device for aircraft; U.S. Pat. No. 5,260,874 which teaches and discloses an aircraft flight emulation test system; U.S. Pat. No. 5,239,468 which teaches and discloses automated helicopter maintenance monitoring; U.S. Pat. No. 4,729,102 which teaches and discloses an aircraft data acquisition and recording system; U.S. Pat. No. 4,682,292 which teaches and discloses a fault tolerant flight data recorder; U.S. Pat. No. 4,660,145 which teaches and discloses a system for compressing aircraft flight data utilizing a multilevel time format; U.S. Pat. No.

4,660,145 which teaches and discloses a system for compressing aircraft flight data utilizing a multilevel time format; U.S. Pat. No. 4,656,585 which teaches and discloses an aircraft flight data recorder data acquisition system; U.S. Pat. No. 4,644,494 which teaches and discloses a solid state memory for aircraft flight data recorder systems; U.S. Pat. No. 4,604,711 which teaches and disclose an aircraft fight data display system; U.S. Pat. No. 4,470,116 which teaches and discloses a digital flight data recording system; U.S. Pat. No. 4,409,670 which teaches and disclose a solid-state digital flight data recorder; U.S. Pat. No. 4,378,574 which teaches and discloses a digital data recorder and method; U.S. Pat. No. 5,719,771 which teaches and discloses a system for mapping occurrences in a transport route; U.S. Pat. No. 4,785,404 which teaches and discloses beating and passage time optimization computer navigation system for sailing vessels; U.S. Pat. No. 4,775,028 which teaches and discloses a method and system for depth sounding; U.S. Pat. No. 4,454,583 which teaches and discloses a navigation system; U.S. Pat. No. 4,138,567 which teaches and discloses a shipboard apparatus for measuring ocean currents; U.S. Pat. No. 4,050,301 which teaches and discloses an electromagnetic water current meter with synthetic direction field; U.S. Pat. No. 5,988,645 which teaches and discloses a moving object monitoring system; U.S. Pat. No. 5,982,048 which teaches and discloses a procedure for connecting a status detection device of a passive safety system for motor vehicles to a control unit; U.S. Pat. No. 5,974,349 which teaches and discloses a remote, aircraft, global, paperless maintenance system; U.S. Pat. No. 5,948,026 which teaches and discloses an automotive data recorder; U.S. Pat. No. 5,917,434 which teaches and discloses an integrated taximeter/GPS position tracking system; U.S. Pat. No. 5,897,602 which teaches and discloses a car navigation system; U.S. Pat. No. 5,895,440 which teaches and discloses a battery monitor and cycle status indicator; U.S. Pat. No. 5,892,437 which teaches and discloses an on-board brake warning device for air brake equipped vehicles; U.S. Pat. No. 5,890,079 which teaches and discloses a remote aircraft flight recorder and advisory system; U.S. Pat. No. 5,877,707 which teaches and discloses a GPS based seat belt monitoring system & method for using same; U.S. Pat. No. 5,862,500 which teaches and discloses an apparatus and method for recording motor vehicle travel information; U.S. Pat. No. 5,815,093 which teaches and discloses a computerized vehicle log; U.S. Pat. No. 5,896,020 which teaches and discloses a laser based speed and accident reconstruction measuring apparatus and method; U.S. Pat. No. 5,798,647 which teaches and discloses a diagnostic test controller apparatus; U.S. Pat. No. 5,796,612 which teaches and discloses a method for flight parameter monitoring and control; U.S. Pat. No. 5,791,441 which teaches and discloses a brake failure monitoring system; U.S. Pat. No. 5,547,149 which teaches and discloses an aircraft airbag protection apparatus and method; U.S. Pat. No. 5,526,269 which teaches and discloses a digital operation recorder; U.S. Pat. No. 5,497,419 which teaches and discloses a method and apparatus for recording sensor data; U.S. Pat. No. 5,446,659 which teaches and discloses a traffic accident data recorder and traffic accident reproduction system; U.S. Pat. No. 5,313,201 which teaches and discloses a vehicular display system; U.S. Pat. No. 5,239,674 which teaches and discloses a method for transferring private data transmissions from a trucking communication system to a cellular communication; U.S. Pat. No. 5,224,211 which teaches and discloses a method and apparatus for non-contact extraction of on-board vehicle trip recorders; U.S. Pat. No. 5,128,874 which teaches and discloses am inertial navigation sensor integrated obstacle detection system; U.S. Pat. No. 5,115,678 which teaches and discloses a method of checking the function of a driving wheel slip control system; U.S. Pat. No. 5,068,656 which teaches and discloses a system and method for monitoring and reporting out-of-route mileage for long haul trucks; U.S. Pat. No. 5,065,321 which teaches a solid state event recorder; U.S. Pat. No. 5,058,423 which teaches and discloses a method of checking the functioning of a driving wheel slip control system; U.S. Pat. No. 5,058,423 which teaches and discloses a method of checking the functioning of a driving wheel slip control system; U.S. Pat. No. 5,056,056 which teaches and discloses a data recorder including a recirculating non-volatile memory; U.S. Pat. No. 4,958,454 which teaches and discloses a data recorder; U.S. Pat. No. 4,931,793 which teaches and discloses a system for providing a warning when vehicles approach a common collision point; U.S. Pat. No. 4,853,850 which teaches and discloses a vehicle computer diagnostic interface apparatus; U.S. Pat. No. 4,835,546 which teaches and discloses an electronic data recorder apparatus and method; U.S. Pat. No. 4,775,028 which teaches and discloses a method and system for depth sounding; U.S. Pat. No. 4,677,429 which teaches and discloses a vehicle information on-board computer; U.S. Pat. No. 4,673,937 which teaches and discloses an automotive collision avoidance and/or air bag deployment radar; U.S. Pat. No. 4,638,289 which teaches and discloses an accident data recorder; U.S. Pat. No. 4,602,127 which teaches and discloses a diagnostic data recorder; U.S. Pat. No. 4,454,583 which teaches and discloses a navigation system; U.S. Pat. No. 4,337,651 which teaches and discloses an apparatus for measuring and indicating braking vehicle speeds; U.S. Pat. No. 4,263,945 which teaches and discloses an automatic fuel dispensing control system; U.S. Pat. No. 4,258,421 which teaches and discloses a vehicle monitoring and recording system; U.S. Pat. No. 4,236,215 which teaches and discloses a vehicular data handling and control system; U.S. Pat. No. 4,201,908 which teaches a measurement and recording apparatus and system; U.S. Pat. No. 4,156,286 which teaches and discloses a solid state data recorder; and U.S. Pat. No. 4,137,553 which teaches and discloses a method and apparatus for magnetically recording vehicle running conditions.

As noted above, the use of any one or more of the vehicle equipment system or systems 11, and their associated interface devices 12, can be optional and can further include any other systems and/or devices which can be, or are, utilized in and/or in conjunction with any of the above noted or envisioned vehicles. The vehicle equipment system(s) 11, especially when the apparatus is utilized in conjunction with law enforcement and/or military vehicles, can also include guns and/or weapon systems and/or self defense systems and electronic warfare systems.

The vehicle equipment system or systems 11 receives signals from the CPU 4, which signals serve to activate or de-activate, or vice versa, whichever the case may be, the respective vehicle equipment system(s) 11 which are utilized in conjunction with the apparatus 1. The vehicle equipment system(s) 11 can also include any other suitable vehicle system or equipment, device or feature which can be utilized to draw attention to the motor vehicle and/or in some other way impede the vehicle theft. It should be noted that any of the interface devices 8, 10 and 12 can include any of the requisite interfacing circuitry which may be necessary to facilitate CPU 4 control over the respective systems which can be utilized.

The apparatus 1 also includes a vehicle position and locating device 13 which can be utilized in order to determine the position and/or the location of the vehicle. The vehicle position and locating device 13 can be utilized so as to determine the position of the vehicle anywhere in the world and provide for the transmission of vehicle position and/or location data to any appropriate system receiver so that the vehicle can be located and/or tracked and recovered. In the preferred embodiment, the vehicle position and locating device 13 includes and utilizes a global positioning device and an associated transmitter for transmitting position and/or location data to the authorized user or operator and/or to an authorized office or agency authorized to receive and/or to monitor such data transmissions. Applicant hereby incorporates by reference herein the subject matter and teachings of U.S. Pat. No. 5,959,577 which discloses a method and structure for distribution of travel information using network.

The apparatus 1 also includes a vehicle position and locating system receiver 14, which can be employed by the authorized user or operator and/or by the authorized office or agency, for receiving and/or processing the data which is transmitted from the vehicle position and locating device 13 as will be described in more detail hereinbelow. The apparatus 1 can also comprise a corresponding user interface device (not shown) for use in conjunction with the vehicle position locating system.

While the preferred embodiment, as illustrated in FIG. 1, describes certain connections between various components and/or devices of the apparatus as being made by a direct and/or a wired electrical connection, it is noted that any direct and/or wired electrical connection(s) between any of the components and/or devices described herein, can be replaced with wireless devices, wireless communication devices, equipment, links and/or linkups, along with their respective and associated technologies and/or devices, which wireless devices and technologies are known and the teachings of which are incorporated by reference herein.

Figure 2:
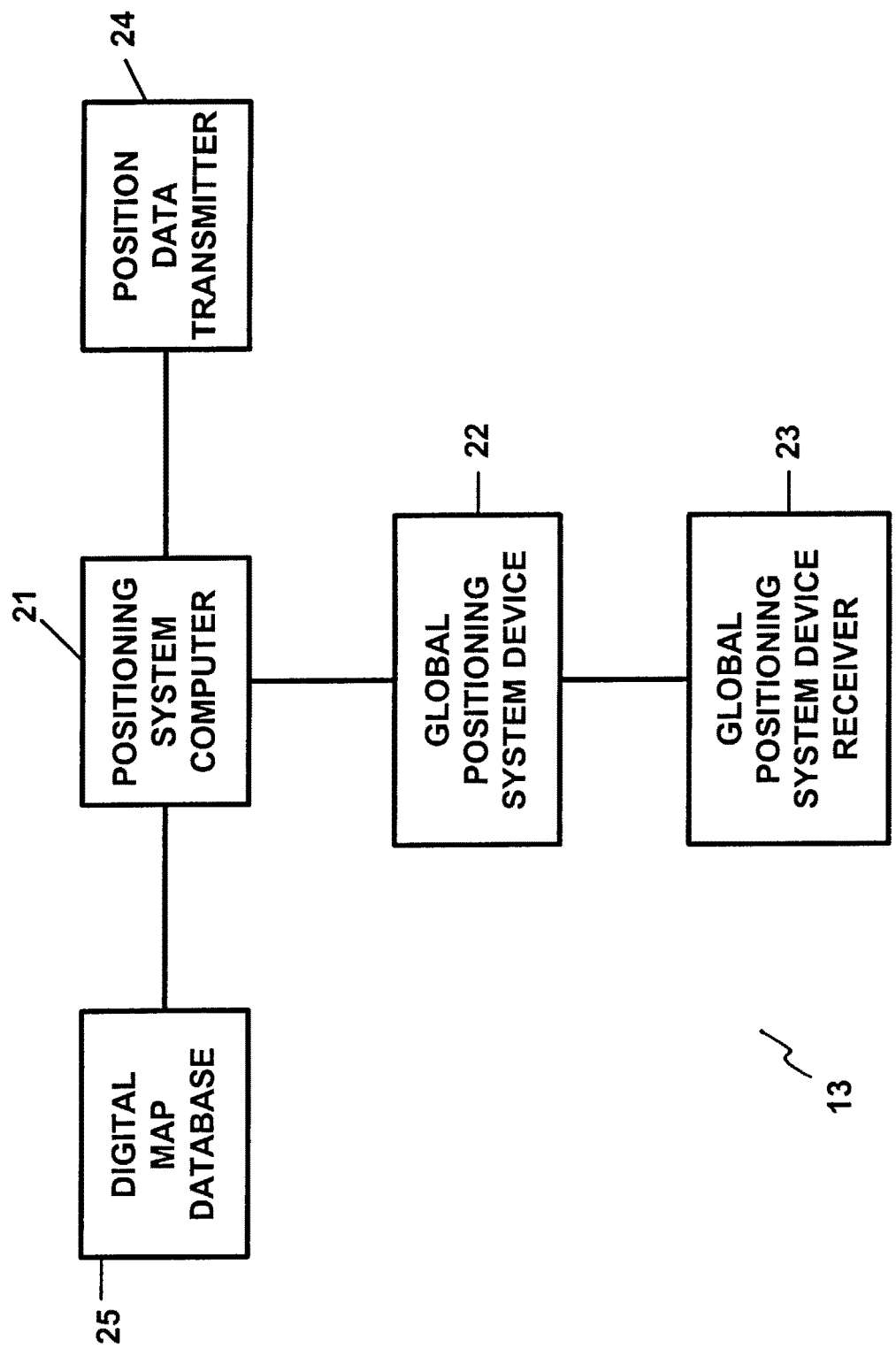
FIG. 2 illustrates the vehicle position and locating device of FIG. 1 illustrating the main components thereof in block diagram form.

FIG. 2 illustrates the vehicle position and locating device 13 of FIG. 1 illustrating the main components thereof in block diagram form. The vehicle position and locating device 13, in the preferred embodiment, includes a positioning system computer 21 and a global positioning device 22 with associated global positioning system receiver 23. The positioning system computer 21 includes a CPU 4 (CPU) (not shown) and associated read only memory (ROM) device (not shown) and random access memory (RAM) device (not shown).

The vehicle position and locating device 13 also includes a position data transmitter 24, for transmitting the vehicle position and/or location data to the vehicle position system receiver 14. The vehicle position and locating device 13 also includes a data base 25 which contains digital and/or digitized map data, which can be utilized to determine the geographical position of the vehicle from the calculated "raw" position data obtained from the global positioning device 22. In this regard, vehicle location on a map and/or street location can be obtained.

As will be described in more detail below, the positioning system computer 21 controls the operation of the vehicle position and locating device 13, including the operation of the global positioning device 22. The global positioning system receiver 23 receives the necessary signals from the global positioning satellites and/or satellite system(s) which are located in orbit above and around the earth. The signals which are received by the receiver 23 are processed by the global positioning device 22, in a manner which is well-known to those skilled in the global positioning art. Once the vehicle position data or "raw" data is calculated, the data is transmitted to, or read by, the positioning system computer 21.

Vehicle position and/or location data can then be transmitted to the vehicle position system receiver 14 which can be located at, or accessible to, the authorized user or operator and/or at the location of an authorized office or agency, such as at a central security office or agency or local or regional law enforcement office or agency, which is duly authorized to receive the vehicle position and/or location data for the vehicle.

Vehicle position and/or location data is transmitted by the transmitter 24 which, in the preferred embodiment, is a radio signal transmitter or a broadcast transmitter. The transmitter 24 can also be a cellular or mobile telephone or wireless or other communication device which is programmed to call and transmit the data to the vehicle position system receiver 14. The transmitter 24 can also be a digital signal transmitter or any other suitable transmitter. The global positioning data could also be obtained by the user or operator by directly "calling" the system receiver 14 and/or the CPU 4 of the apparatus 1.

In the preferred embodiment, the transmitter 24 includes a radio signal transmitter for transmitting vehicle position and/or location data to the vehicle position system receiver 14, which can be at a location of the authorized user or operator and/or at a central security office or agency or at a local or regional law enforcement office or agency as will be described in more detail hereinbelow. In this regard, the vehicle position system receiver 14 includes a radio signal receiver which is tuned to receive the signals which are transmitted by the transmitter 24. If the transmitter 24 is a cellular or mobile telephone or other personal communication device, the system receiver 14 could be equipped with an associated cellular or mobile telephone or personal communication device or other suitable device, which can be used in conjunction with the cellular or mobile telephone transmitter. Digital communication transmitter/receiver combinations and/or transceivers can also be utilized.

The vehicle position and locating device 13 can also have its operation programmed so as to perform updated global positioning calculations, continuously, intermittently, at regular intervals and/or in any other suitable manner, so as to provide for a tracking of a vehicle movement. The vehicle positioning system computer 21, in the preferred embodiment, contains digital and/or digitized map data stored in database 25 for ascertaining the geographical position of the vehicle from the calculated global positioning data ("raw" data) which is calculated by the global positioning device 22. In this manner, the calculated global positioning data, and/or processed geographical position data, can be provided for ascertaining vehicle position and/or location and, if appropriate, for ascertaining vehicle movement such as by monitoring and/or tracking vehicle position as it is updated.

The vehicle position system receiver 14 can be equipped with an appropriate computer system which also includes a digital and/or digitized map database for determining geographical location (i.e. map location, street location, or any other data which can be correlated and/or processed with the positioning data, etc.), from the received global positioning data, at the location of the receiver 14. The system receiver 14 can also be equipped with an alphanumeric pager device which can simply receive the position data and/or the geographical position data from an appropriately designed transmitter 24.

Figure 3:
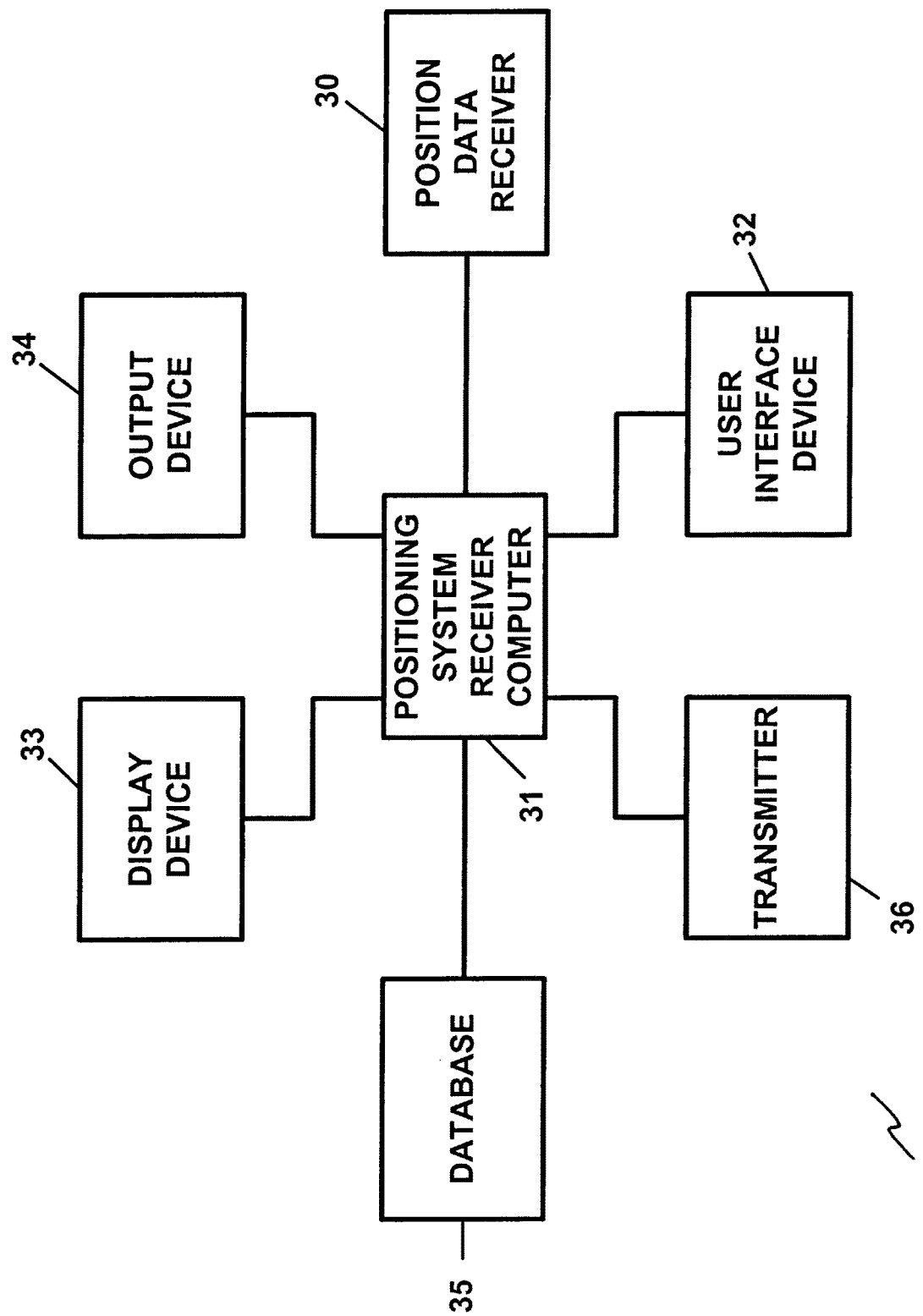
FIG. 3 illustrates the vehicle position and locating system receiver of FIG. 1 illustrating the components thereof in block diagram form.

FIG. 3 illustrates the vehicle position and locating system receiver 14 of FIG. 1 illustrating the components thereof in block diagram form. In FIG. 3, the system receiver 14 includes a receiver 30 for receiving the data transmitted by the transmitter 24 of the vehicle position and locating device 13. In the preferred embodiment, the receiver 30 can be a radio signal receiver, a telephone, telecommunication and/or other system receiver, depending upon the type of transmitter which utilized for the transmitter 24. It is also important to note that the receiver 30 can be a personal communication system or personal communication services (PCS) receiver or device. The receiver 30 can also be a satellite dish receiver or a digital signal receiver.

The vehicle position and locating system receiver 14 also includes a computer 31 for controlling the operation of the system receiver 14. The positioning system receiver computer 31 includes a CPU 4 (CPU) (not shown) and associated read only memory (ROM) device(s) (not shown) and random access memory (RAM) device(s) (not shown). The computer 31 is connected to the receiver 30 for receiving and/or for reading the vehicle position and/or location data which is transmitted by the transmitter 24 and received by the receiver 30.

The system receiver 14 also includes a user interface device 32, which can include a keyboard or a pointing device such as a mouse, a display device 33 such as a display monitor, an output device 34 such as a printer and a database 35 such as a data base containing digital and/or digitized map data for use in determining geographical position of a vehicle from the "raw" position data. The system receiver 14 can also comprise a transmitter 36 for sending data and/or signals to the vehicle position and locating device 13 and/or for transmitting signals to the CPU 4 and/or to the transmitter receiver 2C.

The system receiver 14 can also be implemented by utilizing a home and/or a personal computer which can be utilized with an associated receiver 30 or equivalent peripheral device(s). In the case of a home and/or a personal computer, the data received from the vehicle position and locating device 13 can be input into the computer, from the receiver 30, by any one of the well known methods and techniques for inputting data into a home and/or a personal computer from such an appropriate peripheral device(s). In cases wherein a telephone signal and/or a personal communication device or personal communication services (PCS) devices are utilized, a fax/modem or other suitable device can be utilized to send, and/or to receive, data to, and from, the vehicle position and locating device 13. A television, appropriately equipped to receive and/or to transmit signals can also be utilized. It is also envisioned that digital televisions, interactive televisions, personal communications devices, personal communications services (PCS) devices, personal digital assistants, display telephones, electronically equipped watches, cellular telephones and/or display cellular telephones can also be utilized.

Figure 4:
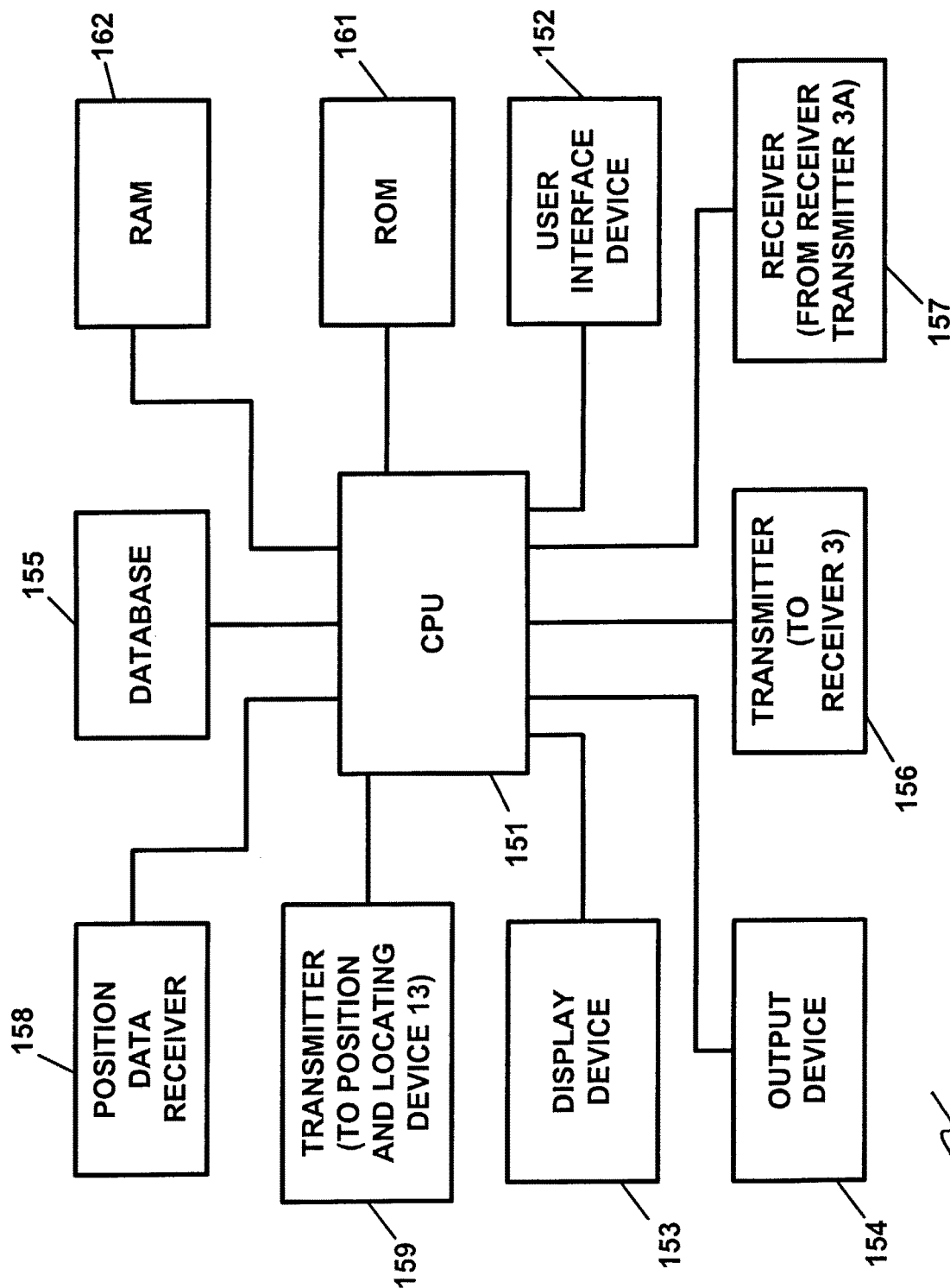
FIG. 4 illustrates a block diagram of a computer system which is utilized in another preferred embodiment of FIG. 1 for performing the functions of, and for, the transmitter and the vehicle position and locating system receiver of the apparatus of the present invention.

It is also important to note that the transmitter system 2 or transceiver and the vehicle position and locating system receiver 14 can be implemented by utilizing, and therefore replaced by, a home and/or a personal computer having the configuration illustrated in FIG. 4. FIG. 4 illustrates a block diagram of a computer system or communication device which provides all of the functions of, and/or for, the transmitter 2 or transceiver and the vehicle position and locating system receiver 14. In FIG. 4, the home and/or personal computer or communication device, which is denoted by the reference numeral 150 includes a CPU 151 with associated read only memory (ROM) device 161 and random access memory (RAM) device 162, and a user input device or user interactive device 152 which includes a keyboard and/or a pointing device. The user input device 152 can also include a retinal scanner, a fingerprint device, a voice recognition device, a handprint recognition device, a handprint geometry recognition device, facial feature recognition device, and/or any other device which can be utilized to provide for the secured access to and use of the apparatus of the present invention via the home and/or personal computer or communication device 150. For example, the retinal scanner, a fingerprint device, a voice recognition device, can be utilized in order to recognize an authorized individual in order to assure authorized use by the authorized individual or user and/or in order to prevent an unauthorized individual or user from using the computer or communication device 150 of the apparatus to control or monitor the vehicle and/or to utilize the apparatus in an unauthorized manner.

The home and/or personal computer or communication device 150 can also include a display device 153 which can be a display monitor, an output device 154 which can be a printer, and a database 155 which can contain access code and command code data as well as digital and/or digitized map data.

The computer 150 can also include a transmitter 156 for transmitting data to the receiver 3 and/or the CPU 4 and a receiver 157 for receiving data from the receiver transmitter 3A and/or the CPU 4. The computer 150 can also include a receiver 158 for receiving data from the vehicle position and locating device 13 and a transmitter 159 for transmitting data to the vehicle position and locating device 13.

The computer 150 can also be any computer or communication device such as, but not limited to a computer, a personal computer, a laptop computer, a hand held computer, a pocket personal computer, a palm-top device, a television, an interactive television, a wireless communication device, a wireless telephone, a telephone, a cellular telephone, and/or any other communication device or devices described herein.

In the embodiment of FIG. 4, data can be transmitted to and received from the computer 150 by using any of the conventionally known communication systems such as by utilizing radio signal communication devices, telecommunication devices, optical communication devices, satellite communication devices, and/or personal communication devices and/or personal communication services (PCS) devices, or any other suitable communications devices, including any of the types of devices described above. In the case of telecommunication devices, a fax/modem for sending and receiving data can be utilized in the computer 150. Digital communication devices can also be utilized.

Figure 5A:
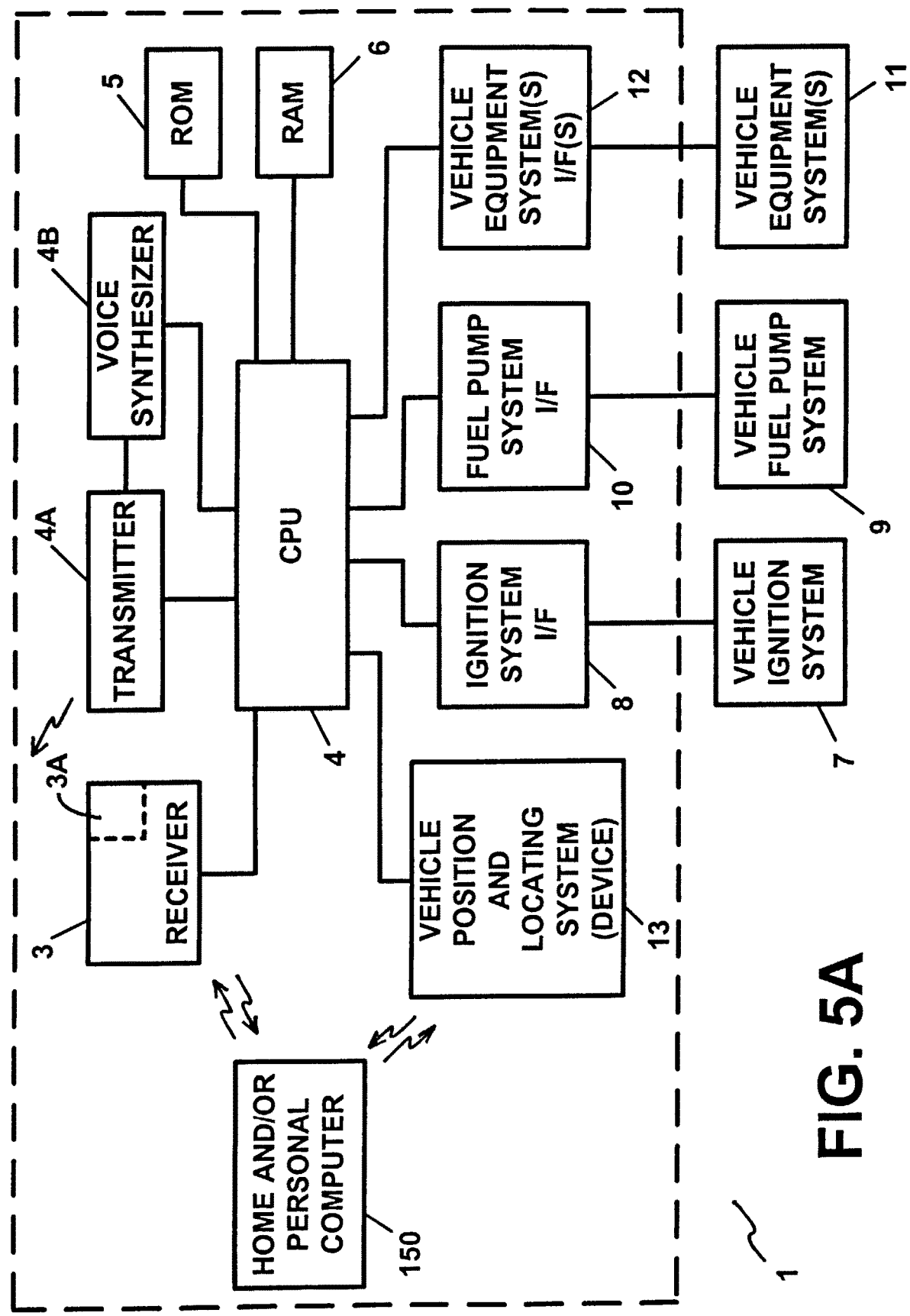
FIG. 5A illustrates the apparatus of FIG. 1 wherein the computer of FIG. 4 is utilized in another preferred embodiment in order to replace and to perform the functions of the transmitter and the vehicle position and locating system receiver of the apparatus of the present invention.

FIG. 5A illustrates the apparatus of FIG. 1 wherein the computer 150 of FIG. 4 is utilized as a substitute device for, and for performing the functions of, the transmitter 2 or transceiver and the vehicle position and locating system receiver 14.

In another preferred embodiment, the apparatus 1 can be utilized in conjunction with a computer so that the authorized user or operator can utilize the apparatus over an on-line service and/or on, or over, the Internet and/or the World Wide Web and/or other suitable communication network or medium.

Figure 5B:
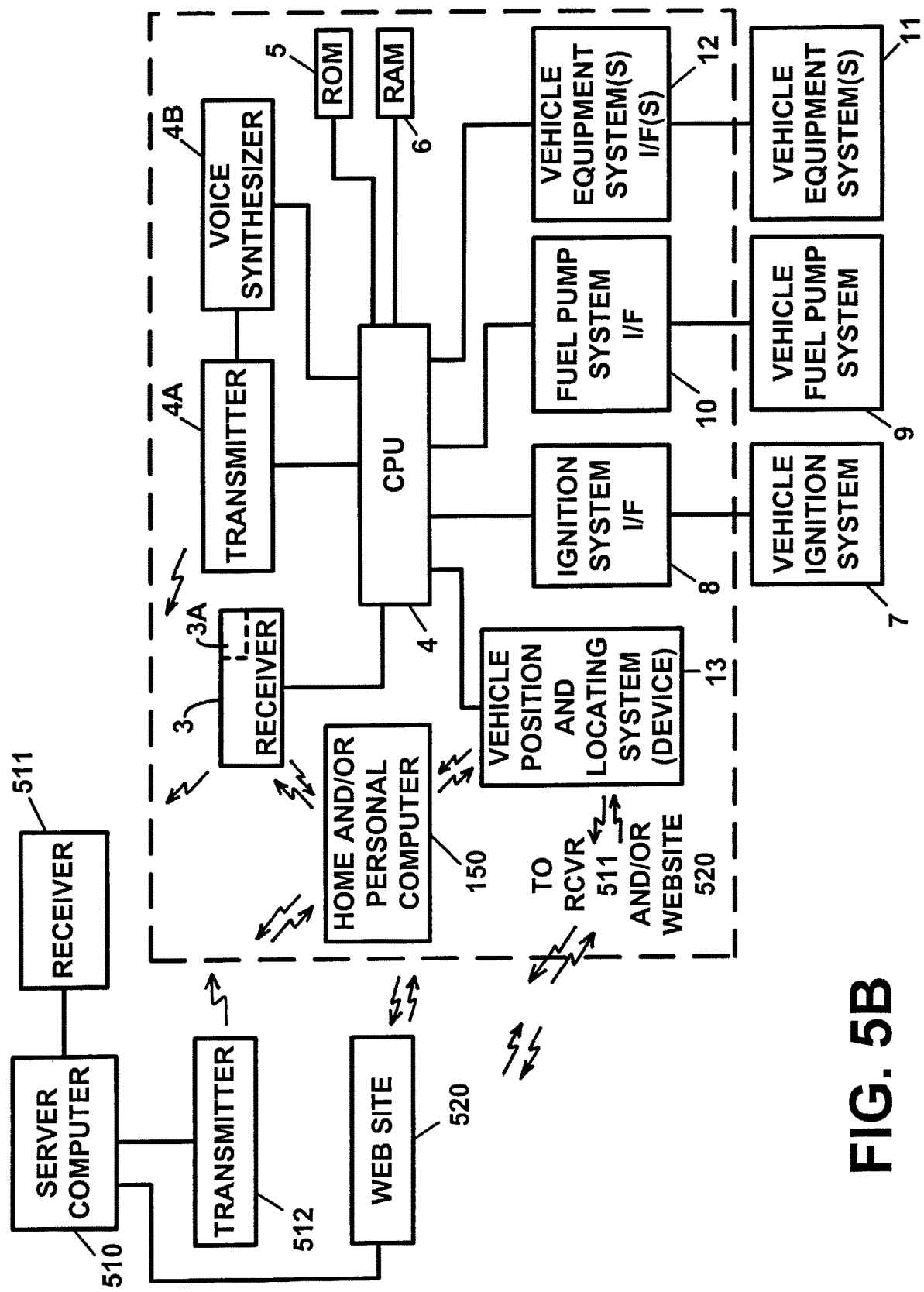
FIG. 5B illustrates another preferred embodiment of the apparatus of the present invention wherein the apparatus is utilized in conjunction with an on-line service and/or on, or over, the Internet and/or the World Wide Web.

FIG. 5B illustrates another preferred embodiment wherein the apparatus 1 is utilized in conjunction with an on-line service and/or on,-or over, the Internet and/or the World Wide Web and/or other suitable communication network or medium. In FIG. 5B, the various transmitters of the apparatus 1, including the receiver transmitter 3A, the CPU transmitter 4A and the vehicle position and locating device transmitter 24, transmit their respective data transmissions to a receiver 500 associated with an on-line service or internet computer system or computer server 510 (hereinafter "server") which is specifically dedicated to the task of providing control over and/or monitoring the vehicle, the apparatus 1 and/or any one or more of the vehicle systems which are controlled and/or monitored by the apparatus 1. The server 510 can also perform vehicle monitoring, tracking and/or recovery functions. The server 510 also has associated therewith, and connected and/or linked thereto, a receiver 511 and a transmitter 512, for receiving and transmitting, respectively, all of the respective signals utilized for the complete and effective operation of the apparatus 1. The server 510 can be utilized in conjunction with an associated Web Site 520.

In the embodiment of FIG. 5B, the authorized user or operator can transmit data directly to the apparatus 1 via the home and/or personal computer 150. The authorized user or operator can also transmit data directly to the server 510 over an appropriate communication network or medium.

By using the computer 150 in conjunction with an appropriate communication medium, the authorized user or operator can then access the dedicated server 510 such as on-line and/or via the Web Site 520 and thereby receive any and all of the above-described data from the server 510 over the on-line service and/or on, or over, the Internet and/or the World Wide Web and/or other suitable communication network or medium. The authorized user or operator can also enter command codes and other data so as to provide control over the apparatus 1 via the server 510. The dedicated server 510 can be accessed via the associated Web Site 520. The dedicated server 510 can also process the data obtained by the apparatus 1 in any appropriate manner, if desired. The authorized user or operator can also access and provide control over the apparatus 1 via the server 510.

Applicant also hereby incorporates by reference herein all of the methods and/or techniques for providing information and/or data over on-line services and/or on, or over, the Internet and/or the World Wide Web or other suitable communication network or medium, along with client/server and/or Web Site technology and methods and/or techniques utilized in conjunction therewith, which are known as of the filing date of this application. Any and/or all data and/or information can be transmitted utilizing TCP/IP protocols and/or other communication protocols. Applicant hereby incorporates by reference herein the subject matter and teachings of Business Data Communications, Raymond R. Panko, Prentice Hall, 1997. In this regard, the authorized user or operator can utilize the apparatus to its fullest capabilities over an on-line service and/or on, or over, the Internet and/or the World Wide Web or other suitable communication network or medium. In this manner, the embodiment of FIG. 5B can allow the authorized user or operator to utilize the apparatus and/or to monitor the operation of the apparatus over the on-line service and/or on, or over, the Internet and/or the World Wide Web from any suitable computer and/or from any location.

The operation of the apparatus 1 of the present invention is described below with reference to the flow diagram illustrated in FIG. 6, which flow diagram illustrates a preferred embodiment method for utilization of the apparatus 1. The method of the present invention can be implemented as a computer program or software program which is utilized in conjunction with the CPU 4. The computer program or software program can be programmable so as to provide for the modification of same, if desired.

Upon the occurrence, or the discovery thereof, of the theft of a motor vehicle, or simply to monitor vehicle status or location, the authorized user or operator of the vehicle can activate the apparatus 1 by entering an access code into the transmitter interface 2A which, as noted above, can be a touch tone telephone keypad. The entry of a valid access code will activate a signal transmission from the transmitting device 2B in a manner similar to that of making a telephone call. In the preferred embodiment, the above sequence of events may occur by the authorized user or operator simply utilizing a touch-tone telephone, which can be a public pay telephone, a private telephone, a line telephone, a cordless or wireless telephone, or a cellular or mobile telephone, and by entering in the pre-determined access code which is assigned to the particular apparatus 1.

In an alternate embodiment where a touch-tone telephone is utilized at the transmitter 2 and a telephone signal receiving device is utilized as the receiver 3, the access code could typically be a code which would comprise a given telephone area code and telephone number assigned to, or programmed for, the receiver 3.

Upon receiving the transmitted signal, the receiver 3, or the communication system servicing the receiver, can typically generate, via transmitter 3A or by another appropriate device, which may or may not be an integral part of the receiver 3, a signal, electrical or otherwise, which is indicative of the receiver 3 having received the signal from the transmitter 2 and which further indicates that the receiver 3 has been accessed. In the case of a communication system or service which services the receiver, the transmitter 3A can be located externally from the apparatus 1 and can be linked to the receiver 3 via the communication link which services the receiver 3 (i.e., the receiver communications service system).

The received access signal is also sent to, or read by, the CPU 4 so as to alert the CPU 4 that the receiver 3, and the apparatus 1 have been accessed. The receiver 3, or the communication system servicing the receiver 3, will then transmit a signal, via its transmitter 3A, to the transmitter receiver 2C which is indicative of the fact that the receiver 3, and the apparatus 1, have been accessed. This signal which is transmitted to the transmitter receiver 2C usually takes the form of an audible tone which can be heard via the transmitter or transmitter device which can typically occur when it is desired to communicate with a receiver.

Once the communication line between the transmitter 2 and the receiver 3 has been established, the receiver 3 can await and receive any transmission of any desired command code data or command code from the transmitter 2. A signal indication by the receiver 3 can be followed by a period of silence during which period, the authorized user or operator can enter the desired command code data or command code, which can include a vehicle disable command code, a vehicle re-enable or reset command code, a cancel code, or any other suitable command code by which the authorized user or operator can exercise control over the apparatus 1. The authorized user or operator can then enter the code or number sequence into the transmitter interface 2A or, in this case, the telephone keypad.

In a case when the motor vehicle has been stolen, the command code can be a vehicle disable command code. It should also be noted that a vehicle re-enable or reset command code, or any other suitable command code, which would represent a function or operation to be performed by the apparatus 1, can also be entered, as the circumstances may require, at this time. The command code is then transmitted from the transmitting device 2B of the transmitter system 2 and is received by the receiver 3. In the preferred embodiment, a command code received signal is then transmitted back to the transmitter system 2, via the receiver 3, or communication system, transmitter 3A, which provides an indication, to the authorized user or operator, that the command code has been received by the apparatus 1.

The command code data is then transmitted to, or read by, the CPU 4 for command code identification and for further processing, if necessary. In this manner, an authorized user or operator, upon learning of the theft of the vehicle, or simply attempting to ascertain the status and/or location of the vehicle, can easily access or activate the apparatus 1 by simply utilizing the nearest touch-tone telephone and by "calling up" the apparatus 1.

The transmitter/receiver system, described above, can be replaced with any remote transmitter/receiver system, such as by a remote transmitter, i.e., a television-type remote control unit, which control unit would require a user interface feature and which has the capability to remotely transmit a multitude of signals over long distances to an associated receiver. A two-way pager, or other appropriate two-way communication device can also be utilized. A home and/or personal computer, with requisite peripheral devices, a personal communication device and/or a personal communication services (PCS) device can also be utilized. Digital communications devices, interactive televisions and/or digital televisions can also be utilized. It is also envisioned that digital televisions, interactive televisions, personal communications devices, personal communications services (PCS) devices, personal digital assistants, display telephones, video telephones, electronically equipped watches and/or other effects or accessories, cellular telephones, display cellular telephones can also be utilized.

By utilizing a transmitter/receiver system, or a wireless telephone and/or wireless communication device system with any other suitable device or equipment, in the preferred embodiment, a long range, remote-controlled system can be achieved which systems are usually very well maintained by telecommunication companies or carriers and are also very reliable. By utilizing a transmitter/receiver system, or a wireless telephone and/or wireless communication device system with any other suitable device or equipment, the authorized user or operator does not have to keep track of a separate remote control unit. In this manner, a reliable and efficient apparatus communication system is achieved. The apparatus 1 can also be equipped with an alternate and/or an auxiliary transmitter device(s), such as a remote control unit or home and/or personal computer system, which could be employed in addition to a telephone. In this manner, if the authorized user or operator should leave the remote control unit in the vehicle, or should lose it, the apparatus 1 can still be accessed by the authorized user or operator. Still further, some transmitter/receiver systems, wireless telephones, and/or wireless communication devices, can have effective distance ranges on the order of hundreds or thousands of miles which may be economical and reliable for long range signal transmission.

In the case where the motor vehicle has been stolen, and the authorized user or operator wants to prevent or thwart the theft of the vehicle and recover the vehicle, the command code which is to be entered is a vehicle disable command code (disable code) which will disable the vehicle in the manner described below. Similarly, if the authorized user or operator desires to re-enable or reset the apparatus 1, such as when the motor vehicle has been recovered or found, so as to render the vehicle re-enabled or operational, the command code to be entered will be a vehicle re-enable or reset command code (re-enable or reset code).

Once the command code has been entered, the receiver 3, via its transmitter 3A, can provide a signal indication to the transmitter system 2, which can take the form of audible tones to a headset or speaker, which serve to confirm receipt of the command code by the receiver 3 and the apparatus 1. The data entered into, and transmitted from, the transmitter system 2, and received by the receiver 3, will then be transmitted to, or read by, the CPU 4 for command code identification and for subsequent processing, if necessary.

If the authorized user or operator merely wants to determine the status of the vehicle and/or of any of the vehicle equipment systems (i.e., is the ignition system on, is the engine running, is a burglar alarm system armed, etc.), a status code can be entered and the CPU 4, after monitoring the vehicle systems, can report back to the authorized user or operator via the receiver transmitter 3A or the CPU transmitter 4A. If the authorized user or operator wants to determine the location of the vehicle and/or if it is in motion, a location request code can be entered whereupon the vehicle position and locating device 13 can be actuated so as to determine vehicle position and/or location data, which data can then be transmitted to the user or operator via transmitter 24. The CPU transmitter 4A can also transmit vehicle portion data as the CPU 4 can also have access to said data. In this manner, the user or operator can exercise control over the vehicle and/or monitor the operational status and/or state of the vehicle and/or of any of the vehicle systems and/or components. The user or operator can also monitor the position and/or movement of the vehicle.

Figure 6A:
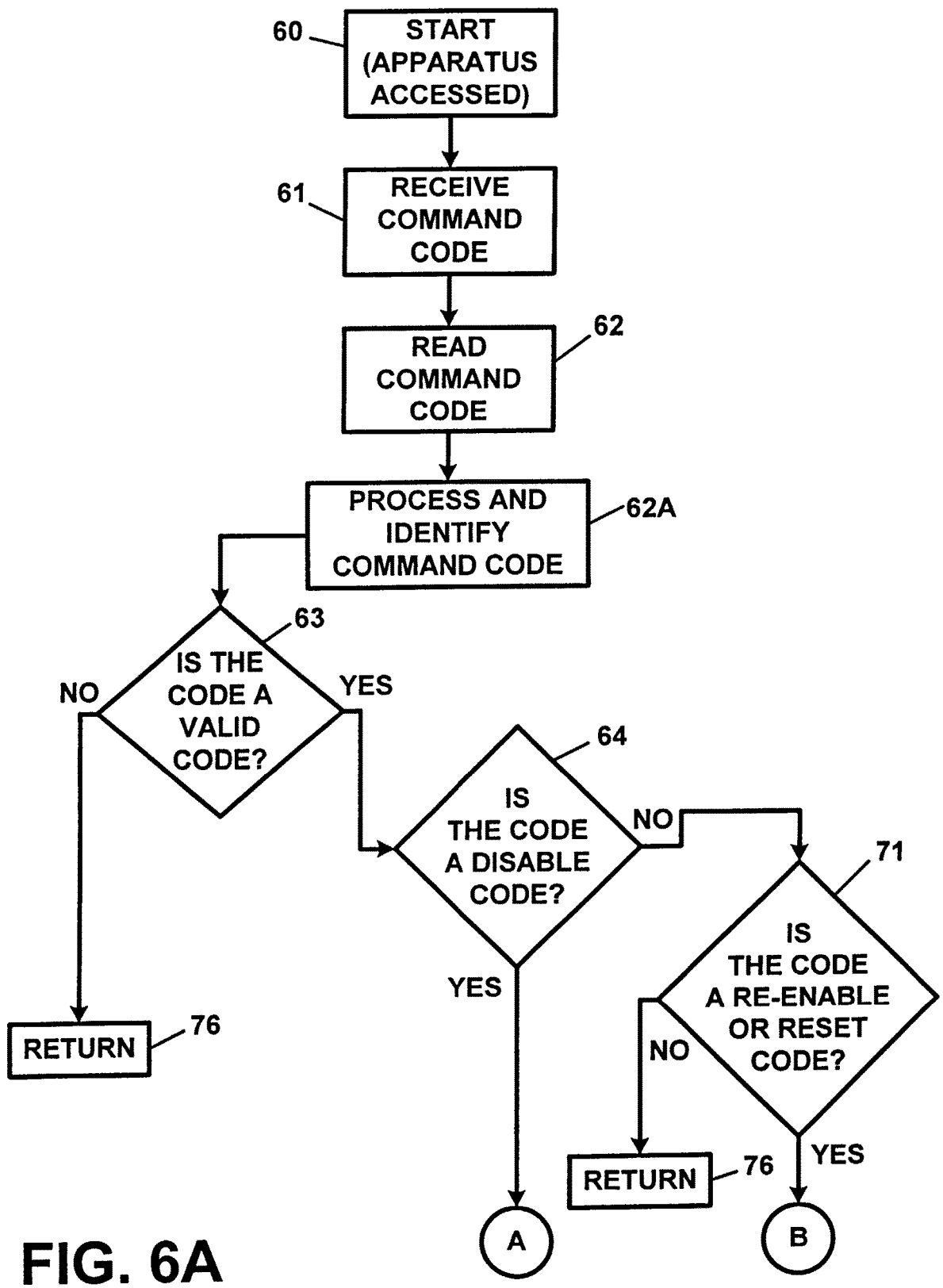
FIG. 6 illustrates a flow diagram illustrating the preferred embodiment operational steps and/or sequences of operation of the apparatus and the method of the present invention.
Figure 6B:
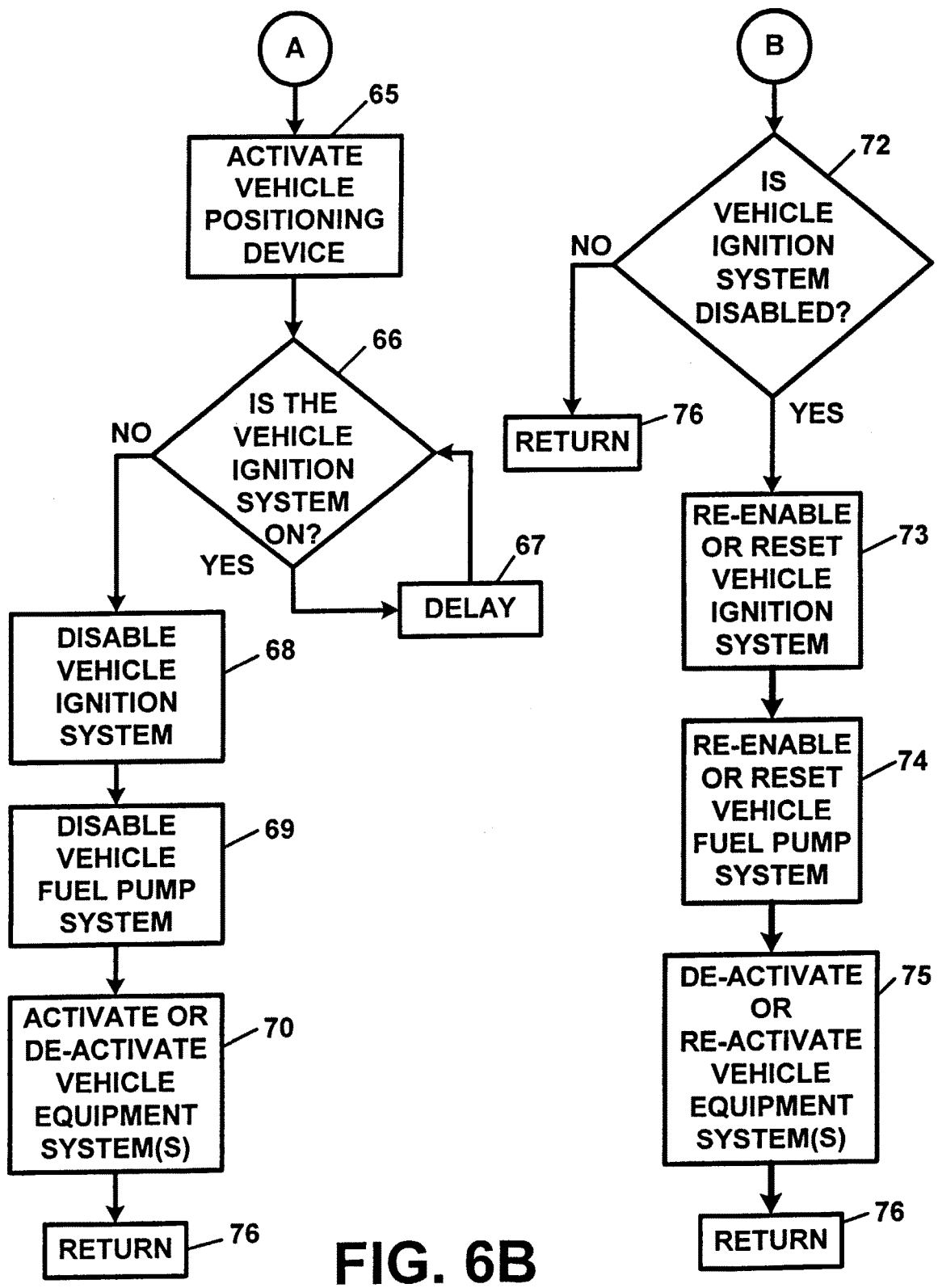

FIG. 6 illustrates a flow diagram of a preferred embodiment of the operational steps and/or sequence of operation of the apparatus and method of the present invention. With reference to FIG. 6, the receiver 3, upon receipt of the access code, will generate an interrupt in the CPU 4 which will activate an operational program or an interrupt service routine, at step 60, of the flow diagram. At step 61, the command code data is received by the apparatus 1. Upon receipt of the command code by the receiver 3, the command code is then transmitted to, or read by, the CPU 4 at step 62. The CPU 4 will then, at step 62A, perform a processing routine in order to identify the command code which has been entered.

In the preferred embodiment, the command code should be of a pre-determined length and should be chosen to be one of a variety of codes which can be chosen so as to provide for the controlling of the apparatus 1 to perform any number of functions and/or to control the vehicle and/or any of the vehicle systems utilized in conjunction with the apparatus 1. The command code can be a valid disable code, a valid re-enable or reset code, a cancel code, a vehicle status code, a vehicle position and locating code, or any other suitable code which can be recognized by the CPU 4 so as to provide control over and/or monitoring of the apparatus 1. A command code can be utilized to indicate a cancel operation, or to identify a previous transmission as a false alarm. An incomplete code, an invalid code, or the absence of a command code after the apparatus 1 has been accessed, can be deemed to be a false alarm.

The cancel and false alarm categories are utilized in order to enable an authorized user or operator to cancel access to and/or activation of the apparatus 1, or to prevent an unauthorized access or unauthorized attempt to enter a command code into the apparatus 1. Such an identification processing routine can be performed in a very simple manner, such as by testing the command code or code data against pre-determined or pre-defined codes and/or against any other code data which can be stored in apparatus program memory. Such testing can be performed by any one of the widely known software testing and identification routines and/or techniques.

At step 63, the CPU 4 will determine if the code is a valid code. If the code is valid, then the processing will proceed to step 64. If the code is invalid, the CPU 4 will return to step 76 thereby exiting the operational program or interrupt service routine and the apparatus 1 will await a next access code and command code transmission. Once a valid command code has been entered, the CPU 4, at step 64, will determine if a valid disable code has been entered, which disable code signifies that the car has been stolen and/or is under the control of an unauthorized user or operator or simply that the authorized user or operator wishes to render the vehicle inoperative. Once the command code, if entered, is identified, the CPU 4, under the control of the apparatus operational program or interrupt service routine, will perform the appropriate apparatus control functions.

If a valid disable code is identified as having been transmitted, at step 64 (which may designate that the vehicle has been stolen), the CPU 4 will initiate and/or actuate the operation of the vehicle position and locating device 13 at step 65. The vehicle position and locating device 13 will then begin to, and continue to, perform the necessary routines in order to determine vehicle position and/or location as will be described below. The operation of the vehicle position and locating device 13 will proceed and continue simultaneously and/or concurrently with the operation of the apparatus 1 and the CPU 4 as described below.

The CPU 4, which is connected to the vehicle ignition system 7, so as to send and receive data to and from the vehicle ignition system 7, will perform a software test, at step 66, in order to determine whether the vehicle ignition system 7 is activated or is on (i.e. the vehicle is operating or is in motion). This will require a monitoring of the vehicle ignition system 7 by the CPU 4.

As noted above, a vehicle ignition system interface 8 is optional and may or may not be employed in order to facilitate this function of monitoring and controlling the vehicle ignition system 7 by the CPU 4.

If the vehicle ignition system 7 is determined to be activated or on, the CPU 4 will enter into a delay loop, at step 67. The purpose of the delay loop, at step 67, is to prevent the vehicle ignition system 7 from being de-activated or shut-down while the vehicle engine is still on or running. Such a test and delay loop routine serves to prevent accidents and resulting personal injury and property damage, such as may be caused when a vehicle suddenly looses power while in motion and/or is travelling at a moderate, or at a high, rate of speed or when such a loss of engine power can result in the failure of the vehicle power steering and/or power brake systems. In this manner, the CPU 4 will continue to interrogate the vehicle ignition system 7 after a pre-determined delay period, and will continue to do so until the vehicle ignition system 7 is determined to be shut-off and/or is non-operational.

While any delay period may be employed, at step 67, and may be programmed into the program software of the apparatus 1, it is important to choose a delay period which can detect even the shortest duration of a vehicle ignition system shut-down. In the preferred embodiment, a delay period of one (1) second is utilized. This delay period, of course, may be changed in the program software, as desired, by utilizing known system programming methods and/or techniques.

After the delay period has elapsed, at step 67, the CPU 4 will again interrogate the ignition system 7, at step 66, and will continue to do so in the above described delay loop routine until the ignition system 7 is determined to be shut-off and/or is non-operational. Once it has been determined that the vehicle ignition system 7 is shut-off and/or is non-operational, the CPU 4, at step 68, will issue a disable signal to the vehicle ignition system 7.

The disable signal which is issued by the CPU 4, at step 68, will disable the vehicle ignition system 7, thereby preventing a restarting of the vehicle engine. The disabling function can be performed by the CPU 4 by issuing a data signal, which causes the vehicle ignition system circuitry to be shut-off or be "opened", such as by opening a switching device and/or a series of switching devices (i.e. a switch or relay (not shown)), which is or are located in, or designed into, the ignition system circuitry, the starter motor, or at any other location in the ignition system 7, or by issuing a disabling signal to the digital or logic devices, which can be utilized in connection with the vehicle electronic command computer and/or other electrical components or systems.

It should be noted that any number of methods can be used, in conjunction with the apparatus 1, for disabling the vehicle ignition system 7. The CPU 4 can be utilized to provide control signals, to disable or re-enable, the vehicle ignition system 7 just as any microprocessor-based digital system provides control over the operation of the components and/or peripheral devices utilized in conjunction therewith. The techniques utilized, in order to provide such control over the vehicle ignition system 7 can be determined on a vehicle-by-vehicle basis.

Once the vehicle ignition system 7 has been disabled, only the issuance of a valid re-enable or reset command code, to the apparatus 1, can be utilized to re-enable or reset the vehicle ignition system 7. In this manner, a carefully concealed and installed placement of the apparatus 1, within the vehicle, will provide for a completely disabled vehicle until such time as a valid access code, followed by a valid re-enable or reset command code, is entered by the authorized user or operator in a manner consistent with the operation of the apparatus 1. As can be readily appreciated, a carefully concealed apparatus 1, along with a strategically placed ignition cut-off circuitry or system, would render it most difficult, if not impossible, for the thief or thieves to practically defeat the apparatus 1.

With reference once again to FIG. 6, the CPU 4, at step 69, will then issue a disabling signal to the vehicle fuel pump system 9 thereby de-activating the vehicle fuel pump system 9 and prohibiting the supply of fuel to the vehicle engine. The disabling signal from the CPU 4 can disable the vehicle fuel pump system 9 by any one of the well known methods for disabling a fuel pump system. In the case of electric fuel pump systems, said systems can be disabled by any one of the known methods for shutting-off or "opening" an electrical circuit which provides power to, or control over, the fuel pump system 9, such as by a cut-off switch or relay, which methods and/or techniques can be similar to and/or analogous to those methods and/or techniques utilized in connection with disabling the vehicle ignition system 7.

In the case where electronic components are utilized, the digital components or logic gates in the control circuitry can also be disabled. In the case where a mechanical fuel pump is utilized, an electric valve assembly, which can provide a fuel pump operation cut-off or disconnect, can also be utilized thereby allowing any appropriate method for disabling an electrical fuel pump system to be utilized in order to disable the electric valve assembly, and ultimately, to shut-off or disable the mechanical fuel pump system. The vehicle fuel pump system interface 10 can be utilized, if necessary, in order to facilitate the above described disabling technique(s).

The CPU 4 can be utilized in order to provide control signals to disable or re-enable the vehicle fuel pump system 9 just as any microprocessor-based digital system provides control over the operation of components and peripheral devices utilized in conjunction therewith. It should be noted that the techniques utilized in order to provide control over (disable or re-enable) the vehicle fuel pump system 9 may be determined on a vehicle-by-vehicle or fuel pump-by-fuel pump basis.

Upon the disabling of the vehicle ignition system 7, at step 68, and/or the vehicle fuel pump system 9, at step 69, the CPU 4, at step 70, if so commanded, will then issue a control signal(s) to activate or de-activate, whichever the case may be, any one or more of the various vehicle equipment systems 11 which are utilized in conjunction with the apparatus 1. As noted above, the vehicle equipment system(s) 11, if employed, can include an alarm or siren, which has a piercing sound and which is placed in the interior of the passenger compartment. The alarm or siren would serve to make it unbearable for the thief or thieves to remain inside the vehicle. External alarms or sirens can also be utilized in order to draw attention to the vehicle. A horn or horns, which could blare continuously or intermittently, could also be utilized to draw attention to the vehicle.

A vehicle light system, i.e. head lights, tail lights, parking lights, etc., can also be activated so as to illuminate continuously or intermittently, such as by blinking, in order to draw attention to the vehicle. Other vehicle equipment systems, such as a power door locking system, can be activated, immediately or after a delay, for securing the vehicle passenger compartment so as to prevent an entry thereunto or an exit therefrom. It is also envisioned that there can be a delay between the disabling of the vehicle ignition system 7 and the activation of the power door lock system so as to allow the thief or thieves to get out of the car before the locking operation takes place.

It is also envisioned that a mechanical hood locking system can be utilized and activated so as to lock the hood and prevent an unauthorized access into the vehicle engine compartment. Such a vehicle hood locking feature could prevent tampering with the apparatus 1 or with other systems and/or components of the vehicle. A vehicle alarm system or anti-theft system(s), such as any one or more of the well known types of anti-theft and/or theft deterrent systems or devices can also be activated, and/or deactivated, when and if desired, by the CPU 4. The CPU 4 can also activate a vehicle homing and/or tracking or recovery device system such as a LoJack® Stolen Vehicle Recovery System and/or any other type of vehicle recovery system.

Any one or more of the above-described vehicle equipment system(s) 11 which can include a power door lock system, including electronic and/or electrical dead bolt locking devices, for securing the vehicle passenger compartment, hood or trunk, so as to prevent an unauthorized entry thereunto, video recording equipment, for recording and supplying video information, and/or audio recording equipment, for recording and supplying audio information, can also be activated or deactivated.

The CPU 4 can be utilized in order to provide control signals to activate and/or to de-activate any one or more of the vehicle equipment systems 11 just as a microprocessor-based digital system provides control over components and/or over peripheral devices utilized in conjunction therewith. Such methods and/or techniques may be similar to those methods and/or techniques utilized to provide control by the CPU 4 over the vehicle ignition system 7 and the vehicle fuel pump system 9. It should be noted that the techniques utilized, in order to provide control over any of the vehicle equipment system(s) 11, can be determined on a vehicle-by-vehicle and/or system-by-system basis. It is also envisioned that a vehicle exhaust system can be de-activated and/or similarly controlled by the apparatus 1.

Once disabled, the vehicle ignition system 7, and the vehicle fuel pump system 9, will remain disabled even if the vehicle power supply should be drained. This is due to the fact that the digital circuitry, which is utilized in the apparatus 1, in the vehicle ignition system 7, in the vehicle fuel pump system 9, and/or in any of the vehicle equipment system(s) 11, can include digital "memory" devices such as logic gates, flip-flops, etc. and/or electromagnetic devices, such as switches or relays, which may be chosen so as to remain in their state unless altered or activated in a pre-defined fashion, electrically, electronically or otherwise, or under the power of an electrical signal or stimulus which is controllable only by an authorized user or operator. Further, even if the vehicle power is completely drained, these above mentioned devices, which may be chosen so as to require a predefined application of electrical or electronic power in order to change their state, or their operating mode or operation, would have their re-activation prevented, and thus, the vehicle ignition system 7, the vehicle fuel pump system 9, and/or any of the vehicle equipment system(s) 11, will remain in a disabled state.

It is also envisioned that back-up and/or supplemental power supplies, such as batteries, fuel cells, etc., (not shown) can also be utilized in conjunction with the apparatus 1 so as to prolong the continued activation or de-activation of the vehicle ignition, fuel pump and/or any of the vehicle equipment system(s) 11 which are utilized. Supplemental power systems are optional and can also be employed with the apparatus 1 so as to provide power for any unusual power requirements which may be required by the vehicle in which the apparatus 1 may be installed. The back-up and/or supplemental power supplies can also be solar powered and/or be constantly chargeable by a vehicle recharging and/or alternator system.

Upon the completion of apparatus 1 operation, at step 70, the CPU 4 will then exit the operational program or interrupt service routine at step 76. This signifies the completion of the operational program or interrupt service routine in the case of receiving a disable command code. The CPU 4 will then await the next accessing and/or activation of the apparatus 1 by the authorized user or operator, via entry of a valid access code into the transmitter system 2 as described above. Unless a valid access code, followed by a valid re-enable or reset command code, is entered into the transmitter interface 2A, the vehicle ignition system 7, and the vehicle fuel pump system 9, will remain disabled and/or any of the utilized vehicle equipment system(s) 11, will remain in their activated or de-activated states.

Upon the vehicle being found or recovered, such as in a manner resulting from utilizing the vehicle position and locating device 13, in the manner described hereinbelow, the authorized user or operator may once again access the apparatus 1 by entering the valid access code into the transmitter interface 2A and then by entering the valid re-enabling or reset command code. As described above, a valid access code will once again initiate the operation of the operational program or interrupt service routine, at step 60, which is described above and illustrated in FIG. 6. The valid re-enable or reset command code will then be received by the receiver 3, in the manner described above at step 61.

The command code data will then be transmitted to, or read by, the CPU 4, at step 62 and processed and identified at step 62A. The CPU 4, at step 63, will then determine whether the re-enable or reset command code, which was entered, is a valid code. The CPU 4, at step 64, will then determine if the command code is a valid disable code. Since a valid re-enable or reset code has been entered, the CPU 4 will determine that the command code is not a disable code. The CPU 4 will then proceed to step 71 and will determine whether the command code is a valid re-enable or reset command code.

If the command code is not a valid re-enable or reset command code, the CPU 4 will exit the operational program or interrupt service routine, at step 76, and will await entry of the next valid access code and command code. It should be noted that, as an added security measure, the apparatus 1 can be programmed so that, upon the receipt of one or more invalid access and/or command codes, the apparatus 1 may require that the authorized user or operator re-program a new access code for the apparatus 1 through a central office or agency or maintenance service which provides service and/or maintenance for the apparatus 1. In any event, the apparatus 1 can be accessed by a valid access code with such accessing resetting the apparatus 1 and initiating the operation of the apparatus 1.

If, however, the entered command code is identified as a valid re-enable or reset code, at step 71, the CPU 4, subsequent to such determination, but prior to actually re-enabling or resetting the vehicle ignition system 7, re-enabling the vehicle fuel pump system 9, and de-activating or re-activating, whichever the case may be, any one or more of the various vehicle equipment systems 11 which are utilized, will perform a test, at step 72, in order to verify that the vehicle ignition system 7 is, in fact, still disabled. If, at step 72, the vehicle ignition system is still enabled or on, the CPU 4 will exit the operational program or interrupt service routine and will await entry of the next valid access code and command code. This test, at step 72, is a safety feature which serves to ensure that no re-enabling or resetting signal will be issued by the apparatus 1 if the vehicle ignition system 7 is not disabled. In this manner, the operation of the vehicle ignition system 7 will not be interrupted or affected, which interruption can be unsafe if the vehicle is already in operation or in motion.

It should be noted that neither the vehicle fuel pump system 9 nor any of the various vehicle equipment systems 11 which can be utilized, should have their status of operation altered as any interruption of the status quo of each of the respective systems, during normal vehicle operation, may also be unsafe.

If the vehicle ignition system 7 is determined to be disabled, at step 72, the CPU 4 will, at step 73, issue a control signal which will re-enable or reset the vehicle ignition system 7. This may be accomplished by any method and/or technique which would re-enable or re-activate the vehicle ignition system circuitry. The CPU 4, at step 74, will then issue a control signal to re-enable or reset the vehicle fuel pump system 9, if so desired, which can also be accomplished by re-enabling or re-activating the vehicle fuel pump system circuitry.

The CPU 4 will then, at step 75, issue control signals to each of the various vehicle equipment systems 11 which are utilized, so as to de-activate or re-activate the respective system(s) which had been activated or de-activated, respectively, earlier at step 70 or otherwise. Upon the completion of the above-described events, the vehicle will then be ready for operation, barring any need for service and/or for repairs. The CPU 4, upon the completion of step 75, will then exit the operational program or interrupt service routine, at step 76, and will await the next valid accessing and/or activation of the apparatus 1.

As noted above, if the re-enable or reset command code is not a valid code, the CPU 4 will ignore the received data, will exit the operational program or interrupt service routine, at step 76, and will await the next valid accessing and/or activation of the apparatus 1. In this regard, if an invalid command code should be entered into the transmitter interface 2A, such as by an authorized user or operator who has made a mistaken entry, or who is trying to cancel the accessing and activation of the apparatus 1, or by an unauthorized person attempting to gain unauthorized access to the apparatus 1, the CPU 4, upon identifying the code as an invalid command code, will ignore the command code transmission, and will exit the operational program or interrupt service routine, at step 76. The CPU 4 will then await the next valid accessing and/or activation of the apparatus 1.

Any subsequent accessing of the apparatus 1 will reset the apparatus 1 thereby preventing the apparatus 1 from being left in a state of "limbo". In this manner, the apparatus 1 serves to prevent an unauthorized accessing and/or an unwanted disabling or re-enabling or resetting of the vehicle ignition system 7 and/or the vehicle fuel pump system 9 along with the activation or the de-activation of any of the various vehicle equipment systems 11 which can be utilized, unless and until all valid codes are utilized.

The above safeguards will also prevent a wrong or mis-dialed number from accidentally accessing and activating the apparatus 1 which can result in an unwanted disabling or re-enabling, or the activation or de-activation, of the respective vehicle systems. These safeguards may be provided at the access code level of transmission and/or at the command code level of transmission. Such safeguards also prevent the apparatus 1 from being accessed and left in a state of "limbo" which may compromise the ability of an authorized user or operator to access and utilize the apparatus 1. The entry of an invalid access code will simply fail to access the apparatus 1.

In this manner, the apparatus 1 serves to prevent an unauthorized or an unwanted disabling or re-enabling or setting or resetting of the vehicle ignition system 7 and/or the vehicle fuel pump system 9 along with the activation or the de-activation of any of the various vehicle equipment systems 11 which can be utilized.

As noted above, with reference to FIG. 6, once a valid disable code has been recognized by the CPU 4, at step 64, the apparatus 1 will, at step 65, activate the vehicle position and locating device 13. The operation of the vehicle position and locating device 13 will then be initiated, at step 65, and will operate simultaneously and/or concurrently with, and independently of, the apparatus 1 and the CPU 4 in the performance of the operational steps 66-76 and 71-76 as described above. In this manner, the vehicle position and locating device 13 is utilized to calculate, determine and transmit vehicle position data in a manner independently of apparatus control over the vehicle ignition system 7, fuel pump system 9, and/or any of the vehicle equipment system(s) 11.

The present invention can be utilized in order to allow a user to remotely control the operation, movement, direction of movement or travel, propulsion, and/or travel, of the vehicle via the computer or communication device 150 and any one or more of the server computer 510 and/or any other server computer or computer described herein. In this manner, the apparatus and method of the present invention can be utilized in order to remotely control the operation, movement, direction of movement or travel, propulsion, and/or travel, of the vehicle in a network environment and/or to drive or maneuver the vehicle from a remote location. The user can also disable any and/or all of the vehicle operating and/or operational control systems in order to facilitate and/or to enable the user to take and have control over the vehicle in order to allow the user to remotely control, drive, or maneuver, the vehicle. The user can also disable any and/or all of the vehicle operating and/or operational control systems in order to facilitate and/or to enable the user to take and have control over the vehicle in order to allow the user to remotely control, drive, or maneuver, the vehicle via the home or personal computer or communication device 150 and any one or more of the server computer 510, and/or any other server computer and/or computer described herein.

Figure 7:
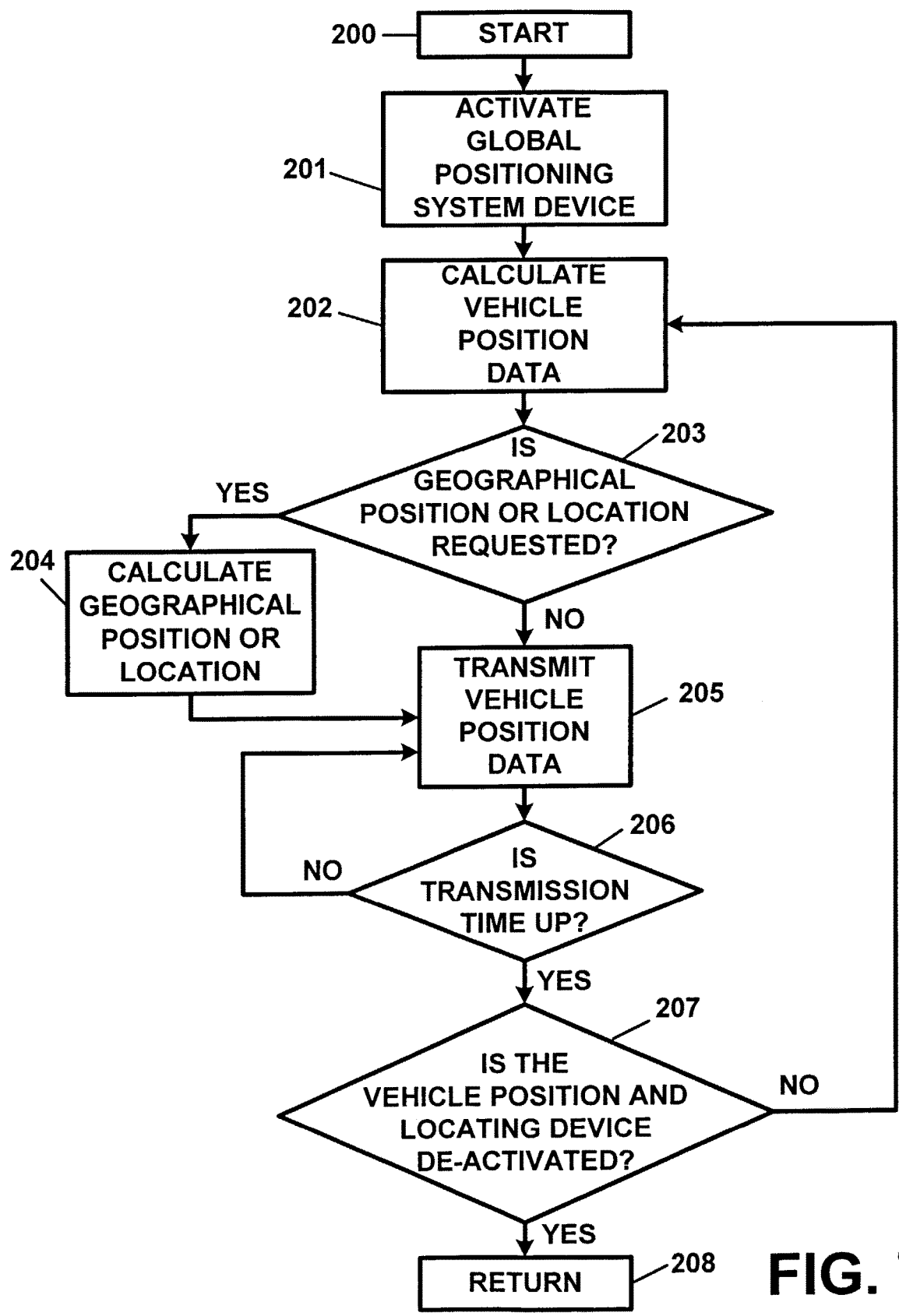
FIG. 7 illustrates the preferred embodiment operation, in flow diagram form, of the vehicle position and locating device which is utilized in the apparatus of the present invention.

FIG. 7 illustrates the operation, in flow diagram form, of the vehicle position and locating device 13. As noted above, the operation of the vehicle position and locating device 13 commences at step 65 as shown in FIG. 6 and thereafter operates simultaneously and/or concurrently with, and independently of, the operation of the apparatus 1 and the CPU 4. With reference to FIG. 7, the operation of the vehicle position and locating device 13 is initiated at step 200 of FIG. 7. At step 201, the computer 21 of the vehicle position and locating device 13 activates the global positioning device 22, which is any one of the widely known global positioning devices. Once activated, the global positioning device 22 calculates vehicle position data at step 202 by using well known global positioning calculation methods and/or techniques.

Once the vehicle position data has been calculated at step 202, a test is performed at step 203 in order to determine if the geographical position data (i.e., specific vehicle location identified on a map, location on identified roadway, etc.) has been requested. If geographical position or location data has been requested, the computer 21 will, at step 204, calculate the geographical position or location data of the vehicle in conjunction with the digital and/or digitized map data which is stored in the database 25. The calculated geographical position data of the vehicle will then be transmitted, at step 205, by the transmitter 24, of the vehicle position and locating device 13, to the vehicle position system receiver 14 which is located at the location of the authorized user or operator, or at the authorized office, agency or other entity.

If, at step 203, geographic position data has not been requested, then the position data which is calculated by the global positioning system 22 is transmitted, at step 205, to the vehicle position system receiver 14. In the preferred embodiment, the calculated vehicle position data is transmitted repeatedly for a predefined time interval which time interval is facilitated by utilizing the time delay at step 206.

In the preferred embodiment, the position data is transmitted repeatedly for a time period of five (5) minutes, which time period is monitored by utilizing the time delay function at step 206. Once the pre-defined time delay period has elapsed, the computer 21 will, at step 207, determine whether the vehicle position and location device 13 has been de-activated, such as would occur once the vehicle has been found and/or recovered and/or if the apparatus 1 has been reset. If the vehicle position and location device 13 has not been de-activated, operation of the vehicle position and locating device 13 will return to step 202 and will once again calculate vehicle position data. In this manner, vehicle position and/or location data can be updated. If the vehicle position device 13 has been de-activated, the computer 21 will, at step 208, exit the operational routine or interrupt service routine and will await its next re-activation.

Figure 8A:
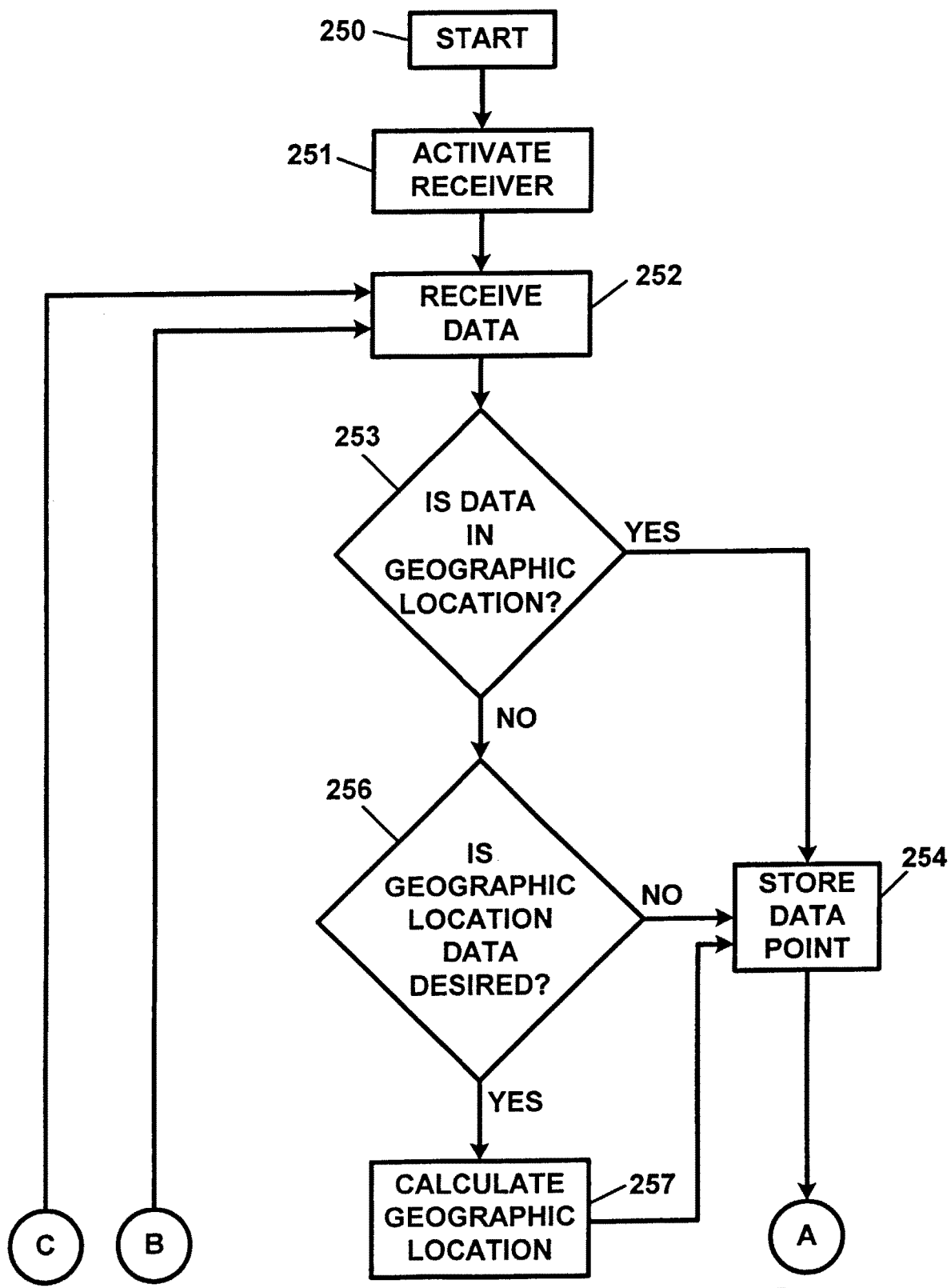
FIG. 8 illustrates the preferred embodiment operation, in flow diagram form, of the vehicle position system receiver which is utilized in the apparatus of the present invention.
Figure 8B:
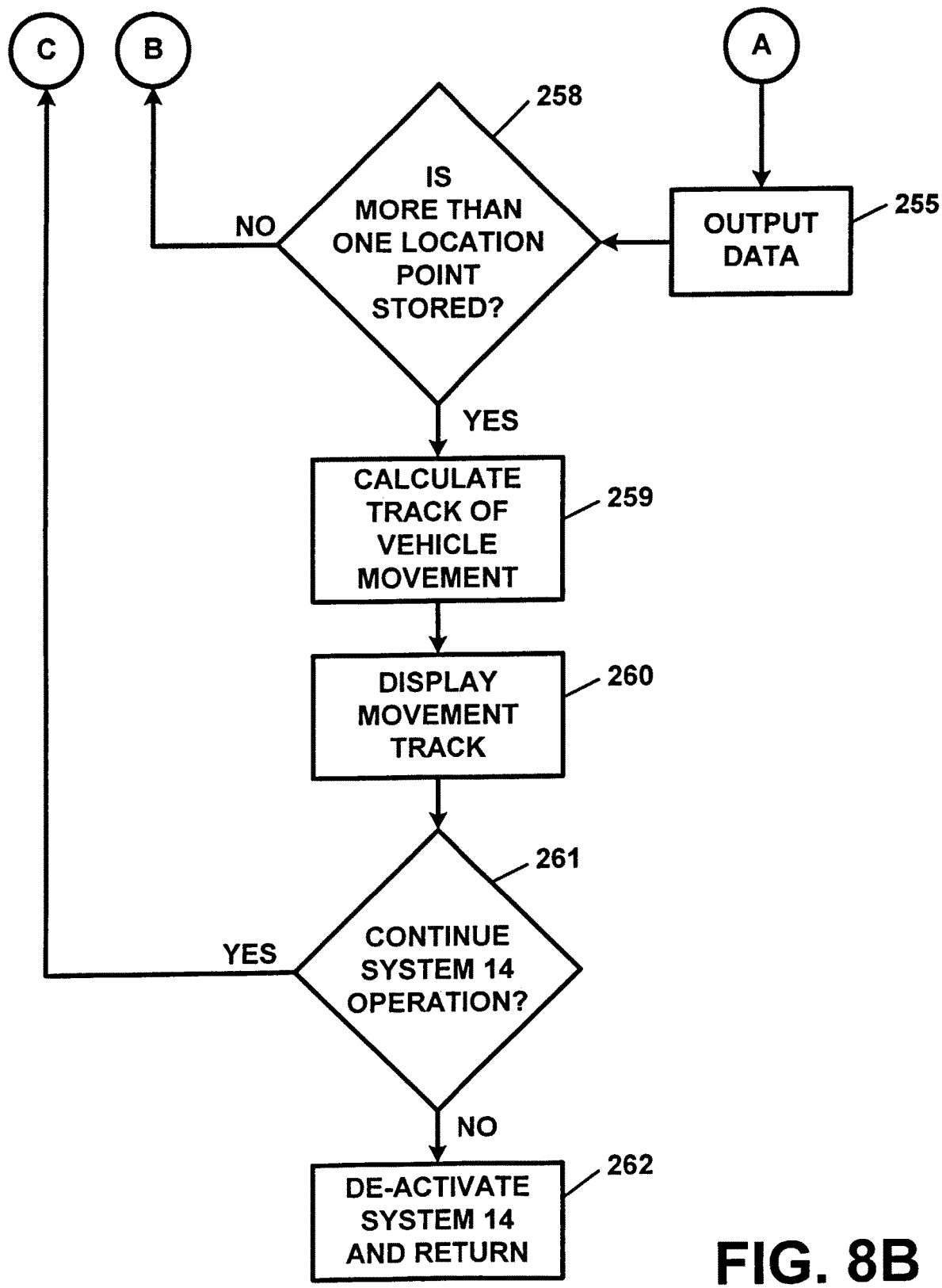

FIG. 8 illustrates the operation, in flow diagram form, of the vehicle position system receiver 14 which, as noted above, is located at the location of the authorized user or operator or at an office, agency or other entity which is authorized to receive the vehicle position and/or location data. The vehicle position system receiver 14 receives the vehicle position data which is transmitted by the vehicle position transmitter 24 of the vehicle position and locating device 13. In the preferred embodiment, the operation of the vehicle position system receiver 14 is activated upon receipt of a valid access code transmitted by the transmitter 3A. In this regard, the above-described access code, which is transmitted by the transmitter 3A, is also received by the receiver 30 of the vehicle position system receiver 14 thereby activating same.

In this regard, the access code is also utilized to activate the vehicle position system receiver 14. The vehicle position system receiver 14 can also be manually and/or in some other way activated by the authorized user or operator or by the authorized agency, office or entity.

Operation of the vehicle position system receiver 14 is initiated at step 250. The computer 31 will, upon receipt of the activate signal, activate the receiver 30, at step 251, which will await transmission of the vehicle position or location data, from the vehicle position and locating device 13. Upon transmission of the vehicle position data from the vehicle position and locating device 13, the receiver 30 will, at step 252, receive the vehicle position data.

The computer 31 will then, at step 253, determine if the received data is geographic position data. If geographic position data is obtained, the computer 31 will, at step 254, store the position data in memory and will, at step 255, display the position data on the display 33. If geographic position data has not been received, the computer 31, at step 256, will generate an inquiry on the display 33 to determine if geographic position data is desired. The system will then await operator response via the user interface 32. If the user selects to receive geographic position data, the computer 31 will proceed to step 257 and calculate geographic position data from the received "raw" position data.

The computer 31 will then, at step 254, store the data for the vehicle position and will, at step 255, display the vehicle position data on the display 33. If, at step 256, the user does not want to obtain geographic position data, the computer 31 will, at step 254, store the "raw" position data and display it on the display 33 in a latitude and/or longitude format, and/or in any other suitable and/or conventional format and/or manner which is utilized in conjunction with the global positioning device 22 or global positioning technology.

At step 258, the computer 31 will determine if more than one vehicle position data point has been stored. If only one vehicle position data point has been stored, the computer 31 will instruct the receiver 30 to receive the next vehicle position data transmission at step 252. If, at step 258, more than one vehicle position data point has been stored, the computer 31 will, at step 259, calculate the track of vehicle movement and display the vehicle movement track on the display 33 at step 260. The computer 31, at step 261, will then determine if the authorized user or operator desires to continue operation of the vehicle position system receiver 14.

If the user or operator desires operation of the vehicle receiver system receiver 14 to continue, such as is the case when the vehicle has not yet been found or recovered, the computer 31 will return to operation, at step 252, and the receiver 30 will receive the next vehicle position data transmission and operation of the vehicle position system receiver 14 will continue. If, however, it is determined, at step 261, that the user or operator desires to discontinue operation of the vehicle position system receiver 14, such as is the case when the vehicle has been found or recovered, the vehicle position system receiver 14 will be de-activated and its operation will cease at step 262. Thereafter, the vehicle position system receiver 14 will await its next activation.

The above described operation of the vehicle position and locating device 13 and the vehicle position system receiver 14 will continue to operate, and continuously update vehicle position data until the vehicle is found and/or recovered, at which point these systems can be de-activated. It is envisioned that the apparatus 1 of the present invention can track and/or locate the vehicle anywhere in the world. It is also important to note that vehicle position data, which is received at the vehicle position system receiver 14, can be output via a printer, via the computer display monitor and/or via a voice synthesized audio output via a speaker (not shown) which is connected to the vehicle position receiver system 14.

In this manner, the apparatus 1 of the present invention can be utilized to find and/or recover a stolen vehicle and/or to monitor vehicle operation and/or vehicle location and/or movement.

In the above described manner, the present invention provides for an apparatus and a method for allowing an authorized user or operator of a vehicle to prevent vehicle theft, to facilitate stolen vehicle recovery, and/or to safely surrender the vehicle under force, or threat of force, while affording the authorized user or operator the opportunity to prevent or seriously thwart the vehicle theft from a safe location or vantage point and facilitate vehicle recovery. The present invention can also be utilized to thwart, or prevent a vehicle theft even if the vehicle theft was discovered at a later time or from a location remote from the vehicle.

Further, the present invention provides for an apparatus and a method for disabling and/or re-enabling various systems of the vehicle, when the vehicle is not in use, simply by "calling up" the apparatus 1, so as to disable the vehicle and provide added security against theft. In this manner, an authorized user or operator can disable the vehicle ignition system 7, fuel pump system 9 and/or any of a variety of the vehicle equipment systems 11, of a vehicle which can be parked or in use, from any location and/or at any time.

An authorized user or operator can also access the apparatus 1 at any time and, with the use of an appropriate command code, can determine the operating status of the vehicle and/or any one or more of the various vehicle systems so as to determine if, for example, the ignition system 7 or fuel pump system 9 is activated or on, thereby alerting the authorized user or operator that someone is operating the vehicle. An authorized user or operator can also access the apparatus 1 so as to determine vehicle position and/or location and/or the geographic location of the vehicle. In this manner, the authorized user or operator can provide monitoring and/or control over the vehicle and/or any of the vehicle equipment systems and/or devices, determine the status of the vehicle and/or of any of the vehicle equipment systems or devices, and/or determine and/or monitor the location of his or her vehicle at any time and for any reason. In this regard, a safe and an effective anti-theft and/or vehicle recovery apparatus and method is provided by the present invention.

While, in the above description, the operation of the present invention has been described and illustrated in conjunction with the use of a valid disable command code and a valid re-enable or reset command code, it is also envisioned that any number of valid disable command codes and/or any number of valid re-enable or reset command codes can be utilized, wherein each different disable code or re-enable or reset code can selectively disable or re-enable or reset any one or any combination of the vehicle systems, such as the vehicle ignition system 7, the vehicle fuel pump system 9, and/or any one or more of the various vehicle auxiliary equipment systems 11 which can be utilized. In this manner, the authorized user or operator can utilize the present invention to selectively disable, re-enable, de-activate or re-activate any one or more of the vehicle systems, or a combination thereof, at his or her discretion, at any time, wherever he or she may be. The operational program and/or interrupt service routine can be altered, modified and/or supplemented in order to service the multitude of possible command codes which can be utilized in conjunction with the apparatus 1.

As noted above, an authorized user or operator can also utilize command codes for determining status of the apparatus 1, or of the vehicle, or any one or more of the vehicle systems. A command code can also be employed to simply determine vehicle position data. In any of the above cases, however, the operational program or interrupt service routine would have to be modified so as to identify and service each of the possible command codes. The operational program or interrupt service routine would also have to be modified so as to identify each of the possible valid command codes so as to provide for the appropriate CPU 4 and apparatus 1 response thereto.

The apparatus 1, the CPU 4, and/or any of the vehicle systems and/or devices and/or vehicle equipment systems, and/or the respective interface devices associated therewith or corresponding thereto, can also be programmable by the user or operator via the transmitter 2, and/or at the vehicle in an appropriate manner and by an appropriately secured device, so that certain parameters, such as the timing, and/or the degree of disabling or re-enabling, of the various vehicle systems can be programmed and/or controlled. Any of the above-described systems and/or devices can be programmable for timed enabling and/or disabling, for timed activation, and/or for deferred activation, etc. By utilizing a multitude of command codes, including disable codes and/or re-enable or reset codes, which codes affect different vehicle systems, or combinations thereof, it is possible to selectively control the vehicle systems from a remote location. This feature provides for greater versatility in the utilization of the apparatus 1.

By providing the capability for utilizing different disable codes and/or re-enable or reset codes, the authorized user or operator may utilize the apparatus 1 of the present invention so as to disable or re-enable or reset the vehicle ignition system 7 and the vehicle fuel pump system 9, at any time, so as to disable the vehicle without activating or de-activating any of the vehicle equipment systems 11, and therefore, without drawing attention to the vehicle.

This feature would enable an authorized user or operator to disable, re-enable, or reset the vehicle ignition system 7, the vehicle fuel pump system 9, and/or activate or deactivate any one or more of the various vehicle equipment systems 11, so as to disable the vehicle at any time and from any location. In this manner, the authorized user or operator can disable the vehicle, and/or any of the vehicle systems, daily and/or nightly, while at work, before going to sleep at night, or at any other time, simply by accessing and activating the apparatus 1 by using the transmitter 2 or transceiver which may simply be a touch-tone telephone.

Since the vehicle ignition system 7 is usually off at these times, the disabling, and the subsequent re-enabling of other vehicle systems will occur as described above with regards to FIG. 6. In this manner, the present invention can provide for an effective device by which to "lock-up" a vehicle, at any time, even when the vehicle is in the rightful possession, or under the control, of the vehicle owner and/or authorized operator.

In any and/or all of the embodiments described herein, the present invention can be utilized in order to provide control over and/or to monitor, the vehicle, any of the vehicle systems, devices, and/or components, vehicle operating status, the operating status of the vehicle's systems, devices, and/or components, video and/or audio inside the vehicle, video and/or audio outside the vehicle, video and/or audio in the vicinity of the vehicle, to provide video conferencing with individuals inside, outside, and/or in the vicinity of the vehicle, to provide notification to a vehicle owner and/or operator of a an operational status and/or state of disrepair of the vehicle and/or a vehicle system, device, and/or component, to provide for remote vehicle diagnostic and/or repair functions, to provide notification from the vehicle CPU 4 regarding vehicle operation, operational status of the vehicle and/or any of the vehicle systems, devices, and/or components.

The present invention can also be utilized in order to provide video and/or audio confirmation and/or verification of and/or for any control, monitoring, and/or security, operation and/or activity which can be effected and/or facilitated via the apparatus of the present invention. In this manner, a user of the present invention who may, for example, effect a control or monitoring function involving the vehicle (i.e. starting the engine, turning on the lights, activating the alarm, turning off the engine, turning the vehicle, and so on, etc.) can obtain a video and/or audio confirmation at and/or from the vehicle that the operation has been effected.

In any and/or all of the embodiments described herein, the respective vehicle equipment system(s) and/or the command computer can ascertain a state of disrepair in any vehicle system, device, and/or component, and can provide notification to the CPU 4. The CPU 4 can then generate and/or transmit an appropriate notification signal to the central processing computer servicing the vehicle. The central processing computer can thereafter generate and/or transmit an appropriate signal and/or message to the computer and/or communication device associated with the vehicle owner or operator.

In any and/or all of the embodiments described herein, the apparatus of the present invention can be utilized in order to notify the manufacturer, dealer, and/or repair center of a state of disrepair, thereby allowing the respective manufacturer, dealer, and/or repair center, to monitor the repairs of the respective vehicles, maintain satisfactory inventories, and/or in other ways utilize this information to better service their respective clients and/or customers.

In any and/or all of the embodiments described herein, the present invention can be utilized in order to provide remote diagnostic services regarding the vehicle. The respective vehicle service individuals and/or entities can access the vehicle via the computer and/or communication device associated with the service individual and/or entity and via the central processing computer. Vehicle, vehicle system, vehicle device and/or vehicle component, diagnostic data and/or information can be obtained at and/or from the vehicle and can be transmitted back to the computer and/or communication device of the service individual and/or entity, via the central processing computer and/or directly. Thereafter, the diagnostic data and/or information can be presented to and/or diagnosed at and/or by the computer and/or communication device associated with the service individual and/or entity. In this manner, the present invention can be utilized in order to provide remote vehicle repair diagnostics. In instances wherein a repair can be effected by reprogramming a respective vehicle system, device, and/or component, the service individual and/or entity can then transmit an appropriate repair signal to the vehicle from the computer and/or communication device associated with service individual and/or entity, either directly and/or via the central processing computer, to the CPU 4 located at the vehicle. Thereafter, the CPU 4 can effect the reprogramming of the respective vehicle system, device, and/or component. In this manner, the apparatus and method of the present invention can be utilized in order to effect remote diagnostics and repair of, for, and regarding and/or all of the vehicles, motor vehicles, boats, marine vessels, aircraft, equipment, structures, and/or premises described herein.

In any and/or all of the embodiments described herein, the apparatus and method of the present invention can be utilized in conjunction with "smart" vehicle components and/or devices. These "smart" components and/or devices can detect wear, state of disrepair, and/or any other defined condition and/or state, of the respective component and/or device. Upon the detection of a condition or state for which an individual owner or operator may desire and/or should be notified, the respective "smart" component and/or device can generate and/or transmit an appropriate signal to the CPU 4 which can then generate and transmit a signal to the central processing computer. The central processing computer can thereafter generate and/or transmit an appropriate signal to the computer and/or communication device associated with the owner or operator of the vehicle. In a reverse fashion, a vehicle owner or operator and/or an agent thereof can access the "smart" component, via the apparatus and method of the present invention can determine the condition and/or state of the "smart" component.

Figure 9:
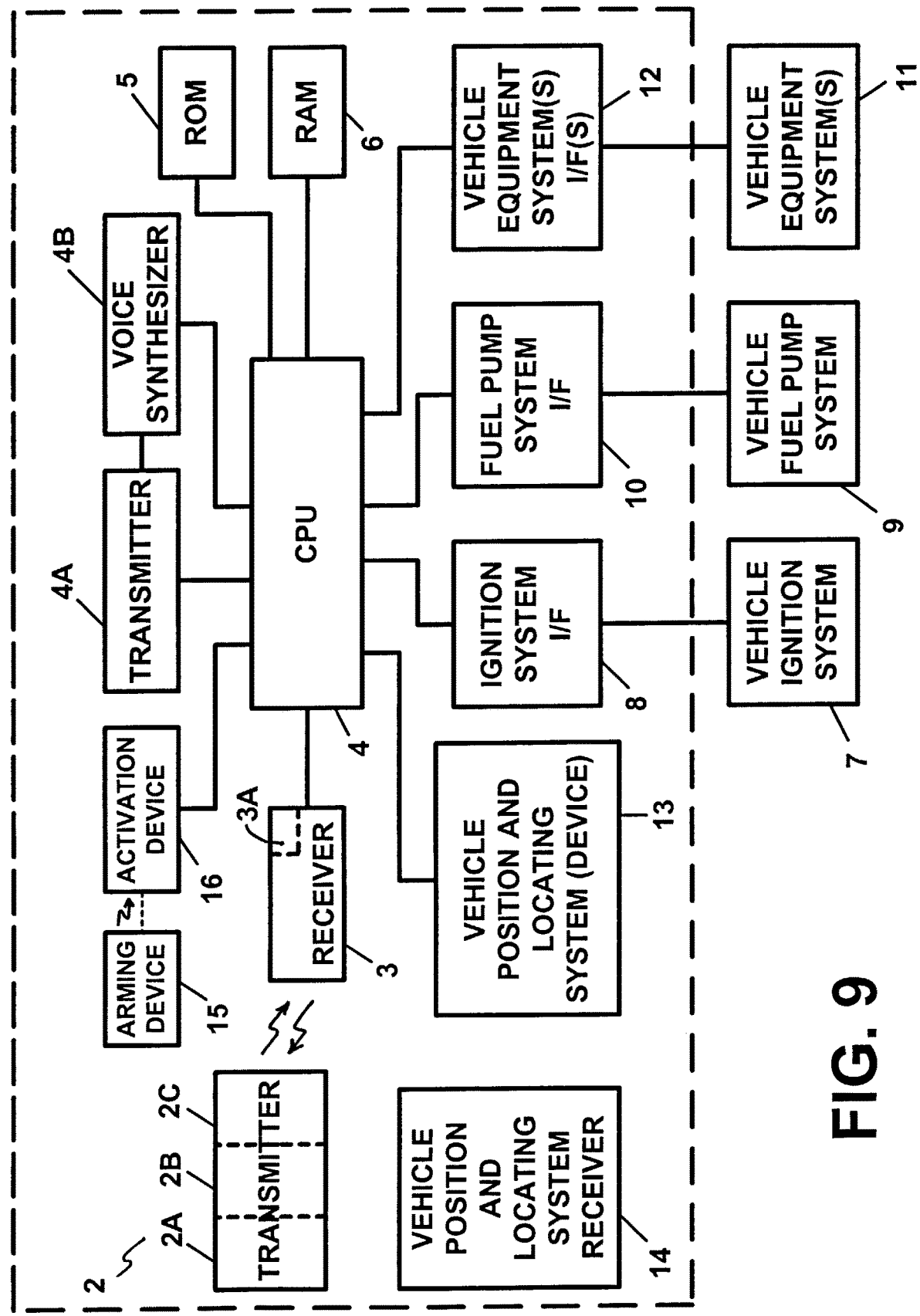
FIG. 9 illustrates another preferred embodiment of the present invention wherein an arming device and an activation device are utilized in conjunction with, and for, an automatic activation of the apparatus of the present invention.

FIG. 9 illustrates another preferred embodiment of the present invention, wherein an arming device 15 and an activation device 16 are utilized in conjunction with the components of the apparatus 1 of FIG. 1. In FIG. 9, the arming device 15 is utilized to arm, activate, or access the apparatus 1 and provides a means by which to access the apparatus 1 separate and apart from the transmitter 2/receiver 3 combination.

The arming device 15 can be a remote transmitter such as those utilized in conjunction with anti-theft devices or systems and/or alarm systems. The arming device 15 can also be a switch, a card reader, including stripe card readers, proximity card readers, turnstile card readers, insertion card readers, key and key insertion devices and readers, magnetic card readers and/or optical cards and/or card readers. The arming device 15 can also be a key switch, a key pad, a keyless activation device with associated key, and/or any other suitable device. The arming device can also be, or include, a voice recognition device(s) or reader(s), voice signature device(s) or reader(s), fingerprint recognition device(s) or reader(s), a retinal scanner(s), a face recognition device(s), a facial features recognition device(s), a handprint recognition device(s) or reader(s), and/or hand scanners and/or hand geometry readers. As with any of the above devices and/or components, the arming device(s) can be directly connected to the CPU 4 or can be linked to the CPU 4 via a wireless communication link or medium.

It is also envisioned that, with a suitable arming device 15, such as a keypad or other device for data input, the authorized user or operator can arm the apparatus 1 with a desired command code. In this manner, a programmable arming device can be utilized wherein apparatus operation, under the command of any of the variety of possible command codes, can be made automatic and/or programmable. An automatic activation can also be performed by an appropriate code being transmitted to the apparatus 1 via the transmitter 2 or transceiver.

The activation device 16 is chosen to correspond with the arming device 15. In this regard, the activation device 16 can be a switch, a key switch, a keypad, a suitable card reader, including stripe card readers, proximity card readers, turnstile card readers, insertion card readers, key and key insertion devices and readers, magnetic card readers, optical card readers, insertion card readers, optical readers as well as a keyless security device. The activation device 16 is connected directly to the CPU 4 as shown in FIG. 9 or it can be connected to the CPU 4 via a wireless communication link or medium.

In certain circumstances, such as when a keypad, key switch and/or any of the various cards and card readers are employed, the arming device 15 and the activation device 16 can be one and the same device and/or comprise one and the same combination of devices.

The embodiment of FIG. 9 provides a mechanism by which an authorized user or operator can arm, activate, and/or access the apparatus 1. Upon the arming, activation or accessing of the apparatus 1, the CPU 4 will, upon the activation of the vehicle ignition system 7, monitor the activation device 16. After a selected and predetermined time interval, chosen in the preferred embodiment to be ten (10) seconds, has elapsed, if the user or operator of the vehicle has failed to successfully activate the activation device 16, either by activating the switch, by using the associated key, by inputting a predetermined code (i.e. password or pass code) into the keypad, or by utilizing the appropriate card or key or other device corresponding to the utilized card reader or other associated device, the CPU 4 will issue an appropriate disabling and/or command signal to activate the apparatus 1 automatically so as to thereby disable the vehicle as described above and so as to also activate the vehicle position and locating device 13.

The command code can be pre-programmed as a default code and/or may be operator selected and programmed in any manner described above for user or operator entry of such a code. In this regard, if an unauthorized user or operator fails to properly activate the activation device 16, within the predetermined time period, the CPU 4 will recognize such failure as that which results from an unauthorized use or operation of the vehicle.

In the above-described manner, the embodiment of FIG. 9 provides a mechanism by which the apparatus 1, can be activated automatically or self-activated. By utilizing the embodiment of FIG. 9, the authorized user or operator, after arming the apparatus 1, need not perform a transmission of an access code and a command code to the apparatus 1, as a default code, which is previously chosen and/or programmed into the apparatus 1 will provide a command signal to the CPU 4. As noted above, with an appropriate arming device 15, the command code can be user selected and/or programmable.

It is also important to note that the arming device 15/activation device 16 can be utilized to activate the apparatus 1 and/or any one or more of the vehicle systems, including the ignition system 7, the fuel pump system 9, any one or more of the various vehicle equipment systems 11 which are utilized in conjunction with the apparatus 1, and/or the vehicle position and locating device 13. In this regard, the arming device 15 and the activation device 16 provide a mechanism by which to automatically activate the apparatus 1 along with any other anti-theft system utilized in the vehicle which can be controlled by the apparatus 1. The vehicle position and locating device 13 can also be activated by an automatic activation of the apparatus 1.

It is also possible to program the apparatus 1 with a command code so that the apparatus will be programmed to become activated, or de-activated, automatically, such as upon the occurrence, or lack thereof, of a pre-defined event or occurrence and/or at any desired time. If the apparatus 1 has been programmed to become activated automatically, the transmitter 4A of the CPU 4 can transmit data relating to vehicle status, apparatus status, the status of each of the vehicle systems utilized, as well as vehicle position data, to a respective receiver which is utilized by the authorized user or operator and/or at the receiver located at a central security office. In this regard, the present invention provides an apparatus and method by which a vehicle and/or a premises can report a theft situation and/or occurrence by itself. The apparatus can transmit a signal via transmitter 4A, or any other suitable apparatus transmitter, to a user, operator, owner, occupant or authorized office or individual of, and for, a respective vehicle or premises.

The apparatus can also be designed or programmed to notify the user, operator, owner, occupant, authorized central office or individual with, or by, multiple communication devices, methods and/or efforts. The apparatus can be designed or programmed to telephone, telephone at an alternate phone and/or at a business phone, beep or page, send a facsimile (fax) message transmission to, send a voice message transmission to, send an electronic mail message transmission to, and/or send a message to an answering service for, a user, operator, owner, occupant, authorized central office or individual of, and for, the respective vehicle or premises.

In this regard, the apparatus can be designed or programmed to telephone an owner, user, operator, occupant, or other authorized central office individual or other authorized individual, at a primary phone number, at an alternate or forwarding phone number and/or at a business phone number, send a beeper or pager message to the individual or central office and/or send a facsimile, an electronic mail message, a voice mail message and/or an answering service message to, or for, the individual or central office. In this manner, the apparatus can report a theft and/or a malfunction situation to the interested individual(s) by utilizing multiple notification and/or reporting avenues so as to provide and ensure that the interested individual(s) are in fact notified as soon as possible.

The user, operator, owner or occupant of the respective vehicle or premises can also activate the apparatus from the vehicle or premises and transmit a signal to the receiver 955 of the apparatus 950 at the central office and/or to the receiver 2C, if necessary, so as to communicate with individuals at these receiver locations and/or to report an emergency, a breakdown and/or some other occurrence.

In this regard, the apparatus 1, when in the automatic activation mode, or simply when being monitored and/or during a status check, can transmit data to the appropriate and respective devices. Further, in this regard, the apparatus 1 of the present invention can be utilized to exercise and/or perform control, monitoring and/or security functions, to report and/or to prevent a vehicle theft and/or determine vehicle position and/or location, in instances when the authorized user or operator is unaware of the theft and/or does not have access to the apparatus or vehicle.

The apparatus and method of the present invention can also be programmable for programmed and/or automatic activation, self-activation, programmed and/or automatic operation and/or self-operation. The apparatus and method of the present invention can provide for an immediate, as well as for a deferred, control, monitoring and/or security function, and/or response thereto, so as to provide for the immediate and/or the deferred control, activation, de-activation, programming, monitoring and/or security, etc., of any one or more of the respective vehicle systems, equipment, devices, appliances, etc., which can be utilized in the above described embodiments as well any of the embodiments described hereinbelow.

Figure 10:
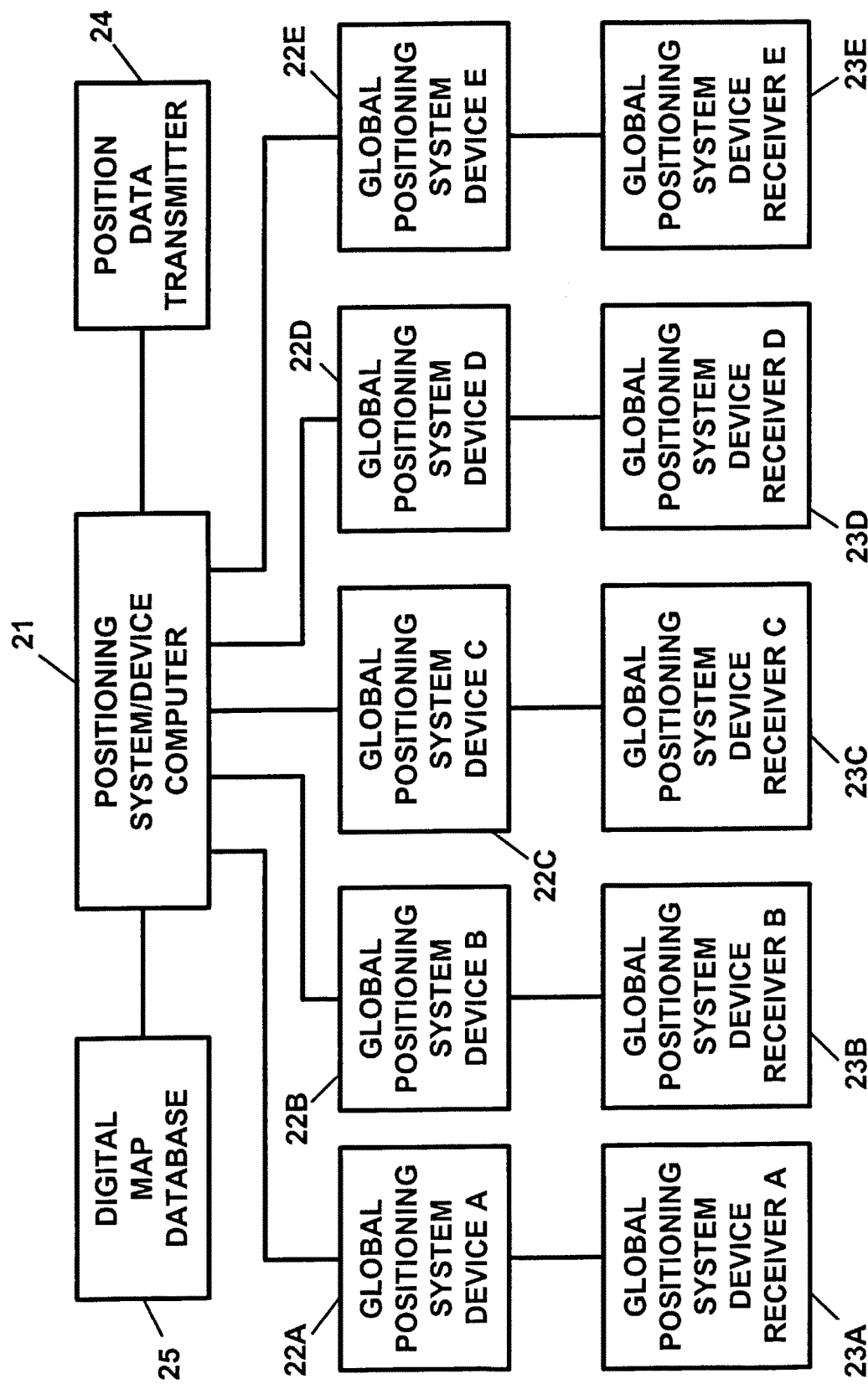
FIG. 10 illustrates another preferred embodiment of the vehicle position and locating device which includes a plurality of global positioning devices and corresponding global positioning receivers.

In yet another preferred embodiment of the present invention, the vehicle position and locating device 13 includes a plurality of global positioning devices which are strategically located at various points and/or locations in, or on, the vehicle. FIG. 10 illustrates another preferred embodiment of the vehicle position and locating device which is denoted by the reference numeral 130. In FIG. 10, the vehicle position and/or locating device 130 includes five (5) global positioning devices 22A, 22B, 22C, 22D and 22E with corresponding global positioning receivers 23A, 23B, 23C, 23D and 23E, respectively, associated therewith. The vehicle position and/or locating device 130 also includes position data transmitter 24 and a digital map database 25.

Each of the global positioning devices 22A-22E is placed at a different point and/or location in, or on, the vehicle. The distances between each of the global positioning devices is recorded and stored in the computer 21. Upon the activation of the global positioning devices 22A-22E and the calculation of each position or location of each device, the position data is transmitted to, or read by, the computer 21, and a determination is made as to whether the initially stored distances between the devices have changed.

Any change in distance between any two or more of the respective global positioning devices 22A-22E would represent that the vehicle, or at least a portion thereof, has been dismantled, at least in part, and possibly to a greater extent, depending upon the resulting disparity in the respective distances. This information can then be transmitted via transmitter 24 to the vehicle position system receiver 14 and the authorized user or operator can be notified of this condition. In this manner, it can be ascertained if a vehicle has been dismantled, "chopped", or stripped, which information may be vital in the recovery process, and in the insurance claims process. The embodiment of FIG. 10 can also be utilized in order to ascertain if the vehicle has been compacted or "boxed." In this manner, the present invention can also be utilized in order to determine if the vehicle has been structurally altered in any manner.

The apparatus and the method of the present invention can also be utilized in conjunction with a central security office or agency, such as a private security service, or by local or regional law enforcement offices or agencies, in order to provide a prompt means by which to report a vehicle theft, provide for a manner in which to disable and/or re-enable a vehicle system, and/or to determine vehicle position and/or location so as to facilitate the recovery of the vehicle. In such an embodiment, vehicle owners will register their vehicles and any and all necessary information pertaining thereto, including access and command codes, with the central security office.

Figure 11A:
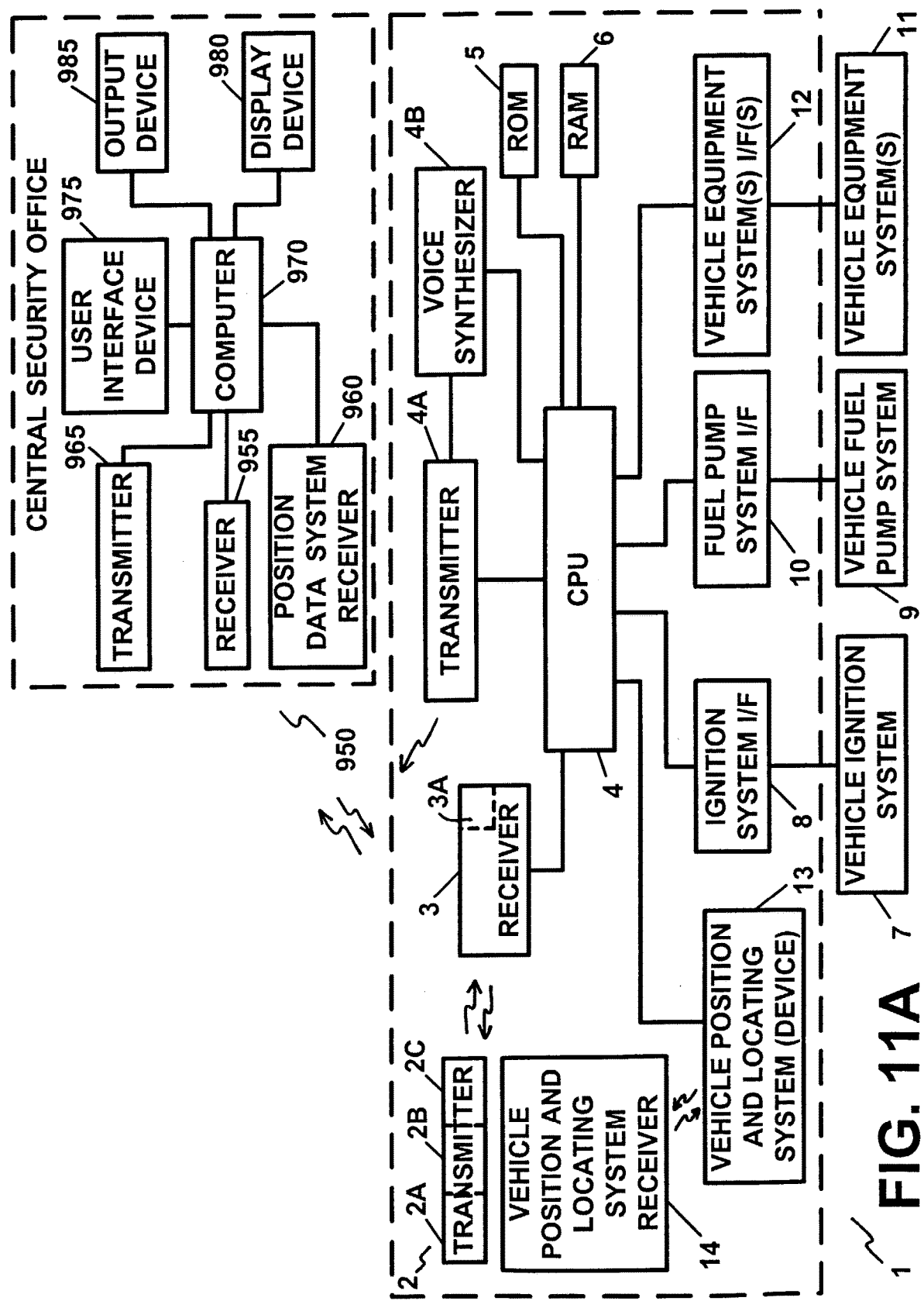
FIG. 11A illustrates another preferred embodiment of the present invention wherein the apparatus is utilized in conjunction with a central security office or agency.

The present invention can also be utilized so as to provide for a centralized control and/or monitoring of and/or for any of the vehicle and/or premises described herein, and/or for prompt law enforcement theft reporting, response to the theft report and/or recovery of the respective vehicles described herein. FIG. 11A illustrates another preferred embodiment of the present invention wherein the apparatus 1 is utilized in conjunction with a central processing computer which can be located at a central security office or agency, such as a private security service, or by a local or regional law enforcement office or agency. In FIG. 11A, the apparatus 1 is utilized in conjunction with an associated apparatus 950 which, in the preferred embodiment, is located at the central security office.

The apparatus 950 includes a receiver 955 which may, but need not, be identical to the receiver 3 which is utilized in the apparatus 1. The receiver 955 should be capable of receiving the various codes which can be transmitted by the transmitter 2 or transceiver (i.e. access code(s) and command code(s)) for any one or for any number of vehicles which can be registered with the central security office. The receiver 955 should be capable of receiving the access code(s) and command code(s) for each registered apparatus.

In the embodiment of FIG. 11A, the apparatus 950 also includes a central processing computer 970, which is connected to the receiver 955. The apparatus 950 also includes a vehicle position system receiver 960 for receiving position data which is transmitted from the vehicle position and locating device 13. The position data system receiver 960 is also connected to the central processing computer 970. The central processing computer 970 also includes the requisite memory ROM and RAM devices (not shown). The apparatus 950 also includes a display device 980, an user interface device 975 and an output device 985 which can be a printer, all of which devices are connected to the central processing computer 970 and are utilized in conjunction therewith.

The apparatus 950 also includes a transmitter 965 which is connected to the central processing computer 970. The transmitter 965 serves to transmit data to the apparatus 1. The transmitter 965 can also be utilized to transmit data to the transmitter 2, to the vehicle position system receiver 14 and/or to the home and/or personal computer 150, if utilized. Such data which is transmitted from the transmitter 965 can include the various access and command codes and/or other codes, such as those codes for ascertaining the status of the vehicle, the apparatus 1, or any one or more of the vehicle systems which are controlled, monitored, and/or secured or used in conjunction with the apparatus 1.

In the preferred embodiment, the receiver 955, the vehicle position system receiver 960, and the transmitter 965 are the same types of devices as those utilized in the apparatus of FIG. 1. In this regard, the receivers 955 and 960, and the transmitter 965, are devices for receiving, and transmitting, respectively, radio signals, satellite communication signals, telecommunications signals, optical communication signals and/or other signals and/or those signals, including digital signals, which are utilized in conjunction with personal communication devices and/or personal communication services (PCS) devices. The devices utilized should, however, be of the same type and/or operate compatibly with the corresponding transmitters and receivers of the apparatus 1.

It is envisioned that the authorized user or operator will register his or her vehicle with the apparatus 950 such as by registering vehicle identification information along with vehicle access and command code data along with any other pertinent information described herein. Further, the receiver 955 is programmed to receive any and all of the signals transmitted from each one of the respective registered transmitters 2 of the respectively registered vehicles.

The vehicle position system receiver 960 is programmed to receive the vehicle position data which is transmitted by each one of the respectively registered vehicle position and locating devices 13 of each of the respectively registered vehicles.

The apparatus 950 is utilized in conjunction with the apparatus 1 in the following manner. As noted above, the central processing computer 970 is capable of recognizing all of the possible access code(s) and command code(s) which are recognized by the apparatus 1 for a particular vehicle. The apparatus 950 is capable of storing vehicle identification information as well as access code and command code data for a plurality of registered vehicles.

Upon the occurrence of a vehicle theft, or the discovery thereof, the authorized user or operator can access the apparatus 1 in the manner described above. In a first embodiment, the access code is transmitted to and received at, the receiver 3 of apparatus 1 and at the receiver 955 of apparatus 950. Upon receipt of the access code by both the receiver 3 and the receiver 950, both the apparatus 1 and the apparatus 950, respectively, will be accessed.

Applicant hereby incorporates by reference herein the subject matter of U.S. Pat. No. 4,882,579 which teaches a code division multiplexed acknowledge back (ack-back) paging system which includes a central station which transmits a group of message signals to a group of ack-back pagers which are addressed as a group.

The signal received at the receiver 955 is transmitted to, or read from, the central processing computer 970 of the apparatus 950. The central processing computer 970 will then identify the vehicle which is stolen and/or which has been accessed. When the authorized user or operator transmits the command code, the command code is received at the receiver 955 of the apparatus 950 as well as at the receiver 3 of the apparatus 1. In this regard, when the apparatus 1 is processing the command code and performing the functions corresponding thereto, the central processing computer 970 of the apparatus 950 is simultaneously and/or concurrently processing the command code data so that the authorized personnel monitoring the apparatus 950 will be aware of which command code has been transmitted by the authorized user or operator and which operations are being exercised and/or performed, or are to be performed, on the vehicle (i.e., vehicle ignition system and/or fuel pump system disabled, etc.). The authorized personnel monitoring the apparatus 950 will also be aware of which operations and/or systems, equipment, devices and/or appliances, are being controlled, monitored and/or secured. The apparatus 950, in the preferred embodiment, can also be utilized to exercise and/or perform control, monitoring and/or security functions on, or over, the vehicle and/or any of the vehicle systems, equipment, devices and/or appliances.

Upon the transmission of the vehicle position data from the vehicle position and locating device 13, the vehicle position data will be transmitted to, and received by, the vehicle position system receiver 960 of the apparatus 950 as well as by the vehicle position system receiver 14 of the apparatus 1. The central processing computer 970 of the apparatus 950 will process the received vehicle position data simultaneously and/or concurrently with the processing of said position data by the CPU 4 of the apparatus 1.

In this regard, the vehicle position data can be processed by, and at, the apparatus 950. Vehicle position data can then be displayed to authorized personnel at the central security office on the display device 980 or output via the output device 985 which can be a printer. While operation of the apparatus 950 can be automatic, authorized personnel may enter commands so as to provide control over, or operate, the apparatus 950 via the user interface 975, if desired.

In this manner, vehicle location or movement can be displayed, and/or tracked, on the display device 980 or output via the output device 985 at the central security office. In this regard, authorized personnel at the central security office or agency could locate or track the vehicle and alert the proper authorities.

In yet another embodiment, the access code can be only transmitted to, and received by, the receiver 955 of the apparatus 950. The apparatus 1 can then be accessed and controlled via access and command codes which are transmitted by the transmitter 965 of the apparatus 950 which access and command codes are received by the receiver 3 of the respective vehicle. In this embodiment, the authorized personnel can provide control over the apparatus 1 by inputting data and commands into the user interface 975. In this embodiment, the vehicle position data and any data transmitted by the CPU 4 of the apparatus 1, is transmitted to, and received by, the vehicle position receiver system 960 and/or at the vehicle position system receiver 14, respectively.

In yet another embodiment, the access code can be transmitted and received only at the receiver 3 thereby accessing the apparatus 1. The vehicle transmitter 3A then transmits a data signal to the receiver 955 of the apparatus 950 thereby alerting the apparatus 950 that the vehicle has been stolen. Command code data as well as other data can then be transmitted to the apparatus 1 via the transmitter 965 of the apparatus 950. The apparatus 950 can be designed to operate and/or perform any and all of the described functions automatically and without operator intervention. Vehicle position data can then be received by the vehicle position receiver system 960 and/or at the vehicle position system receiver 14, respectively. The vehicle position data can then be processed at the central processing computer 970 of the apparatus 950 and/or at the computer 31 of the vehicle position system receiver 14.

In this manner, the apparatus 950 can serve to provide control over, and monitor the functions of, the apparatus 1 for a vehicle or for a plurality of vehicles, and further, the apparatus 950 provides the means by which to allow a central security office or local or regional law enforcement office or agency to exercise and/or perform control, monitoring and/or security functions over the vehicles which are registered therewith. The apparatus and method of the present invention can also be utilized to monitor the operational status, operation and/or state or status of a one or more of the various vehicle systems, components and/or devices. In the case where the apparatus 1 is automatically activated, as described above, the apparatus 1 can transmit a signal, indicative of vehicle theft and/or an unauthorized use or operation of the vehicle, to the apparatus 950 thereby reporting the unauthorized use or operation, or theft, before the authorized user or operator is able to discover same.

The apparatus 950 can also be utilized so as to verify and monitor apparatus accessing and/or activation by the authorized user or operator. The authorized user or operator may "call" the central security office simply to determine the status and/or the whereabouts or location of his or her vehicle. Both the apparatus 1 and the apparatus 950 can provide the same functions and exercise the same control, monitoring, and/or security functions over the vehicle.

The above-described preferred embodiment, wherein the present invention is utilized in conjunction with a central security office, such as a private security agency, or a local or regional law enforcement office, agency and/or authority, provides for and facilitates a prompt and an immediate reporting of a vehicle theft or unauthorized use, and/or provides for ascertaining the status and/or the location of and/or the monitoring of the vehicle. This embodiment also allows the authorized user or operator to take any of the possible steps by which to report and/or to thwart the vehicle theft and activate a vehicle recovery system. Law enforcement efforts could be greatly assisted and enhanced as information which identifies the vehicle could then be immediately available to the central security office and/or to the local or regional law enforcement authorities. Such an embodiment could also greatly assist in processing insurance claims relating to stolen vehicles.

The apparatus 950 can also be utilized in connection with an on-line service and/or on, or over, the Internet and/or the World Wide Web, or other suitable communication network or medium, in a manner analogous to that described above in connection with the utilization of a home and/or a personal computer 150.

Figure 11B:
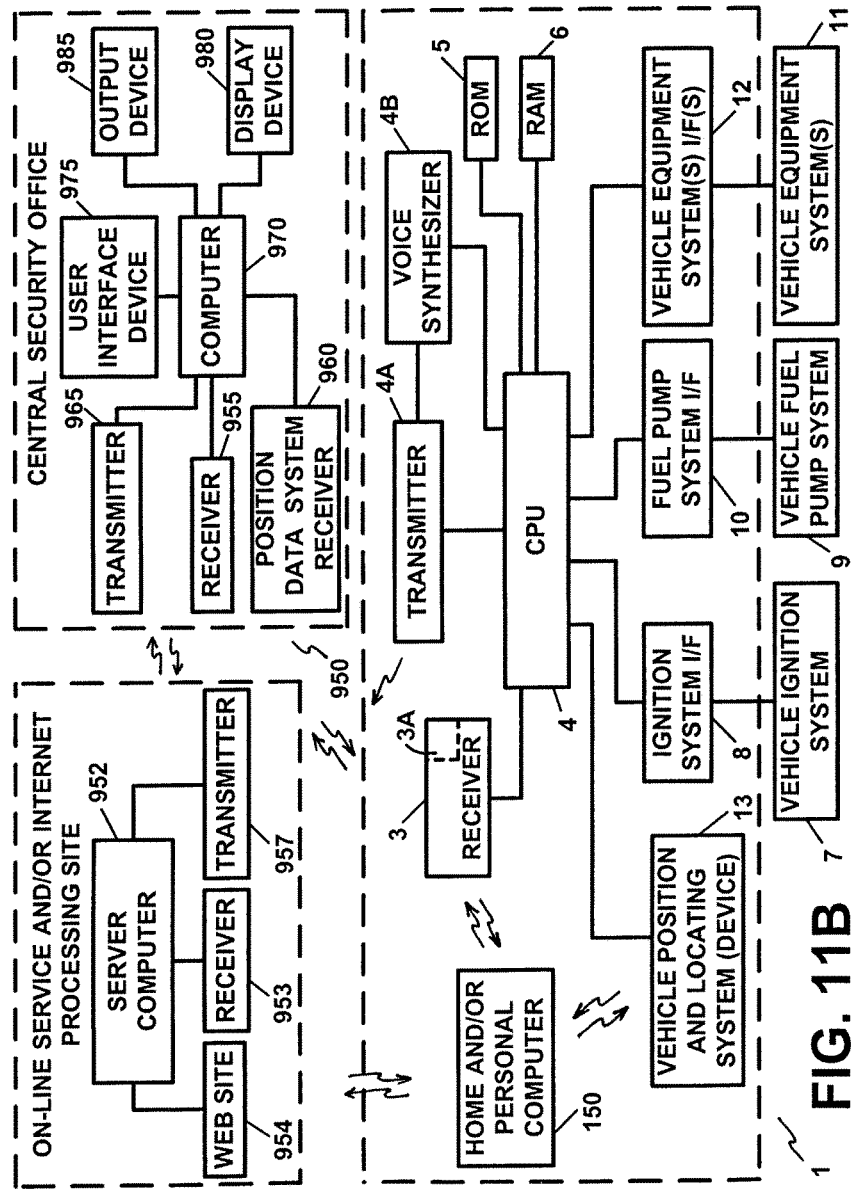
FIG. 11B illustrates yet another preferred embodiment of the present invention wherein the apparatus of FIG. 11A is utilized in conjunction with an on-line service and/or on, or over, the Internet and/or the World Wide Web.

FIG. 11B illustrates yet another preferred embodiment of the present invention wherein the apparatus of FIG. 11A is utilized in conjunction with an on-line service and/or on, or over, the Internet and/or the World Wide Web or other suitable communication network or medium. In FIG. 11B, the home and/or personal computer 150 of FIG. 5A is utilized in place of the transmitter 2 or transceiver and the vehicle position system receiver 14. The apparatus 950 has associated therewith an on-line service and/or an Internet computer system or server 952 with an associated server receiver 953 and transmitter 957 for receiving and transmitting, respectively, any and all data utilized in conjunction with the operation of the server 952, the apparatus 1 and the apparatus 950.

The transmitter 957 transmits any and all appropriate signals to the appropriate and respective devices of the arrangement of FIG. 11B during apparatus operation. In this regard, the server 952 can exercise and/or perform control, monitoring and/or security functions on, or over, the apparatus 1 and the apparatus 950 and also provide for an apparatus which can be utilized, in its entirety, over an on-line service and/or on, or over, the Internet and/or the World Wide Web or other suitable communication network or medium. In FIG. 11B, a Web Site 954 is associated with the server 952.

Any and all data received by the receiver 955 is also received by the server receiver 953. Data which is transmitted by the home and/or personal computer 150, the CPU transmitter 4A, the receiver transmitter 3A and the vehicle position and locating device transmitter 24 are received by the server receiver 953 as well as by the receivers 955 and 960, respectively.

The server 952 will process the data received by the server receiver 953 and perform the same processing functions and/or computing functions as the central processing computer 970, the CPU 4, and/or the computer 150.

The user may transmit data, via the home and/or personal computer 150, directly to the apparatus 1, to the apparatus 950 and/or to the server 952. By using the computer 150 in conjunction with an appropriate communications medium, the authorized user or operator may access the server 952 via the on-line service and/or via the associated Web site 954, or in any other appropriate manner, so as to provide control over, and/or obtain any and all of the above-described data and/or information regarding, his or her vehicle over the on-line service and/or on, or over, the Internet and/or the World Wide Web or other suitable communication network or medium.

The authorized user or operator may also access and provide control over or exercise and/or perform control, monitoring and/or security functions on, or over, the apparatus 1, the apparatus 950 and/or the server 952 via the on-line service and/or via the Web Site 954. In this regard, the present invention enables an authorized user or operator to provide control over vehicle systems and/or monitor the vehicle system status and/or position and/or movement of the vehicle over an on-line service and/or on, or over, the Internet and/or the World Wide Web or other suitable communication network or medium. The apparatus transmitters, of the transmitter 2, the receiver 3, the CPU 4, and the vehicle position and locating device 13, once the apparatus 1 has been activated, can also transmit data directly to the receiver 953 of the server 952 and/or to the Web Site 954. In this manner, all of the data transmitted by the apparatus 1 and/or by the apparatus 950 can be supplied to the server 952 of the on-line service and/or the Internet and/or the Web Site 954 of the World Wide Web.

Data access and command code data, as well as other data, can also be transmitted by the authorized user or operator, via the respective apparatus transmitters to the receiver 953 of the server 952 and/or to the Web Site 954.

The server 952 can perform complete control, monitoring and/or security functions on, or over, the apparatus 1, the apparatus 950, the vehicle, and/or each of the vehicle systems. The apparatus and method of the present invention can be equipped with software and hardware for providing a systematic check of any and all of the apparatus and vehicle systems, including the status or state of the vehicle equipment systems, equipment, devices and/or appliances and provide data relating thereto to the user or operator and/or to the authorized individual(s) at the above-described central security office. The server transmitter 957 can transmit control signals and/or other data, including information to the authorized user or operator and to the apparatus 1 and/or to the apparatus 950. It is also envisioned that the server 952 and the central processing computer 970 can be combined into a single central computer system.

In the above manner, the apparatus and method of the present invention provides a remote-controlled control, monitoring and/or security system, or vehicle anti-theft and/or vehicle recovery apparatus and method, for use in conjunction with an on-line service and/or on, or over, the Internet and/or the World Wide Web or other suitable communication network or medium. In this manner, the apparatus and method of the present invention also provides for a remote-controlled control, monitoring and/or security system which provides visual, video, graphical, audio and/or audible information to the user. Use over the Internet and/or the World Wide Web and/or other related communication systems and/or mediums and/or over on-line services provides for global coverage, control, monitoring and/or security for the vehicle.

In any and/or all of the embodiments described herein, the present invention can be utilized in order to provide control over and/or to monitor, the vehicle, any of the vehicle systems, devices, and/or components, vehicle operating status, the operating status of the vehicle's systems, devices, and/or components, video and/or audio inside the vehicle, video and/or audio outside the vehicle, video and/or audio in the vicinity of the vehicle, to provide video conferencing with individuals inside, outside, and/or in the vicinity of the vehicle, to provide notification to a vehicle owner and/or operator of a an operational status and/or state of disrepair of the vehicle and/or a vehicle system, device, and/or component, to provide for remote vehicle diagnostic and/or repair functions, to provide notification from the vehicle CPU 4 regarding vehicle operation, operational status of the vehicle and/or any of the vehicle systems, devices, and/or components.

The present invention can also be utilized in order to provide video and/or audio confirmation and/or verification of and/or for any control, monitoring, and/or security, operation and/or activity which can be effected and/or facilitated via the apparatus of the present invention. In this manner, a user of the present invention who may, for example, effect a control or monitoring function involving the vehicle (i.e. starting the engine, turning on the lights, activating the alarm, turning off the engine, turning the vehicle, and so on, etc.) can obtain a video and/or audio confirmation at and/or from the vehicle that the operation has been effected.

In any and/or all of the embodiments described herein, the respective vehicle equipment system(s) and/or the command computer can ascertain a state of disrepair in any vehicle system, device, and/or component, and can provide notification to the CPU 4. The CPU 4 can then generate and/or transmit an appropriate notification signal to the central processing computer servicing the vehicle. The central processing computer can thereafter generate and/or transmit an appropriate signal and/or message to the computer and/or communication device associated with the vehicle owner or operator.

In any and/or all of the embodiments described herein, the apparatus of the present invention can be utilized in order to notify the manufacturer, dealer, and/or repair center of a state of disrepair, thereby allowing the respective manufacturer, dealer, and/or repair center, to monitor the repairs of the respective vehicles, maintain satisfactory inventories, and/or in other ways utilize this information to better service their respective clients and/or customers.

In any and/or all of the embodiments described herein, the present invention can be utilized in order to provide remote diagnostic services regarding the vehicle. The respective vehicle service individuals and/or entities can access the vehicle via the computer and/or communication device associated with the service individual and/or entity and via the central processing computer.

Vehicle, vehicle system, vehicle device and/or vehicle component, diagnostic data and/or information can be obtained at and/or from the vehicle and can be transmitted back to the computer and/or communication device of the service individual and/or entity, via the central processing computer and/or directly. Thereafter, the diagnostic data and/or information can be presented to and/or diagnosed at and/or by the computer and/or communication device associated with the service individual and/or entity. In this manner, the present invention can be utilized in order to provide remote vehicle repair diagnostics.

In instances wherein a repair can be effected by reprogramming a respective vehicle system, device, and/or component, the service individual and/or entity can then transmit an appropriate repair signal to the vehicle from the computer and/or communication device associated with service individual and/or entity, either directly and/or via the central processing computer, to the CPU 4 located at the vehicle.

Thereafter, the CPU 4 can effect the reprogramming of the respective vehicle system, device, and/or component. In this manner, the apparatus and method of the present invention can be utilized in order to effect remote diagnostics and repair of, for, and regarding and/or all of the vehicles, motor vehicles, boats, marine vessels, aircraft, equipment, structures, and/or premises described herein.

In any and/or all of the embodiments described herein, the apparatus and method of the present invention can be utilized in conjunction with "smart" vehicle components and/or devices. These "smart" components and/or devices can detect wear, state of disrepair, and/or any other defined condition and/or state, of the respective component and/or device. Upon the detection of a condition or state for which an individual owner or operator may desire and/or should be notified, the respective "smart" component and/or device can generate and/or transmit an appropriate signal to the CPU 4 which can then generate and transmit a signal to the central processing computer. The central processing computer can thereafter generate and/or transmit an appropriate signal to the computer and/or communication device associated with the owner or operator of the vehicle. In a reverse fashion, a vehicle owner or operator and/or an agent thereof can access the "smart" component, via the apparatus and method of the present invention can determine the condition and/or state of the "smart" component.

In another preferred embodiment, the vehicle equipment system(s) 11 can also include a vehicle operation data monitoring device which monitors vehicle operation such as vehicle speed, the status of any of the vehicle systems (i.e. ignition system, fuel pump system, positioning system), and/or any of the vehicle equipment systems described herein, direction of travel, attitude of travel, video inside, outside, and/or at, the vehicle, audio inside, outside, and/or at, the vehicle, activity inside, outside, and/or at, the vehicle, and/or any other electrical, mechanical, electromechanical, hydraulic, and/or other system, equipment system, device, component, and/or appliance.

The vehicle operation data monitoring device can be connected to, and/or linked with, any of the herein-described systems, equipment systems, subsystems, devices, components, and/or appliances, including, but not limited to, speedometer, cruise control device, gyroscope, gyrocompass, directional light device(s), light system(s), door lock system(s), attitude measuring device(s), ignition system, braking system, electronic system(s), hydraulic system(s), video recording device(s) or camera(s), audio recording device(s) or microphone(s), and/or any other systems, equipment systems, devices, components, and/or appliances, described herein and/or otherwise, for controlling and/or monitoring the operation of same and/or for monitoring activity at the vehicle.

The vehicle operation data monitoring device can operate and/or function in a manner similar to, and/or analogous to, an aircraft flight data recorder in monitoring and/or recording operation data. In addition, the vehicle operation data monitoring device can receive any and/or all of the data monitored and transmit same to the any of the herein-described transmitters 2, home and/or personal computers 150, and/or any of the server computers 510, computers 970, and/or server computers 952, and/or any other computers and/or communication devices, which can be utilized to receive this data and/or information. In this manner, the vehicle operation and/or movement can be monitored by, and/or at, any of the herein-described transmitters, home and/or personal computers, computers, and/or server computers.

The vehicle operation data monitoring device can transmit any and/or all vehicle operation data to a respective transmitter(s), home and/or personal computer(s), computer(s), and/or server computer(s), in real-time, live, in a time-delayed manner, and/or in any other appropriate manner. The vehicle operation data monitoring device can also record and/or store any of the operation data monitored thereby.

Any data and/or information which is received from the vehicle operation data monitoring device can be stored at any of the herein-described transmitters 2, home and/or personal computers 150, and/or any of the server computers 510, computers 970, and/or server computers 952, and/or any other computers and/or communication devices, which can be utilized to receive this data. The data and/or information which is received from the vehicle operation data monitoring device can be stored in any suitable manner which can typically involve storing same digitally, storing same digitally in an overwriting manner, so that, for example, the data can be stored and/or overwritten for a given time period and overwriting same, storing same in a looping and/or re-circulating storage medium or tape, storing same in a manner utilized in conjunction with, and/or similar to, the manner in which data and/or information is stored in aircraft flight data recorders and/or aircraft cockpit voice recorders.

The vehicle operation data monitoring device can be accessed by any of the herein-described transmitters, home and/or personal computers, computers, and/or server computers, and/or the individuals utilizing same, in order to monitor and/or ascertain vehicle operation, and/or video and/or audio activity inside, outside, and/or at, the vehicle, at any time and/or to retrieve and/or to access operating data regarding vehicle operation and/or movement, and/or video and/or audio activity inside, outside, and/or at, the vehicle, which has been recorded and/or stored by the vehicle operation data monitoring device. For example, vehicle operating data and/or information, along with video and/or audio information inside, outside, and/or at the vehicle, can be accesses and/or obtained.

The vehicle operation data monitoring device can be utilized to monitor vehicle operation, to investigate a malfunction, to diagnosis a malfunction or other problem, to investigate a cause of an accident, and/or can be utilized for any other purpose.

In a preferred embodiment, the vehicle operation data monitoring device can be programmed to monitor vehicle operation data and/or to transmit same to any respective transmitter, home and/or personal computer, computer, central computer, and/or server computer, continuously, at certain times, and/or under certain conditions, such as a detection by the CPU 4 and/or by the vehicle operation data monitor.

The vehicle operation data monitoring device can also be activated remotely by any individual via any respective transmitter, home and/or personal computer, computer, central computer, and/or server computer, and/or user of same. The vehicle operation data monitoring device can also be activated by a vehicle operator and/or occupant and/or via any other individual.

The data and/or information obtained from the vehicle operation data monitoring device can be stored at any of the respective transmitters, home and/or personal computers, computers, central computers, and/or server computers, for accessing at any time. The data and/or information can be stored at the vehicle operation data monitoring device, and/or at any of the herein-described and respective transmitters, home and/or personal computers, computers, central computers, and/or server computers, in a "loop tape" manner and/or digitally in a looping and/or data overwriting manner so that, for example, only a most recent time period is recorded.

The vehicle operation data monitoring device can be utilized in conjunction with the present invention so as to obtain, to record, and/or access, and/or analyze, vehicle operation data at the vehicle and/or from a location remote from the vehicle, in a network environment, thereby facilitating the monitoring and/or the analysis of vehicle operation data.

Figure 12:
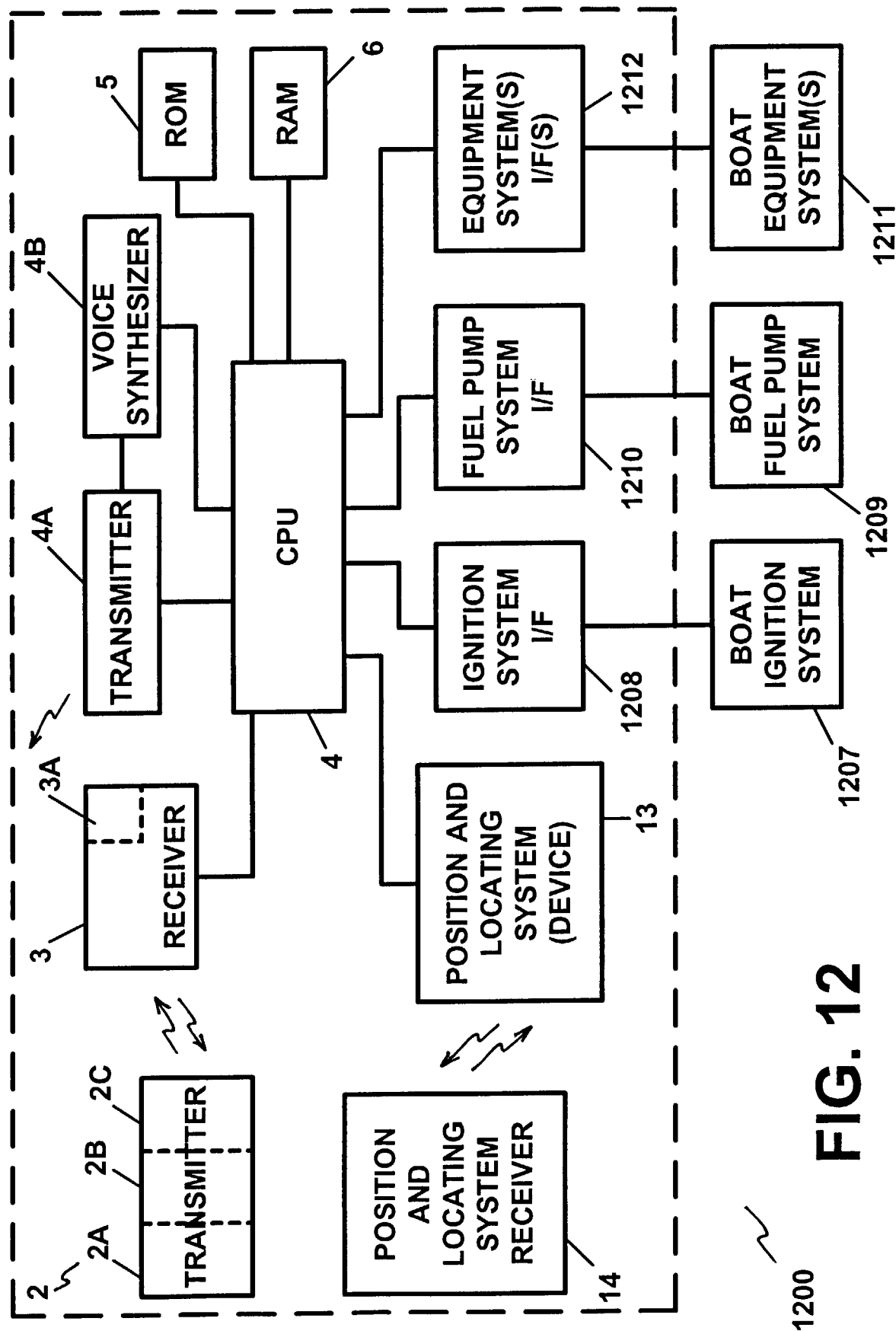
FIG. 12 illustrates another preferred embodiment of the present invention, wherein the apparatus and method is utilized in conjunction with a boat.

In yet another preferred embodiment, the present invention is utilized in conjunction with a marine vessel or vehicle. FIG. 12 illustrates an another preferred embodiment of the present invention, wherein the apparatus and method is utilized in conjunction with a boat. In FIG. 12, the apparatus is denoted generally by the reference numeral 1200. While the boat described below is a motor-powered boat, any type of boat, including, but not limited to sailboats, may also be utilized in conjunction with the present invention.

In FIG. 12, the components of the apparatus 1200 which are common to the apparatus 1 of FIG. 1 are designated by the same reference numerals. In FIG. 12, the CPU 4 is electrically connected and/or linked to the boat ignition system 1207, which is located externally from the apparatus 1200. The CPU 4 may or may not be connected and/or linked with the boat ignition system 1207 through an ignition system interface 1208 which is also shown in FIG. 12. The CPU 4 can transmit signals to, as well as receive signals from, the boat ignition system 1207. In this manner, the CPU 4 and the boat ignition system 1207, can exchange information between each other. In this manner, the CPU 4, upon receiving an appropriate signal from the receiver 3, and upon the completion of the requisite data processing routine(s), can issue an electrical, an electronic, and/or any other suitable signal, including a digital command signal, to the boat ignition system 1207. This electrical, electronic and/or other suitable signal, or digital command signal, may be one which will disable the boat ignition system 1207 or one which will re-enable or reset the boat ignition system 1207. The CPU 4 can also interrogate the boat ignition system 1207 and/or receive data from the boat ignition system 1207 which is indicative of boat ignition system status (i.e., whether the boat ignition system 1207 is on or off).

In the preferred embodiment, the CPU 4 is also electrically connected and/or linked to the boat fuel pump system 1209 which is also located externally from the apparatus 1. The CPU 4 may or may not be connected and/or linked with the boat fuel pump system 1209 through a fuel pump system interface 1210 which is also shown in FIG. 12. In the case of an electrical or an electronic fuel pump system, the CPU 4 can provide an electrical, an electronic, and/or other suitable signal, including a digital signal, which will disable or re-enable the boat fuel pump system 1209.

In the case of a mechanical fuel pump system, the CPU 4 can provide an electrical, electronic, and/or other suitable signal, including a digital signal, which will disable or re-enable an electrical valve system, which can be used to control the operation of the mechanical fuel pump system. Whichever the case may be, the CPU 4 will be capable of issuing an electrical, electronic and/or other suitable signal, including a digital signal, to disable or to re-enable the boat fuel pump system 1209. The CPU 4 can also interrogate and/or receive data from the boat fuel pump system 1209 which is indicative of boat fuel pump system status (i.e., whether the boat fuel pump system 1209 is on or off). The CPU 4 can also be electrically connected and/or linked to an appropriate device (not shown) for controlling the operation of a boat exhaust system.

The CPU 4, in the preferred embodiment, is also electrically connected and/or linked to at least one or more of a boat equipment system(s) 1211. The boat equipment system(s) 1211 are located externally from the apparatus 1 and may or may not be connected and/or linked to the CPU 4, via a boat equipment system(s) interface device(s) 1212 which may or may not be required for each one of the variety or multitude of the boat equipment systems which may be utilized in conjunction with the apparatus.

The boat equipment system(s) 1211 can include a loud siren or alarm, which can be located in the cabin or passenger compartment of the boat and, which can produce a loud piercing sound so as to make it unbearable for an intruder to remain inside the boat cabin and/or passenger compartment. The boat equipment system 1211 can also include an external siren or alarm, which can produce a loud piercing sound, which can be utilized to draw attention to the boat. The boat equipment system 1211 can also include a horn, which may blare continuously or intermittently, so as to also draw attention to the boat. The boat equipment system(s) 1211 can also include "smart" windows which turn opaque and/or darker depending upon interior lighting.

The boat external light system(s), which can include the boat head lights, tail lights or flashers, which can be constantly illuminated or which can blink on and off repeatedly so as to draw attention to the boat, can also be utilized as a boat equipment system 1211. The boat equipment system 1211 can also include a power door or hatch locking system, including electronic and/or electrical dead bolt locking devices, for securing the boat cabin, cockpit or passenger compartment so as to prevent an entry thereunto or an exit therefrom. In addition, the boat equipment system(s) 1211 can include an engine compartment locking device, such as an electrical and/or mechanical locking device, for preventing unauthorized access into the boat engine compartment, so as to prevent any tampering with the apparatus 1 or with other systems and/or components of the boat.

The boat equipment system(s) 1211 can also include any one or more of the widely known boat anti-theft systems and can also include a boat recovery system or device, including a homing and/or a tracking system, each of which system(s) can be activated by the apparatus 1200 of the present invention. The boat equipment system(s) 1211 can also include communication devices, such as two-way radios, radios, televisions, navigational devices and/or equipment, fire extinguishing equipment, pumping devices for pumping water out of the boat, radar devices and equipment, emergency and/or distress signal equipment, sonar devices and/or equipment, and any electrical, electronic and/or otherwise activated appliances and/or equipment which can be utilized on a boat. Appliances can include household appliances such as refrigerators, stoves, air conditioners, ovens, microwave ovens, lighting systems, etc. The boat equipment system(s) 11 can also include systems for detecting failures in any of the above or any other equipment systems and report such failures to the user or operator whether he or she is operating the boat or is not onboard the boat and/or for reporting such failures to a central office.

The boat equipment system(s) 1211 can also include video recording and/or photographing equipment, which can include video recording device(s) and/or a camera(s), such as those utilized in conjunction with personal computers, televisions, digital televisions, interactive televisions, display telephones, video telephones, and/or other communication devices, including personal communication devices, or a still picture camera(s). The video recording device(s) or camera(s) can be digital recording devices or cameras or other suitable devices or cameras, including typical video recording devices or cameras. The video recording device(s) or camera(s), in a preferred embodiment, has associated therewith a transceiver or transmitter/receiver system for transmitting video images recorded by the video recording device(s) or camera(s) to the user or operator and for receiving signals such as, for example, control signals, by which the user or operator can exercise control over the video recording device(s) or camera(s).

The video recording device(s) or camera(s) can be located at any location on the interior of the boat such as, for example, in the cabin, cockpit, and/or passenger compartment of the boat so that the user or operator, or any other authorized individual, can observe and/or photograph the operator of the boat, or the occupants and/or cargo of the boat. The video recording(s) or camera(s) can also be located on the boat exterior. The video recording device(s) or camera(s) can have wide angles for maximum angular viewing and can also be pivotable and/or movable. The video device(s) or camera(s) can be moveable along a track or other guiding device or element so that the respective video recording device or camera can be moved along the boat interior or exterior. The video recording device(s) or camera(s) can record and/or transmit the recorded video and/or the picture(s) in real time and/or live. The video recording device(s) or camera(s) can also be equipped with a storage medium, for storing the recorded video and/or picture(s), and a transmitter or transceiver for transmitting the stored video and/or picture(s) to the user or operator at a later time. In this manner, real-time, as well as deferred, video and/or picture(s) transmissions can be provided.

The boat equipment system(s) 1211 can also include audio recording equipment, which can include audio recording device(s) such as microphones and/or tape recorders, such as those utilized in conjunction with personal computers, televisions, digital televisions, interactive televisions, telephones, cellular telephones, display telephones, video telephones, and/or other communication devices, including personal communication devices. The audio recording device(s) can be digital audio recording devices or other suitable audio devices including typical audio recording devices. The audio recording device(s), in a preferred embodiment, has associated therewith a transceiver or transmitter/receiver system for transmitting the recorded audio to the user or operator and for receiving signals such as, for example, control signals, by which the user or operator can exercise control over the audio recording device(s).

The audio recording device(s) can be located at any location on the interior and/or exterior of the boat so that the user or operator, or any other authorized individual, may hear what is transpiring, and/or what has transpired, inside and/or outside the boat. The audio recording device(s) can also be pivotable and/or movable. The audio device(s) or microphone(s) can be moveable along a track or other guiding device or element so that the respective audio recording device or microphone can be moved along the boat interior or exterior. The audio recording device(s) can record and/or transmit the recorded audio in real time and/or live. The audio recording device(s) can also be equipped with a storage medium, for storing the recorded audio, and a transmitter or transceiver for transmitting the stored audio at a later time. In this manner, real-time as well as deferred audio transmissions may be provided.

The boat equipment system(s) 1211 can also include an intercom system or device or telephone, cellular, digital or otherwise for providing a means by which to allow the user or operator, or other authorized operator, to communicate with the operator and/or occupants of the boat. The boat equipment system 11 can also include video conferencing devices and/or equipment for enabling the boat occupants and/or individuals inside the boat, outside the boat, and/or in the vicinity of the boat, to engage in and/or partake in video conferences and/or video conferencing with others via a communication network.

The boat equipment system(s) 1211 can also include the boat battery or batteries, boat fuel cell or fuel cells, battery monitoring equipment, battery charge level, fuel cell output, fuel cell fuel supply, fuel cell temperature measuring device, fuel cell by-product (i.e. water or other by-product, heat, etc.) measuring device, fuel cell output measuring device (i.e. voltmeter, ammeter, current measure, power meter, etc.), a boat rudder, a rudder control and/or monitoring device, a depth sounding device and/or depth sounding control and/or monitoring device, a navigation system, a navigation control and/or monitoring system, an automatic pilot, a radar system, a sonar system, boat data recorder, a boat data recorder control and/or monitoring device, a boat cockpit voice recorder, a boat cockpit voice recorder control and/or monitoring device, an emergency oxygen control and/or monitoring device, an emergency oxygen deployment detection device, an air bag deployment device, an air bag deployment detection device, a boat dashboard or control console display device, a gyroscope for measuring boat pitch, roll, yaw, or attitude, a gyrocompass for measuring direction of travel, a boat data recorder and/or a boat operation data recorder.

The boat equipment system(s) 1211 can also include monitoring device(s) for reading and/or monitoring the status and/or condition of any of the boat fuel supply, water and/or coolant supply, electrical generator and/or alternator operation, battery charge level, fuel cell electrical power output, fuel cell fuel supply level, fuel cell operating temperature, fuel cell by-product output level, and/or engine or motor temperature level, marine control system and/or any other boat operation and/or system function and/or boat equipment system(s) operating status and/or condition. The monitoring device(s), in a preferred embodiment, has associated therewith a transceiver or transmitter/receiver system for transmitting data and/or information recorded and/or read by the monitoring device(s) to the user or operator and for receiving signals such as, for example, control signals, by which the user or operator can exercise control over the monitoring device(s).

The boat equipment system(s) 1211 can also include communication devices, such as two-way radios, radios, televisions, navigational devices and/or equipment, fire extinguishing equipment, radar devices and equipment, emergency and/or distress signal equipment, and any electrical, electronic and/or otherwise activated appliances and/or equipment which can be utilized in a boat or marine vessel. Appliances can include household appliances such as refrigerators, stoves, air conditioners, ovens, microwave ovens, lighting systems, etc. The boat equipment system(s) 1211 can also include electrical and/or electronically controlled dead bolt locking devices for use on doors, windows, and/or in conjunction with any other opening components and/or components for gaining access to various locations and/or in, and/or any systems, devices, and/or components of, the boat.

The boat equipment system(s) 1211 can also include an automatic pilot device which can be utilized to drive the boat automatically and/or to control any one or more of the boat's direction of travel or movement, speed of travel or movement, forward movement, reverse movement, boat turning or steering, engine operation, directional light signals, side movement, and/or stopping or parking. The automatic pilot can also control or monitor any and/or all of the electrical systems, electronic systems, mechanical systems, hydraulic systems, braking systems, etc., of the boat. In any and/or all of the embodiments described herein the automatic pilot can be programmed to operate and/or to control the operation of the boat. The automatic pilot can utilize a pre-stored travel program to control the travel of the boat. A user can also upload a travel program to the automatic pilot during the operation or use of the present invention.

The automatic pilot can be utilized in conjunction with a global positioning device, the vehicle position and locating device (system) 13, and a navigation system with or without a map database, in order to automatically control, drive, and/or maneuver, the boat from a location to a destination.

The boat equipment system(s) 1211 can also include a fuel draining system or dumping system, a noise cancellation device or noise cancellation system, a parachute, a parachute deployment system and/or a boat navigation system.

The boat equipment system(s) 1211 can also include a color video camera, an acoustic sensor or acoustic sensing device, a door sensing device which can be utilized to sense an open state or a closed state of a door or doors, and/or a window sensing device which can be utilized to sense an open state or a closed state of a window or windows.

The boat equipment system(s) 1211 can also include a power "on" sensor or power "on" sensing device for sensing a power "on" condition for any of the boat equipment system(s) 1211, boat systems, boat equipment, boat devices, boat components, and/or other boat systems, described herein. The boat equipment system(s) 1211 can also include a power "off" sensor or power "off" sensing device for sensing a power "off" condition for any of the boat equipment system(s) 1211, boat systems, boat equipment, boat devices, boat components, and/or other boat systems, described herein.

The boat equipment system(s) 1211 can also include a temperature sensor or temperature sensing device and/or a water sensor or a water sensing device. The boat equipment system(s) 1211 can also include a water pump or water pumping device for pumping water out of the boat.

The boat equipment system(s) 1211 can also include a motion sensor for detection the motion or movement of individuals or objects inside the boat, outside the boat, and/or in the vicinity of the boat.

The boat equipment system(s) 1211 can also include locks for preventing use and/or access to various locations, systems, devices, and/or components of the boat. The boat equipment systems can also include hydraulic and/or pneumatic equipment and/or other equipment, including winches, etc, which can be remotely activated as described herein. The boat equipment system(s) 1211 can also include boat communication devices including, but not limited to radios, televisions and entertainment devices, two-way radios, cellular telephones and equipment, etc. The boat equipment system(s) 1211 can also include systems for detecting failures in any of the above, or any other, equipment systems and report such failure(s) to the user or operator whether he or she is operating the boat or is not in the boat and/or for reporting such failures to a central office.

The boat equipment system(s) 1211 can also include the boat command computer which is utilized to control and/or to the various electronic, electrical, mechanical, and/or electromechanical systems, components, devices, of the boat. The command computer can control and monitor any of the systems, components, and/or devices, of the boat, including, but not limited to, the ignition system, the fuel system, fuel injection system, electrical systems for ignition, lights, horn, door locks, exhaust system, windows, fuel pump, oil pump, engine timing device, battery, fuel cells, fuel supply device, video recording equipment, audio recording equipment, boat integrated positioning device, and/or any other system, device, or component which can be controlled and/or monitored by the command computer.

The command computer can transmit control signals and/or status request signals to any of the herein-described boat systems, components and/or devices so as to respectively control and/or monitor the operating status and/or condition of the respective system, component and/or device. The command computer can also receive signals from the respective systems, devices and/or components, with said signals containing data and/or information concerning the operating status, operating state, and/or condition, of the respective systems, devices and/or components. The command computer can be utilized so as to control, monitor, and/or provide diagnostic information for any of the boat systems, components, and/or devices, which are controlled and/or monitored with the command computer.

The boat equipment system(s) 1211 can also include wear and/or usage indicators and/or detection devices which can be connected with either the command computer and/or the central processing computer and which can be utilized so as to monitor the wear and/or usage of any of the herein-described electronic, electrical, mechanical, and/or electromechanical, systems, devices, and/or components.

The boat equipment system(s) 11 can also include automatic control devices for controlling and/or monitoring boat systems and/or devices for boat movement and/or motion, such as, but not limited to, boat motor and/or transmission system for controlling boat forward and/or reverse direction of movement, boat acceleration system for controlling speed of movement, boat rudder system and/or boat steering system, boat pump system, and/or any other system and/or component for controlling and/or for effecting remote-control over the movement, motion and/or operation of the boat.

The boat equipment system(s) 1211 can also include a life boat deployment device or a life boat deployment system and/or a life raft deployment device or a life raft deployment system.

In the case of commercial equipment, industrial equipment, drilling equipment, mining equipment, excavating equipment, and/or other commercial equipment, the boat equipment system(s) 1211 can also include loading and/or unloading mechanisms, cutting mechanisms, bailing mechanisms, winches and any and all of the various systems and devices utilized in conjunction with these boats and/or equipment.

As noted above, the use of any one or more of the vehicle equipment system or systems 11, and their associated interface devices 12, may be optional and may further include any other systems and/or devices which may, or are, utilized in and/or in conjunction with any of the above noted or envisioned vehicles. The vehicle equipment system(s) 11, especially when the apparatus is utilized in conjunction with law enforcement and/or military vehicles, can also include guns and/or weapon systems and/or self defense systems and electronic warfare systems.

As noted above, the use of any one or more of the boat equipment system(s) 1211, and their associated interface devices 1212, may be optional. Further, wireless devices may be utilized for any of the devices utilized in conjunction with the apparatus 1200.

The boat equipment system(s) 1211 receives signals from the CPU 4, which signals serve to activate or de-activate, or vice versa, whichever the case may be, the respective boat equipment system(s) which are utilized in conjunction with the apparatus 1200. The boat equipment system(s) 1211 can also include any other suitable boat system or equipment feature which can be utilized to draw attention to the boat and/or in some other way to impede boat theft. It should be noted that any of the interface devices 1208, 1210 and 1212 can include any of the requisite interfacing circuitry which may be necessary to facilitate CPU 4 control over the respective systems which can be utilized.

In another preferred embodiment, the boat equipment system(s) 1211 can also include a boat operation data monitoring device which monitors boat operation such as boat speed, the status of any of the boat systems (i.e. ignition system, fuel pump system, positioning system), and/or any of the boat equipment systems described herein, direction of travel, attitude of travel, video inside, outside, and/or at, the boat, audio inside, outside, and/or at, the boat, activity inside, outside, and/or at, the boat, and/or any other electrical, mechanical, electromechanical, hydraulic, and/or other system, equipment system, device, component, and/or appliance.

The boat operation data monitoring device can be connected to, and/or linked with, any of the herein-described systems, equipment systems, subsystems, devices, components, and/or appliances, including, but not limited to, speedometer, cruise control device, rudder, gyroscope, gyrocompass, directional light device(s), light system(s), door lock system(s), depth sounding measurement devices, attitude measuring device(s), ignition system, braking system, electronic system(s), hydraulic system(s), video recording device(s) or camera(s), audio recording device(s) or microphone(s), and/or any other systems, equipment systems, devices, components, and/or appliances, described herein and/or otherwise, for controlling and/or monitoring the operation of same and/or for monitoring activity at the boat.

The boat operation data monitoring device can operate and/or function in a manner similar to, and/or analogous to, an aircraft flight data recorder in monitoring and/or recording operation data. In addition, the boat operation data monitoring device can receive any and/or all of the data monitored and transmit same to the any of the herein-described transmitters 2, home and/or personal computers 150, and/or any of the server computers 510, computers 970, and/or server computers 952, and/or any other computers and/or communication devices, which can be utilized to receive this data and/or information. In this manner, the boat operation and/or movement can be monitored by, and/or at, any of the herein-described transmitters, home and/or personal computers, computers, and/or server computers.

The boat operation data monitoring device can transmit any and/or all boat operation data to a respective transmitter(s), home and/or personal computer(s), computer(s), and/or server computer(s), in real-time, live, in a time-delayed manner, and/or in any other appropriate manner. The boat operation data monitoring device can also record and/or store any of the operation data monitored thereby.

Any data and/or information which is received from the boat operation data monitoring device can be stored at any of the herein-described transmitters 2, and/or home and/or personal computers 150, and/or any of the server computers 510, computers 970, and/or server computers 952, and/or any other computers and/or communication devices, which can be utilized to receive this data. The data and/or information which is received from the boat operation data monitoring device can be stored in any suitable manner which can typically involve storing same digitally, storing same digitally in an overwriting manner, so that, for example, the data can be stored and/or overwritten for a given time period and overwriting same, storing same in a looping and/or re-circulating storage medium or tape, storing same in a manner utilized in conjunction with, and/or similar to, the manner in which data and/or information is stored in aircraft flight data recorders and/or aircraft cockpit voice recorders.

The boat operation data monitoring device can be accessed by any of the herein-described transmitters, home and/or personal computers, computers, and/or server computers, and/or the individuals utilizing same, in order to monitor and/or ascertain boat operation, and/or video and/or audio activity inside, outside, and/or at, the boat, at any time and/or to retrieve and/or to access operating data regarding boat operation and/or movement, and/or video and/or audio activity inside, outside, and/or at, the boat, which has been recorded and/or stored by the boat operation data monitoring device. For example, boat operating data and/or information, along with video and/or audio information inside, outside, and/or at the boat, can be accesses and/or obtained.

The boat operation data monitoring device can be utilized to monitor boat operation, to investigate a malfunction, to diagnosis a malfunction or other problem, to investigate a cause of an accident, and/or can be utilized for any other purpose.

In a preferred embodiment, the boat operation data monitoring device can be programmed to monitor boat operation data and/or to transmit same to any respective transmitter, home and/or personal computer, computer, central computer, and/or server computer, continuously, at certain times, and/or under certain conditions, such as a detection by the CPU 4 and/or by the boat operation data monitor.

The boat operation data monitoring device can also be activated remotely by any individual via any respective transmitter, home and/or personal computer, computer, central computer, and/or server computer, and/or user of same. The boat operation data monitoring device can also be activated by a boat operator and/or occupant and/or via any other individual.

The data and/or information obtained from the boat operation data monitoring device can be stored at any of the respective transmitters, home and/or personal computers, computers, central computers, and/or server computers, for accessing at any time. The data and/or information can be stored at the boat operation data monitoring device, and/or at any of the herein-described and respective transmitters, home and/or personal computers, computers, central computers, and/or server computers, in a "loop tape" manner and/or digitally in a looping and/or data overwriting manner so that, for example, only a most recent time period is recorded.

The boat operation data monitoring device can be utilized in conjunction with the present invention so as to obtain, to record, and/or access, and/or analyze, boat operation data at the boat and/or from a location remote from the boat, in a network environment, thereby facilitating the monitoring and/or the analysis of boat operation data.

The boat equipment system(s) 1211 can also include a guidance system. The boat equipment system(s) 1211 can also include a monitoring device or monitoring system for measuring and/or monitoring any one or more of boat attitude, pitch, roll, yaw, speed, erratic movement, sudden movement in any direction, sudden movement or jolts in any direction inconsistent with normal or expected movement or operation. The monitoring device or monitoring system can detect sudden changes in normal boat operation, abnormal boat behavior, abnormal or erratic boat behavior (i.e. intentional ditching of the boat, loss of control, deviation from an expected course of travel, etc.), and/or a loss of control condition. The monitoring device or monitoring system can detect sudden change(s) in boat movement, erratic behavior, and/or abnormal behavior, and generate and transmit a signal to any one or more of the server computer 510, the server computer 952, the computer 970, and/or the home or personal computer or communication device 150, to alert an authorized user of the sudden change(s) in boat movement, erratic behavior, and/or abnormal behavior.

Thereafter, a user or operator can take control of the boat from a remote location via any one or more of the home or personal computer or communication device 150, the server computer 510, the server computer 952, and/or the computer 970. The user can remotely control any the boat system(s), equipment system(s), device(s), component(s), accessory, and/or accessories, via the home or personal computer or communication device 150 and any one or more of the server computer 510, the server computer 952, and/or the computer 970.

The airplane equipment system(s) 1311 can also include a navigation device or navigation system which can be programmed to detect when the airplane is deviating from a pre-established or expected flight plane and which can generate and transmit a signal to any one or more of the server computer 510, the server computer 952, the computer 970, and/or the home or personal computer or communication device 150, to alert an authorized user of the unexpected change or deviation in the airplane flight plan or path. Thereafter, a user or operator can take control of the airplane from a remote location via any one or more of the home or personal computer or communication device 150, the server computer 510, the server computer 952, and/or the computer 970.

The apparatus 1200 also includes a position and locating device 13 which can be utilized in order to determine the position and/or the location of the boat. The position and locating device 13 can be utilized so as to determine the position of the boat anywhere in the world and provide for the transmission of boat position and/or location data to any appropriate system receiver so that the boat may be located and/or tracked and recovered. In the preferred embodiment, the position and locating device 13 includes and utilizes a global positioning device and an associated transmitter for transmitting position and/or location data to the authorized user or operator and/or to an authorized office or agency authorized to receive and/or to monitor such data transmissions.

The apparatus 1200 of FIG. 12 also includes a position and locating system receiver 14, which may be employed by the authorized user or operator and/or by the authorized office or agency, for receiving and/or processing the data which is transmitted from the position and locating device 13 as described above. The apparatus of can also comprise a user interface device (not shown).

The apparatus and method of the preferred embodiment of FIG. 12 can be utilized and/or operates in the same or in a similar and/or analogous manner as described above with regards to the embodiments of FIGS. 1-11B and/or consistent with the description of the various embodiments and features of the present invention as described herein. The apparatus and method of the present invention can also provide for the immediate, and/or for the deferred, control, activation, deactivation, programming, monitoring and/or security of any one or more of the boat and/or marine vessel or vehicle systems, equipment, devices, appliances, etc., in the same, similar and/or analogous manner as described above with its use in conjunction with vehicles and/or motor vehicles.

The present invention can be utilized in order to allow a user to remotely control the operation, movement, direction of movement or travel, propulsion, and/or travel, of the boat via the computer or communication device 150 and any one or more of the server computer 510, the server computer 952, and/or the computer 970. In this manner, the apparatus and method of the present invention can be utilized in order to remotely control the operation, movement, direction of movement or travel, propulsion, and/or travel, of the boat, in a network environment and/or to control, maneuver, drive, or operate, the boat from a remote location in a network environment. The user can also disable any and/or all of the boat operating and/or operational control systems in order to facilitate and/or to enable the user to take and have control over the boat in order to allow the user to remotely control, drive, or maneuver, the boat via the home or personal computer or communication device 150 and any one or more of the server computer 510, the server computer 952, and/or the computer 970.

Although the present invention has been hereinabove described as being utilized in conjunction with a boat, it is noted that the present invention can be utilized in conjunction with a ship, cruise ship, or any other boat, manned or unmanned, regardless of size, shape or form, private, commercial and/or military. The boat equipment systems can also include guns and/or weapon systems and/or self-defense systems and/or electronic warfare systems. The present invention can also be utilized in conjunction with submersible vehicles such as submarines.

Figure 13:
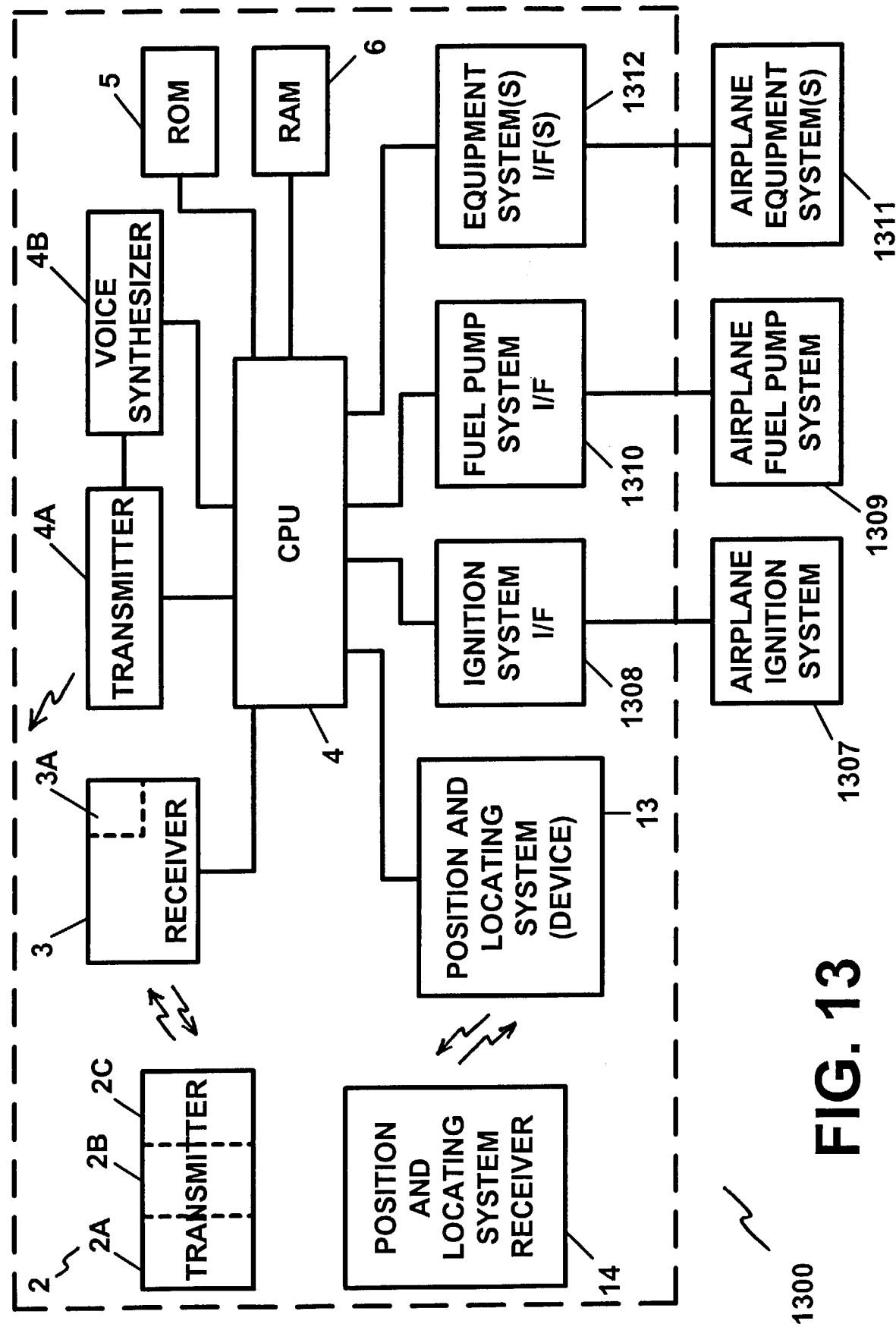
FIG. 13 illustrates another preferred embodiment of the present invention, wherein the apparatus and method is utilized in conjunction with an airplane.

In yet another preferred embodiment, the present invention is utilized in conjunction with an aircraft, airplane, jet, or helicopter. FIG. 13 illustrates an another preferred embodiment of the present invention, wherein the apparatus and method is utilized in conjunction with an airplane. As used herein, the term "airplane" means any one or more of aircraft, airplane, jet, helicopter, glider, spacecraft, and/or space shuttle, etc. The apparatus of FIG. 13 is denoted generally by the reference numeral 1300. In FIG. 13, the components of the apparatus which are common to the apparatus 1 of FIG. 1 are designated by the same reference numerals. In FIG. 13, the CPU 4 is electrically connected and/or linked to the airplane ignition system 1307, which is located externally from the apparatus 1300. The CPU 4 may or may not be connected and/or linked with the airplane ignition system 1307 through an ignition system interface 1308 which is also shown in FIG. 13.

The CPU 4 can transmit signals to, as well as receive signals from, the airplane ignition system 1307. In this manner, the CPU 4 and the airplane ignition system 1307, can exchange information between each other. In this manner, the CPU 4, upon receiving an appropriate signal from the receiver 3, and upon the completion of the requisite data processing routine, can issue an electrical, an electronic, and/or any other suitable signal, including a digital command signal, to the airplane ignition system 1307. This electrical, electronic and/or other suitable signal, or digital command signal, can be one which will disable the airplane ignition system 1307 or one which will re-enable or reset the airplane ignition system 7. The CPU 4 can also interrogate the airplane ignition system 1307 and/or receive data from the airplane ignition system 1307 which is indicative of ignition system status (i.e., whether the airplane ignition system 1307 is on or off).

In the preferred embodiment, the CPU 4 is also electrically connected and/or linked to the airplane fuel pump or supply system 1309 which is also located externally from the apparatus 1300. The CPU 4 may or may not be connected and/or linked with the airplane fuel pump system 1309 through a fuel pump system interface 1310 which is also shown in FIG. 13. In the case of an electrical or an electronic fuel pump system, the CPU 4 can provide an electrical, an electronic, and/or other suitable signal, including a digital signal, which will disable or re-enable the airplane fuel pump or supply system 1309.

In the case of a mechanical fuel pump system, the CPU 4 can provide an electrical, electronic, and/or other suitable signal, including a digital signal, which will disable or re-enable an electrical valve system, which can be used to control the operation of the mechanical fuel pump system. Whichever the case may be, the CPU 4 will be capable of issuing an electrical, electronic and/or other suitable signal, including a digital signal, to disable or to re-enable the airplane fuel pump system 1309. The CPU 4 can also interrogate and/or receive data from the airplane fuel pump or supply system 1309 which is indicative of airplane fuel pump system status (i.e., whether the airplane fuel pump system 1309 is on or off). The CPU 4 can also be electrically connected and/or linked to an appropriate device (not shown) for controlling the operation of a airplane exhaust system.

The CPU 4, in the preferred embodiment, is also electrically connected to at least one or more of an airplane equipment system(s) 1311. The airplane equipment system(s) 1311 are located externally from the apparatus 1300 and may or may not be connected to the CPU 4, via an airplane equipment system(s) interface device(s) 1312 which may or may not be required for each one of the variety or multitude of the airplane equipment systems which can be utilized in conjunction with the apparatus 1300.

The airplane equipment system(s) 1311 can include a loud siren or alarm, which can be located in the cabin, passenger compartment and/or cockpit of the airplane and, which can produce a loud piercing sound so as to make it unbearable for an intruder to remain inside the airplane cabin, passenger compartment and/or cockpit. The airplane equipment system(s) 1311 can also include an external siren or alarm, which can produce a loud piercing sound, which can be utilized to draw attention to the airplane. The airplane equipment system(s) 1311 can also include a horn, which may blare continuously or intermittently, so as to also draw attention to the airplane. The airplane equipment system(s) 1311 can also include "smart" windows which turn opaque and/or darker depending upon interior lighting.

The airplane external light system(s), which can include the airplane head lights, tail lights or flashers, which can be constantly illuminated or which may blink on and off repeatedly so as to draw attention to the airplane, can also be utilized as a airplane equipment system 1311. The airplane equipment system(s) 1311 can also include a power door or hatch locking system or device, for securing the airplane cabin, passenger compartment and/or cockpit so as to prevent an unauthorized entry thereunto or an exit therefrom. In addition, the airplane equipment system(s) 1311 can include a locking system, such as a mechanical locking system, for preventing an unauthorized access into the airplane engine compartment so as to prevent tampering with the apparatus 1300 or with other systems and/or components of the airplane.

The airplane equipment system(s) 1311 can also include any one or more of the widely known airplane anti-theft systems and can also include a airplane recovery system or device, including a homing and/or a tracking system, each of which system(s) can be activated by the apparatus 1300 of the present invention. The airplane equipment system(s) 1311 can also include landing gear, cabin and/or interior pressurization systems, devices, and/or cabin pressurization control and/or monitoring systems and/or devices, communication devices, such as two-way radios, radios, televisions, navigational devices and/or equipment, fire extinguishing equipment, radar devices and equipment, emergency and/or distress signal equipment, sonar devices and/or equipment, and any electrical, electronic and/or otherwise activated appliances and/or equipment which can be utilized on an airplane. Appliances can include household appliances such as refrigerators, stoves, air conditioners, ovens, microwave ovens, lighting systems, etc. The airplane equipment system(s) 1311 can also include systems for detecting failures in any of the above or any other equipment systems and report such failures to the user or operator whether he or she is operating the airplane or is not onboard the airplane and/or for reporting such failures to a central office.

The airplane equipment system(s) 1311 can also include video recording and/or photographing equipment, which can include video recording device(s) and/or a camera(s), such as those utilized in conjunction with personal computers, televisions, digital televisions, interactive televisions, display telephones, video telephones, and/or other communication devices, including personal communication devices, or a still picture camera(s). The video recording device(s) or camera(s) can be digital recording devices or cameras or other suitable devices or cameras, including typical video recording devices or cameras. The video recording device(s) or camera(s), in a preferred embodiment, has associated therewith a transceiver or transmitter/receiver system for transmitting video images recorded by the video recording device(s) or camera(s) to the user or operator and for receiving signals such as, for example, control signals, by which the user or operator can exercise control over the video recording device(s) or camera(s).

The video recording device(s) or camera(s) can be located at any location on the interior of the airplane such as, for example, in the dashboard, cabin, cockpit, and/or passenger compartment of the airplane so that the user or operator, or any other authorized individual, may observe and/or photograph the operator of the airplane, or the occupants and/or cargo of the airplane. The video recording(s) or camera(s) can also be located on the airplane exterior. The video recording device(s) or camera(s) can have wide angles for maximum angular viewing and can also be pivotable and/or movable. The video device(s) or camera(s) can be moveable along a track or other guiding device or element so that the respective video recording device or camera can be moved along the airplane interior or exterior. The video recording device(s) or camera(s) can record and/or transmit the recorded video and/or the picture(s) in real time and/or live. The video recording device(s) or camera(s) can also be equipped with a storage medium, for storing the recorded video and/or picture(s), and a transmitter or transceiver for transmitting the stored video and/or picture(s) to the user or operator at a later time. In this manner, real-time, as well as deferred, video and/or picture(s) transmissions may be provided.

The airplane equipment system(s) 1311 can also include audio recording equipment, which can include audio recording device(s) such as microphones and/or tape recorders, such as those utilized in conjunction with personal computers, televisions, digital televisions, interactive televisions, telephones, cellular telephones, display telephones, video telephones, and/or other communication devices, including personal communication devices. The audio recording device(s) can be digital audio recording devices or other suitable audio devices including typical audio recording devices. The audio recording device(s), in a preferred embodiment, has associated therewith a transceiver or transmitter/receiver system for transmitting the recorded audio to the user or operator and for receiving signals such as, for example, control signals, by which the user or operator may exercise control over the audio recording device(s).

The audio recording device(s) can be located at any location on the interior and/or exterior of the airplane so that the user or operator, or any other authorized individual, can hear what is transpiring, and/or what has transpired, inside and/or outside the airplane. The audio recording device(s) can also be pivotable and/or movable. The audio device(s) or microphone(s) can be moveable along a track or other guiding device or element so that the respective audio recording device or microphone can be moved along the airplane interior or exterior. The audio recording device(s) can record and/or transmit the recorded audio in real time and/or live. The audio recording device(s) can also be equipped with a storage medium, for storing the recorded audio, and a transmitter or transceiver for transmitting the stored audio at a later time. In this manner, real-time as well as deferred audio transmissions may be provided.

The airplane equipment system(s) 1311 can also include an intercom system or device or telephone, cellular, digital, or otherwise for providing a means by which to allow the user or operator, or other authorized operator, to communicate with the operator and/or occupants of the airplane. The airplane equipment system 1311 can also include video conferencing devices and/or equipment for enabling the airplane occupants and/or individuals inside the airplane, outside the airplane, and/or in the vicinity of the airplane, to engage in and/or partake in video conferences and/or video conferencing with others via a communication network.

The airplane equipment system(s) 1311 can also include the airplane battery or batteries, airplane fuel cell or fuel cells, battery monitoring equipment, battery charge level, fuel cell output, fuel cell fuel supply, fuel cell temperature measuring device, fuel cell by-product (i.e. water or other by-product, heat, etc.) measuring device, fuel cell output measuring device (i.e. voltmeter, ammeter, current measure, power meter, etc.), an airplane aileron control and/or monitoring device, a rudder control and/or monitoring device, an horizontal stabilizer control and/or monitoring device, a vertical stabilizer control and/or monitoring device, an altimeter, an emergency landing parachute control and/or monitoring device, an emergency parachute deployment control and/or deployment detection device, a navigation system, a navigation control and/or monitoring system, an automatic pilot, a radar system, a flight data recorder, a flight data recorder control and/or monitoring device, a cockpit voice recorder, a cockpit voice recorder control and/or monitoring device, a wing flap control and/or monitoring device, an emergency oxygen control and/or monitoring device, an emergency oxygen deployment detection device, an air bag deployment device, an air bag deployment detection device, an airplane cockpit or control console display device, a gyroscope for measuring airplane pitch, roll, yaw, or attitude, a gyrocompass for measuring direction of travel, an airplane data recorder and/or an airplane operation data recorder.

The airplane equipment system(s) 1311 can also include an instrument landing system and a guidance system. The airplane equipment system(s) 1311 can also include a flight monitoring device or flight monitoring system for measuring and/or monitoring any one or more of flight attitude, altitude, pitch, roll, yaw, speed, rate of descent, erratic movement, sudden movement in any direction, sudden movement or jolts in any direction inconsistent with normal or expected flight movement or operation. The flight monitoring device or flight monitoring system can detect sudden changes in normal flight operation, abnormal flight behavior, abnormal or erratic flight behavior (i.e. intentional ditching of the aircraft, loss of control, etc.), and/or a loss of control condition. The flight monitoring device or flight monitoring system can detect sudden change(s) in airplane flight, erratic behavior, and/or abnormal behavior, and generate and transmit a signal to any one or more of the server computer 510, the server computer 952, the computer 970, and/or the home or personal computer or communication device 150, to alert an authorized user of the sudden change(s) in airplane flight, erratic behavior, and/or abnormal behavior. Thereafter, a user or operator can take control of the airplane from a remote location via any one or more of the home or personal computer or communication device 150, the server computer 510, the server computer 952, and/or the computer 970.

The airplane equipment system(s) 1311 can also include a navigation device or navigation system which can be programmed to detect when the airplane is deviating from a pre-established or expected flight plane and which can generate and transmit a signal to any one or more of the server computer 510, the server computer 952, the computer 970, and/or the home or personal computer or communication device 150, to alert an authorized user of the unexpected change or deviation in the airplane flight plan or path. Thereafter, a user or operator can take control of the airplane from a remote location via any one or more of the home or personal computer or communication device 150, the server computer 510, the server computer 952, and/or the computer 970.

The airplane equipment system(s) 1311 can also include monitoring device(s) for reading and/or monitoring the airplane fuel supply, water and/or coolant supply, electrical generator and/or alternator operation, battery charge level, fuel cell electrical power output, fuel cell fuel supply level, fuel cell operating temperature, fuel cell by-product output level, and/or engine or motor temperature level, airplane flight control systems and/or any other airplane operation and/or system function and/or airplane equipment system(s) operating status and/or condition. The monitoring device(s), in a preferred embodiment, has associated therewith a transceiver or transmitter/receiver system for transmitting data and/or information recorded and/or read by the monitoring device(s) to the user or operator and for receiving signals such as, for example, control signals, by which the user or operator can exercise control over the monitoring device(s).

The airplane equipment system(s) 1311 can also include communication devices, such as two-way radios, radios, televisions, navigational devices and/or equipment, fire extinguishing equipment, radar devices and equipment, emergency and/or distress signal equipment, and any electrical, electronic and/or otherwise activated appliances and/or equipment which can be utilized in an airplane or aircraft. Appliances can include household appliances such as refrigerators, stoves, air conditioners, ovens, microwave ovens, lighting systems, etc. The airplane equipment system(s) 1311 can also include electrical and/or electronically controlled dead bolt locking devices for use on doors, windows, and/or in conjunction with any other opening components and/or components for gaining access to various locations on and/or in, and/or any systems, devices, and/or components of, the airplane.

The airplane equipment system(s) 1311 can also include locks for preventing use and/or access to various locations, systems, devices, and/or components of the airplane. The airplane equipment systems can also include hydraulic and/or pneumatic equipment and/or other equipment, including hydraulic control devices and/or control systems, winches, etc, which can be remotely activated as described herein. The airplane equipment system(s) 1311 can also include airplane communication devices including, but not limited to, radios, televisions and entertainment devices, two-way radios, cellular telephones and equipment, etc. The equipment system(s) 1311 can also include systems for detecting failures in any of the above, or any other, equipment systems and report such failure(s) to the user or operator whether he or she is operating the airplane or is not in the airplane and/or for reporting such failures to a central office.

The airplane equipment system(s) 1311 can also include the airplane command computer which is utilized to control and/or to the various electronic, electrical, mechanical, and/or electromechanical systems, components, devices, of the airplane. The command computer can control and monitor any of the systems, components, and/or devices, of the airplane, including, but not limited to, the automatic pilot system, radar system, lift control system, control surface system, the ignition system, engine and/or thrusting system, braking system, the fuel system, fuel injection system, landing gear, fuel dumping system, electrical systems for ignition, lights, horn, door locks, exhaust system, windows, fuel pump, oil pump, engine timing device, battery, fuel cells, fuel supply device, video recording equipment, audio recording equipment, airplane integrated positioning device, and/or any other system, device, or component which can be controlled and/or monitored by the command computer.

The command computer can transmit control signals and/or status request signals to any of the herein-described airplane systems, components and/or devices so as to respectively control and/or monitor the operating status and/or condition of the respective system, component and/or device. The command computer can also receive signals from the respective systems, devices and/or components, with said signals containing data and/or information concerning the operating status, operating state, and/or condition, of the respective systems, devices and/or components. The command computer can be utilized so as to control, monitor, and/or provide diagnostic information for any of the airplane systems, components, and/or devices, which are controlled and/or monitored with the command computer.

The airplane equipment system(s) 1311 can also include wear and/or usage indicators and/or detection devices which can be connected with either the command computer and/or the central processing computer and which can be utilized so as to monitor the wear and/or usage of any of the herein-described electronic, electrical, mechanical, and/or electromechanical, systems, devices, and/or components.

The airplane equipment system(s) 1311 can also include automatic control devices for controlling and/or monitoring airplane systems and/or devices for airplane take-off, flight, normal cruising, automatic pilot cruising, landing, airplane movement and/or motion, such as, but not limited to, airplane takeoff, thrust, engine or propeller system, forward thrust system for controlling airplane forward direction movement, airplane acceleration system for controlling speed of movement, airplane tail, wings, rudder, and/or other control surface systems and/or devices, airplane steering system, airplane braking system, airplane reverse thrust system, landing gear, airplane pump system, airplane turning and/or banking systems, and/or any other system and/or component for controlling and/or for effecting remote-control over the movement, motion and/or operation of the airplane.

The airplane equipment system(s) 1311 can also include an automatic pilot device which can be utilized to fly the airplane automatically and/or to control any one or more of the airplane's direction of travel or movement, speed of travel or movement, forward movement, reverse movement, airplane turning, banking, and/or or steering, engine operation, directional light signals, side movement, and/or stopping or parking. The automatic pilot can also control or monitor any and/or all of the electrical systems, electronic systems, mechanical systems, hydraulic systems, braking systems, etc., of the airplane. In any and/or all of the embodiments described herein the automatic pilot can be programmed to operate and/or to control the operation of the airplane. The automatic pilot can utilize a pre-stored flight plan or travel program to control the travel of, or fly, the airplane. A user can also upload a flight plan or travel program to the automatic pilot during the operation or use of the present invention.

The automatic pilot can be utilized in conjunction with a global positioning device, the position and locating device (system) 13, and a navigation system with or without a map database, in order to automatically control, fly, and/or maneuver, the airplane from a location to a destination.

In another preferred embodiment, any number of emergency flight plans can be stored in the automatic pilot or a database or storage device associated with the CPU 4.

In a preferred embodiment, the position and locating system (device) 13 can determine the location or position of the airplane. Once the location or position of the airplane has been determined, an emergency fight plan can be selected for landing the airplane at a nearest, a convenient, and/or a prepared airport, air field, or landing strip. The emergency flight plan can be automatically loaded into the automatic pilot and the airplane can be flown and landed at the selected airport, air field, or landing strip. For example, if the airplane is determined in a certain region, a flight plan to an airport, air field, or landing strip servicing, or in, that region can be selected.

The automatic pilot can then automatically fly the airplane to the airport, air field, or landing strip, automatically select the landing runway, including transmitting any runway identification code, and automatically land the plane. The automatic pilot can also communicate with the tower or instrument landing systems associated with the airport, air field, or landing strip in order to ascertain the best runway to land on.

The automatic pilot can also automatically dump any excess fuel in flight while retaining any required amount needed to reach the destination as well as retaining a reserve fuel amount. Fuel can be dumped so as to eliminate the danger of an explosion during flight, during landing, or upon the airplane coming to a stop.

The airplane equipment system(s) 1311 can also include a fuel dumping system, a noise cancellation device or noise cancellation system, a parachute, a parachute deployment system and/or an airplane navigation system.

The airplane equipment system(s) 1311 can also include a color video camera, an acoustic sensor or acoustic sensing device, a door sensing device which can be utilized to sense an open state or a closed state of a door or doors, and/or a window sensing device which can be utilized to sense an open state or a closed state of a window or windows.

The airplane equipment system(s) 1311 can also include a power "on" sensor or power "on" sensing device for sensing a power "on" condition for any of the airplane equipment system(s) 1311, airplane systems, airplane equipment, airplane devices, airplane components, and/or other airplane systems, described herein. The airplane equipment system(s) 1311 can also include a power "off" sensor or power "off" sensing device for sensing a power "off" condition for any of the airplane equipment system(s) 1311, airplane systems, airplane equipment, airplane devices, airplane components, and/or other airplane systems, described herein.

The airplane equipment system(s) 1311 can also include a temperature sensor or temperature sensing device and/or a water sensor or a water sensing device. The airplane equipment system(s) 1311 can also include a water pump or water pumping device for pumping water out of the airplane.

The airplane equipment system(s) 1311 can also include a motion sensor for detection the motion or movement of individuals or objects inside the airplane, outside the airplane, and/or in the vicinity of the airplane.

The airplane equipment system(s) 1311 can also include any one or more of an emergency exit sliding chute, an emergency exit landing chute, an emergency life boat deployment system, a life boat deployment device, an emergency life raft deployment system, and/or a life raft deployment device.

In the case of commercial equipment, industrial equipment, the airplane equipment system(s) 1311 can also include loading and/or unloading mechanisms, winches, etc., and any and/or all of the various systems and devices utilized in conjunction with these airplanes and/or equipment.

In another preferred embodiment, the airplane equipment system(s) 1311 can also include a airplane operation data monitoring device which monitors airplane operation such as airplane speed, the status of any of the airplane systems (i.e. ignition system, fuel pump system, positioning system), and/or any of the airplane equipment systems described herein, direction of travel, attitude of travel, video inside, outside, and/or at, the airplane, audio inside, outside, and/or at, the airplane, activity inside, outside, and/or at, the airplane, and/or any other electrical, mechanical, electromechanical, hydraulic, and/or other system, equipment system, device, component, and/or appliance.

The airplane operation data monitoring device can be connected to, and/or linked with, any of the herein-described systems, equipment systems, subsystems, devices, components, and/or appliances, including, but not limited to, speedometer, cruise control device, auto pilot, control surfaces, horizontal stabilizer, vertical stabilizer, cabin pressure control, landing gear, ailerons, altimeter, navigation system, emergency parachute, emergency landing equipment, emergency evacuation equipment, data display, braking system, wing flaps, rudder, gyroscope, gyrocompass, directional light device(s), light system(s), door lock system(s), depth sounding measurement devices, attitude measuring device(s), ignition system, braking system, electronic system(s), hydraulic system(s), video recording device(s) or camera(s), audio recording device(s) or microphone(s), and/or any other systems, equipment systems, devices, components, and/or appliances, described herein and/or otherwise, for controlling and/or monitoring the operation of same and/or for monitoring activity at the airplane.

The airplane operation data monitoring device can operate and/or function in a manner similar to, and/or analogous to, an aircraft flight data recorder in monitoring and/or recording operation data. In addition, the airplane operation data monitoring device can receive any and/or all of the data monitored and transmit same to the any of the herein-described transmitters 2, home and/or personal computers 150, and/or any of the server computers 510, computers 970, and/or server computers 952, and/or any other computers and/or communication devices, which can be utilized to receive this data and/or information. In this manner, the airplane operation and/or movement can be monitored by, and/or at, any of the herein-described transmitters, home and/or personal computers, computers, and/or server computers.

The airplane operation data monitoring device can transmit any and/or all airplane operation data to a respective transmitter(s), home and/or personal computer(s), computer(s), and/or server computer(s), in real-time, live, in a time-delayed manner, and/or in any other appropriate manner. The airplane operation data monitoring device can also record and/or store any of the operation data monitored thereby.

Any data and/or information which is received from the airplane operation data monitoring device can be stored at any of the herein-described transmitters 2, home and/or personal computers 150, and/or any of the server computers 510, computers 970, and/or server computers 952, and/or any other computers and/or communication devices, which can be utilized to receive this data. The data and/or information which is received from the airplane operation data monitoring device can be stored in any suitable manner which can typically involve storing same digitally, storing same digitally in an overwriting manner, so that, for example, the data can be stored and/or overwritten for a given time period and overwriting same, storing same in a looping and/or re-circulating storage medium or tape, storing same in a manner utilized in conjunction with, and/or similar to, the manner in which data and/or information is stored in aircraft flight data recorders and/or aircraft cockpit voice recorders.

The airplane operation data monitoring device can be accessed by any of the herein-described transmitters, home and/or personal computers, computers, and/or server computers, and/or the individuals utilizing same, in order to monitor and/or ascertain airplane operation, and/or video and/or audio activity inside, outside, and/or at, the airplane, at any time and/or to retrieve and/or to access operating data regarding airplane operation and/or movement, and/or video and/or audio activity inside, outside, and/or at, the airplane, which has been recorded and/or stored by the airplane operation data monitoring device. For example, airplane operating data and/or information, along with video and/or audio information inside, outside, and/or at the airplane, can be accesses and/or obtained.

The airplane operation data monitoring device can be utilized to monitor airplane operation, to investigate a malfunction, to diagnosis a malfunction or other problem, to investigate a cause of an accident, and/or can be utilized for any other purpose.

In a preferred embodiment, the airplane operation data monitoring device can be programmed to monitor airplane operation data and/or to transmit same to any respective transmitter, home and/or personal computer, computer, central computer, and/or server computer, continuously, at certain times, and/or under certain conditions, such as a detection by the CPU 4 and/or by the airplane operation data monitor.

The airplane operation data monitoring device can also be activated remotely by any individual via any respective transmitter, home and/or personal computer, computer, central computer, and/or server computer, and/or user of same. The airplane operation data monitoring device can also be activated by a airplane operator and/or occupant and/or via any other individual.

The data and/or information obtained from the airplane operation data monitoring device can be stored at any of the respective transmitters, home and/or personal computers, computers, central computers, and/or server computers for accessing at any time. The data and/or information can be stored at the airplane operation data monitoring device, and/or at any of the herein-described and respective transmitters, home and/or personal computers, computers, central computers, and/or server computers, in a "loop tape" manner and/or digitally in a looping and/or data overwriting manner so that, for example, only a most recent time period is recorded.

The airplane operation data monitoring device can be utilized in conjunction with the present invention so as to obtain, to record, and/or access, and/or analyze, airplane operation data at the airplane and/or from a location remote from the airplane, in a network environment, thereby facilitating the monitoring and/or the analysis of airplane operation data.

As noted above, the use of any one or more of the airplane equipment system(s) 1311, and their associated interface devices 1312, may be optional. Further, as described above, wireless devices can be utilized.

The airplane equipment system(s) 1311 receives signals from the CPU 4, which signals serve to activate or de-activate, or vice versa, whichever the case may be, the respective airplane equipment system(s) which are utilized in conjunction with the apparatus 1300. The airplane equipment system(s) 1311 can also include any other suitable airplane system or equipment feature which may be utilized to draw attention to the airplane and/or in some other way to impede the airplane theft. It should be noted that any of the interface devices 1308, 1310 and 1312 can include any of the requisite interfacing circuitry which may be necessary to facilitate CPU 4 control over the respective systems which may be utilized.

The apparatus 1300 also includes a position and locating device 13 which can be utilized in order to determine the position and/or the location of the airplane. The position and locating device 13 can be utilized so as to determine the position of the airplane anywhere in the world and provide for the transmission of airplane position and/or location data to any appropriate system receiver so that the airplane can be located and/or tracked and recovered. In the preferred embodiment, the position and locating device 13 includes and utilizes a global positioning device and an associated transmitter for transmitting position and/or location data to the authorized user or operator and/or to an authorized office or agency authorized to receive and/or to monitor such data transmissions.

The apparatus 1300 also includes a position and locating system receiver 14, which can be employed by the authorized user or operator and/or by the authorized office or agency, for receiving and/or processing the data which is transmitted from the position and locating device 13 as will be described above. The apparatus 1 can also comprise a user interface device (not shown).

The apparatus and method of the preferred embodiment of FIG. 13 can be utilized and/or operates in the same or in a similar and/or analogous manner as described above with regards to the embodiments of FIGS. 1-12 and/or consistent with the description of the various embodiments and features of the present invention as described herein.

The apparatus and method of the present invention can also provide for the immediate, and/or for the deferred, control, activation, deactivation, programming, monitoring and/or security of any one or more of the airplane systems, equipment, devices, appliances, etc., in the same, similar and/or analogous manner as described herein.

Although the present invention has been described herein as being utilized in conjunction with an airplane, it is noted that the present invention can be utilized in conjunction with any aircraft, including airplanes, jets, gliders, spacecraft, space shuttles, satellites, manned or unmanned, regardless of size, shape or form, private, commercial and/or military. The airplane equipment systems can also include guns and/or weapon systems and/or self-defense systems and/or electronic warfare systems.

The present invention can be utilized in order to allow a user to remotely control the operation, movement, direction of movement or travel, propulsion, and/or travel, of the airplane via the computer or communication device 150 and any one or more of the server computer 510, the server computer 952, and/or the computer 970. In this manner, the apparatus and method of the present invention can be utilized in order to remotely control the operation, movement, direction of movement or travel, propulsion, and/or travel, of the airplane in a network environment and/or to operate, fly, or maneuver, the airplane from a remote location in a network environment. The user can also disable any and/or all of the airplane operating and/or operational control systems, such as, but not limited to, the cockpit control systems and/or the flight deck control systems, in order to facilitate and/or to enable the user to have control over the airplane in order to allow the user to remotely control, fly, maneuver, or operate, the airplane via the computer or communication device 150 via the home or personal computer or communication device 150 and any one or more of the server computer 510, the server computer 952, and/or the computer 970.

The user can also remotely fly and land the airplane via the home or personal computer or communication device 150 and any one or more of the server computer 510, the server computer 952, and/or the computer 970. Any and all flight control functions can be controlled via the home or personal computer or communication device 150 and any one or more of the server computer 510, the server computer 952, and/or the computer 970. The airplane can also be landed remotely by controlling and/or uploading information to the automatic pilot aboard the airplane. The user can also dump fuel, deploy parachutes, and/or activate and/or deploy emergency landing escape chutes, fire extinguishment equipment, and/or any other system(s), equipment system(s), device(s), component(s), accessory, and/or accessories, via the home or personal computer or communication device 150 and any one or more of the server computer 510, the server computer 952, and/or the computer 970.

The automatic pilot can also be instructed or controlled, via the home or personal computer or communication device 150 and any one or more of the server computer 510, the server computer 952, and/or the computer 970, to activate black box transmissions, and/or audio and/or video recording transmissions, to a location remote from the airplane, to dump fuel, to deploy parachutes, and/or to activate and/or deploy emergency landing escape chutes, fire extinguishment equipment, any other system(s), equipment system(s), device(s), component(s), accessory, and/or accessories.

Figure 14:
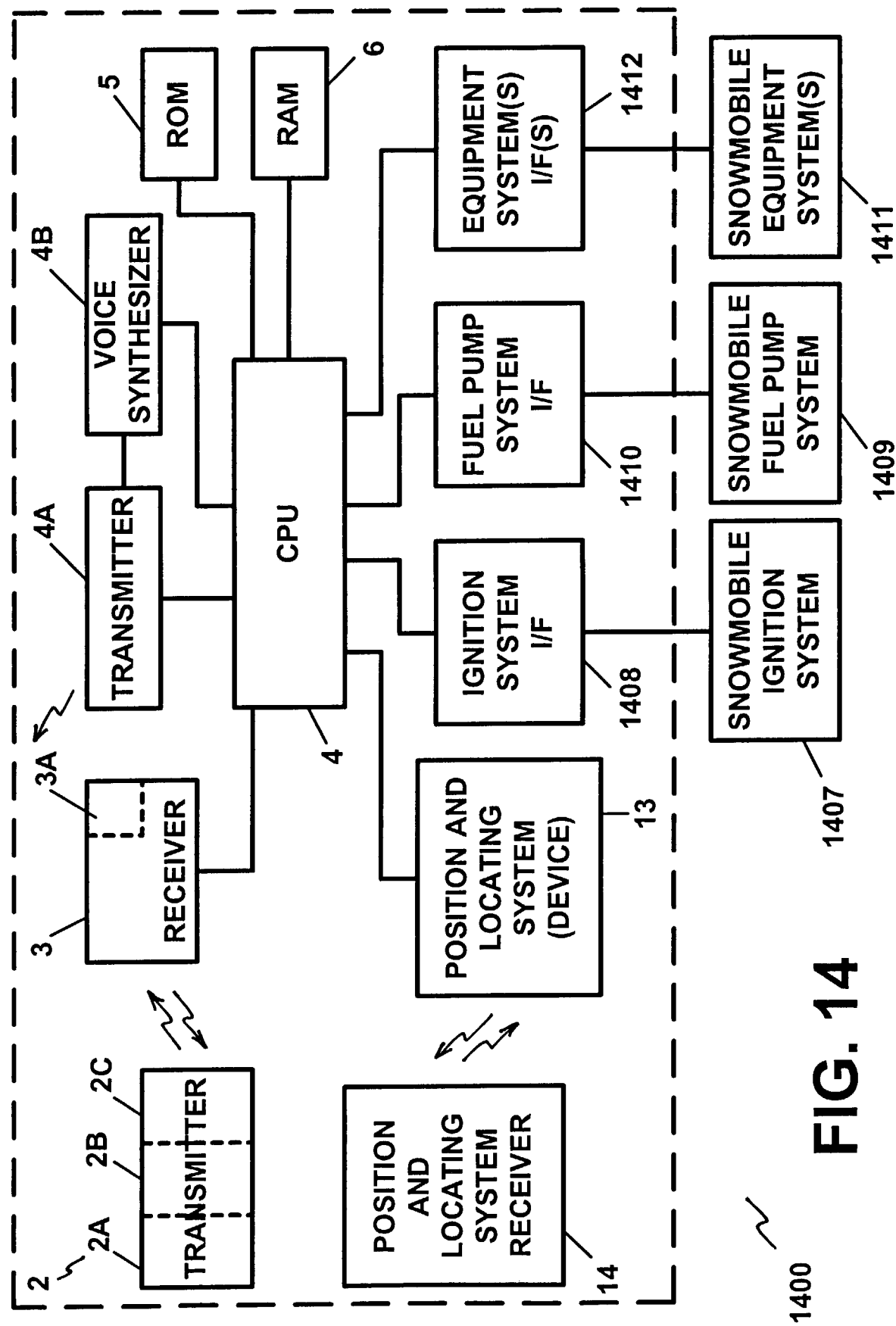
FIG. 14 illustrates another preferred embodiment of the present invention wherein the apparatus is utilized in conjunction with a snowmobile.

In yet another preferred embodiment, the present invention is utilized in conjunction with a snowmobile, jetski or recreational vehicle. FIG. 14 illustrates an another preferred embodiment of the present invention wherein the apparatus is utilized in conjunction with a snowmobile. The apparatus of FIG. 14 is denoted generally by the reference numeral 1400. In FIG. 14, the components of the apparatus 1400 which are common to the apparatus 1 of FIG. 1 are designated by the same reference numerals. In FIG. 14, the CPU 4 is electrically connected and/or linked to the snowmobile ignition system 1407, which is located externally from the apparatus 1. The CPU 4 may or may not be connected and/or linked with the snowmobile ignition system 1407 through an ignition system interface 1408 which is also shown in FIG. 14.

The CPU 4 can transmit signals to, as well as receive signals from, the snowmobile ignition system 1407. In this manner, the CPU 4 and the snowmobile ignition system 1407, can exchange information between each other. In this manner, the CPU 4, upon receiving an appropriate signal from the receiver 3, and upon the completion of the requisite data processing routine, can issue an electrical, an electronic, and/or any other suitable signal, including a digital command signal, to the snowmobile ignition system 1407. This electrical, electronic and/or other suitable signal, or digital command signal, can be one which will disable the snowmobile ignition system 1407 or one which will re-enable or reset the snowmobile ignition system 1407. The CPU 4 can also interrogate the snowmobile ignition system 1407 and/or receive data from the snowmobile ignition system 1407 which is indicative of ignition system status (i.e., whether the snowmobile ignition system 1407 is on or off). In the preferred embodiment, the CPU 4 is also electrically connected and/or linked to the snowmobile fuel pump or supply system 1409 which is also located externally from the apparatus 1400. The CPU 4 may or may not be connected and/or linked with the snowmobile fuel pump system 1409 through a fuel pump system interface 1410 which is also shown in FIG. 14. In the case of an electrical or an electronic fuel pump system, the CPU 4 can provide an electrical, an electronic, and/or other suitable signal, including a digital signal, which will disable or re-enable the snowmobile fuel pump system 1409.

In the case of a mechanical fuel pump system, the CPU 4 can provide an electrical, electronic, and/or other suitable signal, including a digital signal, which will disable or re-enable an electrical valve system, which can be used to control the operation of the mechanical fuel pump system. Whichever the case may be, the CPU 4 will be capable of issuing an electrical, electronic and/or other suitable signal, including a digital signal, to disable or to re-enable the snowmobile fuel pump system 1409. The CPU 4 can also interrogate and/or receive data from the snowmobile fuel pump system 1409 which is indicative of snowmobile fuel pump system status (i.e., whether the snowmobile fuel pump system 1409 is on or off). The CPU 4 can also be electrically connected and/or linked to an appropriate device (not shown) for controlling the operation of a snowmobile exhaust system.

The CPU 4, in the preferred embodiment, is also electrically connected and/or linked to at least one or more of a snowmobile equipment system or system(s) 1411. The snowmobile equipment system(s) 1411 are located externally from the apparatus 1400 and may or may not be connected to the CPU 4, via a snowmobile equipment system interface 1412 which may or may not be required for each one of the variety or multitude of the snowmobile equipment systems which can be utilized in conjunction with the apparatus.

The snowmobile equipment system(s) 1411 can include a loud siren or alarm, which can be located in, or on, the passenger compartment of the snowmobile and, which can produce a loud piercing sound so as to make it unbearable for an intruder to remain inside or on the snowmobile. The snowmobile equipment system(s) 1411 can also include an external siren or alarm, which can produce a loud piercing sound, which can be utilized to draw attention to the snowmobile. The snowmobile equipment system(s) 1411 can also include a horn, which can blare continuously or intermittently, so as to also draw attention to the snowmobile. The snowmobile equipment system(s) 1411 can also include "smart" windows which turn opaque and/or darker depending upon interior lighting.

The snowmobile light system(s), which can include the snowmobile head lights, tail lights or flashers, which can be constantly illuminated or which can blink on and off repeatedly so as to draw attention to the snowmobile, can also be utilized as a snowmobile equipment system 1411. The snowmobile equipment system(s) 1411 can also include a power locking systems and/or devices as appropriate as well as steering mechanism locking devices, locking devices for preventing unauthorized access into or onto the snowmobile, snowmobile track locking devices for preventing movement of the snowmobile and/or locking devices for preventing unauthorized access to the snowmobile engine, so as to prevent any tampering with the apparatus or with other systems and/or components of the snowmobile.

The snowmobile equipment system(s) 1411 can also include any one or more of the known snowmobile anti-theft systems and can also include a snowmobile recovery system or device, including a homing and/or a tracking system, each of which system(s) can be activated by the apparatus of the present invention. The snowmobile equipment system(s) 1411 can include any other equipment systems, including any and all of the above-noted equipment systems described herein for use in conjunction with vehicles, boats and airplanes, including video and/or audio recording equipment and/or intercom equipment and/or any of the herein-described communications systems and/or devices.

The snowmobile equipment system(s) 1411 can include video recording and/or photographing equipment, which can include video recording device(s) and/or a camera(s), such as those utilized in conjunction with personal computers, televisions, digital televisions, interactive televisions, display telephones, video telephones, and/or other communication devices, including personal communication devices, or a still picture camera(s). The video recording device(s) or camera(s) can be digital recording devices or cameras or other suitable devices or cameras, including typical video recording devices or cameras. The video recording device(s) or camera(s), in a preferred embodiment, has associated therewith a transceiver or transmitter/receiver system for transmitting video images recorded by the video recording device(s) or camera(s) to the user or operator and for receiving signals such as, for example, control signals, by which the user or operator can exercise control over the video recording device(s) or camera(s).

The video recording device(s) or camera(s) can be located at any location on the interior of the snowmobile such as, for example, in the dashboard, cabin, cockpit, and/or passenger compartment of the snowmobile so that the user or operator, or any other authorized individual, can observe and/or photograph the operator of the snowmobile, or the occupants and/or cargo of the snowmobile. The video recording(s) or camera(s) can also be located on the snowmobile exterior. The video recording device(s) or camera(s) can have wide angles for maximum angular viewing and can also be pivotable and/or movable. The video device(s) or camera(s) can be moveable along a track or other guiding device or element so that the respective video recording device or camera can be moved along the snowmobile interior or exterior. The video recording device(s) or camera(s) can record and/or transmit the recorded video and/or the picture(s) in real time and/or live. The video recording device(s) or camera(s) can also be equipped with a storage medium, for storing the recorded video and/or picture(s), and a transmitter or transceiver for transmitting the stored video and/or picture(s) to the user or operator at a later time. In this manner, real-time, as well as deferred, video and/or picture(s) transmissions can be provided.

The snowmobile equipment system(s) 1411 can also include audio recording equipment, which can include audio recording device(s) such as microphones and/or tape recorders, such as those utilized in conjunction with personal computers, televisions, digital televisions, interactive televisions, telephones, cellular telephones, display telephones, video telephones, and/or other communication devices, including personal communication devices. The audio recording device(s) can be digital audio recording devices or other suitable audio devices including typical audio recording devices. The audio recording device(s), in a preferred embodiment, has associated therewith a transceiver or transmitter/receiver system for transmitting the recorded audio to the user or operator and for receiving signals such as, for example, control signals, by which the user or operator can exercise control over the audio recording device(s).

The audio recording device(s) can be located at any location on the interior and/or exterior of the snowmobile so that the user or operator, or any other authorized individual, can hear what is transpiring, and/or what has transpired, inside and/or outside the snowmobile. The audio recording device(s) can also be pivotable and/or movable. The audio device(s) or microphone(s) can be moveable along a track or other guiding device or element so that the respective audio recording device or microphone can be moved along the snowmobile interior or exterior. The audio recording device(s) can record and/or transmit the recorded audio in real time and/or live. The audio recording device(s) can also be equipped with a storage medium, for storing the recorded audio, and a transmitter or transceiver for transmitting the stored audio at a later time. In this manner, real-time as well as deferred audio transmissions can be provided.

The snowmobile equipment system 1411 can also include video conferencing devices and/or equipment for enabling the snowmobile occupants and/or users, individuals on the snowmobile, inside or outside the snowmobile, and/or in the vicinity of the snowmobile, to engage in and/or partake in video conferences and/or video conferencing with others via a communication network.

The snowmobile equipment system(s) 1411 can also include the snowmobile battery or batteries, snowmobile fuel cell or fuel cells, battery monitoring equipment, battery charge level, fuel cell output, fuel cell fuel supply, fuel cell temperature measuring device, fuel cell by-product (i.e. water or other by-product, heat, etc.) measuring device, fuel cell output measuring device (i.e. voltmeter, ammeter, current measure, power meter, etc.), an air bag deployment device, an air bag deployment detection device, a dashboard display device, a gyroscope for measuring snowmobile pitch, roll, yaw, or attitude, a gyrocompass for measuring direction of travel, a data recorder and/or an operation data recorder, a navigation system, a navigation control and/or monitoring system, an automatic pilot, a voice recorder, a voice recorder control and/or monitoring device, and/or a control console display device. The equipment system 1411 can also include any of the devices and/or systems described herein as being utilized with vehicles, boats, and/or airplanes.

The snowmobile equipment system(s) 1411 can also include monitoring device(s) for reading and/or monitoring the snowmobile fuel supply, water and/or coolant supply, electrical generator and/or alternator operation, battery charge level, fuel cell electrical power output, fuel cell fuel supply level, fuel cell operating temperature, fuel cell by-product output level, and/or engine or motor temperature level, snowmobile control system and/or any other snowmobile operation and/or system function and/or snowmobile equipment system(s) operating status and/or condition. The monitoring device(s), in a preferred embodiment, has associated therewith a transceiver or transmitter/receiver system for transmitting data and/or information recorded and/or read by the monitoring device(s) to the user or operator and for receiving signals such as, for example, control signals, by which the user or operator can exercise control over the monitoring device(s).

The snowmobile equipment system(s) 1411 can also include communication devices, such as two-way radios, radios, televisions, navigational devices and/or equipment, fire extinguishing equipment, radar devices and equipment, emergency and/or distress signal equipment, and any electrical, electronic and/or otherwise activated appliances and/or equipment which can be utilized in a snowmobile. Appliances can include household appliances such as refrigerators, stoves, air conditioners, ovens, microwave ovens, lighting systems, etc. The snowmobile equipment system(s) 1411 can also include electrical and/or electronically controlled dead bolt locking devices for use on doors, windows, hood, trunk and/or in conjunction with any other opening components and/or components for gaining access to various locations on and/or in, and/or any systems, devices, and/or components of, the snowmobile.

The snowmobile equipment system(s) 1411 can also include a wheel and/or brake locking device or mechanism. The snowmobile equipment systems can also include hydraulic and/or pneumatic equipment and/or other equipment, including winches, etc, which can be remotely activated as described herein. The snowmobile equipment system(s) 1411 can also include snowmobile communication devices including, but not limited to radios, televisions and entertainment devices, two-way radios, cellular telephones and equipment, etc. The snowmobile equipment system(s) 1411 can also include systems for detecting failures in any of the above, or any other, equipment systems and report such failure(s) to the user or operator whether he or she is operating the snowmobile or is not in the snowmobile and/or for reporting such failures to a central office.

The snowmobile equipment system(s) 1411 can also include the snowmobile command computer which is utilized to control and/or to the various electronic, electrical, mechanical, and/or electromechanical systems, components, devices, of the snowmobile. The command computer can control and monitor any of the systems, components, and/or devices, of the snowmobile, including, but not limited to, the ignition system, the fuel system, fuel injection system, electrical systems for ignition, lights, horn, door locks, exhaust system, windows, fuel pump, oil pump, engine timing device, battery, fuel cells, fuel supply device, video recording equipment, audio recording equipment, snowmobile integrated positioning device, tire pressure indicator, and/or any other system, device, or component which can be controlled and/or monitored by the command computer.

The command computer can transmit control signals and/or status request signals to any of the herein-described snowmobile systems, components and/or devices so as t respectively control and/or monitor the operating status and/or condition of the respective system, component and/or device. The command computer can also receive signals from the respective systems, devices and/or components, with said signals containing data and/or information concerning the operating status, operating state, and/or condition, of the respective systems, devices and/or components. The command computer can be utilized so as to control, monitor, and/or provide diagnostic information for any of the snowmobile systems, components, and/or devices, which are controlled and/or monitored with the command computer.

The snowmobile equipment system(s) 1411 can also include wear and/or usage indicators and/or detection devices which can be connected with either the command computer and/or the central processing computer and which can be utilized so as to monitor the wear and/or usage of any of the herein-described electronic, electrical, mechanical, and/or electromechanical, systems, devices, and/or components.

The snowmobile equipment system(s) 1411 can also include automatic control devices for controlling and/or monitoring snowmobile systems and/or devices for snowmobile movement and/or motion, such as, but not limited to, snowmobile transmission system for controlling snowmobile forward and/or reverse direction of movement, snowmobile acceleration system for controlling speed of movement, snowmobile braking system for controlling snowmobile braking, snowmobile steering system for steering the snowmobile, and/or any other system and/or component for controlling and/or for effecting remote-control over the movement and/or the motion of the snowmobile.

The snowmobile equipment system(s) 1411 can also include an automatic pilot device which can be utilized to drive the snowmobile automatically and/or to control any one or more of the snowmobile's direction of travel or movement, speed of travel or movement, forward movement, reverse movement, snowmobile turning or steering, engine operation, directional light signals, side movement, and/or stopping or parking. The automatic pilot can also control or monitor any and/or all of the electrical systems, electronic systems, mechanical systems, hydraulic systems, braking systems, etc., of the snowmobile. In any and/or all of the embodiments described herein the automatic pilot can be programmed to operate and/or to control the operation of the snowmobile. The automatic pilot can utilize a pre-stored travel program to control the travel of the snowmobile. A user can also upload a travel program to the automatic pilot during the operation or use of the present invention.

The automatic pilot can be utilized in conjunction with a global positioning device, the vehicle position and locating device (system) 13, and a navigation system with or without a map database, in order to automatically control, drive, and/or maneuver, the snowmobile from a location to a destination.

The snowmobile equipment system(s) 1411 can also include a fuel draining system or dumping system, a noise cancellation device or noise cancellation system, a parachute, a parachute deployment system and/or a snowmobile navigation system.

The snowmobile equipment system(s) 1411 can also include a color video camera, an acoustic sensor or acoustic sensing device, a door sensing device which can be utilized to sense an open state or a closed state of a door or doors, and/or a window sensing device which can be utilized to sense an open state or a closed state of a window or windows.

The snowmobile equipment system(s) 1411 can also include a power "on" sensor or power "on" sensing device for sensing a power "on" condition for any of the snowmobile equipment system(s) 1411, snowmobile systems, snowmobile equipment, snowmobile devices, snowmobile components, and/or other snowmobile systems, described herein. The snowmobile equipment system(s) 1411 can also include a power "off" sensor or power "off" sensing device for sensing a power "off" condition for any of the snowmobile equipment system(s) 1411, snowmobile systems, snowmobile equipment, snowmobile devices, snowmobile components, and/or other snowmobile systems, described herein.

The snowmobile equipment system(s) 1411 can also include a temperature sensor or temperature sensing device and/or a water sensor or a water sensing device. The snowmobile equipment system(s) 1411 can also include a water pump or water pumping device for pumping water out of the snowmobile.

The snowmobile equipment system(s) 1411 can also include a motion sensor for detection the motion or movement of individuals or objects inside the snowmobile, outside the snowmobile, and/or in the vicinity of the snowmobile.

The snowmobile equipment system(s) 1411 can also include a guidance system. The snowmobile equipment system(s) 1411 can also include a monitoring device or monitoring system for measuring and/or monitoring any one or more of snowmobile attitude, pitch, roll, yaw, speed, erratic movement, sudden movement in any direction, sudden movement or jolts in any direction inconsistent with normal or expected movement or operation. The monitoring device or monitoring system can detect sudden changes in normal vehicle operation, abnormal vehicle behavior, abnormal or erratic snowmobile behavior (i.e. intentional crashing of the vehicle, loss of control, deviation from an expected course of travel, etc.), and/or a loss of control condition. The monitoring device or monitoring system can detect sudden change(s) in snowmobile movement, erratic behavior, and/or abnormal behavior, and generate and transmit a signal to any one or more of the server computer 510, the server computer 952, the computer 970, and/or the home or personal computer or communication device 150, to alert an authorized user of the sudden change(s) in vehicle movement, erratic behavior, and/or abnormal behavior. Thereafter, a user or operator can take control of the snowmobile from a remote location via any one or more of the home or personal computer or communication device 150, the server computer 510, the server computer 952, and/or the computer 970.

In another preferred embodiment, the snowmobile equipment system(s) 1411 can also include a snowmobile operation data monitoring device which monitors snowmobile operation such as snowmobile speed, the status of any of the snowmobile systems (i.e. ignition system, fuel pump system, positioning system), and/or any of the snowmobile equipment systems described herein, direction of travel, attitude of travel, video inside, outside, and/or at, the snowmobile, audio inside, outside, and/or at, the snowmobile, activity inside, outside, and/or at, the snowmobile, and/or any other electrical, mechanical, electromechanical, hydraulic, and/or other system, equipment system, device, component, and/or appliance.

The snowmobile operation data monitoring device can be connected to, and/or linked with, any of the herein-described systems, equipment systems, subsystems, devices, components, and/or appliances, including, but not limited to, speedometer, cruise control device, gyroscope, gyrocompass, directional light device(s), light system(s), door lock system(s), attitude measuring device(s), ignition system, braking system, electronic system(s), hydraulic system(s), video recording device(s) or camera(s), audio recording device(s) or microphone(s), and/or any other systems, equipment systems, devices, components, and/or appliances, described herein and/or otherwise, for controlling and/or monitoring the operation of same and/or for monitoring activity at the snowmobile.

The snowmobile operation data monitoring device can operate and/or function in a manner similar to, and/or analogous to, an aircraft flight data recorder in monitoring and/or recording operation data. In addition, the snowmobile operation data monitoring device can receive any and/or all of the data monitored and transmit same to the any of the herein-described transmitters 2, home and/or personal computers 150, and/or any of the server computers 510, computers 970, and/or server computers 952, and/or any other computers and/or communication devices, which can be utilized to receive this data and/or information. In this manner, the snowmobile operation and/or movement can be monitored by, and/or at, any of the herein-described transmitters, home and/or personal computers, computers, and/or server computers.

The snowmobile operation data monitoring device can transmit any and/or all snowmobile operation data to a respective transmitter(s), home and/or personal computer(s), computer(s), and/or server computer(s), in real-time, live, in a time-delayed manner, and/or in any other appropriate manner. The snowmobile operation data monitoring device can also record and/or store any of the operation data monitored thereby.

Any data and/or information which is received from the snowmobile operation data monitoring device can be stored at any of the herein-described transmitters 2, home and/or personal computers 150, and/or any of the server computers 510, computers 970, and/or server computers 952, and/or any other computers and/or communication devices, which can be utilized to receive this data. The data and/or information which is received from the snowmobile operation data monitoring device can be stored in any suitable manner which can typically involve storing same digitally, storing same digitally in an overwriting manner, so that, for example, the data can be stored and/or overwritten for a given time period and overwriting same, storing same in a looping and/or re-circulating storage medium or tape, storing same in a manner utilized in conjunction with, and/or similar to, the manner in which data and/or information is stored in aircraft flight data recorders and/or aircraft cockpit voice recorders.

The snowmobile operation data monitoring device can be accessed by any of the herein-described transmitters, home and/or personal computers, computers, and/or server computers, and/or the individuals utilizing same, in order to monitor and/or ascertain snowmobile operation, and/or video and/or audio activity inside, outside, and/or at, the snowmobile, at any time and/or to retrieve and/or to access operating data regarding snowmobile operation and/or movement, and/or video and/or audio activity inside, outside, and/or at, the snowmobile, which has been recorded and/or stored by the snowmobile operation data monitoring device. For example, snowmobile operating data and/or information, along with video and/or audio information inside, outside, and/or at the snowmobile, can be accesses and/or obtained.

The snowmobile operation data monitoring device can be utilized to monitor snowmobile operation, to investigate a malfunction, to diagnosis a malfunction or other problem, to investigate a cause of an accident, and/or can be utilized for any other purpose.

In a preferred embodiment, the snowmobile operation data monitoring device can be programmed to monitor snowmobile operation data and/or to transmit same to any respective transmitter, home and/or personal computer, computer, central computer, and/or server computer, continuously, at certain times, and/or under certain conditions, such as a detection by the CPU 4 and/or by the snowmobile operation data monitor.

The snowmobile operation data monitoring device can also be activated remotely by any individual via any respective transmitter, home and/or personal computer, computer, central computer, and/or server computer, and/or user of same. The snowmobile operation data monitoring device can also be activated by a snowmobile operator and/or occupant and/or via any other individual.

The data and/or information obtained from the snowmobile operation data monitoring device can be stored at any of the respective transmitters, home and/or personal computers, computers, central computers, and/or server computers, for accessing at any time. The data and/or information can be stored at the snowmobile operation data monitoring device, and/or at any of the herein-described and respective transmitters, home and/or personal computers, computers, central computers, and/or server computers, in a "loop tape" manner and/or digitally in a looping and/or data overwriting manner so that, for example, only a most recent time period is recorded.

The snowmobile operation data monitoring device can be utilized in conjunction with the present invention so as to obtain, to record, and/or access, and/or analyze, snowmobile operation data at the snowmobile and/or from a location remote from the snowmobile, in a network environment, thereby facilitating the monitoring and/or the analysis of snowmobile operation data.

In any and/or all of the embodiments described herein, the present invention can facilitate the transmission of data and/or information regarding the operation of any of the herein described vehicles, motor vehicles, boats, marine vessels, airplanes, aircraft, and/or recreational vehicles, and/or any of the respective systems, equipment systems, subsystems, devices, components, and/or appliances thereof, thereby dispensing with the need to obtain this data and/or information from data recorders located in, at, or on, the respective vehicles, motor vehicles, boats, marine vessels, airplanes, aircraft, and/or recreational vehicles. In this manner, for example, data and/or information normally recorded and/or store on a flight data recorder and/or a cockpit voice recorder can be obtained and/or stored on, or at, any of the herein-described transmitters 2, home and/or personal computers 150, and/or any of the server computers 510, computers 970, and/or server computers 952, described herein. In this manner, the need to recover a respective data recorder from the respective vehicle, motor vehicle, boat, marine vessel, airplane, aircraft, and/or recreational vehicle, can be rendered unnecessary and/or can be dispensed with entirely.

As noted above, the use of any one or more of the snowmobile equipment system(s) 1411, and their associated interface devices 1412, can be optional. Further, as described above, wireless devices can also be utilized.

The snowmobile equipment system(s) 1411 receives signals from the CPU 4, which signals serve to activate or de-activate, or vice versa, whichever the case can be, the respective snowmobile equipment system(s) which are utilized in conjunction with the apparatus 1400. The snowmobile equipment system(s) 1411 can also include any other suitable snowmobile system or equipment feature which can be utilized to draw attention to the snowmobile and/or in some other way impede the snowmobile theft. It should be noted that any of the interface devices 1408, 1410 and 1412 can include any of the requisite interfacing circuitry which can be necessary to facilitate CPU 4 control over the respective systems which can be utilized.

The apparatus 1400 also includes a position and locating device 13 which can be utilized in order to determine the position and/or the location of the snowmobile. The position and locating device 13 can be utilized so as to determine the position of the snowmobile anywhere in the world and provide for the transmission of position and/or location data to any appropriate system receiver so that the snowmobile can be located and/or tracked and recovered. In the preferred embodiment, the position and locating device 13 includes and utilizes a global positioning device and an associated transmitter for transmitting position and/or location data to the authorized user or operator and/or to an authorized office or agency authorized to receive and/or to monitor such data transmissions.

The apparatus 1400 of FIG. 14 also includes a position and locating system receiver 14, which can be employed by the authorized user or operator and/or by the authorized office or agency, for receiving and/or processing the data which is transmitted from the snowmobile position and locating device 13 as described above. The apparatus 1 can also comprise a user interface device (not shown).

The apparatus and method of the preferred embodiment of FIG. 14 can be utilized and/or operates in the same or in a similar and/or analogous manner as described herein and/or consistent with the description of the various embodiments and features of the present invention.

The present invention can be utilized in order to allow a user to remotely control the operation, movement, direction of movement or travel, propulsion, and/or travel, of the snowmobile via the computer or communication device 150 and any one or more of the server computer 510, the server computer 952, and/or the computer 970. In this manner, the apparatus and method of the present invention can be utilized in order to remotely control the operation, movement, direction of movement or travel, propulsion, and/or travel, of the snowmobile in a network environment and/or to control, maneuver, drive, or operate, the snowmobile from a remote location, in a network environment. The user can also disable any and/or all of the snowmobile operating and/or operational control systems in order to facilitate and/or to enable the user to take and have control over the snowmobile in order to allow the user to remotely control, drive, or maneuver, the snowmobile via the home or personal computer or communication device 150 and any one or more of the server computer 510, the server computer 952, and/or the computer 970.

The apparatus and method of the present invention can also provide for the immediate, and/or for the deferred control, activation, deactivation, programming, monitoring and/or security of any one or more of the snowmobile and/or recreational vehicle systems, equipment, devices, appliances, etc., in the same, similar and/or analogous manner as described above in conjunction with the various embodiments of the present invention.

Although the present invention has been described herein as being utilized in conjunction with a snowmobile, it is noted that the present invention can also be utilized in conjunction with any type of recreational vehicle, including jetskis, scooters, motorcycles, minibikes, hot-air balloons, go-carts, mopeds, etc, manned or unmanned, regardless of size, shape or form, private, commercial and/or military. The recreational vehicle equipment systems can also include guns and/or weapon systems and/or self-defense systems and/or electronic warfare systems, if desired, and especially when used in law enforcement and/or military applications.

The present invention can be utilized in conjunction with a motor home, a mobile home and/or a camper as the present invention can be utilized to provide control, monitoring and/or security functions pertaining to motor vehicle equipment and home systems, equipment and appliances.

Figure 15:
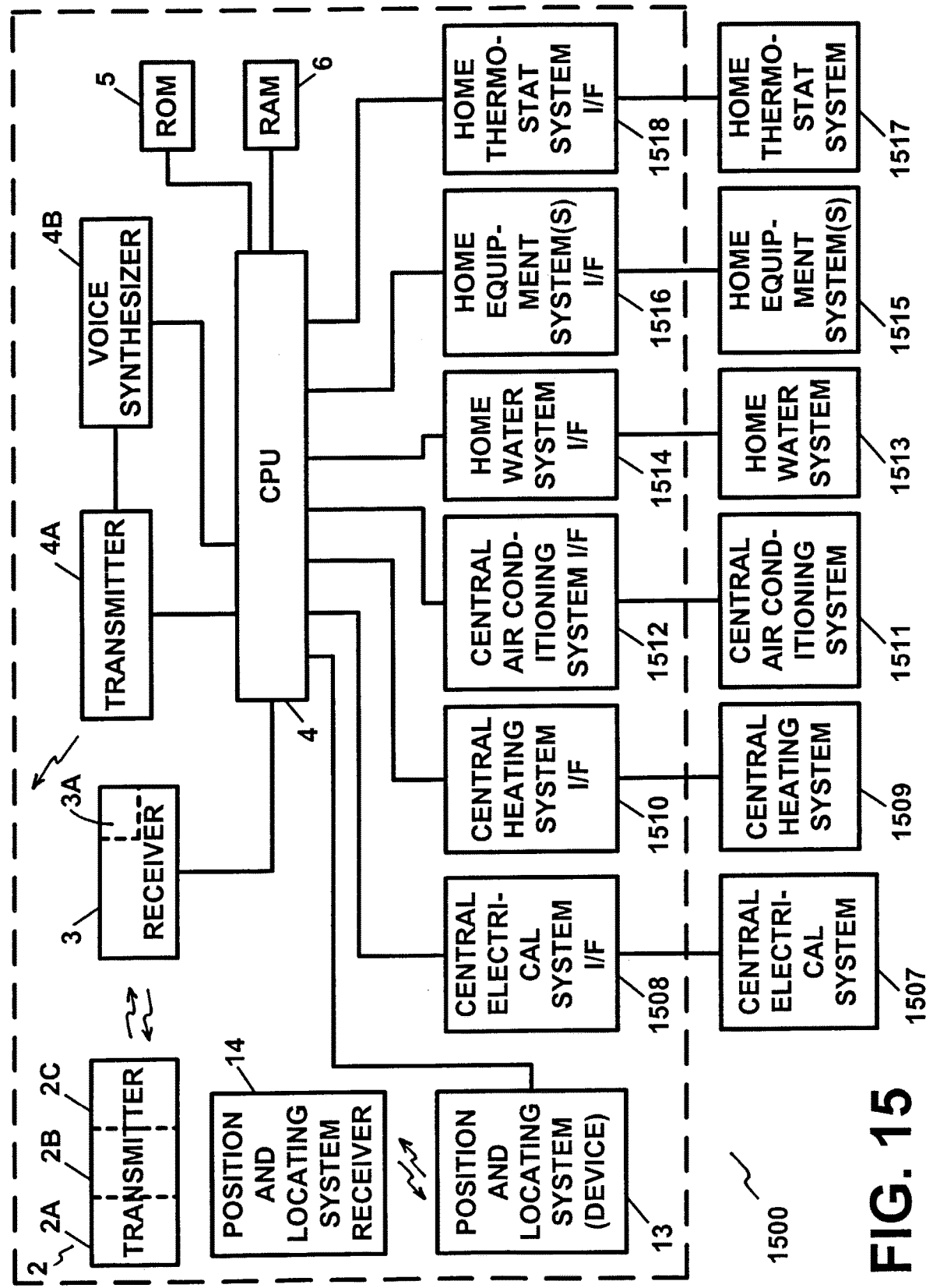
FIG. 15 illustrates another preferred embodiment of the present invention wherein the apparatus and method is utilized in conjunction with a home or residential premises control system.

In still another preferred embodiment, the present invention can be utilized in conjunction with a residential premises, residential building and/or a home or a household control system. FIG. 15 illustrates an another preferred embodiment of the present invention wherein the apparatus and method is utilized in conjunction with a home control system. The apparatus of FIG. 15 is denoted generally by the reference numeral 1500. It is understood that, while the embodiment of FIG. 15 is illustrated and described in conjunction with a home or a household system, the apparatus 1500 can be utilized in any residential premises and/or any residential building.

In FIG. 15, the components of the apparatus 1500 which are common to the apparatus 1 of FIG. 1 are designated by the same reference numerals. In FIG. 15, the CPU 4 is electrically connected and/or linked to the home and/or household central electrical system 1507, which is located externally from the apparatus 1500. The CPU 4 may or may not be connected and/or linked with the home central electrical system 1507 through a central electrical system interface 1508 which is also shown in FIG. 15.

The CPU 4 can transmit signals to, as well as receive signals from, the home central electrical system 1507. In this manner, the CPU 4 and the home central electrical system 1507, can exchange information between each other. In this manner, the CPU 4, upon receiving an appropriate signal from the receiver 3, and upon the completion of the requisite data processing routine, can issue an electrical, an electronic, and/or any other suitable signal, including a digital command signal, to the home central electrical system 1507. This electrical, electronic and/or other suitable signal, or digital command signal, can be one which will disable the home central electrical system 1507 or one which will re-enable or reset the home central electrical system 1507. The CPU 4 can also interrogate the central electrical system 1507 and/or receive data from the central electrical system 1507 which is indicative of central electrical system status (i.e., whether the central electrical system 1507, or any portion thereof, is on or off).

In the preferred embodiment, the CPU 4 is also electrically connected and/or linked to the home central heating system 1509 which is also located externally from the apparatus 1500. The CPU 4 may or may not be connected and/or linked with the home central heating system 1509 through a central heating system interface 1510 which is also shown in FIG. 15. The CPU 4 is capable of issuing an electrical, electronic and/or other suitable signal, including a digital signal, to disable or to re-enable the home central heating system 1509. The CPU 4 can also interrogate and/or receive data from the home central heating system 1509 which is indicative of home central heating system status (i.e., whether the central heating system 1509, or any portion thereof, is on or off).

In the preferred embodiment, the CPU 4 is also electrically connected and/or linked to the home central air conditioning system 1511 which is also located externally from the apparatus 1500. The CPU 4 may or may not be connected and/or linked with the home central air conditioning system 1511 through a central air conditioning system interface 1512 which is also shown in FIG. 15. The CPU 4 is capable of issuing an electrical, electronic and/or other suitable signal, including a digital signal, to disable or to re-enable the home central air conditioning system 1511. The CPU 4 can also interrogate and/or receive data from the home central air conditioning system 1511 which is indicative of home central air conditioning system status (i.e., whether the central air conditioning system 1511, or any portion thereof, is on or off).

The CPU 4 can also be electrically connected and/or linked to the home water system 1513 which is also located externally from the apparatus 1500. The CPU 4 may or may not be connected and/or linked with the home water system 1513 through a home water system interface 1514 which is also shown in FIG. 15. The home water system interface 1514, in the preferred embodiment, is an electrically controlled water shut-off valve(s) or similar device(s). The CPU 4 is capable of issuing an electrical, electronic and/or other suitable signal, including a digital signal, to disable or to re-enable the home water system 1513. The CPU 4 can also interrogate and/or receive data from the home water system 1513 which is indicative of the state of the home water system 1513 (i.e. whether the home water system 1513, or any portion thereof, is on or off). The home water system 1513 can then be controlled (i.e. turned on or off) and/or adjusted by the user or operator.

The CPU 4 can also be electrically connected and/or linked to the home thermostat or environmental control system 1517 so as to control and/or monitor home interior temperature. The CPU 4 may or may not be connected and/or linked with the home thermostat system 1517 through a home thermostat system interface 1518 which is also shown in FIG. 15. The CPU 4 is capable of issuing an electrical, electronic and/or other suitable signal, including a digital signal, to disable or to re-enable the home thermostat system 1517.

The CPU 4 can also interrogate and/or receive data from the home thermostat system 1517 which is indicative of the state of the home thermostat system 1517 (i.e. home interior temperature and/or whether the temperature of the home interior, or any portion thereof, is too hot, too cold, or acceptable). The home thermostat system 1517 can then be controlled and/or adjusted by the user or operator. In this manner, the home thermostat system 1517 can then be adjusted and/or controlled by the user or operator via the apparatus 1500. The home thermostat system 1517 can be connected and/or linked to the home central heating system 1509 and/or to the home central air conditioning system 1511 so as to activate, de-activate, set and/or control the operation of these systems, as necessary, in order to, and so as to, achieve the desired temperature and/or environmental conditions in the home.

The CPU 4, in the preferred embodiment, is also electrically connected and/or linked to at least one or more of a home equipment system(s) 1515. The home equipment system(s) 1515 are located externally from the apparatus 1500 and may or may not be connected and/or linked to the CPU 4, via a home system equipment system or systems interface 1516 which may or may not be required for each one of the variety or multitude of the home equipment system(s) 1515 which can be utilized in conjunction with the apparatus 1500.

The home equipment system(s) 1515 can include a home anti-theft and/or burglary alarm system, a loud siren or alarm, which can be located in the interior of the home, which can produce a loud piercing sound so as to make it unbearable for an intruder to remain inside the home, an exterior siren or alarm, which can produce a loud piercing sound, which can be utilized to draw attention to the home, and exterior lighting system(s) and interior lighting systems, which lighting systems can be turned on or turned off at the user or operator's discretion and which can be controlled to blink on and off to draw attention to the home. The home equipment system(s) 1515 can also include "smart" windows which turn opaque and/or darker depending upon interior lighting.

The home equipment system(s) 1515 can also include a electrical and/or electronically controlled locking devices for doors and/or windows, including electrical and/or electronic dead-bolt locking systems and devices, electrical systems for controlling electrical circuits or systems room-by-room, device-by-device, and/or appliance-by-appliance. The home equipment system(s) 1515 can also include devices for controlling any one or more of the electrical circuits, such as circuits controlled by fuses, circuit breakers or equivalent devices. The home equipment system(s) 1515 can also include devices for controlling and/or monitoring hot water heaters, garage door openers, lawn sprinkler systems, electric fences and/or fencing, in-ground or above-ground pool equipment, filters and/or heaters, home central water valve, individual room water valve, home fire detector equipment and home fire extinguishment equipment. The home equipment system(s) 1515 can also include power door and window closing, locking and opening equipment. The home equipment system(s) 1515 can also include "smart" windows and/or "smart" glass which can turn opaque depending upon the amount and/or intensity of interior lighting.

The home equipment system(s) 1515 can also include any and all of a wide variety of home appliances such as televisions, telephones, telephone answering machines, alarm systems, VCRs, stoves, ovens, microwave ovens, door bells, individual lights or lamps, blenders, toasters, personal computers, word processors, stereos, radios, and any other home appliance and/or device which is electrically and/or electronically activated and/or controllable.

The home equipment system(s) 1515 can also include video recording and/or photographing equipment, which can include video recording device(s) and/or a camera(s), such as those utilized in conjunction with personal computers, televisions, digital televisions, interactive televisions, display telephones, video telephones, and/or other communication devices, including personal communication devices, or a still picture camera(s). The video recording device(s) or camera(s) can be digital recording devices or cameras or other suitable devices or cameras, including typical video recording devices or cameras. The video recording device(s) or camera(s), in a preferred embodiment, has associated therewith a transceiver or transmitter/receiver system for transmitting video images recorded by the video recording device(s) or camera(s) to the owner or occupant and for receiving signals such as, for example, control signals, by which the owner or occupant can exercise control over the video recording device(s) or camera(s).

The video recording device(s) or camera(s) can be located at any location on the interior of the home such as, for example, in any room or rooms of the home so that the owner or occupant, or any other authorized individual, can observe and/or photograph any portions and/or rooms in the interior of the home, or the occupants and/or anything which can be located and/or stored in the home. The video recording device(s) or camera(s) can also be located on the exterior of the home so that the owner or occupant, or any other authorized individual, can observe and/or photograph the exterior of the home or residential premises, or portion thereof, or the individuals or objects and/or anything which can be present, located and/or stored on the premises of home and/or residential premises.

The video recording device(s) or camera(s) can have wide angles for maximum angular viewing and can also be pivotable and/or movable. The video device(s) or camera(s) can be moveable along a track or other guiding device or element so that the respective video recording device or camera can be moved along the premises interior or exterior. The video recording device(s) or camera(s) can record and/or transmit the recorded video and/or the picture(s) in real time and/or live. The video recording device(s) or camera(s) can also be equipped with a storage medium, for storing the recorded video and/or picture(s), and a transmitter or transceiver for transmitting the stored video and/or picture(s) to the owner or occupant at a later time. In this manner, real-time, as well as deferred, video and/or picture(s) transmissions can be provided.

The home equipment system(s) 1515 can also include audio recording equipment, which can include audio recording device(s) such as microphones and/or tape recorders, such as those utilized in conjunction with personal computers, televisions, digital televisions, interactive televisions, telephones, cellular telephones, display telephones, video telephones, and/or other communication devices, including personal communication devices. The audio recording device(s) can be digital audio recording devices or other suitable audio devices including typical audio recording devices. The audio recording device(s), in a preferred embodiment, has associated therewith a transceiver or transmitter/receiver system for transmitting the recorded audio to the owner or occupant and for receiving signals such as, for example, control signals, by which the owner or occupant can exercise control over the audio recording device(s).

The audio recording device(s) can be located at any location on the interior and/or exterior of the home and/or residential premises so that the owner or occupant, or any other authorized individual, can hear what is transpiring, and/or what has transpired, inside and/or outside the home and/or residential premises. The audio recording device(s) can also be pivotable and/or movable. The audio recording device(s) microphone(s) can be moveable along a track or other guiding device or element so that the respective audio recording device or microphone can be moved along the premises interior or exterior. The audio recording device(s) can record and/or transmit the recorded audio in real time and/or live. The audio recording device(s) can also be equipped with a storage medium, for storing the recorded audio, and a transmitter or transceiver for transmitting the stored audio at a later time. In this manner, real-time as well as deferred audio transmissions can be provided.

The home equipment system(s) 1515 can also include an intercom system or device or a telephone, cellular, digital or otherwise for providing a means by which to allow the user or operator, or other authorized operator, to communicate with the persons present in, or occupants of, the home. The home equipment system(s) 1515 can also include video conferencing devices and/or equipment for enabling the vehicle occupants and/or individuals inside the vehicle, outside the vehicle, and/or in the vicinity of the vehicle, to engage in and/or partake in video conferences and/or video conferencing with others via a communication network.

The home equipment system 1515 can also include the premises battery or batteries, premises fuel cell or fuel cells, battery monitoring equipment, battery charge level, fuel cell output, fuel cell fuel supply, fuel cell temperature measuring device, fuel cell by-product (i.e. water or other by-product, heat, etc.) measuring device, fuel cell output measuring device (i.e. voltmeter, ammeter, current measure, power meter, etc.).

The home equipment system(s) 1515 can also include monitoring device(s) for reading and/or monitoring the status and/or condition of any of the home fuel supply, water supply, electrical generator and/or alternator operation, water usage, heat and/or air conditioning usage, electricity usage, gas and/or oil or other fuel usage, battery charge level, electrical system charge level, fuel cell electrical power output, fuel cell fuel supply level, fuel cell operating temperature, fuel cell by-product output level, telephone usage and charges, appliance usage, etc, a home control system and/or any other home operation and/or system function and/or home equipment system(s) operating status and/or condition. The monitoring device(s), in a preferred embodiment, can have associated therewith a transceiver or transmitter/receiver system for transmitting data and/or information recorded and/or read by the monitoring device(s) to the user or operator and for receiving signals such as, for example, control signals, by which the user or operator can exercise control over the monitoring device(s).

The home equipment system(s) 1515 can also include communication devices, such as two-way radios, radios, televisions, fire extinguishing equipment, emergency and/or distress signal equipment, and any electrical, electronic and/or otherwise activated appliances and/or equipment which can be utilized in a home. Appliances can include household appliances such as refrigerators, stoves, air conditioners, ovens, microwave ovens, lighting systems, etc. The home equipment system(s) 1515 can also include electrical and/or electronically controlled dead bolt locking devices for use on doors, windows, and/or in conjunction with any other opening components and/or components for gaining access to various locations on and/or in, and/or any systems, devices, and/or components of, the home and/or residential premises.

The home equipment system(s) 1515 can also include a home automatic control device or home automatic control system which can be utilized to control any one or more of the herein-described home systems and/or any of the herein-described home equipment systems 1515 automatically. In this manner, the home automatic control device or home automatic control system can automatically control the operation of any one or more of the home systems and/or home equipment systems 1515. The home automatic control device or home automatic control system can also control or monitor any and/or all of the systems, electrical systems, electronic systems, mechanical systems, hydraulic systems, appliances, components, and/or device, of the home or residential premises.

In any and/or all of the embodiments described herein, the home automatic control device or home automatic control system can be programmed to operate and/or to control the operation of the home or residential premises. The home automatic control device or home automatic control system can utilize a pre-stored program to control the operation of the home or residential premises and any of the home systems and/or home equipment systems 1515 described herein. A user can also upload a program to the home automatic control device or home automatic control system during the operation or use of the present invention.

The home equipment system(s) 1515 can also include a noise cancellation device or noise cancellation system for eliminating noise in or about the home or residential premises.

The home equipment system(s) 1515 can also include a color video camera, an acoustic sensor or acoustic sensing device, a door sensing device which can be utilized to sense an open state or a closed state of a door or doors, and/or a window sensing device which can be utilized to sense an open state or a closed state of a window or windows.

The home equipment system(s) 1515 can also include a power "on" sensor or power "on" sensing device for sensing a power "on" condition for any of the home equipment system(s) 1515, home systems, home equipment, home devices, home components, and/or other home systems, described herein. The home equipment system(s) 1515 can also include a power "off" sensor or power "off" sensing device for sensing a power "off" condition for any of the home equipment system(s) 1515, home systems, home equipment, home devices, home components, and/or other home systems, described herein.

The home equipment system(s) 1515 can also include a temperature sensor or temperature sensing device and/or a water sensor or a water sensing device. The home equipment system(s) 1515 can also include a water pump or water pumping device for pumping water out of the home or residential premises.

The home equipment system(s) 1515 can also include a motion sensor for detection the motion or movement of individuals or objects inside the home or residential premises, outside the home or residential premises, and/or in the vicinity of the home or residential premises.

The home equipment system(s) 1515 can also include hydraulic and/or pneumatic equipment and/or other equipment, including winches, etc, which can be remotely activated as described herein. The home equipment system(s) 1515 can also include home communication devices including, but not limited to radios, televisions and entertainment devices, two-way radios, cellular telephones and equipment, etc. The home equipment system(s) 1515 can also include systems for detecting failures in any of the herein-described equipment systems and report such failure(s) to the user or operator whether he or she is in the home or not in the home and/or for reporting such failures to a central office.

The home equipment system(s) 1515 can also include the home and/or residential premises command computer which is utilized to control and/or to the various electronic, electrical, mechanical, and/or electromechanical systems, components, devices, of the home and/or residential premises. The command computer can control and monitor any of the herein-described systems, components, and/or devices, of the home and/or residential premises which can be controlled and/or monitored by the command computer.

The command computer can transmit control signals and/or status request signals to any of the herein-described home and/or residential premises systems, components, and/or devices, so as to respectively control and/or monitor the operating status and/or condition of the respective system, component, and/or device. The command computer can also receive signals from the respective systems, devices, and/or components, with said signals containing data and/or information concerning the operating status, operating state, and/or condition, of the respective systems, devices, and/or components. The command computer can be utilized so as to control, monitor, and/or provide diagnostic information for any of the home and/or residential premises systems, components, and/or devices, which are controlled and/or monitored with the command computer.

The home equipment system(s) 1515 can also include wear and/or usage indicators and/or detection devices which can be connected with either the command computer and/or the central processing computer and which can be utilized so as to monitor the wear and/or usage of any of the herein-described electronic, electrical, mechanical, and/or electro-mechanical, systems, devices, and/or components.

The home equipment system(s) 1515 can also include automatic control devices for controlling and/or monitoring home and/or residential premises systems, devices, and/or components, for home or residential premises maintenance and/or upkeep.

In the case of commercial, industrial, and/or farm and/or construction equipment, drilling equipment, mining equipment, excavating equipment, and/or other commercial equipment, the home equipment system(s) 1515 can also include loading and/or unloading mechanisms, cutting mechanisms, bailing mechanisms, winches and any and all of the various systems and devices utilized in conjunction with these premises and/or equipment.

As noted above, the use of any one or more of the home equipment system(s) 1515 and/or appliances or devices and their associated interface devices 1516, can be optional. The interface devices 1516 can be wireless devices or modules which need not be directly connected to the CPU 4 or to its respective equipment system. In this regard, hard-wired connections are not necessary. In the case of wireless interface devices or modules 1516, corresponding wireless technology and/or systems can be utilized to provide for the wireless control and operation of the respective equipment(s).

In the case of a mobile home, the apparatus 1500 can also comprise a position and locating device 13 which can be utilized in order to determine the position and/or the location of the mobile home. The mobile home position and locating device 13 can be utilized so as to determine the position of the mobile home anywhere in the world and provide for the transmission of position and/or location data to any appropriate system receiver so that the mobile home can be located and/or tracked and recovered. In a preferred embodiment, the mobile home position and locating device 13 includes and utilizes a global positioning device and an associated transmitter for transmitting position and/or location data to the authorized user, operator and/or authorized individual.

The apparatus 1500 can also comprise a mobile home position and locating system receiver 14, which can be employed by the authorized user, operator and/or authorized individual, for receiving and/or processing the data which is transmitted from the position and locating device 13 as described in the preferred embodiments above. The apparatus 1 can also comprise a user interface device (not shown).

The home equipment system(s) receives signals from the CPU 4, which signals serve to activate or de-activate, or vice versa, whichever the case can be, the respective home equipment system(s) which are utilized in conjunction with the apparatus 1500. The home equipment system(s) 1515 can also include any other suitable home system or equipment feature which can be utilized to draw attention to the home and/or in some other way impede home theft. It should be noted that any of the interface devices can include any of the requisite interfacing circuitry which can be necessary to facilitate CPU 4 control over the respective systems which can be utilized. It is understood that, while the embodiment of FIG. 15 is illustrated and described in conjunction with a home or a household system, the embodiment can also be utilized in any residential premises and/or any residential building.

The apparatus and method of the preferred embodiment of FIG. 15 can be utilized and/or operates in the same or in a similar and/or analogous manner as described in conjunction with the embodiments described above, and/or consistent with the description of the various embodiments and features of the present invention as described herein, so as to provide control, monitoring and/or security functions for, and over, a home and/or residential premises, and/or any of the herein-described premises systems, premises equipment systems, premises equipment, premises devices, premises components, and/or premises accessories.

The apparatus and method of FIG. 15 can provide for an immediate, as well as for a deferred, control, activation, de-activation, programming, monitoring and/or security function and/or response thereto of, and for, any one or more of the home and/or residential premises systems, equipment, devices, appliances, etc., in the same, similar and/or analogous manner as described above in conjunction with its utilization in the embodiments described herein.

As described above in conjunction with use of the apparatus and method of the present invention with vehicles, the present invention can, if desired, perform a test in order to determine the state or status of any particular system, equipment, device and/or appliance before exercising and/or performing a given control, monitoring and/or security function. Depending upon the outcome of the test, the apparatus and method of the present invention can execute, alter and/or defer the performance and/or execution of the control, monitoring and/or security function. For example, a command to shut-off a home central electrical system can be deferred until after the operation of a home security system, which security system can be deemed to have priority in performing a monitoring and shut-down procedure for the entire home, has been successfully completed.

In this manner a homeowner or occupant can access a home system at any time and from any location and thereby exercise and/or perform control, monitoring and/or security functions on, or over, any home system, equipment and/or appliance. The owner or occupant can also monitor the status, state or operation of any home system, equipment, device and/or appliance. Lastly, the owner or occupant can perform security related functions or operations on, and over, the home system, equipment, device and/or appliance. As noted above, the present invention can be utilized in conjunction with a telephone, either analog or digital, a touch tone telephone, a cordless telephone and/or a cellular or mobile telephone, a home and/or a personal computer, having associated telecommunication devices or other suitable peripheral device(s) such as a modem and/or a fax/modem, or other personal communication devices, which can operate over an appropriate telecommunications system, and/or other suitable communications systems, including radio signal, optical, satellite and/or other communications systems.

Figure 16:
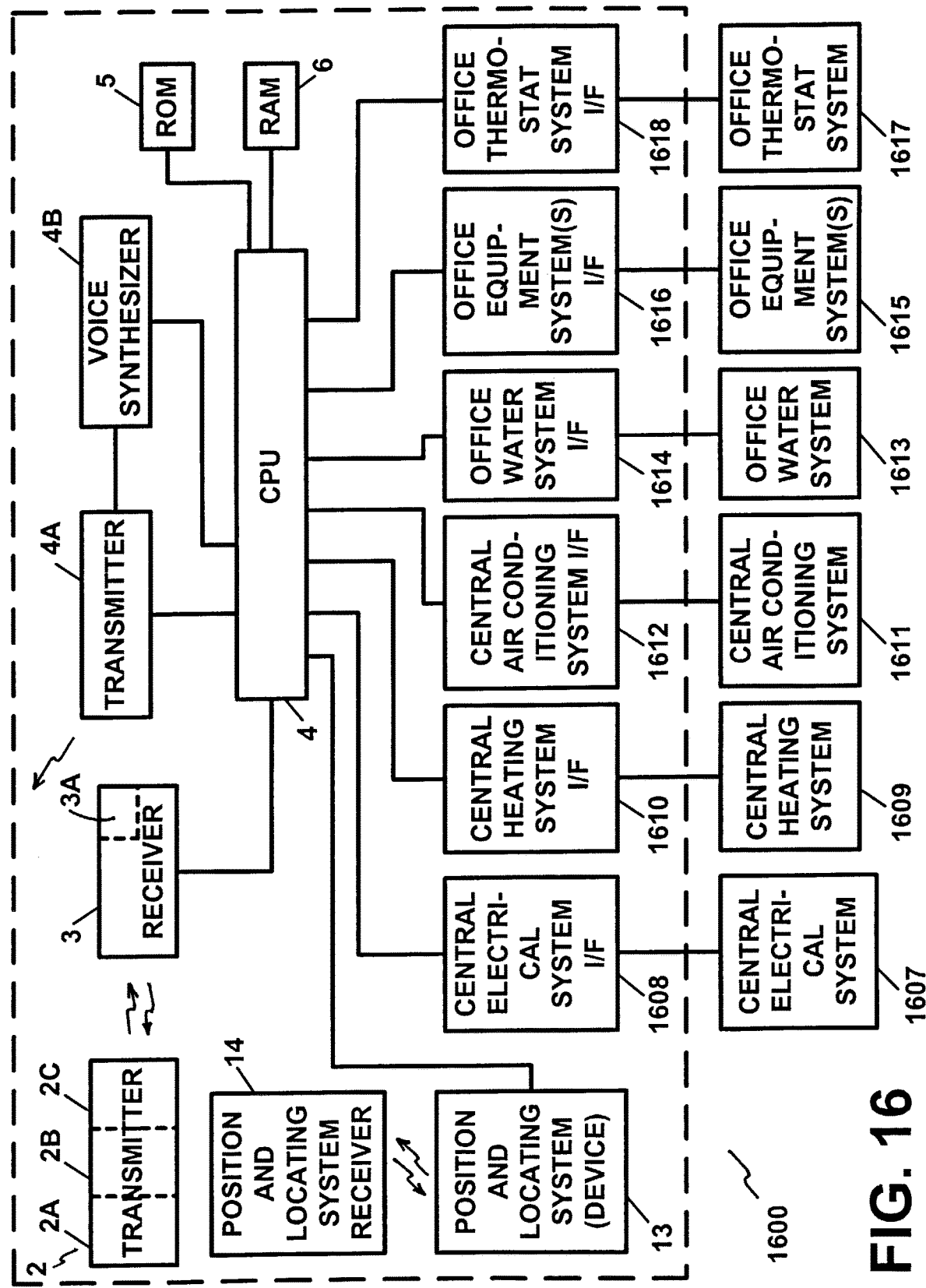
FIG. 16 illustrates another preferred embodiment of the present invention wherein the apparatus and method is utilized in conjunction with a commercial office and/or premises control system.

In still another preferred embodiment, the apparatus of the present invention is utilized in conjunction with a commercial premises, commercial building, commercial office, industrial facility, commercial structure, industrial structure, manufacturing facility, manufacturing equipment, manufacturing machine, drilling platform, drilling rig, oil drilling platform, off-shore drilling platform, off-shore drilling rig, excavation equipment, construction equipment, mining platform, mining equipment, assembly facility, assembly line facility and/or equipment, assembly equipment, industrial robotic equipment, mass production facility, production facility, assembly line, and/or any other industrial structure, building, edifice, equipment, system, device, component thereof and/or control system thereof and/or therefore (hereinafter referred to as "commercial premises"). FIG. 16 illustrates an another preferred embodiment of the present invention wherein the apparatus and method is utilized in conjunction with a commercial premises and/or commercial premises control system. It is understood that, while the embodiment of FIG. 16 is illustrated and described in conjunction with an commercial office and/or premises control system, the embodiment can also be utilized in any commercial building and/or any commercial premises and/or any type of building, structure, equipment, and/or premises. The apparatus of FIG. 16 is denoted generally by the reference numeral 1600. In FIG. 16, the components of the apparatus which are common to the apparatus of FIG. 1 are designated by the same reference numerals.

In FIG. 16, the CPU 4 is electrically connected and/or linked to the commercial office and/or premises central electrical system 1607, which is located externally from the apparatus 1600. The CPU 4 may or may not be connected and/or linked with the central electrical system 1607 through a central electrical system interface 1608 which is also shown in FIG. 16. The CPU 4 can transmit signals to, as well as receive signals from, the central electrical system 1607. In this manner, the CPU 4 and the central electrical system 1607, can exchange information between each other. In this manner, the CPU 4, upon receiving an appropriate signal from the receiver 3, and upon the completion of the requisite data processing routine, can issue an electrical, an electronic, and/or any other suitable signal, including a digital command signal, to the central electrical system 1607. This electrical, electronic and/or other suitable signal, or digital command signal, can be one which will disable the central electrical system 1607 or one which will re-enable or reset the central electrical system 1607.

The CPU 4 can also interrogate the central electrical system 1607 and/or receive data from the central electrical system 1607 which is indicative of central electrical system status (i.e., whether the central electrical system 1607, or any portion thereof, is on or off).

In the preferred embodiment, the CPU 4 is also electrically connected and/or linked to the commercial office and/or premises central heating system 1609 which is also located externally from the apparatus 1600. The CPU 4 may or may not be connected and/or linked with the central heating system 1609 through a central heating system interface 1610 which is also shown in FIG. 16. The CPU 4 is capable of issuing an electrical, electronic and/or other suitable signal, including a digital signal, to disable or to re-enable the central heating system 1609. The CPU 4 can also interrogate and/or receive data from the central heating system 1609 which is indicative of central heating system status (i.e., whether the central heating system 1609, or any portion thereof, is on or off).

In the preferred embodiment, the CPU 4 is also electrically connected and/or linked to the commercial office and/or premises central air conditioning system 1611 which is also located externally from the apparatus 1600. The CPU 4 may or may not be connected and/or linked with the central air conditioning system 1611 through a central air conditioning system interface 1612 which is also shown in FIG. 16. The CPU 4 is capable of issuing an electrical, electronic and/or other suitable signal, including a digital signal, to disable or to re-enable the central air conditioning system 1611. The CPU 4 can also interrogate and/or receive data from the central air conditioning system 1611 which is indicative of central air conditioning system status (i.e., whether the central air conditioning system 1611, or any portion thereof, is on or off).

The CPU 4 can also be electrically connected and/or linked to the commercial office and/or premises water system 1613 which is also located externally from the apparatus 1600. The CPU 4 may or may not be connected and/or linked with the water system 1613 through a commercial office and/or premises water system interface 1614 which is also shown in FIG. 16. The water system interface 1614, in the preferred embodiment, is an electrically controlled water shut-off valve(s) and/or device(s). The CPU 4 is capable of issuing an electrical, electronic and/or other suitable signal, including a digital signal, to disable or to re-enable the water system 1613. The CPU 4 can also interrogate and/or receive data from the water system 1613 which is indicative of the state of the water system (i.e. whether the water system, or any portion thereof, is on or off). The commercial office and/or premises water system 1613 can then be adjusted and/or controlled (i.e. turned on or off) by the user or operator.

The CPU 4 can also be electrically connected and/or linked to the commercial office and/or premises thermostat system 1617 which is also located externally from the apparatus 1600. The CPU 4 may or may not be connected and/or linked with the thermostat system 1617 through a commercial office and/or premises thermostat system interface 1618 which is also shown in FIG. 16. The CPU 4 is capable of issuing an electrical, electronic and/or other suitable signal, including a digital signal, to disable or to re-enable the thermostat system 1617. The CPU 4 can also interrogate and/or receive data from the thermostat system 1617 which is indicative of the temperature of the commercial office and/or premises interior (i.e., the interior temperature and/or whether interior temperature, or any portion thereof, is too hot, too cold, or acceptable). The thermostat system 1617 can then be adjusted and/or controlled by the user or operator. The thermostat system 1617 can be connected and/or linked to the central heating system 1609 and to the central air conditioning system 1611 so as to activate and/or control the operation of these systems in order to, and so as to, achieve the desired temperature in the commercial office and/or premises.

The CPU 4, in the preferred embodiment, is also electrically connected and/or linked to at least one or more of a commercial office and/or premises equipment system(s) 1615. The commercial office and/or premises equipment system(s) 1615 are located externally from the apparatus 1600 and may or may not be connected and/or linked to the CPU 4, via a commercial office and/or premises system equipment system(s) interface 1616 which may or may not be required for each one of the variety or multitude of the commercial office and/or premises equipment systems which can be utilized in conjunction with the apparatus.

The commercial office and/or premises equipment system(s) 1615 can include a commercial office and/or premises anti-theft and/or burglary alarm system, loud siren or alarm, which can be located in the interior of the home, which can produce a loud piercing sound so as to make it unbearable for an intruder to remain inside the home, an exterior siren or alarm, which can produce a loud piercing sound, which can be utilized to draw attention to the commercial office and/or premises and exterior lighting system(s) and/or the interior lighting system(s), which lighting systems can be turned on or turned off at the user's or operator's discretion and which can be controlled to blink on and off to draw attention to the commercial office and/or premises. The premises equipment system(s) 1615 can also include "smart" windows which turn opaque and/or darker depending upon interior lighting.

The commercial office and/or premises equipment system(s) 1615 can also include electrical and/or electronically controlled locking devices for doors and/or windows, including electric or electronic dead-bolt locking devices or systems, electrical systems for controlling electrical circuits or systems room-by-room, device-by-device, and/or appliance-by-appliance.

The commercial office and/or premises equipment system(s) 1615 can also include devices for controlling any one or more of the electrical circuits, such as circuits controlled by fuses, circuit breakers or equivalent devices. The commercial office and/or premises equipment system(s) 1615 can also include devices for controlling and/or monitoring hot water heaters, garage door openers, lawn sprinkler systems, electric fences and/or fencing, in-ground or above-ground pool equipment, fountain equipment, filters and/or heaters, commercial office and/or premises fire detector equipment and commercial office and/or premises fire extinguishment equipment. Commercial office and/or premises equipment system(s) 1615 can also include power door and window closing, locking and opening equipment.

The commercial office and/or premises equipment system(s) 1615 can also include any and all office equipment and/or premises appliances such as televisions, telephones, telephone answering machines, alarm systems, VCRs, stoves, ovens, microwave ovens, door bells, individual lights or lamps, blenders, toasters, computers and associated peripherals, word processors, stereos, radios, manufacturing equipment and any other commercial office and/or premises appliances and/or devices which are electrically and/or electronically activated and/or controllable.

The commercial office and/or premises equipment system(s) 1615 can also include video recording and/or photographing equipment, which can include video recording device(s) and/or a camera(s), such as those utilized in conjunction with personal computers, televisions, digital televisions, interactive televisions, display telephones, video telephones, and/or other communication devices, including personal communication devices, or a still picture camera(s). The video recording device(s) or camera(s) can be digital recording devices or cameras or other suitable devices or cameras, including typical video recording devices or cameras. The video recording device(s) or camera(s), in a preferred embodiment, has associated therewith a transceiver or transmitter/receiver system for transmitting video images recorded by the video recording device(s) or camera(s) to the owner or occupant and for receiving signals such as, for example, control signals, by which the owner or occupant can exercise control over the video recording device(s) or camera(s).

The video recording device(s) or camera(s) can be located at any location on the interior of the commercial office and/or premises such as, for example, in any room or rooms of the commercial office and/or premises so that the owner or occupant, or any other authorized individual, can observe and/or photograph any portions and/or rooms in the interior of the commercial office and/or premises, or the occupants and/or anything which can be located and/or stored in the commercial office and/or premises. The video recording device(s) or camera(s) can also be located on the exterior of the commercial office and/or premises so that the owner or occupant, or any other authorized individual, can observe and/or photograph the exterior of the commercial office and/or premises, or portion thereof, or the individuals or objects and/or anything which can be present, located and/or stored on the premises of commercial office and/or premises.

The video recording device(s) or camera(s) can have wide angles for maximum angular viewing and can also be pivotable and/or movable. The video device(s) or camera(s) can be moveable along a track or other guiding device or element so that the respective video recording device or camera can be moved along the commercial premises interior or exterior. The video recording device(s) or camera(s) can record and/or transmit the recorded video and/or the picture(s) in real time and/or live. The video recording device(s) or camera(s) can also be equipped with a storage medium, for storing the recorded video and/or picture(s), and a transmitter or transceiver for transmitting the stored video and/or picture(s) to the owner or occupant at a later time. In this manner, real-time, as well as deferred, video and/or picture(s) transmissions can be provided.

The commercial office and/or premises equipment system(s) 1615 can also include audio recording equipment, which can include audio recording device(s) such as microphones and/or tape recorders, such as those utilized in conjunction with personal computers, televisions, digital televisions, interactive televisions, telephones, cellular telephones, display telephones, video telephones, and/or other communication devices, including personal communication devices. The audio recording device(s) can be digital audio recording devices or other suitable audio devices including typical audio recording devices. The audio recording device(s), in a preferred embodiment, has associated therewith a transceiver or transmitter/receiver system for transmitting the recorded audio to the owner or occupant and for receiving signals such as, for example, control signals, by which the owner or occupant can exercise control over the audio recording device(s).

The audio recording device(s) can be located at any location on the interior and/or exterior of the commercial office and/or premises so that the owner or occupant, or any other authorized individual, can hear what is transpiring, and/or what has transpired, inside and/or outside the commercial office and/or premises.

The audio recording device(s) can also be pivotable and/or movable. The audio device(s) or camera(s) can be moveable along a track or other guiding device or element so that the respective video recording device or camera can be moved along the commercial premises interior or exterior. The audio recording device(s) can record and/or transmit the recorded audio in real time and/or live. The audio recording device(s) can also be equipped with a storage medium, for storing the recorded audio, and a transmitter or transceiver for transmitting the stored audio at a later time. In this manner, real-time as well as deferred audio transmissions can be provided.

The commercial office and/or premises equipment system(s) 1615 can also include an intercom system or device or telephone, cellular, digital or otherwise, for providing a means by which to allow the user or operator, or other authorized individual, to communicate with the persons present in the, or occupants of the, commercial office and/or premises. The vehicle equipment system 1615 can also include video conferencing devices and/or equipment for enabling the vehicle occupants and/or individuals inside the vehicle, outside the vehicle, and/or in the vicinity of the vehicle, to engage in and/or partake in video conferences and/or video conferencing with others via a communication network.

The premises equipment system(s) 1615 can also include the premises battery or batteries, premises fuel cell or fuel cells, battery monitoring equipment, battery charge level, fuel cell output, fuel cell fuel supply, fuel cell temperature measuring device, fuel cell by-product (i.e. water or other by-product, heat, etc.) measuring device, fuel cell output measuring device (i.e. voltmeter, ammeter, current measure, power meter, etc.).

The commercial office and/or premises equipment system(s) 1615 can also include monitoring device(s) for reading and/or monitoring the status and/or condition of any of the commercial office and/or premises fuel supply, water supply, electrical generator and/or alternator operation, water usage, heat and/or air conditioning usage, electricity usage, gas and/or oil or other fuel usage, battery charge level, electrical system charge level, fuel cell electrical power output, fuel cell fuel supply level, fuel cell operating temperature, fuel cell by-product output level, telephone usage and charges, commercial office and/or premises equipment and/or appliance usage, etc, a commercial office and/or premises control system and/or any other commercial office and/or premises operation and/or system function and/or commercial premises equipment system(s) operating status and/or condition. The monitoring device(s), in a preferred embodiment, can have associated therewith a transceiver or transmitter/receiver system for transmitting data and/or information recorded and/or read by the monitoring device(s) to the user or operator and for receiving signals such as, for example, control signals, by which the user or operator can exercise control, monitoring and/or security over the monitoring device(s).

The commercial premises equipment system(s) 1615 can also include communication devices, such as two-way radios, radios, televisions, fire extinguishing equipment, emergency and/or distress signal equipment, and any electrical, electronic and/or otherwise activated appliances and/or equipment which can be utilized in a commercial. Appliances can include household appliances such as refrigerators, stoves, air conditioners, ovens, microwave ovens, lighting systems, etc. The commercial premises equipment system(s) 1615 can also include electrical and/or electronically controlled dead bolt locking devices for use on doors, windows, and/or in conjunction with any other opening components and/or components for gaining access to various locations on and/or in, and/or any systems, devices, and/or components of, the commercial premises.

The commercial premises equipment system(s) 1615 can also include a commercial premises automatic control device or commercial premises automatic control system which can be utilized to control any one or more of the herein-described commercial premises systems and/or any of the herein-described commercial premises equipment systems 1615 automatically. In this manner, the commercial premises automatic control device or commercial premises automatic control system can automatically control the operation of any one or more of the commercial premises systems and/or commercial premises equipment systems 1615. The commercial premises automatic control device or commercial premises automatic control system can also control or monitor any and/or all of the systems, electrical systems, electronic systems, mechanical systems, hydraulic systems, appliances, components, and/or device, of the commercial premises.

In any and/or all of the embodiments described herein, the commercial premises automatic control device or commercial premises automatic control system can be programmed to operate and/or to control the operation of the commercial premises. The commercial premises automatic control device or commercial premises automatic control system can utilize a pre-stored program to control the operation of the commercial premises and any of the commercial premises systems and/or commercial premises equipment systems 1615 described herein. A user can also upload a program to the commercial premises automatic control device or commercial premises automatic control system during the operation or use of the present invention.

The commercial premises equipment system(s) 1615 can also include a noise cancellation device or noise cancellation system for eliminating noise in or about the commercial premises.

The commercial premises equipment system(s) 1615 can also include a color video camera, an acoustic sensor or acoustic sensing device, a door sensing device which can be utilized to sense an open state or a closed state of a door or doors, and/or a window sensing device which can be utilized to sense an open state or a closed state of a window or windows.

The commercial premises equipment system(s) 1615 can also include a power "on" sensor or power "on" sensing device for sensing a power "on" condition for any of the commercial premises equipment system(s) 1615, commercial premises systems, commercial premises equipment, commercial premises devices, commercial premises components, and/or other commercial premises systems, described herein. The commercial premises equipment system(s) 1615 can also include a power "off" sensor or power "off" sensing device for sensing a power "off" condition for any of the commercial premises equipment system(s) 1615, commercial premises systems, commercial premises equipment, commercial premises devices, commercial premises components, and/or other commercial premises systems, described herein.

The commercial premises equipment system(s) 1615 can also include a temperature sensor or temperature sensing device and/or a water sensor or a water sensing device. The commercial premises equipment system(s) 1615 can also include a water pump or water pumping device for pumping water out of the commercial premises.

The commercial premises equipment system(s) 1615 can also include a motion sensor for detection the motion or movement of individuals or objects inside the commercial premises, outside the commercial premises, and/or in the vicinity of the commercial premises.

The commercial premises equipment system(s) 1615 can also include hydraulic and/or pneumatic equipment and/or other equipment, assembly equipment, drilling equipment, mining equipment, construction equipment, excavation equipment, robotic equipment, electrical equipment of any kind, mechanical equipment of any kind, electromechanical equipment of any kind, including winches, etc, which can be remotely activated as described herein. The premises equipment system(s) 1615 can also include premises communication devices including, but not limited to radios, televisions and entertainment devices, two-way radios, cellular telephones and equipment, etc. The premises equipment system(s) 1615 can also include systems for detecting failures in any of the herein-described equipment systems and report such failure(s) to the user or operator whether he or she is in the premises or not in the premises and/or for reporting such failures to a central office.

The commercial premises equipment system(s) 1615 can also include the commercial premises command computer which is utilized to control and/or to the various electronic, electrical, mechanical, and/or electromechanical systems, components, devices, of the commercial premises. The command computer can control and monitor any of the herein-described systems, components, and/or devices, of the commercial premises which can be controlled and/or monitored by the command computer.

The command computer can transmit control signals and/or status request signals to any of the herein-described commercial premises systems, components, and/or devices, so as to respectively control and/or monitor the operating status and/or condition of the respective system, component, and/or device. The command computer can also receive signals from the respective systems, devices, and/or components, with said signals containing data and/or information concerning the operating status, operating state, and/or condition, of the respective systems, devices, and/or components. The command computer can be utilized so as to control, monitor, and/or provide diagnostic information for any of the commercial premises systems, components, and/or devices, which are controlled and/or monitored with the command computer.

The premises equipment system(s) 1615 can also include wear and/or usage indicators and/or detection devices which can be connected with either the command computer and/or the central processing computer and which can be utilized so as to monitor the wear and/or usage of any of the herein-described electronic, electrical, mechanical, and/or electromechanical, systems, devices, and/or components.

The commercial premises equipment system(s) 1615 can also include automatic control devices for controlling and/or monitoring commercial premises systems, devices, and/or components, for commercial premises maintenance and/or upkeep.

In the case of commercial, industrial, and/or farm and/or construction equipment, drilling equipment, mining equipment, excavating equipment, and/or other commercial equipment, the premises equipment system(s) 1615 can also include loading and/or unloading mechanisms, cutting mechanisms, bailing mechanisms, winches and any and all of the various systems and devices utilized in conjunction with these premises and/or equipment.

As noted above, the use of any one or more of the commercial office and/or premises equipment systems and/or appliances or devices 1615 and their associated interface devices 1616, can be optional. The interface devices 1616 can be wireless devices or modules which need not be directly connected to the CPU 4 or to its respective equipment system. In this regard, wired connections are not necessary. In the case of wireless interface devices or modules 1616, corresponding wireless technology and/or systems must be utilized to provide for the wireless control and operation of the respective equipment(s).

The commercial office and/or premises equipment system or system(s) 1615 receives signals from the CPU 4, which signals serve to activate or de-activate, or vice versa, whichever the case can be, the respective commercial office and/or premises equipment system(s) which are utilized in conjunction with the apparatus 1600. The commercial office and/or premises equipment system(s) 1615 can also include any other suitable commercial office and/or premises system or equipment feature which can be utilized to draw attention to the commercial office and/or premises and/or in some other way impede commercial office and/or premises theft. It should be noted that any of the interface devices can include any of the requisite interfacing circuitry which can be necessary to facilitate CPU 4 control over the respective systems, equipment, devices and/or appliances which can be utilized.

The apparatus and method of the preferred embodiment of FIG. 16 is utilized and operates in the manner described above in conjunction with the vehicle and/or the home embodiments so as to provide for a system for controlling, monitoring and/or providing security functions for and over a commercial office and/or premises. The apparatus and method of the preferred embodiment of FIG. 16 can be utilized and/or operates in the same or in a similar and/or analogous manner consistent with the description of the various embodiments and features of the present invention as described herein so as to provide control, monitoring and/or security functions over and with respect to the commercial office and/or premises with which the apparatus is utilized in conjunction with.

In the case of mobile commercial office and/or premises, the apparatus 1600 can also comprise a commercial office and/or premises position and locating device 13 which can be utilized in order to determine the position and/or the location of the commercial office and/or premises. The position and locating device 13 can be utilized so as to determine the position of the commercial office and/or premises anywhere in the world and provide for the transmission of position and/or location data to any appropriate system receiver so that the commercial office and/or premises can be located and/or tracked and recovered. In the preferred embodiment, the position and locating device 13 includes and utilizes a global positioning device and an associated transmitter for transmitting position and/or location data to the authorized user, operator, and/or authorized individual.

The apparatus 1600 also includes a commercial offices and/or premises position and locating system receiver 14, which can be employed by the authorized user, operator, and/or authorized individual, for receiving and/or processing the data which is transmitted from the position and locating device 13 as described above. The apparatus 1 can also comprise a user interface device (not shown).

The apparatus and method of the preferred embodiment of FIG. 16 is utilized and operates in the manner described above in conjunction with the vehicle and/or the home premises embodiments so as to provide for a system for controlling, monitoring and/or providing security functions for, and over, a commercial office and/or premises. The apparatus and method of the preferred embodiment of FIG. 16 can be utilized and/or operates in the same or in a similar and/or analogous manner as described in conjunction with the various embodiments described herein and/or consistent with the description of the various embodiments and features of the present invention as described herein, so as to provide control, monitoring and/or security functions for, and over, a commercial office and/or premises, and/or any of the herein-described commercial premises systems, commercial premises equipment systems, commercial premises equipment, commercial premises devices, commercial premises components, and/or commercial premises accessories.

In this manner, an owner, occupant, and/or authorized individual, can access a commercial office and/or premises system at any time and from any location and thereby exercise and/or perform control, monitoring and/or security functions over any commercial office and/or premises system, equipment, device and/or appliance. The owner, occupant, and/or authorized individual, can also monitor the status, state or operation of any commercial office and/or premises system, equipment, device and/or appliance. Lastly, the owner or authorized individual can perform security related functions or operations on and over the commercial office and/or premises system, equipment, device and/or appliance.

The apparatus and method of FIG. 16 can provide for an immediate, as well as for a deferred, control, activation, de-activation, programming, monitoring and/or security functions and/or responses thereto, of, and for, any one or more of the commercial office and/or premises systems, equipment, devices, appliances, etc., in the same, similar and/or analogous manner as described above with in conjunction with the various embodiments.

As described above in conjunction with use of the apparatus and method of the present invention with vehicles and residential premises, the present invention can, if desired, perform a test in order to determine the state or status of any particular system, equipment, device and/or appliance before exercising and/or performing a given control, monitoring and/or security function. Depending upon the outcome of the test, the apparatus and method of the present invention can execute, alter, and/or defer, the performance and/or the execution of the control, monitoring and/or security function. For example, a command to shutoff a central electrical system can be deferred until after the operation of a security system, which security system can be deemed to have priority in performing a monitoring and shut-down procedure for the entire commercial office and/or premises, has been successfully completed.

As noted above, the present invention, in any of the herein described embodiments, as well as modifications, variations and/or alternate embodiments thereof, can be utilized in conjunction with a telephone, including analog and digital telephones, a touch-tone telephone, a cordless telephone and/or a cellular or mobile telephone, a home and/or a personal computer having associated telecommunication devices or other suitable peripheral device(s) such as a modem and/or a fax/modem, or other personal communication devices, which can operate over an appropriate telecommunications system, and/or other suitable communications systems, including radio signal, optical, satellite and/or other communications systems.

The communications system(s) utilized in any of the embodiments described herein can operate anywhere in the electromagnetic and/or the radio spectrum. In this regard, personal communication service (PCS) systems and devices, including stationary, portable and/or hand-held devices, can also be utilized. Digital signal communications devices and/or systems, including digital satellite systems, can also be utilized. Interactive and/or digital televisions, personal communication devices, personal communications services (PCS) devices, telephones, including telephones which utilize analog or digital technology, personal digital assistants, cellular telephones, display telephones, video telephones, display cellular telephones and electronically equipped watches, beepers, pagers or paging systems, and/or other devices and/or personal effects and/or accessories can also be utilized for interactive use and/or for the display or output applications and/or functions. In this regard, the apparatus and method of the present invention can be utilized on, or over, the Internet and/or the World Wide Web, or other suitable communication network or medium, in order to control, monitor and/or provide security functions on, or for, any of the herein described vehicles, marine vessels or vehicles, aircraft, recreational vehicles, residential premises and/or commercial premises.

The apparatus and method of the present invention can find applications in areas other than those described and illustrated above. The present invention can find application in any type of control, monitoring and/or security system or the like, wherein a long-range remote-controlled and/or interactive system can be utilized in order to provide an immediate, or a deferred, response to a control, monitoring and/or security function, or response thereto, and/or to exercise and/or provide control, monitoring or security over desired items and/or devices from a remote location. The present invention can also be utilized to monitor and/or track the whereabouts or location of various objects and/or systems. In this regard, the apparatus and method of the present invention can be utilized so as to monitor the whereabouts and/or location of individuals and to provide for a means by which to communicate with them.

The apparatus and method of the present invention can be utilized in conjunction with appropriate security devices for preventing access by unauthorized individuals. In this regard, the apparatus and method of the present invention can be utilized in conjunction with appropriate security access devices, secured and/or encrypted communication signals, linkups and mediums. Security measures can include utilization and processing of access codes, encrypted codes, personal identification codes and/or data, software-based security measures and/or devices, hardware-based security measures and/or devices, and/or any combination of software-based and hardware-based measures and/or devices. The security measures and/or methods utilized can also include the use of signal scramblers and associated de-scramblers, and/or any one or more of the widely known devices and/or methods for providing a secured communication system and/or link. Applicant hereby incorporates by reference herein the subject matter and teachings of *APPLIED CRYPTOGRAPHY*, by Bruce Schneier, John Wiley & Sons, Inc., 1996, for incorporating the various encryption and/or cryptographic techniques, methods, protocols, key management techniques, algorithm types and modes, encryption standards, cifers, sequence generators, hash functions, public-key algorithms, public-key digital signature algorithms, identification schemes, key exchange algorithms, and/or any other techniques, algorithms, and/or protocols, disclosed and/or described therein, which can be utilized for providing for the secured transmission of any of the signals or communication transmissions which are or can be utilized in any of the herein-described embodiments of the present invention.

The present invention provides for an apparatus and method for exercising and/or performing remote-controlled control, monitoring and/or security functions and/or operations for any type and variety of vehicles, motor vehicles, marine vessels and vehicles, aircraft, recreational vehicles, residential premises and/or commercial premises.

The apparatus and method of the present invention can also be programmable for programmed and/or automatic activation, self-activation, programmed and/or automatic operation and/or self-operation. The apparatus and method of the present invention can provide for an immediate, as well as for a deferred, control, monitoring and/or security function, and/or response thereto, so as to provide for the immediate and/or for the deferred control, activation, de-activation, programming, monitoring and/or security, etc., of any one or more of the respective systems, equipment, devices, appliances, etc., which can be utilized in any of the above described embodiments and/or in any modifications, variations and/or alternate embodiments thereof.

The present invention can also be equipped with, and be utilized with, hardware and software necessary for providing self-monitoring functions, automatic control and/or responses to occurrences, providing automatic notice of an occurrence and/or a situation to an owner, user and/or authorized individual. In this regard, any and all of the embodiments described above can comprise a monitoring device, a triggering device and/or any other suitable device for detecting an occurrence and/or a situation which can warrant providing notice to an owner, user and/or authorized operator. In this regard, the apparatus can provide a transmission of any appropriate signal from a transmitter and, if desired, from a voice synthesizer to the owner, user and/or authorized individual, or to the location of the individual. The signal utilized could be in the form of a communication transmission, depending upon the communication medium utilized, a telephone call, a voice message, a beeper and/or pager message, an Electronic mail message, a fax transmission, and/or any other mode of communication which can be utilized with any of the apparatuses, devices and/or components described herein.

Any of the above-described embodiments can be utilized in conjunction with a central security office and/or agency for providing use in conjunction with such a central office and/or agency as described hereinabove. In this manner, each and every embodiment of the present invention can be utilized with a central security office and/or agency. The present invention can also provide a means for occupants of the vehicle, motor vehicle, marine vessel, aircraft, recreational vehicle, residential premises and/or commercial premises to contact a central security office and/or agency and/or any other individual having corresponding communication equipment and/or who is authorized and/or equipped to receive such transmissions.

The present invention can be utilized to access, monitor, and/or record or store, operation data and/or information for any of the herein-described vehicles, motor vehicles, boats, marine vessels, airplanes, aircraft, and/or recreational vehicles, at a location remote from the respective vehicles, motor vehicles, boats, marine vessels, airplanes, aircraft, and/or recreational vehicles, as well as for any of the herein-described residential premises and/or commercial premises. Any of the respective operation data and/or information can be obtained at, and/or stored at, any of the transmitters, home and/or personal computers, computers, and/or server computers, described herein.

The present invention can provide for the remote accessing, obtaining, or storage, of operation data for any one or more of the herein-described vehicles, motor vehicles, boats, marine vessels, airplanes, aircraft, and/or recreational vehicles. In addition, the present invention can provide for the remote accessing, obtaining, or storage, of operation data for any one or more of the herein-described residential premises and/or commercial premises, by accessing, controlling, and/or monitoring, respective premises operation data recorder and/or monitoring devices.

The present invention enables an owner, user and/or authorized individual, to exercise and/or perform convenient control, monitoring and/or security functions, as and/or operations, over any of the above described or similar objects, vehicles, vessels and/or premises, from a remote location. For example, an individual can conveniently provide control over and monitor, the state and/or status of a vehicle parked at a location distant from his present location, and provide control over and monitor, a boat, an airplane, a vacation home which can be located in another locale, and/or to provide control over and monitor, a business office after hours or while absent therefrom.

In another preferred embodiment of the present invention, the present invention can be utilized in conjunction with intelligent agents, software agents and/or mobile agents. In such embodiments, the agent can be programmed to perform any and all of the control, monitoring, and/or security functions described herein on behalf on any of the herein described and/or respective owners, users, operators of the vehicles, premises, equipment, systems, devices, and/or components, described herein. Applicant hereby incorporates by reference herein the subject matter of the Agent Sourcebook, A Complete Guide to Desktop, Internet and Intranet Agents, by Alper Caglayan and Colin Harrison, Wiley Computer Publishing, 1997. Applicant also incorporates by reference herein the subject matter of Cool Intelligent Agents For The Net, by Leslie L. Lesnick with Ralph E. Moore, IDG Books Worldwide, Inc. 1997.

The present invention, in any of the embodiments described herein, can be designed to be user-friendly. In this regard, the present invention can be menu-driven, and/or its operation can be menu-selected, from audio menus, visual menus, or both audio and visual menus.

Applicant hereby incorporates by reference herein the subject matter and the teachings of the following U.S. Pat. Nos. 4,882,579, 4,882,746, 5,003,317, 5,031,103, 5,081,667, 5,113,427, 5,138,649, 5,173,932, 5,208,756, 5,223,844, 5,247,564, 5,276,728, 5,287,398, 5,334,974, 5,389,935, 5,418,537, 5,432,841, 5,513,244, 5,515,043, 5,557,254, 5,563,453, 5,682,133, 6,014,447, 6,009,363, 6,007,095, 6,006,159, 5,973,619, 5,949,345, 5,898,392, 5,844,473, 5,835,871, 5,835,376, 5,809,161, 5,729,452, 5,715,905, 5,660,246, and 5,550,738.

The present invention, in any and/or all of the embodiments described herein, hereby incorporates the teachings of, and can utilize the teachings of, the above-identified U.S. Patents as well as improve upon the teachings of the above-identified U.S. Patents.

In any and/or all of the embodiments described herein, any of the fuel cells which are or can be utilized can be hydrogen fuel cells, zinc fuel cells, alkaline fuel cells, phosphoric acid fuel cells, proton exchange membrane fuel cells, methanol fuel cells, direct methanol fuel cells, natural gas fuel cells, molten carbonate fuel cells, solid oxide fuel cells, and/or any other fuel cell type, and/or any combination thereof.

In any and/or all of the embodiments described herein, the respective CPU 4, server computer 510, computer 970, or other central processing computer, and/or the server computer 952, and/or any other central processing computers and/or devices, can maintain maintenance records and/or service records for any of the herein-described vehicles, motor vehicles, boats, marine vessels, airplanes, aircraft, recreational vehicles, residential premises, and/or any of the commercial premises described herein, and/or for any of the respective systems, subsystems, devices, and/or components of same.

The respective CPU 4 or computers can monitor maintenance and/or servicing activities, store information regarding maintenance and/or servicing performed thereon and/or thereto, and/or provide notification, via e-mail message, fax transmission, beeper and/or pager message, telephone message, and/or notification via any other appropriate means, for and/or regarding any of the herein-described vehicles and/or premises and/or systems, subsystems, devices and/or components, of same. In this manner, maintenance and/or service records can be accessed and/or obtained via the apparatus and method of the present invention by accessing the respective CPU 4 and/or any of the other computers described herein. The CPU 4 and/or any of the other computers described herein can also be programmed to provide notification to the respective individuals, owners, users and/or occupants described herein regarding when maintenance and/or service can be needed and/or can be scheduled.

The present invention, in any and/or all of the embodiments described herein, can be utilized to control, monitor and/or maintain and/or secure any of the herein-described vehicles, motor vehicles, boats, marine vessels, airplanes, aircraft, recreational vehicles, residential premises, and/or any of the commercial premises described herein, and/or for any of the respective systems, subsystems, devices, and/or components of same. For example, the present invention can be utilized to monitor and/or control fuel cells via the Internet, the World Wide Web and/or via any other communication network.

The present invention can also be utilized to control and/or monitor any of the herein-described and respective systems, equipment systems, subsystems, devices, and/or components of any of the herein-described vehicles, motor vehicles, boats, marine vessels, airplanes, aircraft, recreational vehicles, residential premises, and/or any of the commercial premises.

In any and/or all of the embodiments described herein, any of the systems, subsystems, equipment systems, devices, and/or components, of any of the herein-described vehicles, motor vehicles, boats, marine vessels, airplanes, aircraft, recreational vehicles, residential premises, and/or commercial premises, can be controlled, monitored, and/or secured, via the CPU 4 and/or via any other computer, server computer, communication device, and/or any other devices, described herein.

In any and/or all of the embodiments described herein, the movement, propulsion, direction of travel, and/or the operation, of any of the herein-described vehicles, motor vehicles, boats, marine vessels, airplanes, aircraft, recreational vehicles, and/or any of their respective systems, equipment systems, subsystems, devices, components and/or appliances, can be controlled via any of the herein-described transmitters, home and/or personal computers, and/or other suitable communication devices or computers, via any of the herein-described server computers, computers, central processing computers and/or similarly utilized computers and/or computer systems.

In another preferred embodiment of the present invention, the CPU 4 can be the dedicated control device for, and/or can be an integrated control device and/or component of, any of the respective systems, subsystems, equipment systems, devices, and/or components, of any of the herein-described vehicles, motor vehicles, boats, marine vessels, airplanes, aircraft, recreational vehicles, residential premises, and/or commercial premises. In this manner, for example, the CPU 4 and/or the respective apparatus can be utilized to provide for the direct control, monitoring, and/or security, of and/or for any one of the specific systems, subsystems, equipment systems, devices and/or components, of any of the herein-described vehicles, motor vehicles, boats, marine vessels, airplanes, aircraft, recreational vehicles, residential premises, and/or commercial premises.

In the same manner, any specific system, equipment system, subsystem, device and/or component, can be directly controlled, monitored, and/or secured, directly by, from, and/or via, the dedicated CPU 4 and/or by, from, and/or via, the CPU 4 which can be an internal and/or an integrated control device and/or component of the respective system, equipment system, subsystem, device and/or component.

In any of the embodiments described herein which provide centralized processing functionality such as those embodiments of FIG. 5B, FIG. 11A, and FIG. 11B, any of the respective server computers 510, computers 970, server computers 952 and computers 970 can be any computers and/or computer systems, central processing computers, sever computers, network computers, and/or any other computers and/or communication devices, depending upon the specific application and/or the communication networks which are utilized in conjunction therewith. Any of the respective server computers 510, computers 970, server computers 952 and computers 970, can also be implemented by any number any/or type of computers and/or computer systems.

In any and/or all of the embodiments described herein, any of the respective transmitters 2, central processing units CPU 4, home and/or personal computers 150, server computers 510, computers 970, server computers 952, can transmit signals, data and/or information, to, as well as receive signals, data and/or information, from, any one or more of the respective transmitters 2, central processing units CPU 4, home and/or personal computers 150, server computers 510, computers 970, server computers 952. Any of the respective transmitters 2, central processing units CPU 4, home and/or personal computers 150, server computers 510, computers 970, server computers 952, can communicate with each other in a bi-directional manner and/or fashion.

In any and/or all of the embodiments described herein, the CPU 4 can generate and transmit an appropriate message and/or signal, which can contain any appropriate data and/or information, and transmit said signal to a respective transmitter 2, home and/or personal computer 150, server computer 510, computer 970, and/or server computer 952, depending upon the embodiment utilized. In turn, any of the server computers 510, computers 970, and/or server computers 952, can process and/or transmit either the signal and/or a signal generated in response to the signal transmitted from the CPU 4 to the transmitter 2, the home and/or personal computer, and/or any other communication device associated with the respective individual, owner, user, and/or occupant, to be provided with such notification.

In any and/or all of the embodiments described herein, any of the server computers 510, computers 970, and/or server computers 952, and/or any of the home and/or personal computers or communication devices 150 described herein and/or utilized in conjunction with the apparatus and method of the present invention can comprise any number of computers or computer systems. In this regard, any of the server computers 510, computers 970, and/or server computers 952, and/or any of the home and/or personal computers or communication devices 150 can be a single computer or computer system or can be comprised of, or can include, a plurality (two or more) computers or computer systems.

In any and/or all of the embodiments described herein, any of the receivers or transmitters associated with and/or utilized in conjunction with any of the server computers 510, computers 970, and/or server computers 952, and/or any of the home and/or personal computers or communication devices 150, described herein, can be or can include any number of receivers or transmitters, respectively.

In this manner, any event occurring at and/or involving, any condition of, any occurrence of, and/or other operating conditions and/or states regarding, any of the respective systems, equipment systems, subsystems, devices, components, and/or appliances, of any of the respective vehicles, motor vehicles, boats, marine vessels, airplane, aircraft, recreational vehicles, residential premises, and/or commercial premises, described herein. For example, a malfunctioning of a respective system(s), equipment system(s), subsystem(s), device(s), component(s), equipment, and/or appliance(s), of any of the herein-described vehicles, motor vehicles, boats, marine vessels, airplanes, aircraft, recreational vehicles, residential premises, and/or commercial premises, can be reported to a respective server computer, central processing computer, and/or central monitoring service, and/or can be reported to any of the respective individuals, users, owners, and/or occupants.

Similarly, any activation, de-activation, enabling, disabling, and/or any change and/or occurrence in, and/or involving the status and/or the operational state, of any of the respective system(s), equipment system(s), subsystem(s), device(s), component(s), equipment, and/or appliance(s), described herein, can be reported to a respective server computer, central processing computer, and/or central monitoring service, and/or can be reported to any of the respective individuals, users, owners, and/or occupants.

In another preferred embodiment of the present invention, a respective vehicle owner, vehicle user, or other authorized individual or entity, can program any one or more of respective server computer 510, a server computer 952, and/or a computer 970, so as to provide a limitation, limitations, a restriction, and/or restrictions, regarding any control operations or functions, any monitoring operations or functions, and/or any security operations or functions, which can be authorized, allowed, and/or disallowed. In this regard, the present invention can be utilized so as to allow an owner, user, or authorized individual or entity, to pre-specify limitations or restrictions regarding the use of the apparatus and method of the present invention in conjunction with any of the herein described vehicles.

The limitation(s) or restriction(s) on the ability to access the present invention and/or the vehicle and/or to perform any of the herein-described control, monitoring, and/or security, operations or functions on or regarding the respective vehicle can include, but is not limited to authorized individuals who may utilize the present invention to perform a control monitoring, and/or security operation or function, on or regarding any of the herein-described vehicles and/or any of the herein-described vehicle systems, vehicle equipment systems, vehicle equipment, vehicle components, vehicle devices, and/or vehicle accessories, authorized time or times for performing any of the herein-described control, monitoring, and/or security, operations or functions on or regarding any of the herein-described vehicles and/or any of the herein-described vehicle systems, vehicle equipment systems, vehicle equipment, vehicle components, vehicle devices, and/or vehicle accessories, the name or identity of an authorized individual, entity, individuals, and/or entities, which or which can perform any of the herein-described control, monitoring, and/or security, operations or functions on or regarding any of the herein-described vehicles and/or any of the herein-described vehicle systems, vehicle equipment systems, vehicle equipment, vehicle components, vehicle devices, and/or vehicle accessories, the types of, the kinds of, and/or the degree of, control, monitoring, and/or security, operations or functions which can be performed on or regarding any of the herein-described vehicles and/or any of the herein-described vehicle systems, vehicle equipment systems, vehicle equipment, vehicle components, vehicle devices, and/or vehicle accessories, the vehicles and/or any of the herein-described vehicle systems, vehicle equipment systems, vehicle equipment, vehicle components, vehicle devices, and/or vehicle accessories, which can be controlled, monitored, and/or secured, via the present invention, the time or times for which certain control, monitoring, and/or security, operations or functions can be performed on certain vehicles and/or any of the herein-described vehicle systems, vehicle equipment systems, vehicle equipment, vehicle components, vehicle devices, and/or vehicle accessories, the name or identity of an owner, user, or authorized individual(s), entity, or entities, who or which are authorized to perform any of the control, monitoring, and/or security, operations or functions on certain vehicles and/or certain of any of the herein-described vehicle systems, vehicle equipment systems, vehicle equipment, vehicle components, vehicle devices, and/or vehicle accessories, and/or the types of or identity of the vehicle systems, vehicle equipment systems, vehicle equipment, vehicle components, vehicle devices, and/or vehicle accessories, which can be controlled, monitored, and/or secured, via the present invention and/or which can be controlled by the respective owner, user, or authorized individual or entity, and/or the degree and/or manner to which they can be controlled, monitored, and/or secured.

The present invention can be utilized in order to limit and/or restrict access to any one or more of the herein-described vehicles as well as to limit or restrict the control, monitoring, and/or security, operations or functions, which can be performed on or regarding any one or more of the herein-described vehicles and/or any of the herein-described vehicle systems, vehicle equipment systems, vehicle equipment, vehicle components, vehicle devices, and/or vehicle accessories, associated with a vehicle or vehicles. In this manner, the present invention can be utilized in order to limit or restrict use of the present invention as it may pertain to a respective vehicle or vehicles.

In a preferred embodiment, a limitation or restriction on access to a vehicle and/or to any of the herein-described vehicle systems, vehicle equipment systems, vehicle equipment, vehicle components, vehicle devices, and/or vehicle accessories, and/or the types and kinds of control, monitoring, and/or security, operations and/or functions, which can be performed on or regarding a vehicle and/or any of the herein-described vehicle systems, vehicle equipment systems, vehicle equipment, vehicle components, vehicle devices, and/or vehicle accessories, can be transmitted to a respective server computer 510, a server computer 952, and/or a computer 970, from a communication device or a computer associated with the owner, user, or authorized individual.

The communication device or computer can, but need not be, the home or personal computer or communication device 150, but rather can be a communication device, telephone, wireless telephone, cellular telephone, videophone, display telephone, two-way radio, walkie-talkie, television, digital television, cable television, interactive television, pager, beeper, personal digital assistant, pocket personal computer, computer, desktop computer, laptop or notebook computer, mobile computer, handheld computer, a network computer for receiving and/or providing electronic mail messages, and/or watch, and/or any other communication device.

The owner, user, or authorized individual, can, at any time, access the respective server computer 510, a server computer 952, and/or a computer 970, whichever computer is being utilized, and transmit the limitation(s) or restriction(s) to the respective server computer 510, a server computer 952, and/or a computer 970. The limitation or restriction can be automatically received by the respective server computer 510, a server computer 952, and/or a computer 970, and can be automatically stored by the respective server computer 510, a server computer 952, and/or a computer 970.

Thereafter, upon an individual or entity attempting to access the vehicle via the respective server computer 510, a server computer 952, and/or a computer 970, in order to attempt to perform a control, a monitoring, and/or a security, operation or function, on or regarding a vehicle and/or a vehicle system, a vehicle equipment system, vehicle equipment, a vehicle component, a vehicle device, and/or a vehicle accessory, the respective server computer 510, a server computer 952, and/or a computer 970, can utilize the stored limitation(s) or restriction(s) in processing the control, monitoring, and/or security, operation or function, which is being attempted.

The respective server computer 510, a server computer 952, and/or a computer 970, can determine whether the attempted control, monitoring, and/or security, operation or function, is at last one of authorized, allowed, unauthorized, or disallowed. Depending upon the outcome of the processing routine, the respective server computer 510, a server computer 952, and/or a computer 970, will determine if the attempted control, monitoring, and/or security, operation or function, is at least one of authorized, allowed, unauthorized, or disallowed.

If the respective server computer 510, a server computer 952, and/or a computer 970, determines that the attempted control, monitoring, and/or security, operation or function, is authorized or allowed, the respective server computer 510, a server computer 952, and/or a computer 970, will effectuate the control, monitoring, and/or security, operation or function on or regarding the vehicle and/or any vehicle system(s), vehicle equipment system(s), vehicle equipment, vehicle component(s), vehicle device(s), vehicle accessory, and/or vehicle accessories. If the respective server computer 510, a server computer 952, and/or a computer 970, determines that the attempted control, monitoring, and/or security, operation or function, is unauthorized or not allowed, then the respective server computer 510, a server computer 952, and/or a computer 970, will disallow the attempted control, monitoring, and/or security, operation or function.

The respective server computer 510, a server computer 952, and/or a computer 970, can thereafter, generate and transmit an notification message to any of the herein-described communication devices identified as being associated with the owner, user, and/or authorized individual or entity, so as to provide information regarding the access of the vehicle and/or the control, monitoring, and/or security, operation(s) and/or function(s) performed. In the case of an unauthorized access and/or attempt, the notification message can provide information regarding the attempted access and/or the control, monitoring, and/or security, operation or function, which was attempted. The notification message can also include the time of access, telephone number or traced location from which the access communication originated and/or was transmitted, and/or any other information regarding the time or access and the individual or entity accessing the vehicle or attempting top access the vehicle.

Figure 17:
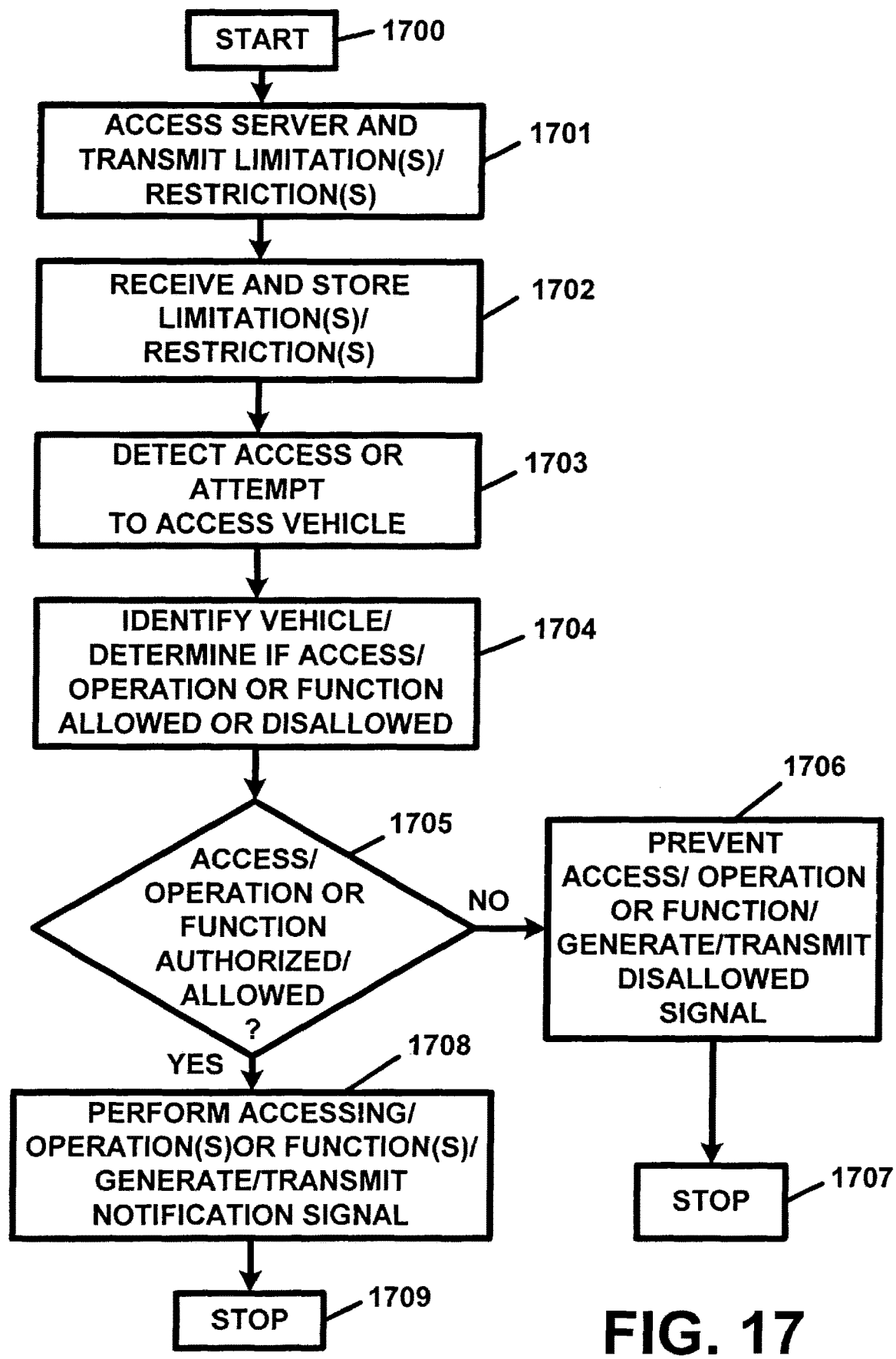
FIG. 17 illustrates another preferred embodiment method for utilizing the present invention, in flow diagram form.

FIG. 17 illustrates another preferred embodiment method for utilizing the apparatus and method of the present invention, in flow diagram form. The operation of the embodiment of FIG. 17 commences at step 1700. At step 1701, a respective owner, user, or authorized individual, can access the respective server computer 510, a server computer 952, and/or a computer 970, whichever computer is being utilized, via the communication device and transmit the limitation(s) or restriction(s) to the respective server computer 510, a server computer 952, and/or a computer 970.

The limitation(s) or restriction(s) can include or involve the identity of an individuals(), entity, or entities, who or which may access and/or control, monitor, and/or secure, the vehicle and/or any of the vehicle system(s), vehicle equipment system(s), vehicle equipment, vehicle component(s), vehicle device(s), vehicle accessory, and/or vehicle accessories (i.e. vehicle owner, authorized user, authorized operator, authorized individual or entity, etc.), the authorized times of allowed access and/or control, monitoring, and/or security, operations and/or functions (i.e. known or expected use times, in-use times, parked, stored, and/or maintenance times, travel times, driving times, flying times, etc.), the types or kinds of control, monitoring, and/or security, operations and/or functions (i.e. activate, deactivate, disable, re-enable, control operation, remote-control operation, etc.) which can be performed and the vehicle(s) any or any of the vehicle system(s), vehicle equipment system(s), vehicle equipment, vehicle component(s), vehicle device(s), vehicle accessory, and/or vehicle accessories, on which the control, monitoring, and/or security, operations or functions can be performed, and/or any other limitation(s) and/or restrictions on access or the vehicle and/or any of the vehicle system(s), vehicle equipment system(s), vehicle equipment, vehicle component(s), vehicle device(s), vehicle accessory, and/or vehicle accessories, and/or use of the present invention.

At step 1702, the limitation(s) or restriction(s) can be automatically received by the respective server computer 510, a server computer 952, and/or a computer 970, and automatically stored by the respective server computer 510, a server computer 952, and/or a computer 970. At step 1703, the respective server computer 510, a server computer 952, and/or a computer 970, will detect an accessing of the respective server computer 510, a server computer 952, and/or a computer 970, by an individual or entity, in order for the individual or entity to access, and/or to perform a control, monitoring, and/or security, operation or function on or regarding, the vehicle and/or any one or more of the vehicle system(s), vehicle equipment system(s), vehicle equipment, vehicle component(s), vehicle device(s), vehicle accessory, and/or vehicle accessories.

At step 1704, the respective server computer 510, a server computer 952, and/or a computer 970, and automatically stored by the respective server computer 510, a server computer 952, and/or a computer 970, will identify the vehicle which is the subject of the accessing. At step 1704, the respective server computer 510, a server computer 952, and/or a computer 970, will utilize the stored limitation(s) and/or restriction(s) information in order to determine whether the accessing is authorized, allowed, unauthorized, and/or disallowed, and/or whether the control, monitoring, and/or security, operation(s) and/or function(s), being attempted is authorized, allowed, unauthorized, and/or disallowed.

If, at step 1705, it is determined that any one or more of the accessing of the vehicle or the control, monitoring, and/or security, operation(s) and/or function(s), being attempted is unauthorized or disallowed, the respective server computer 510, a server computer 952, and/or a computer 970 will proceed to step 1706 and prevent the accessing of the vehicle and prevent the attempted control, monitoring, and/or security, operation(s) and/or function(s) from being performed.

The server computer 510, a server computer 952, and/or a computer 970 will also, at step 1706, generate a disallowed signal and transmit same to a communication device(s) associated with a vehicle owner, a vehicle user, an authorized individual or entity, a law enforcement agency, and/or other official agency or entity (i.e. police, security agency, security service provider, FBI, Federal Transportation Administration, Federal Aviation Administration, Coast Guard, Army, Air Force, Navy, etc.).

The disallowed signal can contain any information regarding the source of the attempted accessing, the identity of the individual seeking the accessing or seeking to perform or effectuate the control, monitoring, and/or security, operation(s) or function(s), the source of the attempted control, monitoring, and/or security, operation(s) or function(s), the time of the request for same, the types of control, monitoring, and/or security, operation(s) or function(s), attempted, and the vehicle and/or the vehicle system(s), vehicle equipment system(s), vehicle equipment, vehicle component(s), vehicle device(s), vehicle accessory, and/or vehicle accessories, which are or were the subject of the attempt.

Thereafter, the operation of the apparatus and method of the present invention will cease at step 1707.

If, at step 1705, it is determined that any one or more of the accessing of the vehicle or the control, monitoring, and/or security, operation(s) and/or function(s), being attempted is authorized or allowed, the respective server computer 510, a server computer 952, and/or a computer 970, will proceed to step 1708 and perform the desired vehicle accessing and perform the desired control, monitoring, and/or security, operation(s) and/or function(s), on the vehicle and/or the vehicle system(s), vehicle equipment system(s), vehicle equipment, vehicle component(s), vehicle device(s), vehicle accessory, and/or vehicle accessories.

The server computer 510, a server computer 952, and/or a computer 970 will also, at step 1708, generate a notification signal and transmit same to a communication device(s) associated with a vehicle owner, a vehicle user, an authorized individual or entity, a law enforcement agency, and/or other official agency or entity (i.e. police, security agency, security service provider, FBI, Federal Transportation Administration, Federal Aviation Administration, Coast Guard, Army, Air Force, Navy, etc.).

The notification signal can contain any information regarding the source of the accessing, the identity of the individual or entity seeking the accessing or seeking to perform or effectuate the control, monitoring, and/or security, operation(s) or function(s), the source of the control, monitoring, and/or security, operation(s) or function(s), the time of the receipt of same, the types of control, monitoring, and/or security, operation(s) or function(s), performed, or to be performed, and the vehicle and/or the vehicle system(s), vehicle equipment system(s), vehicle equipment, vehicle component(s), vehicle device(s), vehicle accessory, and/or vehicle accessories, which were, and/or which are to the subject of the subject of the respective control, monitoring, and/or security, operation(s) or function(s).

Thereafter, the operation of the apparatus and method of the present invention will cease at step 1709.

In another preferred embodiment of the present invention, a respective premises owner, premises user, or other authorized individual or entity, can program any one or more of respective server computer 510, a server computer 952, and/or a computer 970, so as to provide a limitation, limitations, a restriction, and/or restrictions, regarding any control operations or functions, any monitoring operations or functions, and/or any security operations or functions, which can be authorized, allowed, and/or disallowed. In this regard, the present invention can be utilized so as to allow an owner, user, or authorized individual or entity, to pre-specify limitations or restrictions regarding the use of the apparatus and method of the present invention in conjunction with any of the herein described premises.

The limitation(s) or restriction(s) on the ability to access the present invention and/or the premises and/or to perform any of the herein-described control, monitoring, and/or security, operations or functions on or regarding the respective premises can include, but is not limited to authorized individuals who may utilize the present invention to perform a control monitoring, and/or security operation or function, on or regarding any of the herein-described premises and/or any of the herein-described premises systems, premises equipment systems, premises equipment, premises components, premises devices, and/or premises accessories, authorized time or times for performing any of the herein-described control, monitoring, and/or security, operations or functions on or regarding any of the herein-described premises and/or any of the herein-described premises systems, premises equipment systems, premises equipment, premises components, premises devices, and/or premises accessories, the name or identity of an authorized individual, entity, individuals, and/or entities, which or which can perform any of the herein-described control, monitoring, and/or security, operations or functions on or regarding any of the herein-described premises and/or any of the herein-described premises systems, premises equipment systems, premises equipment, premises components, premises devices, and/or premises accessories, the types of, the kinds of, and/or the degree of, control, monitoring, and/or security, operations or functions which can be performed on or regarding any of the herein-described premises and/or any of the herein-described premises systems, premises equipment systems, premises equipment, premises components, premises devices, and/or premises accessories, the premises and/or any of the herein-described premises systems, premises equipment systems, premises equipment, premises components, premises devices, and/or premises accessories, which can be controlled, monitored, and/or secured, via the present invention, the time or times for which certain control, monitoring, and/or security, operations or functions can be performed on certain premises and/or any of the herein-described premises systems, premises equipment systems, premises equipment, premises components, premises devices, and/or premises accessories, the name or identity of an owner, user, or authorized individual(s), entity, or entities, who or which are authorized to perform any of the control, monitoring, and/or security, operations or functions on certain premises and/or certain of any of the herein-described premises systems, premises equipment systems, premises equipment, premises components, premises devices, and/or premises accessories, and/or the types of or identity of the premises systems, premises equipment systems, premises equipment, premises components, premises devices, and/or premises accessories, which can be controlled, monitored, and/or secured, via the present invention and/or which can be controlled by the respective owner, user, or authorized individual or entity, and/or the degree and/or manner to which they can be controlled, monitored, and/or secured.

The present invention can be utilized in order to limit and/or restrict access to any one or more of the herein-described premises as well as to limit or restrict the control, monitoring, and/or security, operations or functions, which can be performed on or regarding any one or more of the herein-described premises and/or any of the herein-described premises systems, premises equipment systems, premises equipment, premises components, premises devices, and/or premises accessories, associated with a premises or premises. In this manner, the present invention can be utilized in order to limit or restrict use of the present invention as it may pertain to a respective premises or premises.

In a preferred embodiment, a limitation or restriction on access to a premises and/or to any of the herein-described premises systems, premises equipment systems, premises equipment, premises components, premises devices, and/or premises accessories, and/or the types and kinds of control, monitoring, and/or security, operations and/or functions, which can be performed on or regarding a premises and/or any of the herein-described premises systems, premises equipment systems, premises equipment, premises components, premises devices, and/or premises accessories, can be transmitted to a respective server computer 510, a server computer 952, and/or a computer 970, from a communication device or a computer associated with the owner, user, or authorized individual.

The communication device or computer can, but need not be, the home or personal computer or communication device 150, but rather can be a communication device, telephone, wireless telephone, cellular telephone, videophone, display telephone, two-way radio, walkie-talkie, television, digital television, cable television, interactive television, pager, beeper, personal digital assistant, pocket personal computer, computer, desktop computer, laptop or notebook computer, mobile computer, handheld computer, a network computer for receiving and/or providing electronic mail messages, and/or watch, and/or any other communication device.

The owner, user, or authorized individual, can, at any time, access the respective server computer 510, a server computer 952, and/or a computer 970, whichever computer is being utilized, and transmit the limitation(s) or restriction(s) to the respective server computer 510, a server computer 952, and/or a computer 970. The limitation or restriction can be automatically received by the respective server computer 510, a server computer 952, and/or a computer 970, and can be automatically stored by the respective server computer 510, a server computer 952, and/or a computer 970.

Thereafter, upon an individual or entity attempting to access the premises via the respective server computer 510, a server computer 952, and/or a computer 970, in order to attempt to perform a control, a monitoring, and/or a security, operation or function, on or regarding a premises and/or a premises system, a premises equipment system, premises equipment, a premises component, a premises device, and/or a premises accessory, the respective server computer 510, a server computer 952, and/or a computer 970, can utilize the stored limitation(s) or restriction(s) in processing the control, monitoring, and/or security, operation or function, which is being attempted. The respective server computer 510, a server computer 952, and/or a computer 970, can determine whether the attempted control, monitoring, and/or security, operation or function, is at last one of authorized, allowed, unauthorized, or disallowed. Depending upon the outcome of the processing routine, the respective server computer 510, a server computer 952, and/or a computer 970, will determine if the attempted control, monitoring, and/or security, operation or function, is at least one of authorized, allowed, unauthorized, or disallowed.

If the respective server computer 510, a server computer 952, and/or a computer 970, determines that the attempted control, monitoring, and/or security, operation or function, is authorized or allowed, the respective server computer 510, a server computer 952, and/or a computer 970, will effectuate the control, monitoring, and/or security, operation or function on or regarding the premises and/or any premises system(s), premises equipment system(s), premises equipment, premises component(s), premises device(s), premises accessory, and/or premises accessories. If the respective server computer 510, a server computer 952, and/or a computer 970, determines that the attempted control, monitoring, and/or security, operation or function, is unauthorized or not allowed, then the respective server computer 510, a server computer 952, and/or a computer 970, will disallow the attempted control, monitoring, and/or security, operation or function.

The respective server computer 510, a server computer 952, and/or a computer 970, can thereafter, generate and transmit an notification message to any of the herein-described communication devices identified as being associated with the owner, user, and/or authorized individual or entity, so as to provide information regarding the access of the premises and/or the control, monitoring, and/or security, operation(s) and/or function(s) performed. In the case of an unauthorized access and/or attempt, the notification message can provide information regarding the attempted access and/or the control, monitoring, and/or security, operation or function, which was attempted. The notification message can also include the time of access, telephone number or traced location from which the access communication originated and/or was transmitted, and/or any other information regarding the time or access and the individual or entity accessing the premises or attempting top access the premises.

Figure 18:
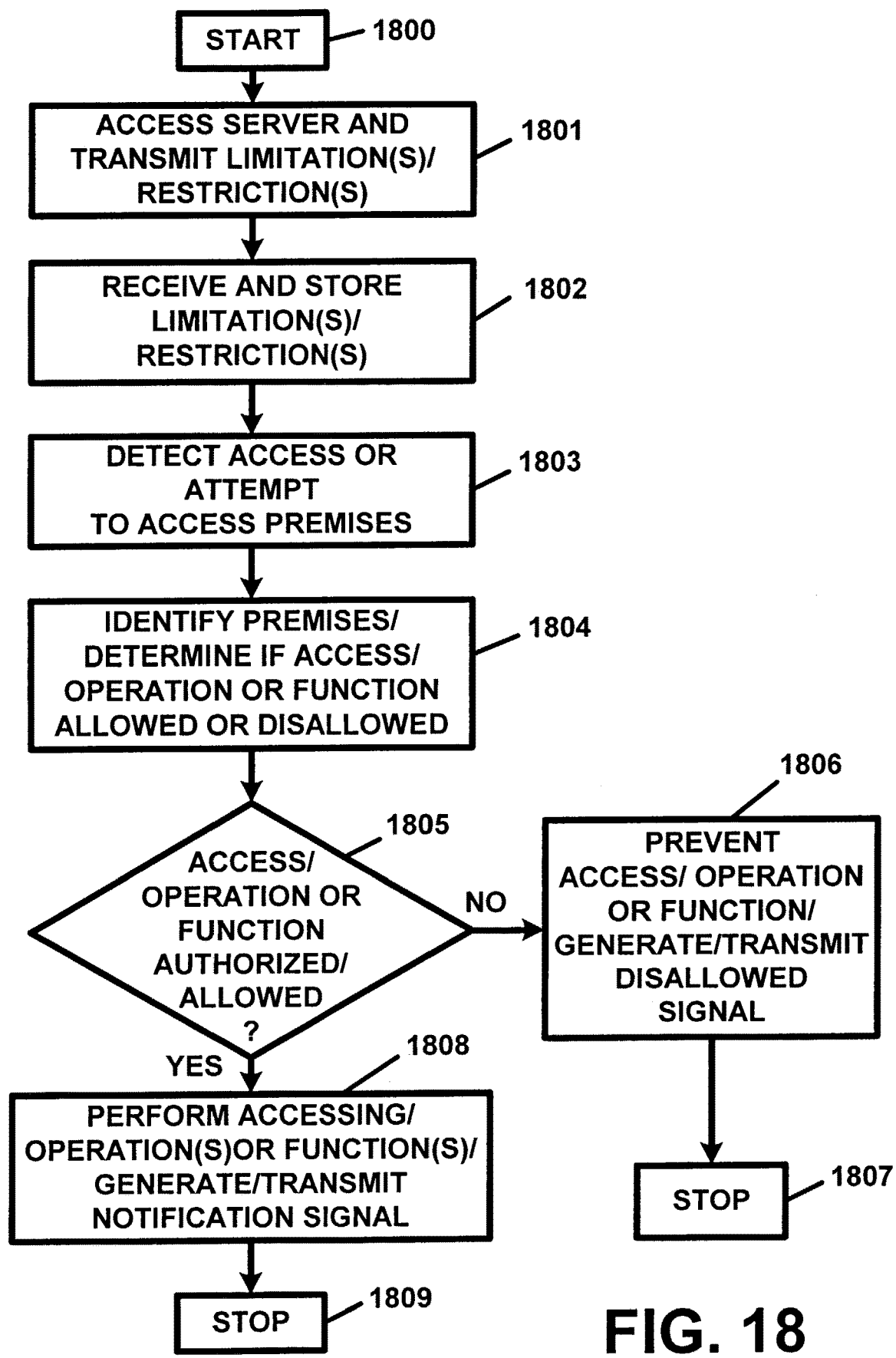
FIG. 18 illustrates still another preferred embodiment method for utilizing the present invention, in flow diagram form.

FIG. 18 illustrates another preferred embodiment method for utilizing the apparatus and method of the present invention, in flow diagram form. The operation of the embodiment of FIG. 18 commences at step 1800. At step 1801, a respective owner, user, or authorized individual, can access the respective server computer 510, a server computer 952, and/or a computer 970, whichever computer is being utilized, via the communication device and transmit the limitation(s) or restriction(s) to the respective server computer 510, a server computer 952, and/or a computer 970.

The limitation(s) or restriction(s) can include or involve the identity of an individual(s), entity, or entities, who or which may access and/or control, monitor, and/or secure, the premises and/or any of the premises system(s), premises equipment system(s), premises equipment, premises component(s), premises device(s), premises accessory, and/or premises accessories (i.e. premises owner, authorized user, authorized operator, authorized individual or entity, etc.), the authorized times of allowed access and/or control, monitoring, and/or security, operations and/or functions (i.e. known or expected use times, in-use times, occupied times, vacant times stored, and/or maintenance times, operational times, etc.), the types or kinds of control, monitoring, and/or security, operations and/or functions (i.e. activate, deactivate, disable, re-enable, control operation, remote-control operation, etc.) which can be performed and the premises(s) any or any of the premises system(s), premises equipment system(s), premises equipment, premises component(s), premises device(s), premises accessory, and/or premises accessories, on which the control, monitoring, and/or security, operations or functions can be performed, and/or any other limitation(s) and/or restrictions on access or the premises and/or any of the premises system(s), premises equipment system(s), premises equipment, premises component(s), premises device(s), premises accessory, and/or premises accessories, and/or use of the present invention.

At step 1802, the limitation(s) or restriction(s) can be automatically received by the respective server computer 510, a server computer 952, and/or a computer 970, and automatically stored by the respective server computer 510, a server computer 952, and/or a computer 970. At step 1803, the respective server computer 510, a server computer 952, and/or a computer 970, will detect an accessing of the respective server computer 510, a server computer 952, and/or a computer 970, by an individual or entity, in order for the individual or entity to access, and/or to perform a control, monitoring, and/or security, operation or function on or regarding, the premises and/or any one or more of the premises system(s), premises equipment system(s), premises equipment, premises component(s), premises device(s), premises accessory, and/or premises accessories.

At step 1804, the respective server computer 510, a server computer 952, and/or a computer 970, and automatically stored by the respective server computer 510, a server computer 952, and/or a computer 970, will identify the premises which is the subject of the accessing. At step 1804, the respective server computer 510, a server computer 952, and/or a computer 970, will utilize the stored limitation(s) and/or restriction(s) information in order to determine whether the accessing is authorized, allowed, unauthorized, and/or disallowed, and/or whether the control, monitoring, and/or security, operation(s) and/or function(s), being attempted is authorized, allowed, unauthorized, and/or disallowed.

If, at step 1805, it is determined that any one or more of the accessing of the premises or the control, monitoring, and/or security, operation(s) and/or function(s), being attempted is unauthorized or disallowed, the respective server computer 510, a server computer 952, and/or a computer 970 will proceed to step 1806 and prevent the accessing of the premises and prevent the attempted control, monitoring, and/or security, operation(s) and/or function(s) from being performed.

The server computer 510, a server computer 952, and/or a computer 970 will also, at step 1806, generate a disallowed signal and transmit same to a communication device(s) associated with a premises owner, a premises user, an authorized individual or entity, a law enforcement agency, and/or other official agency or entity (i.e. police, security agency, security service provider, FBI, Coast Guard, Army, Air Force, Navy, etc.). The disallowed signal can contain any information regarding the source of the attempted accessing, the identity of the individual seeking the accessing or seeking to perform or effectuate the control, monitoring, and/or security, operation(s) or function(s), the source of the attempted control, monitoring, and/or security, operation(s) or function(s), the time of the request for same, the types of control, monitoring, and/or security, operation(s) or function(s), attempted, and the premises and/or the premises system(s), premises equipment system(s), premises equipment, premises component(s), premises device(s), premises accessory, and/or premises accessories, which are or were the subject of the attempt.

Thereafter, the operation of the apparatus and method of the present invention will cease at step 1807.

If, at step 1805, it is determined that any one or more of the accessing of the premises or the control, monitoring, and/or security, operation(s) and/or function(s), being attempted is authorized or allowed, the respective server computer 510, a server computer 952, and/or a computer 970, will proceed to step 1808 and perform the desired premises accessing and perform the desired control, monitoring, and/or security, operation(s) and/or function(s), on the premises and/or the premises system(s), premises equipment system(s), premises equipment, premises component(s), premises device(s), premises accessory, and/or premises accessories.

The server computer 510, a server computer 952, and/or a computer 970 will also, at step 1808, generate a notification signal and transmit same to a communication device(s) associated with a premises owner, a premises user, an authorized individual or entity, a law enforcement agency, and/or other official agency or entity (i.e. police, security agency, security service provider, FBI, Coast Guard, Army, Air Force, Navy, etc.).

The notification signal can contain any information regarding the source of the accessing, the identity of the individual or entity seeking the accessing or seeking to perform or effectuate the control, monitoring, and/or security, operation(s) or function(s), the source of the control, monitoring, and/or security, operation(s) or function(s), the time of the receipt of same, the types of control, monitoring, and/or security, operation(s) or function(s), performed, or to be performed, and the premises and/or the premises system(s), premises equipment system(s), premises equipment, premises component(s), premises device(s), premises accessory, and/or premises accessories, which were, and/or which are to the subject of the subject of the respective control, monitoring, and/or security, operation(s) or function(s).

Thereafter, the operation of the apparatus and method of the present invention will cease at step 1809.

In another preferred embodiment, the apparatus and method of the present invention can provide a real-time and/or a deferred notification to a vehicle owner, user, and/or an authorized individual that the vehicle has been accessed and/or that a control, a monitoring, and/or a security, operation(s) or function(s) has been, or is about to be, performed on or regarding any of the herein-described vehicles and/or any of the herein-described vehicle systems, vehicle equipment systems, vehicle equipment, vehicle components, vehicle devices, and/or vehicle accessories.

The notification can be performed by transmitting a notification message containing information regarding the vehicle accessing event, and/or the control, monitoring, and/or security, operation(s) and/or function(s) which has been, or which is about to be, performed, from a respective server computer 510, a server computer 952, and/or a computer 970, whichever computer is being utilized.

In another preferred embodiment, the respective vehicle owner, user, or other authorized individual can transmit a reply message, to the respective server computer 510, a server computer 952, and/or a computer 970, containing information for any one or more of allowing or disallowing the vehicle accessing, and/or undoing or canceling any performed control, monitoring, and/or security, operation(s) or function(s) or allowing or disallowing any control, monitoring, and/or security, operation(s) or function(s) which are about to be performed.

The respective server computer 510, server computer 952, and/or computer 970, can receive and process the reply signal and, thereafter, either undo or cancel any performed control, monitoring, and/or security, operation(s) or function(s), and/or allow of disallow the vehicle accessing, and/or any control, monitoring, and/or security, operation(s) or function(s), which are about to be performed.

The respective server computer 510, server computer 952, and/or computer 970, can, thereafter, generates an activity or confirmation message containing information regarding the action taken by the respective server computer 510, server computer 952, and/or computer 970, in response to the reply signal.

Figure 19:
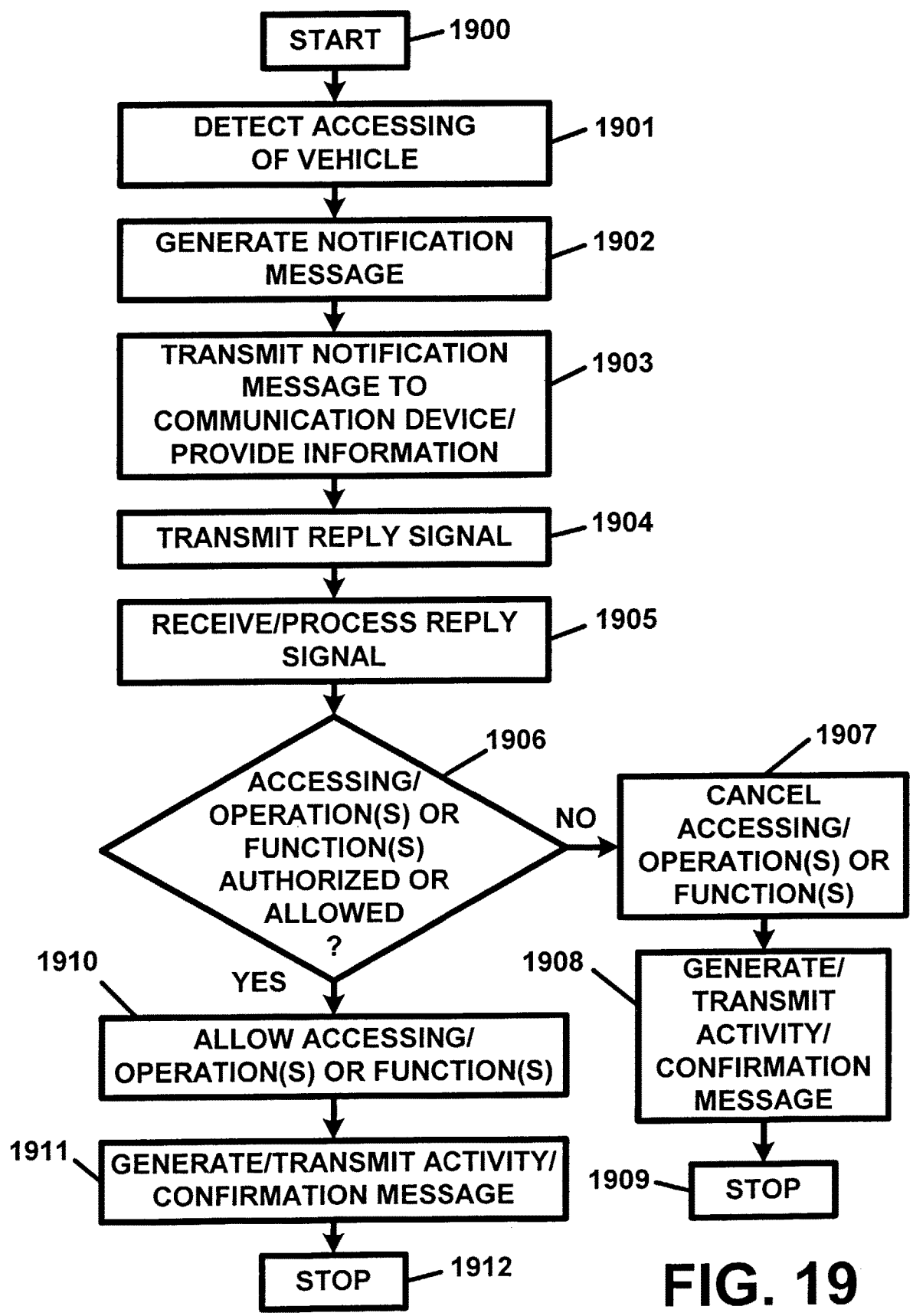
FIG. 19 illustrates yet another preferred embodiment method for utilizing the present invention, in flow diagram form.

FIG. 19 illustrates another preferred embodiment method for utilizing the apparatus and method of the present invention, in flow diagram form. With reference to FIG. 19, the operation of the apparatus commences at step 1900. At step 1901, the respective server computer 510, server computer 952, and/or computer 970, detects an accessing of the vehicle, or an attempt to access the vehicle, along with information regarding any control, monitoring, and/or security, operation(s) and/or function(s), which are to be performed and/or which are attempted to be performed, on or regarding the vehicle and/or any of the herein-described vehicles and/or any of the herein-described vehicle systems, vehicle equipment systems, vehicle equipment, vehicle components, vehicle devices, and/or vehicle accessories.

At step 1902, the respective server computer 510, server computer 952, and/or computer 970, will generate a notification message containing information regarding the vehicle accessing, the attempt to access the vehicle, the source of the accessing or the attempted accessing, the identity of the individual performing or seeking the accessing or performing or seeking to perform or effectuate the control, monitoring, and/or security, operation(s) or function(s), the source of the attempted control, monitoring, and/or security, operation(s) or function(s), the time of the request for same, the types of control, monitoring, and/or security, operation(s) or function(s), attempted, and/or the vehicle and/or the vehicle system(s), vehicle equipment system(s), vehicle equipment, vehicle component(s), vehicle device(s), vehicle accessory, and/or vehicle accessories, which are or were the subject of the vehicle accessing or the attempted vehicle accessing.

At step 1903, the notification message is transmitted from the respective server computer 510, a server computer 952, and/or a computer 970, to a communication device or a computer associated with the owner, user, or authorized individual. The communication device or computer can, but need not be, the home or personal computer or communication device 150, but rather can be a communication device, telephone, wireless telephone, cellular telephone, videophone, display telephone, two-way radio, walkie-talkie, television, digital television, cable television, interactive television, pager, beeper, personal digital assistant, pocket personal computer, computer, desktop computer, laptop or notebook computer, mobile computer, handheld computer, a network computer for receiving and/or providing electronic mail messages, and/or watch, and/or any other communication device.

At step 1903, the communication device can provide information contained in the notification message to the owner, user, or authorized individual. At step 1903, the owner, user, or authorized individual, can enter information for either undoing or canceling any performed control, monitoring, and/or security, operation(s) or functions(s), canceling any performed or about to be performed control, monitoring, and/or security, operation(s) or functions(s), and/or allowing or disallowing any control, monitoring, and/or security, operation(s) or functions(s), which are about to be performed.

At step 1904, the owner, user, or authorized individual, can transmit a reply signal to the respective server computer 510, a server computer 952, and/or a computer 970. The reply signal can contain information for canceling any performed or about to be performed control, monitoring, and/or security, operation(s) or functions(s), and/or allowing or disallowing any control, monitoring, and/or security, operation(s) or functions(s), which are about to be performed.

At step 1905, the reply signal can be received and processed by the respective server computer 510, server computer 952, and/or computer 970. At step 1906, the respective server computer 510, server computer 952, and/or computer 970, will determine if the vehicle accessing and/or the control, monitoring, and/or security, operation(s) and/or function(s), performed or about to be performed, are authorized, allowed, unauthorized, or disallowed.

If, at step 1906, it is determined that the vehicle accessing and/or the control, monitoring, and/or security, operation(s) and/or function(s), performed or about to be performed, are unauthorized or disallowed, the operation of the respective server computer 510, server computer 952, and/or computer 970, will proceed to step 1907 and the accessing will be cancelled and any control, monitoring, and/or security, operation(s) and/or function(s), performed will be undone or cancelled and/or any control, monitoring, and/or security, operation(s) and/or function(s), about to be performed will be disallowed.

Thereafter, at step 1908, the respective server computer 510, server computer 952, and/or computer 970, will generate an activity or confirmation message containing information regarding any actions taken by, or operations performed, by the respective server computer 510, server computer 952, and/or computer 970, in response to the reply signal. At step 1908, the respective server computer 510, server computer 952, and/or computer 970, will transmit the activity or confirmation message to the communication device associated with the owner, user, or authorized individual and the information contained in the activity or confirmation message can be provided to the owner, user, or authorized individual. Thereafter, the operation of the apparatus will cease at step 1909.

If, at step 1906, it is determined that the vehicle accessing and/or the control, monitoring, and/or security, operation(s) and/or function(s), performed or about to be performed, are authorized or allowed, the operation of the respective server computer 510, server computer 952, and/or computer 970, will proceed to step 1910 and the accessing will be allowed and any control, monitoring, and/or security, operation(s) and/or function(s), performed will undisturbed and/or any control, monitoring, and/or security, operation(s) and/or function(s), about to be performed will be performed.

Thereafter, at step 1911, the respective server computer 510, server computer 952, and/or computer 970, will generate an activity or confirmation message containing information regarding any actions taken by, or operations performed, by the respective server computer 510, server computer 952, and/or computer 970, in response to the reply signal. At step 1911, the respective server computer 510, server computer 952, and/or computer 970, will transmit the activity or confirmation message to the communication device associated with the owner, user, or authorized individual and the information contained in the activity or confirmation message can be provided to the owner, user, or authorized individual. Thereafter, the operation of the apparatus will cease at step 1912.

In another preferred embodiment, the apparatus and method of the present invention can provide a real-time and/or a deferred notification to a premises owner, user, and/or an authorized individual that the premises has been accessed and/or that a control, a monitoring, and/or a security, operation(s) or function(s) has been, or is about to be, performed on or regarding any of the herein-described premises and/or any of the herein-described premises systems, premises equipment systems, premises equipment, premises components, premises devices, and/or premises accessories.

The notification can be performed by transmitting a notification message containing information regarding the premises accessing event, and/or the control, monitoring, and/or security, operation(s) and/or function(s) which has been, or which is about to be, performed, from a respective server computer 510, a server computer 952, and/or a computer 970, whichever computer is being utilized.

In another preferred embodiment, the respective premises owner, user, or other authorized individual can transmit a reply message, to the respective server computer 510, a server computer 952, and/or a computer 970, containing information for any one or more of allowing or disallowing the premises accessing, and/or undoing or canceling any performed control, monitoring, and/or security, operation(s) or function(s) or allowing or disallowing any control, monitoring, and/or security, operation(s) or function(s) which are about to be performed.

The respective server computer 510, server computer 952, and/or computer 970, can receive and process the reply signal and, thereafter, either undo or cancel any performed control, monitoring, and/or security, operation(s) or function(s), and/or allow of disallow the premises accessing, and/or any control, monitoring, and/or security, operation(s) or function(s), which are about to be performed.

The respective server computer 510, server computer 952, and/or computer 970, can, thereafter, generates an activity or confirmation message containing information regarding the action taken by the respective server computer 510, server computer 952, and/or computer 970, in response to the reply signal.

Figure 20:
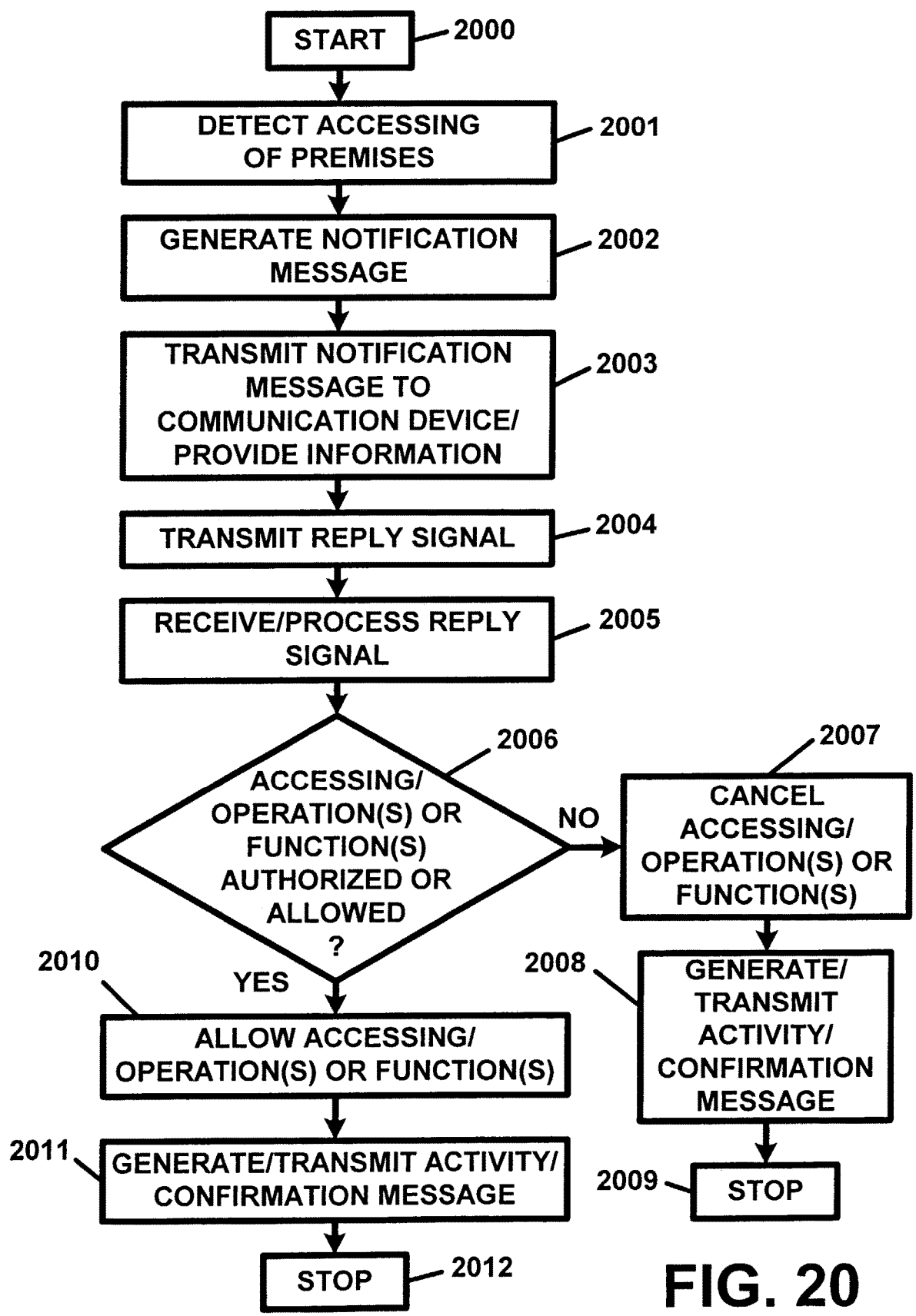
FIG. 20 illustrates another preferred embodiment method for utilizing the present invention, in flow diagram form.

FIG. 20 illustrates another preferred embodiment method for utilizing the apparatus and method of the present invention, in flow diagram form. With reference to FIG. 20, the operation of the apparatus commences at step 2000. At step 2001, the respective server computer 510, server computer 952, and/or computer 970, detects an accessing of the premises, or an attempt to access the premises, along with information regarding any control, monitoring, and/or security, operation(s) and/or function(s), which are to be performed and/or which are attempted to be performed, on or regarding the premises and/or any of the herein-described premises and/or any of the herein-described premises systems, premises equipment systems, premises equipment, premises components, premises devices, and/or premises accessories.

At step 2002, the respective server computer 510, server computer 952, and/or computer 970, will generate a notification message containing information regarding the premises accessing, the attempt to access the premises, the source of the accessing or the attempted accessing, the identity of the individual performing or seeking the accessing or performing or seeking to perform or effectuate the control, monitoring, and/or security, operation(s) or function(s), the source of the attempted control, monitoring, and/or security, operation(s) or function(s), the time of the request for same, the types of control, monitoring, and/or security, operation(s) or function(s), attempted, and/or the premises and/or the premises system(s), premises equipment system(s), premises equipment, premises component(s), premises device(s), premises accessory, and/or premises accessories, which are or were the subject of the premises accessing or the attempted premises accessing.

At step 2003, the notification message is transmitted from the respective server computer 510, a server computer 952, and/or a computer 970, to a communication device or a computer associated with the owner, user, or authorized individual.

The communication device or computer can, but need not be, the home or personal computer or communication device 150, but rather can be a communication device, telephone, wireless telephone, cellular telephone, videophone, display telephone, two-way radio, walkie-talkie, television, digital television, cable television, interactive television, pager, beeper, personal digital assistant, pocket personal computer, computer, desktop computer, laptop or notebook computer, mobile computer, handheld computer, a network computer for receiving and/or providing electronic mail messages, and/or watch, and/or any other communication device.

At step 2003, the communication device can provide information contained in the notification message to the owner, user, or authorized individual. At step 2003, the owner, user, or authorized individual, can enter information for either undoing or canceling any performed control, monitoring, and/or security, operation(s) or functions(s), canceling any performed or about to be performed control, monitoring, and/or security, operation(s) or functions(s), and/or allowing or disallowing any control, monitoring, and/or security, operation(s) or functions(s), which are about to be performed.

At step 2004, the owner, user, or authorized individual, can transmit a reply signal to the respective server computer 510, a server computer 952, and/or a computer 970. The reply signal can contain information for canceling any performed or about to be performed control, monitoring, and/or security, operation(s) or functions(s), and/or allowing or disallowing any control, monitoring, and/or security, operation(s) or functions(s), which are about to be performed.

At step 2005, the reply signal can be received and processed by the respective server computer 510, server computer 952, and/or computer 970. At step 1906, the respective server computer 510, server computer 952, and/or computer 970, will determine if the premises accessing and/or the control, monitoring, and/or security, operation(s) and/or function(s), performed or about to be performed, are authorized, allowed, unauthorized, or disallowed.

If, at step 2006, it is determined that the premises accessing and/or the control, monitoring, and/or security, operation(s) and/or function(s), performed or about to be performed, are unauthorized or disallowed, the operation of the respective server computer 510, server computer 952, and/or computer 970, will proceed to step 2007 and the accessing will be cancelled and any control, monitoring, and/or security, operation(s) and/or function(s), performed will be undone or cancelled and/or any control, monitoring, and/or security, operation(s) and/or function(s), about to be performed will be disallowed.

Thereafter, at step 2008, the respective server computer 510, server computer 952, and/or computer 970, will generate an activity or confirmation message containing information regarding any actions taken by, or operations performed, by the respective server computer 510, server computer 952, and/or computer 970, in response to the reply signal. At step 2008, the respective server computer 510, server computer 952, and/or computer 970, will transmit the activity or confirmation message to the communication device associated with the owner, user, or authorized individual and the information contained in the activity or confirmation message can be provided to the owner, user, or authorized individual. Thereafter, the operation of the apparatus will cease at step 2009.

If, at step 2006, it is determined that the premises accessing and/or the control, monitoring, and/or security, operation(s) and/or function(s), performed or about to be performed, are authorized or allowed, the operation of the respective server computer 510, server computer 952, and/or computer 970, will proceed to step 2010 and the accessing will be allowed and any control, monitoring, and/or security, operation(s) and/or function(s), performed will undisturbed and/or any control, monitoring, and/or security, operation(s) and/or function(s), about to be performed will be performed.

Thereafter, at step 2011, the respective server computer 510, server computer 952, and/or computer 970, will generate an activity or confirmation message containing information regarding any actions taken by, or operations performed, by the respective server computer 510, server computer 952, and/or computer 970, in response to the reply signal. At step 2011, the respective server computer 510, server computer 952, and/or computer 970, will transmit the activity or confirmation message to the communication device associated with the owner, user, or authorized individual and the information contained in the activity or confirmation message can be provided to the owner, user, or authorized individual. Thereafter, the operation of the apparatus will cease at step 2012.

The apparatus and method of the present invention can be utilized to perform any/or all of the herein-described functionality for any of the herein-described vehicles and/or for any of the herein-described vehicle systems, vehicle equipment systems, vehicle equipment, vehicle components, vehicle devices, and/or vehicle accessories. The present invention can be utilized to control, monitor, and/or secure, any of the herein-described vehicles and/or any of the herein-described vehicle systems, vehicle equipment systems, vehicle equipment, vehicle components, vehicle devices, and/or vehicle accessories.

The present invention can be utilized in order to disable any controls of any of the herein-described vehicles and/or any vehicle system(s), vehicle equipment system(s), vehicle equipment, vehicle component(s), vehicle device(s), and/or vehicle accessory, described herein and/or otherwise utilized in conjunction with the vehicle and provide for the remote-controlled operation of the vehicle and any vehicle system(s), vehicle equipment system(s), vehicle equipment, vehicle component(s), vehicle device(s), and/or vehicle accessory, described herein and/or otherwise utilized in conjunction with the vehicle.

The apparatus and method of the present invention can be utilized to perform any/or all of the herein-described functionality for any of the herein-described vehicles and/or for any of the herein-described vehicle systems, vehicle equipment systems, vehicle equipment, vehicle components, vehicle devices, and/or vehicle accessories. The present invention can be utilized to control, monitor, and/or secure, any of the herein-described vehicles and/or any of the herein-described vehicle systems, vehicle equipment systems, vehicle equipment, vehicle components, vehicle devices, and/or vehicle accessories.

The present invention can be utilized in order to disable any controls of any of the herein-described vehicles and/or any vehicle system(s), vehicle equipment system(s), vehicle equipment, vehicle component(s), vehicle device(s), and/or vehicle accessory, described herein and/or otherwise utilized in conjunction with the vehicle and provide for the remote-controlled operation of the vehicle and any vehicle system(s), vehicle equipment system(s), vehicle equipment, vehicle component(s), vehicle device(s), and/or vehicle accessory, described herein and/or otherwise utilized in conjunction with the vehicle.

The apparatus and method of the present invention can be utilized to perform any/or all of the herein-described functionality for any of the herein-described vehicles and/or for any of the herein-described vehicle systems, vehicle equipment systems, vehicle equipment, vehicle components, vehicle devices, and/or vehicle accessories. The present invention can be utilized to control, monitor, and/or secure, any of the herein-described vehicles and/or any of the herein-described vehicle systems, vehicle equipment systems, vehicle equipment, vehicle components, vehicle devices, and/or vehicle accessories.

The present invention can be utilized in order to disable any controls of any of the herein-described vehicles and/or any vehicle system(s), vehicle equipment system(s), vehicle equipment, vehicle component(s), vehicle device(s), and/or vehicle accessory, described herein and/or otherwise utilized in conjunction with the vehicle and provide for the remote-controlled operation of the vehicle and any vehicle system(s), vehicle equipment system(s), vehicle equipment, vehicle component(s), vehicle device(s), and/or vehicle accessory, described herein and/or otherwise utilized in conjunction with the vehicle.

The apparatus and method of the present invention can also be utilized in order to allow a vehicle owner, user, or authorized individual, to limit or restrict access to, and/or control, monitoring, and/or security, operations or functions which relate to, a vehicle or vehicles. The present invention can also be utilized to provide real-time and/or deferred notification to a vehicle owner, user, or authorized individual, a vehicle is being accesses via the present invention and/or that a control, monitoring, and/or security, operation(s) and/or function(s) has been performed and/or is being attempted.

The apparatus and method of the present invention can be utilized to perform any/or all of the herein-described functionality for any of the herein-described premises and/or for any of the herein-described premises systems, premises equipment systems, premises equipment, premises components, premises devices, and/or premises accessories. The present invention can be utilized to control, monitor, and/or secure, any of the herein-described premises and/or any of the herein-described premises systems, premises equipment systems, premises equipment, premises components, premises devices, and/or premises accessories.

The present invention can be utilized in order to disable any controls of any of the herein-described premises and/or any premises system(s), premises equipment system(s), premises equipment, premises component(s), premises device(s), and/or premises accessory, described herein and/or otherwise utilized in conjunction with the premises and provide for the remote-controlled operation of the premises and any premises system(s), premises equipment system(s), premises equipment, premises component(s), premises device(s), and/or premises accessory, described herein and/or otherwise utilized in conjunction with the premises.

The apparatus and method of the present invention can be utilized to perform any/or all of the herein-described functionality for any of the herein-described premises and/or for any of the herein-described premises systems, premises equipment systems, premises equipment, premises components, premises devices, and/or premises accessories. The present invention can be utilized to control, monitor, and/or secure, any of the herein-described premises and/or any of the herein-described premises systems, premises equipment systems, premises equipment, premises components, premises devices, and/or premises accessories.

The present invention can be utilized in order to disable any controls of any of the herein-described premises and/or any premises system(s), premises equipment system(s), premises equipment, premises component(s), premises device(s), and/or premises accessory, described herein and/or otherwise utilized in conjunction with the premises and provide for the remote-controlled operation of the premises and any premises system(s), premises equipment system(s), premises equipment, premises component(s), premises device(s), and/or premises accessory, described herein and/or otherwise utilized in conjunction with the premises.

The apparatus and method of the present invention can be utilized to perform any/or all of the herein-described functionality for any of the herein-described premises and/or for any of the herein-described premises systems, premises equipment systems, premises equipment, premises components, premises devices, and/or premises accessories. The present invention can be utilized to control, monitor, and/or secure, any of the herein-described premises and/or any of the herein-described premises systems, premises equipment systems, premises equipment, premises components, premises devices, and/or premises accessories.

The present invention can be utilized in order to disable any controls of any of the herein-described premises and/or any premises system(s), premises equipment system(s), premises equipment, premises component(s), premises device(s), and/or premises accessory, described herein and/or otherwise utilized in conjunction with the premises and provide for the remote-controlled operation of the premises and any premises system(s), premises equipment system(s), premises equipment, premises component(s), premises device(s), and/or premises accessory, described herein and/or otherwise utilized in conjunction with the premises.

The apparatus and method of the present invention can also be utilized in order to allow a premises owner, user, or authorized individual, to limit or restrict access to, and/or control, monitoring, and/or security, operations or functions which relate to, a premises or premises. The present invention can also be utilized to provide real-time and/or deferred notification to a premises owner, user, or authorized individual, a premises is being accesses via the present invention and/or that a control, monitoring, and/or security, operation(s) and/or function(s) has been performed and/or is being attempted.

In any and/or all of the embodiments described herein the apparatus and method of the present invention can be utilized to monitor and/or control any of the vehicles and/or premises described herein. In another preferred embodiment, a user can access the vehicle or premises via the computer system or server 952, obtain video information and/or audio information at the vehicle or premises, and if needed or desired, transmit a signal including the video information and/or audio information obtained, to the computer 970 associated with the central security office. In this manner, for example, an owner or other authorized individual who has just ascertained that a vehicle or a premises may have been, or is being, broken into, vandalized, stolen, used or entered without authorization, can transmit video or audio information, including any video or audio evidence of the occurrence, to the central office computer 970 for viewing by authorized individuals and/or for storage for later use as evidence. In this manner, the apparatus and method of the present invention can be utilized to report any of the herein-described occurrences regarding any of the herein-described vehicles while on-line with the computer system or server 952.

For example, an individual can access his or her vehicle, ascertain that it has been or is being used by or operated by an unauthorized person, has been or is being vandalized or damaged, has been or is being burglarized, or is in a damaged state or a state of disrepair, and transmit a signal to the central office computer 970 which can include information regarding the occurrence (i.e., that the vehicle has been or is being used by or operated by an unauthorized person, has been or-is being vandalized or damaged, has been or is being burglarized, or is in a damaged state or a state of disrepair, etc.) as well as any one or more of video information or a picture, audio information, recorded video information, recorded audio information, which can be used in order to provide information regarding the occurrence to the appropriate individuals and/or authorities and/or used as evidence by any appropriate security or law enforcement service or entity.

In a similar or analogous manner, an individual can access his or her premises, ascertain that it has been or is being used by or operated by an unauthorized person, has been or is being entered upon, has been or is being trespassed upon or broken into, has been or is being vandalized or damaged, has been or is being burglarized, or is in a damaged state or a state of disrepair, and transmit a signal to the central office computer 970 which can include information regarding the occurrence (i.e., that the premises has been or is being used by or operated by an unauthorized person, has been or is being entered upon, has been or is being trespassed upon or broken into, has been or is being vandalized or damaged, has been or is being burglarized, or is in a damaged state or a state of disrepair, etc.) as well as any one or more of video information or a picture, audio information, recorded video information, recorded audio information, which can be used in order to provide information regarding the occurrence to the appropriate individuals and/or authorities and/or used as evidence by any appropriate security or law enforcement service or entity. In this manner, the apparatus and method of the present invention can be utilized to report any of the herein-described occurrences regarding any of the herein-described premises while on-line with the computer system or server 952.

In another preferred embodiment, the apparatus of the present invention can be programmed so that any appropriate and/or respective system, equipment system, equipment, component, device, and/or accessory, of any of the herein-described vehicles and/or premises can automatically detect an occurrence of at least one of an unauthorized use of, an act of vandalism perpetrated on, to, or in, a break-in of, a burglary of, damage to, and/or a state of disrepair of, any of the herein-described vehicles and/or premises, and/or any system, equipment system, equipment, component, device, and/or accessory, of a vehicle and/or a premises. The apparatus, and/or any respective components, can automatically generate and transmit a signal to the central office computer 970 which can include information regarding the occurrence as well as any one or more of video information or a picture, audio information, recorded video information, recorded audio information, which can be used in order to provide information regarding the occurrence to the appropriate individuals and/or authorities and/or used as evidence by any appropriate security or law enforcement service or entity.

In any of the embodiments described herein which provide centralized processing functionality such as those embodiments of FIG. 5B, FIG. 11A, and FIG. 11B, any of the respective server computers 510, computers 970, server computers 952 and computers 970 can be any computers and/or computer systems, central processing computers, sever computers, network computers, and/or any other computers and/or communication devices, depending upon the specific application and/or the communication networks which are utilized in conjunction therewith. Any of the respective server computers 510, computers 970, server computers 952 and computers 970, can also be implemented by any number any/or type of computers and/or computer systems.

In any and/or all of the embodiments described herein, any of the respective transmitters 2, central processing units CPU 4, home and/or personal computers 150, server computers 510, computers 970, server computers 952, can transmit signals, data and/or information, to, as well as receive signals, data and/or information, from, any one or more of the respective transmitters 2, central processing units CPU 4, home and/or personal computers 150, server computers 510, computers 970, server computers 952. Any of the respective transmitters 2, central processing units CPU 4, home and/or personal computers 150, server computers 510, computers 970, server computers 952, can communicate with each other in a bi-directional manner and/or fashion.

In any and/or all of the embodiments described herein, the CPU 4 can generate and transmit an appropriate message and/or signal, which can contain any appropriate data and/or information, and transmit said signal to a respective transmitter 2, home and/or personal computer 150, server computer 510, computer 970, and/or server computer 952, depending upon the embodiment utilized. In turn, any of the server computers 510, computers 970, and/or server computers 952, can process and/or transmit either the signal and/or a signal generated in response to the signal transmitted from the CPU 4 to the transmitter 2, the home and/or personal computer, and/or any other communication device associated with the respective individual, owner, user, and/or occupant, to be provided with such notification.

In any of the embodiments described herein which provide centralized processing functionality such as those embodiments of FIG. 5B, FIG. 11A, and FIG. 11B, any of the respective server computers 510, computers 970, server computers 952 and computers 970 can be any computers and/or computer systems, central processing computers, sever computers, network computers, and/or any other computers and/or communication devices, depending upon the specific application and/or the communication networks which are utilized in conjunction therewith. Any of the respective server computers 510, computers 970, server computers 952 and computers 970, can also be implemented by any number any/or type of computers and/or computer systems.

In any and/or all of the embodiments described herein, any of the respective transmitters 2, central processing units CPU 4, home and/or personal computers 150, server computers 510, computers 970, server computers 952, can transmit signals, data and/or information, to, as well as receive signals, data and/or information, from, any one or more of the respective transmitters 2, central processing units CPU 4, home and/or personal computers 150, server computers 510, computers 970, server computers 952. Any of the respective transmitters 2, central processing units CPU 4, home and/or personal computers 150, server computers 510, computers 970, server computers 952, can communicate with each other in a bi-directional manner and/or fashion.

In any and/or all of the embodiments described herein, the CPU 4 can generate and transmit an appropriate message and/or signal, which can contain any appropriate data and/or information, and transmit said signal to a respective transmitter 2, home and/or personal computer 150, server computer 510, computer 970, and/or server computer 952, depending upon the embodiment utilized. In turn, any of the server computers 510, computers 970, and/or server computers 952, can process and/or transmit either the signal and/or a signal generated in response to the signal transmitted from the CPU 4 to the transmitter 2, the home and/or personal computer, and/or any other communication device associated with the respective individual, owner, user, and/or occupant, to be provided with such notification.

In any and/or all of the embodiments described herein, any of the server computers 510, computers 970, and/or server computers 952, and/or any of the home and/or personal computers or communication devices 150 described herein and/or utilized in conjunction with the apparatus and method of the present invention can comprise and/or can be implemented with any number of computers or computer systems. In this regard, any of the server computers 510, computers 970, and/or server computers 952, and/or any of the home and/or personal computers or communication devices 150 can be a single computer or computer system or can be comprised of, or can include, a plurality (i.e. two or more) computers or computer systems. In this manner, any of the server computers 510, computers 970, and/or server computers 952, and/or any of the home and/or personal computers or communication devices 150 can be comprised of, and/or can be implemented, by utilizing any number of computers and/or computer systems.

The server computer 510, computer 970, and/or server computer 952, and/or any of the home and/or personal computer or communication devices 150 can also be comprised of, or can include, any number of computers and/or computer systems and can also include any number of transmitters, receivers, and/or other hardware devices and/or peripheral devices.

In any and/or all of the embodiments described herein, any of the receivers or transmitters associated with and/or utilized in conjunction with any of the server computers 510, computers 970, and/or server computers 952, and/or any of the home and/or personal computers or communication devices 150, described herein, can be or can include any number of receivers or transmitters, respectively.

In this manner, any event occurring at and/or involving, any condition of, any occurrence of, and/or other operating conditions and/or states regarding, any of the respective systems, equipment systems, subsystems, devices, components, and/or appliances, of any of the respective vehicles, motor vehicles, boats, marine vessels, airplane, aircraft, recreational vehicles, residential premises, and/or commercial premises, described herein, can be reported to a respective server computer, central processing computer, and/or central monitoring service, and/or can be reported to any of the respective individuals, users, owners, and/or occupants.

For example, a malfunctioning of a respective system(s), equipment system(s), subsystem(s), device(s), component(s), equipment, and/or appliance(s), of any of the herein-described vehicles, motor vehicles, boats, marine vessels, airplanes, aircraft, recreational vehicles, residential premises, and/or commercial premises, can be reported to a respective server computer, central processing computer, and/or central monitoring service, and/or can be reported to any of the respective individuals, users, owners, and/or occupants.

Similarly, any activation, de-activation, enabling, disabling, and/or any change and/or occurrence in, and/or involving the status and/or the operational state, of any of the respective system(s), equipment system(s), subsystem(s), device(s), component(s), equipment, and/or appliance(s), described herein, can be reported to a respective server computer, central processing computer, and/or central monitoring service, and/or can be reported to any of the respective individuals, users, owners, and/or occupants.

In any and/or all of the embodiments described herein, the apparatus can be utilized in order to provide any one or more of, video information, audio information, and/or video conferencing information, on or via any number of communication channels. The apparatus and method of the present invention can be utilized to provide any one or more of video information, audio information, and/or video conferencing information, on or via any number of communication channels in a communication network.

The apparatus of the present invention can be utilized to provide video information, obtained with a video recording device or camera located at a vehicle and/or at, or in the vicinity of, a premises with any of the home and/or personal computers or communication devices 150 described herein, via any of the herein-described server computers 510, computers 970, and/or server computers 952. The apparatus of the present invention can be utilized to provide audio information, obtained with an audio recording device or microphone located at a vehicle and/or at, or in the vicinity of, a premises with any of the home and/or personal computers or communication devices 150 described herein, via any of the herein-described server computers 510, computers 970, and/or server computers 952. The apparatus of the present invention can be utilized to provide video conferencing information, obtained with video conferencing equipment located at a vehicle and/or at, or in the vicinity of, a premises with any of the home and/or personal computers or communication devices 150 described herein, via any of the herein-described server computers 510, computers 970, and/or server computers 952.

The apparatus and method of the present invention can be utilized to provide video information from any one of any number of video recording devices. The apparatus and method of the present invention can also be utilized to provide audio information from any one of any number of audio recording devices. The apparatus and method of the present invention can also be utilized to provide video conferencing from any one of any number of video conferencing devices.

For example, a user can select a particular video camera, from any number of video cameras utilized in conjunction with the apparatus and method of the present invention, from which to obtain video. In a similar manner, a user can select a particular audio microphone, from any number of audio microphones utilized in conjunction with the apparatus and method of the present invention, from which to obtain audio. A user can also select a particular video conferencing device, from any number of video conferencing devices utilized in conjunction with the apparatus and method of the present invention, from which to engage in a video conference(s).

In another preferred embodiment, the apparatus and method of the present invention can be utilized in order to provide video information and/or video images from two or more video recording devices or cameras to a user computer or user communication device 150 simultaneously in a split-screen format or multiple screen format.

While the present invention has been described and illustrated in various preferred embodiments, such descriptions are merely illustrative of the present invention and are not to be construed to be limitations thereof. In this regard, the present invention encompasses any and all modifications, variations and/or alternate embodiments with the scope of the present invention being limited only by the claims which follow.

What is claimed is:

1. An apparatus, comprising:
a receiver, wherein the receiver receives information regarding a limitation or a restriction for allowing or for prohibiting a control operation or a monitoring operation regarding a vehicle, a vehicle system, a vehicle equipment system, a vehicle equipment, a vehicle component, a vehicle device, or a vehicle accessory;
a memory, wherein the memory stores the information regarding the limitation or the restriction for allowing or for prohibiting the control operation or the monitoring operation regarding the vehicle, the vehicle system, the vehicle equipment system, the vehicle equipment, the vehicle component, the vehicle device, or the vehicle accessory;
a first controller, wherein the first controller is specially programmed to perform the control operation or the monitoring operation regarding the vehicle, the vehicle system, the vehicle equipment system, the vehicle equipment, the vehicle component, the vehicle device, or the vehicle accessory, wherein the first controller is a server computer for a website, and further wherein the first controller is located at a location separate and apart from the vehicle,
wherein the receiver receives a first signal, wherein the first signal is transmitted from a second controller via a communication network, and further wherein the first signal contains information regarding the control operation or the monitoring operation regarding the vehicle, the vehicle system, the vehicle equipment system, the vehicle equipment, the vehicle component, the vehicle device, or the vehicle accessory, wherein the second controller is located at a location separate and apart from the first controller and separate and apart from the vehicle, wherein the first controller is specially programmed to determine, using the information regarding the limitation or the restriction, if the control operation or the monitoring operation regarding the vehicle, the vehicle system, the vehicle equipment system, the vehicle equipment, the vehicle component, the vehicle device, or the vehicle accessory, is allowed or disallowed, wherein the first controller determines, using the information regarding the limitation or the restriction, if the control operation or the monitoring operation regarding the vehicle, the vehicle system, the vehicle equipment system, the vehicle equipment, the vehicle component, the vehicle device, or the vehicle accessory, is allowed or disallowed, and if allowed, the first controller transmits a second signal to a third controller, wherein the third controller is located in or at the vehicle, and further wherein the third controller generates a third signal in response to the second signal, wherein the third signal activates, deactivates, enables, disables, controls an operation of, or monitors an operation of, the vehicle, the vehicle system, the vehicle equipment system, the vehicle equipment, the vehicle component, the vehicle device, or the vehicle accessory.

2. The apparatus of claim 1, wherein the apparatus generates a message, wherein the message is transmitted from the first controller or from the apparatus and is received by or at the second controller or by or at a communication device of or associated with an owner or user of the vehicle or an authorized individual, wherein the message contains information regarding a receiving of the first signal by the receiver or contains information regarding the control operation or the monitoring operation.

3. The apparatus of claim 2, wherein the message is transmitted in an e-mail message or in an electronic transmission.

4. The apparatus of claim 1, wherein the communication network is the Internet or the World Wide Web.

5. The apparatus of claim 1, wherein the second controller is a cellular telephone, an interactive television, a personal digital assistant, a personal computer, a laptop computer, or a watch, and further wherein the third controller is a central processing unit, a microprocessor, or a digital computer.

6. The apparatus of claim 1, wherein the first signal, the second signal, or the third signal, contains information for controlling a propulsion of the vehicle, a turning of the vehicle, a flight of the vehicle, or a landing of the vehicle.

7. The apparatus of claim 1, wherein the vehicle is an airplane, a jet, an aircraft, or a helicopter.

8. The apparatus of claim 1, wherein the vehicle is a boat, a marine vehicle, a submarine, or a marine vessel.

9. The apparatus of claim 1, wherein the vehicle is a train or a subway train.

10. The apparatus of claim 1, wherein the third controller effectuates a repair or a reprogramming of the vehicle system, the vehicle equipment system, the vehicle equipment, the vehicle component, the vehicle device, or the vehicle accessory.

11. An apparatus, comprising:
a receiver;
a first controller, wherein the first controller is located at a location separate and apart from a vehicle, wherein the receiver receives a signal transmitted from a second controller, wherein the first controller is a server computer of a website, wherein the second controller is located at a location separate and apart from the first controller and separate and apart from the vehicle, wherein the signal contains information regarding a control operation or a monitoring operation regarding a vehicle, a vehicle system, a vehicle equipment system, a vehicle equipment, a vehicle component, a vehicle device, or a vehicle accessory,
wherein the first controller is specially programmed to generate a message containing information regarding information contained in the signal, an attempt to perform the control operation or the monitoring operation regarding the vehicle, the vehicle system, the vehicle equipment system, the vehicle equipment, the vehicle component, the vehicle device, or the vehicle accessory, or a performance of the control operation or the monitoring operation regarding the vehicle, the vehicle system, the vehicle equipment system, the vehicle equipment, the vehicle component, the vehicle device, or the vehicle accessory, and further wherein the first controller generates the message, and further wherein the message is transmitted from the first controller or from the apparatus and is received by or at a communication device of or associated with an owner or user of the vehicle or an authorized individual.

12. The apparatus of claim 11, wherein the first controller receives a reply signal transmitted from the communication device, wherein the reply signal contains information for allowing or disallowing the control operation or the monitoring operation regarding the vehicle, the vehicle system, the vehicle equipment system, the vehicle equipment, the vehicle component, the vehicle device, or the vehicle accessory.

13. The apparatus of claim 12, wherein the first controller processes the information contained in the reply signal and generates a second signal for allowing or disallowing the control operation or the monitoring operation, regarding the vehicle, the vehicle system, the vehicle equipment system, the vehicle equipment, the vehicle component, the vehicle device, or the vehicle accessory.

14. The apparatus of claim 13, wherein the first controller transmits the second signal to a third controller, wherein the third controller is located at the vehicle, wherein the third controller generates a third signal, and further wherein the third signal activates, deactivates, enables, disables, controls an operation of, or monitors an operation of the vehicle, the vehicle system, the vehicle equipment system, the vehicle equipment, the vehicle component, the vehicle device, or the vehicle accessory.

15. An apparatus, comprising:
a receiver, wherein the receiver receives information regarding a limitation or a restriction for allowing or for prohibiting a control operation or a monitoring operation regarding a premises, a premises system, a premises equipment system, a premises equipment, a premises component, a premises device, or a premises accessory, wherein the premises is a residential building or residential structure and any land associated with the residential building or residential structure or the premises is a commercial building or commercial structure and any land associated with the commercial building or commercial structure;
a memory, wherein the memory stores the information regarding the limitation or the restriction for allowing or for prohibiting the control operation or the monitoring operation regarding the premises, the premises system, the premises equipment system, the premises equipment, the premises component, the premises device, or the premises accessory;
a first controller, wherein the first controller is specially programmed to perform the control operation or the monitoring operation regarding the premises, the premises system, the premises equipment system, the premises equipment, the premises component, the premises device, or the premises accessory, wherein the first controller is a server computer for a website, and further wherein the first controller is located at a location separate and apart from the premises,
wherein the receiver receives a first signal, wherein the first signal is transmitted from a second controller via a communication network, and further wherein the first signal contains information regarding the control operation or the monitoring operation regarding the premises, the premises system, the premises equipment system, the premises equipment, the premises component, the premises device, or the premises accessory, wherein the second controller is located at a location separate and apart from the first controller and separate and apart from the premises, wherein the first controller is specially programmed to determine, using the information regarding the limitation or the restriction, if the control operation or the monitoring operation regarding the premises, the premises system, the premises equipment system, the premises equipment, the premises component, the premises device, or the premises accessory, is allowed or disallowed, wherein the first controller determines, using the information regarding the limitation or the restriction, if the control operation or the monitoring operation regarding the premises, the premises system, the premises equipment system, the premises equipment, the premises component, the premises device, or the premises accessory, is allowed or disallowed, and if allowed, the first controller transmits a second signal to a third controller, wherein the third controller is located at the premises, and further wherein the third controller generates a third signal in response to the second signal, wherein the third signal activates, deactivates, enables, disables, controls an operation of, or monitors an operation of, the premises, the premises system, the premises equipment system, the premises equipment, the premises component, the premises device, or the premises accessory.

16. The apparatus of claim 15, wherein the apparatus generates a message, wherein the message is transmitted from the first controller or from the apparatus and is received by or at the second controller or by or at a communication device of or associated with an owner or user of the premises or an authorized individual, wherein the message contains information contained in the first signal or contains information regarding the control operation or the monitoring operation.

17. The apparatus of claim 15, wherein the first signal, the second signal, or the third signal, contains information for controlling or monitoring, or controlling or monitoring an operation of, the premises, the premises system, the premises equipment system, the premises equipment, the premises component, the premises device, or the premises accessory.

18. An apparatus, comprising:
a receiver;
a first controller, wherein the first controller is located at a location separate and apart from a premises, wherein the premises is a residential building or residential structure and any land associated with the residential building or residential structure or the premises is a commercial building or commercial structure and any land associated with the commercial building or commercial structure, wherein the receiver receives a signal transmitted from a second controller, wherein the first controller is a server computer of a website, wherein the second controller is located at a location separate and apart from the first controller and separate and apart from the premises, wherein the signal contains information regarding a control operation or a monitoring operation regarding a premises, a premises system, a premises equipment system, a premises equipment, a premises component, a premises device, or a premises accessory,
wherein the first controller is specially programmed to generate a message containing information regarding information contained in the signal, an attempt to perform the control operation or the monitoring operation regarding the premises, the premises system, the premises equipment system, the premises equipment, the premises component, the premises device, or the premises accessory, or a performance of the control operation or the monitoring operation regarding the premises, the premises system, the premises equipment system, the premises equipment, the premises component, the premises device, or the premises accessory, and further wherein the first controller generates the message, and further wherein the message is transmitted from the first controller or from the apparatus and is received by or at a communication device of or associated with an owner or user of the premises or an authorized individual.

19. The apparatus of claim 18, wherein the first controller receives a reply signal transmitted from the communication device, wherein the reply signal contains information for allowing or disallowing the control operation or the monitoring operation regarding the premises, the premises system, the premises equipment system, the premises equipment, the premises component, the premises device, or the premises accessory.

20. The apparatus of claim 19, wherein the first controller processes the information contained in the reply signal and generates a second signal for allowing or disallowing the control operation or the monitoring operation regarding the premises, the premises system, the premises equipment system, the premises equipment, the premises component, the premises device, or the premises accessory.

21. The apparatus of claim 20, wherein the first controller transmits the second signal to a third controller, wherein the third controller is located at the premises, wherein the third controller generates a third signal, and further wherein the third signal activates, deactivates, enables, disables, controls an operation of, or monitors an operation of, the premises, the premises system, the premises equipment system, the premises equipment, the premises component, the premises device, or the premises accessory.

22. The apparatus of claim 18, wherein the apparatus effectuates a repair or a reprogramming of the premises, the premises system, the premises equipment system, the premises equipment, the premises component, the premises device, or the premises accessory.

23. An apparatus, comprising:
a receiver, wherein the receiver receives information regarding a limitation or a restriction for allowing or for prohibiting a control operation or a monitoring operation regarding a vehicle, a vehicle system, a vehicle equipment system, a vehicle equipment, a vehicle component, a vehicle device, or a vehicle accessory;
a memory, wherein the memory stores the information regarding the limitation or the restriction for allowing or for prohibiting the control operation or the monitoring operation regarding the vehicle, the vehicle system, the vehicle equipment system, the vehicle equipment, the vehicle component, the vehicle device, or the vehicle accessory;
a first controller, wherein the first controller is specially programmed to perform the control operation or the monitoring operation regarding the vehicle, the vehicle system, the vehicle equipment system, the vehicle equipment, the vehicle component, the vehicle device, or the vehicle accessory, wherein the first controller is a server computer for a website, and further wherein the first controller is located at a location separate and apart from the vehicle,
wherein the receiver receives a first signal, wherein the first signal is transmitted from a second controller via a communication network, and further wherein the first signal contains information regarding the control operation or the monitoring operation regarding the vehicle, the vehicle system, the vehicle equipment system, the vehicle equipment, the vehicle component, the vehicle device, or the vehicle accessory, wherein the second controller is located at a location separate and apart from the first controller and separate and apart from the vehicle, wherein the first controller is specially programmed to determine, using the information regarding the limitation or the restriction, if the control operation or the monitoring operation regarding the vehicle, the vehicle system, the vehicle equipment system, the vehicle equipment, the vehicle component, the vehicle device, or the vehicle accessory, is allowed or disallowed, wherein the first controller determines, using the information regarding the limitation or the restriction, if the control operation or the monitoring operation regarding the vehicle, the vehicle system, the vehicle equipment system, the vehicle equipment, the vehicle component, the vehicle device, or the vehicle accessory, is allowed or disallowed, and if allowed, the first controller transmits a second signal to a third controller, wherein the third controller is located in or at the vehicle, and further wherein the third controller generates a third signal in response to the second signal, wherein the third signal activates, deactivates, enables, disables, controls an operation of, or monitors an operation of, the vehicle, the vehicle system, the vehicle equipment system, the vehicle equipment, the vehicle component, the vehicle device, or the vehicle accessory, wherein the first controller generates a message, and further wherein the first controller or the apparatus transmits the message, and further wherein the message is received by or at the second controller or by or at a communication device of or associated with an owner or user of the vehicle or an authorized individual.

24. The apparatus of claim 23, wherein the first signal, the second signal, or the third signal, contains information for controlling an operation of the vehicle, a propulsion of the vehicle, a turning of the vehicle, a flight of the vehicle, or a landing of the vehicle.

25. The apparatus of claim 23, wherein the message contains information regarding a receiving of the first signal by the receiver, and further wherein the message is transmitted in an e-mail message or in an electronic transmission.

26. The apparatus of claim 23, wherein the message contains information regarding the control operation or the monitoring operation, and further wherein the message is transmitted in an e-mail message or in an electronic transmission.

27. An apparatus, comprising:
a receiver, wherein the receiver receives information regarding a limitation or a restriction for allowing or for prohibiting a control operation or a monitoring operation regarding a vehicle, a vehicle system, a vehicle equipment system, a vehicle equipment, a vehicle component, a vehicle device, or a vehicle accessory;
a memory, wherein the memory stores the information regarding the limitation or the restriction for allowing or for prohibiting the control operation or the monitoring operation regarding the vehicle, the vehicle system, the vehicle equipment system, the vehicle equipment, the vehicle component, the vehicle device, or the vehicle accessory;
a first controller, wherein the first controller is specially programmed to perform the control operation or the monitoring operation regarding the vehicle, the vehicle system, the vehicle equipment system, the vehicle equipment, the vehicle component, the vehicle device, or the vehicle accessory, and further wherein the first controller is located at a location separate and apart from the vehicle,
wherein the receiver receives a first signal, wherein the first signal is transmitted from a second controller, and further wherein the first signal contains information regarding the control operation or the monitoring operation regarding the vehicle, the vehicle system, the vehicle equipment system, the vehicle equipment, the vehicle component, the vehicle device, or the vehicle accessory, wherein the second controller is located at a location separate and apart from the first controller and separate and apart from the vehicle, wherein the first controller is specially programmed to determine, using the information regarding the limitation or the restriction, if the control operation or the monitoring operation regarding the vehicle, the vehicle system, the vehicle equipment system, the vehicle equipment, the vehicle component, the vehicle device, or the vehicle accessory, is allowed or disallowed, wherein the first controller determines, using the information regarding the limitation or the restriction, if the control operation or the monitoring operation regarding the vehicle, the vehicle system, the vehicle equipment system, the vehicle equipment, the vehicle component, the vehicle device, or the vehicle accessory, is allowed or disallowed, and if allowed, the first controller transmits a second signal to a third controller, wherein the third controller is located in or at the vehicle, and further wherein the third controller generates a third signal in response to the second signal, wherein the third signal activates, deactivates, enables, disables, controls an operation of, or monitors an operation of, the vehicle, the vehicle system, the vehicle equipment system, the vehicle equipment, the vehicle component, the vehicle device, or the vehicle accessory,
wherein the first controller generates a message, and further wherein the first controller or the apparatus transmits the message, and further wherein the message is received by or at the second controller or by or at a communication device of or associated with an owner or user of the vehicle or an authorized individual.

28. The apparatus of claim 27, wherein the second controller or the communication device is a cellular telephone, an interactive television, a personal digital assistant, a personal computer, a laptop computer, or a watch, and further wherein the third controller is a central processing unit, a microprocessor, or a digital computer.

29. The apparatus of claim 27, wherein the message contains information regarding a receiving of the first signal by the receiver or information regarding the control operation or the monitoring operation, and further wherein the message is transmitted in an e-mail message or in an electronic transmission.

30. An apparatus, comprising:
a receiver;
a first controller, wherein the first controller is located at a location separate and apart from a vehicle, wherein the receiver receives a signal transmitted from a second controller, wherein the first controller is a server computer of a website, wherein the second controller is located at a location separate and apart from the first controller and separate and apart from the vehicle, wherein the signal contains information regarding a control operation or a monitoring operation regarding a vehicle, a vehicle system, a vehicle equipment system, a vehicle equipment, a vehicle component, a vehicle device, or a vehicle accessory, wherein the first controller is specially programmed to generate a message containing information regarding information contained in the signal, an attempt to perform the control operation or the monitoring operation regarding the vehicle, the vehicle system, the vehicle equipment system, the vehicle equipment, the vehicle component, the vehicle device, or the vehicle accessory, or a performance of the control operation or the monitoring operation regarding the vehicle, the vehicle system, the vehicle equipment system, the vehicle equipment, the vehicle component, the vehicle device, or the vehicle accessory, and further wherein the first controller generates the message, and further wherein the message is transmitted in an e-mail message or in an electronic transmission to a communication device of or associated with an owner or user of the vehicle or an authorized individual.

31. The apparatus of claim 30, wherein the first controller receives a reply signal transmitted from the communication device, wherein the reply signal contains information for allowing or disallowing the control operation or the monitoring operation regarding the vehicle, the vehicle system, the vehicle equipment system, the vehicle equipment, the vehicle component, the vehicle device, or the vehicle accessory.

32. The apparatus of claim 31, wherein the first controller processes the information contained in the reply signal and generates a second signal for allowing or disallowing the control operation or the monitoring operation regarding the vehicle, the vehicle system, the vehicle equipment system, the vehicle equipment, the vehicle component, the vehicle device, or the vehicle accessory.

33. An apparatus, comprising:
a receiver, wherein the receiver receives information regarding a limitation or a restriction for allowing or for prohibiting a control operation or a monitoring operation regarding a premises, a premises system, a premises equipment system, a premises equipment, a premises component, a premises device, or a premises accessory, wherein the premises is a structure on a piece of land, a structure located on or in water, an industrial structure, equipment, or a mobile structure;
a memory, wherein the memory stores the information regarding the limitation or the restriction for allowing or for prohibiting the control operation or the monitoring operation regarding the premises, the premises system, the premises equipment system, the premises equipment, the premises component, the premises device, or the premises accessory;
a first controller, wherein the first controller is specially programmed to perform the control operation or the monitoring operation regarding the premises, the premises system, the premises equipment system, the premises equipment, the premises component, the premises device, or the premises accessory, wherein the first controller is a server computer for a website, and further wherein the first controller is located at a location separate and apart from the premises,
wherein the receiver receives a first signal, wherein the first signal is transmitted from a second controller, and further wherein the first signal contains information regarding the control operation or the monitoring operation regarding the premises, the premises system, the premises equipment system, the premises equipment, the premises component, the premises device, or the premises accessory, wherein the second controller is located at a location separate and apart from the first controller and separate and apart from the premises, wherein the first controller is specially programmed to determine, using the information regarding the limitation or the restriction, if the control operation or the monitoring operation regarding the premises, the premises system, the premises equipment system, the premises equipment, the premises component, the premises device, or the premises accessory, is allowed or disallowed, wherein the first controller determines, using the information regarding the limitation or the restriction, if the control operation or the monitoring operation regarding the premises, the premises system, the premises equipment system, the premises equipment, the premises component, the premises device, or the premises accessory, is allowed or disallowed, and if allowed, the first controller transmits a second signal to a third controller, wherein the third controller is located at the premises, and further wherein the third controller generates a third signal in response to the second signal, wherein the third signal activates, deactivates, enables, disables, controls an operation of, or monitors an operation of, the premises, the premises system, the premises equipment system, the premises equipment, the premises component, the premises device, or the premises accessory.

34. The apparatus of claim 33, wherein the first controller generates a message, and further wherein the first controller or the apparatus transmits the message, and further wherein the message is received by or at the second controller or by or at a communication device of or associated with an owner or user of the premises or an authorized individual, wherein the message contains information contained in the first signal or contains information regarding the control operation or the monitoring operation.

35. The apparatus of claim 34, wherein the message is transmitted in an e-mail message or in an electronic transmission.

36. The apparatus of claim 33, wherein the first signal, the second signal, or the third signal, contains information for controlling or monitoring, or controlling or monitoring an operation of, the premises, the premises system, the premises equipment system, the premises equipment, the premises component, the premises device, or the premises accessory.

37. An apparatus, comprising:
a receiver;
a first controller, wherein the first controller is located at a location separate and apart from a premises, wherein the premises is a residential building or residential structure and any land associated with the residential building or residential structure or the premises is a commercial building or commercial structure and any land associated with the commercial building or commercial structure, wherein the receiver receives a signal transmitted from a second controller, wherein the first controller is a server computer of a website, wherein the second controller is located at a location separate and apart from the first controller and separate and apart from the premises, wherein the signal contains information regarding a control operation or a monitoring operation regarding the premises, or regarding a premises system, a premises equipment system, a premises equipment, a premises component, a premises device, or a premises accessory, of the premises, wherein the first controller is specially programmed to generate a message containing information regarding information contained in the signal, an attempt to perform the control operation or the monitoring operation regarding the premises, or regarding the premises system, the premises equipment system, the premises equipment, the premises component, the premises device, or the premises accessory, of the premises, or a performance of the control operation or the monitoring operation regarding the premises, or regarding the premises system, the premises equipment system, the premises equipment, the premises component, the premises device, or the premises accessory, of the premises, and further wherein the first controller generates the message, and further wherein the message is transmitted from the first controller or the apparatus in an e-mail message or in an electronic transmission, and further wherein the message is received by or at a communication device of or associated with an owner or user of the premises or an authorized individual.

\* \* \* \* \*